US012629671B2

(12) United States Patent
Perroud et al.

(10) Patent No.: US 12,629,671 B2
(45) Date of Patent: May 19, 2026

(54) PIPETTING APPARATUS AND METHODS

(71) Applicant: Revvity Health Sciences, Inc.,
Waltham, MA (US)

(72) Inventors: Thomas Perroud, Lexington, MA
(US); Thomas Rawlins, Tyngsborough,
MA (US); Hans-Juergen Tiedtke,
Bonn (DE); Kai Hassler, Lucerne (CH)

(73) Assignee: REVVITY HEALTH SCIENCES,
INC., Waltham, MA (US)

( * ) Notice: Subject to any disclaimer, the term of this
patent is extended or adjusted under 35
U.S.C. 154(b) by 927 days.

(21) Appl. No.: 17/741,647

(22) Filed: May 11, 2022

(65) Prior Publication Data

US 2023/0366904 A1     Nov. 16, 2023

(51) Int. Cl.
*G01N 35/10*          (2006.01)
*B01L 3/02*           (2006.01)

(52) U.S. Cl.
CPC ........... *B01L 3/0237* (2013.01); *B01L 3/0217*
(2013.01); *B01L 3/0231* (2013.01); *G01N*
*35/1016* (2013.01); *B01L 2200/0615*
(2013.01); *B01L 2200/146* (2013.01); *B01L*
*2200/148* (2013.01); *B01L 2400/0487*
(2013.01); *G01N 2035/103* (2013.01)

(58) Field of Classification Search
None
See application file for complete search history.

(56) References Cited

U.S. PATENT DOCUMENTS

| | | | | |
|---|---|---|---|---|
| 3,800,984 A | * | 4/1974 | Phelan | ................... B01L 3/021 |
| | | | | 222/137 |
| 4,523,484 A | * | 6/1985 | Kadota | ................... G01N 1/38 |
| | | | | 73/864.22 |
| 5,192,511 A | | 3/1993 | Roach | |
| 5,499,545 A | | 3/1996 | Kimura et al. | |
| 8,096,197 B2 | | 1/2012 | Curtis et al. | |
| 11,161,108 B2 | | 11/2021 | Ott | |
| 2002/0188410 A1 | | 12/2002 | Salje | |
| 2007/0059215 A1 | | 3/2007 | Huang | |
| 2007/0102445 A1 | | 5/2007 | Nay et al. | |
| 2011/0182782 A1 | | 7/2011 | Dzuong | |
| 2016/0045913 A1 | | 2/2016 | Luebbert et al. | |
| 2016/0067705 A1 | | 3/2016 | Gehrig et al. | |

(Continued)

FOREIGN PATENT DOCUMENTS

| | | | |
|---|---|---|---|
| EP | 2359932 A1 | 8/2011 |
| EP | 1973662 B1 | 3/2016 |

(Continued)

OTHER PUBLICATIONS

Invitation to Pay Additional Fees and, where applicable, Protest Fee
in corresponding PCT Application No. PCT/US2023/065982 (Aug.
31, 2023).

(Continued)

*Primary Examiner* — P. Kathryn Wright
(74) *Attorney, Agent, or Firm* — Myers Bigel, P.A.

(57) ABSTRACT

An automated pipetting system includes a pipettor. The
pipettor includes a pipetting channel, a first plunger mecha-
nism operable to change a pressure in the pipetting channel
to aspirate or dispense a liquid, and a second plunger
mechanism operable to change the pressure in the pipetting
channel to aspirate or dispense the liquid.

23 Claims, 62 Drawing Sheets

(56) References Cited

U.S. PATENT DOCUMENTS

| | | | |
|---|---|---|---|
| 2018/0214862 A1 | 8/2018 | Horsley et al. | |
| 2019/0143317 A1 | 5/2019 | Ott et al. | |
| 2019/0291097 A1 | 9/2019 | Ott | |
| 2019/0376994 A1 | 12/2019 | Pawlowski | |
| 2020/0330977 A1* | 10/2020 | Wikholm | G01N 35/1016 |
| 2021/0252496 A1* | 8/2021 | Schieffer | B01L 3/0227 |
| 2021/0252498 A1 | 8/2021 | Förthmann et al. | |

FOREIGN PATENT DOCUMENTS

| | | | |
|---|---|---|---|
| GB | 2132346 A | 7/1984 | |
| JP | 2010256200 A | 11/2010 | |
| WO | 2021163437 A1 | 8/2021 | |

OTHER PUBLICATIONS

Adaptive Signal Technology™—Improved Capacitive Liquid Level Detection for Increased Process Reliability, News-Medical.Net (Jul. 19, 2016).
LHD Ultra series—digital low differential pressure sensors Datasheet, First Sensors (16 pages) (Date unknown but admitted prior art).
International Search Report and the Written Opinion of the International Searching Authority corresponding to International Patent Application No. PCT/US2023/065982 (29 pages) (mailed Oct. 25, 2023).

* cited by examiner

300

344

324

342

352

322

360

SF1

PIPETTING APPARATUS AND METHODS

FIELD

The present technology relates to automated liquid handling systems and, more particularly, to apparatus and methods for aspirating and/or dispensing liquids using a pipettor.

BACKGROUND

Laboratory liquid handling systems are used to transport and operate on volumes of liquid. The liquid handling system may include one or more pipettors that are used to aspirate portions of liquid samples and/or to dispense liquid samples. In some cases, the liquid samples are aspirated and dispensed robotically and, in some cases, automatically and programmatically.

SUMMARY

According to some embodiments, an automated pipetting system includes a pipettor. The pipettor includes a pipetting channel, a first plunger mechanism operable to change a pressure in the pipetting channel to aspirate or dispense a liquid, and a second plunger mechanism operable to change the pressure in the pipetting channel to aspirate or dispense the liquid.

According to some embodiments, the first and second plunger mechanisms are operable to displace an air volume in the pipetting channel.

According to some embodiments, the first and second plunger mechanisms are operable independently of one another to change the pressure in the pipetting channel.

In some embodiments, the pipetting system includes a pipetting orifice and a liquid collection volume, and the first and second plunger mechanisms are operable to change the pressure in the pipetting channel to aspirate the liquid into the liquid collection volume through the pipetting orifice or to dispense the liquid from the liquid collection volume through the pipetting orifice.

The automated pipetting system may include a pipette tip removably coupled to the pipettor, wherein the pipette tip includes the liquid collection volume and the pipetting orifice.

In some embodiments, the pipettor includes an ejection mechanism operable to force the pipette tip off of the pipettor.

According to some embodiments, the first plunger mechanism includes a first chamber and a first plunger, wherein the first plunger mechanism is operable to move the first plunger through the first chamber to change the pressure in the pipetting channel, and the second plunger mechanism includes a second chamber and a second plunger, wherein the second plunger mechanism is operable to move the second plunger through the second chamber to change the pressure in the pipetting channel.

In some embodiments, the first plunger mechanism includes a first plunger actuator operable to move the first plunger through the first chamber, the second plunger mechanism includes a second plunger actuator operable to move the second plunger through the second chamber, and the automated pipetting system includes a controller configured to automatically and programmatically control the first plunger actuator and the second plunger actuator.

The first plunger actuator and the second plunger actuator may be linear actuators.

In some embodiments, the first plunger mechanism is configured to translate the first plunger along a first plunger axis, the second plunger mechanism is configured to translate the second plunger along a second plunger axis, the first plunger has a first cross-sectional area in a plane orthogonal to the first plunger axis, the second plunger has a second cross-sectional area in a plane orthogonal to the second plunger axis, and the second cross-sectional area is greater than the first cross-sectional area.

In some embodiments, the second cross-sectional area is at least three times the first cross-sectional area.

According to some embodiments, the first plunger mechanism is configured to translate the first plunger through the first chamber, the second plunger mechanism is configured to translate the second plunger through the second chamber, the first plunger displaces an air volume in the first chamber at a first rate of air volume displacement per unit translation, the second plunger displaces an air volume in the second chamber at a second rate of air volume displacement per unit translation, and the second rate of air volume displacement per unit translation is greater than the first rate of air volume displacement per unit translation.

In some embodiments, the second rate of air volume displacement per unit translation is at least three times the first rate of air volume displacement per unit translation.

In some embodiments, the first plunger mechanism is configured to provide a first maximum air volume displacement, the second plunger mechanism is configured to provide a second maximum air volume displacement, and the second maximum air volume displacement is greater than the first maximum air volume displacement.

In some embodiments, the second maximum air volume displacement is at least ten times the first maximum air volume displacement.

In some embodiments, the first chamber has a first chamber volume, and the second chamber has a second chamber volume that is greater than the first chamber volume.

In some embodiments, the second chamber volume is at least ten times the first chamber volume.

According to some embodiments, the pipettor includes a valve to selectively control fluid communication between the second chamber and a port to atmosphere.

According to some embodiments, the pipettor includes at least one valve to selectively control fluid communication between the second chamber and the pipetting channel. In some embodiments, the first plunger is disposed in the pipetting channel.

According to some embodiments, the first plunger is disposed in the pipetting channel.

The automated pipetting system may include a controller configured to automatically and programmatically control the first and second plunger mechanisms.

The automated pipetting system may include a pressure sensor coupled to the pipetting channel, wherein the controller is configured to receive a pipetting channel pressure signal from the pressure sensor indicating the pressure in the pipetting channel.

According to some embodiments, the pipettor includes a valve to selectively control fluid communication between the second plunger mechanism and the pipetting channel, and the controller is configured to automatically and programmatically control the valve.

According to some embodiments, a method for operating an automated pipetting system includes performing, by at least one control circuit, operations comprising: operating a first plunger mechanism of a pipettor of the automated pipetting system to change a pressure in a pipetting channel of the pipettor to aspirate or dispense a liquid; and operating a second plunger mechanism of the pipettor to change the pressure in the pipetting channel to aspirate or dispense the liquid.

According to some embodiments, the method includes operating the first and second plunger mechanisms to displace an air volume in the pipetting channel.

According to some embodiments, the method includes operating the first and second plunger mechanisms independently of one another to change the pressure in the pipetting channel.

According to some embodiments, the method includes operating the first and second plunger mechanisms to aspirate the liquid into a liquid collection volume through a pipetting orifice or to dispense the liquid from the liquid collection volume through the pipetting orifice.

In some embodiments, the method includes removably coupling a pipette tip to the pipettor, wherein the pipette tip includes the liquid collection volume and the pipetting orifice.

In some embodiments, the method includes operating an ejection mechanism to force the pipette tip off of the pipettor.

According to some embodiments, the first plunger mechanism includes a first chamber and a first plunger, the second plunger mechanism includes a second chamber and a second plunger, the method includes operating the first plunger mechanism to move the first plunger through the first chamber to change the pressure in the pipetting channel, and the method includes operating the second plunger mechanism includes moving the second plunger through the second chamber to change the pressure in the pipetting channel.

In some embodiments, the first plunger mechanism includes a first plunger actuator operable to move the first plunger through the first chamber, the second plunger mechanism includes a second plunger actuator operable to move the second plunger through the second chamber, and the method includes automatically and programmatically controlling the first plunger actuator and the second plunger actuator using a controller.

The first plunger actuator and the second plunger actuator may be linear actuators.

According to some embodiments, the first plunger mechanism is configured to translate the first plunger along a first plunger axis, the second plunger mechanism is configured to translate the second plunger along a second plunger axis, the first plunger has a first cross-sectional area in a plane orthogonal to the first plunger axis, the second plunger has a second cross-sectional area in a plane orthogonal to the second plunger axis, and the second cross-sectional area is greater than the first cross-sectional area.

In some embodiments, the second cross-sectional area is at least three times the first cross-sectional area.

In some embodiments, the first plunger mechanism is configured to translate the first plunger through the first chamber, the second plunger mechanism is configured to translate the second plunger through the second chamber, the first plunger displaces an air volume in the first chamber at a first rate of air volume displacement per unit translation, the second plunger displaces an air volume in the second chamber at a second rate of air volume displacement per unit translation, and the second rate of air volume displacement per unit translation is greater than the first rate of air volume displacement per unit translation.

In some embodiments, the second rate of air volume displacement per unit translation is at least three times the first rate of air volume displacement per unit translation.

According to some embodiments, the first plunger mechanism is configured to provide a first maximum air volume displacement, the second plunger mechanism is configured to provide a second maximum air volume displacement, and the second maximum air volume displacement is greater than the first maximum air volume displacement.

In some embodiments, the second maximum air volume displacement is at least ten times the first maximum air volume displacement.

According to some embodiments, the first chamber has a first chamber volume, and the second chamber has a second chamber volume that is greater than the first chamber volume.

In some embodiments, the second chamber volume is at least ten times the first chamber volume.

The method may include selectively controlling fluid communication between the second chamber and the pipetting channel using a valve forming a part of the pipettor. In some embodiments, the first plunger is disposed in the pipetting channel.

According to some embodiments, the first plunger is disposed in the pipetting channel.

The method may include automatically and programmatically controlling the first and second plunger mechanisms using a controller.

According to some embodiments, the pipettor includes a pressure sensor coupled to the pipetting channel, and the controller receives a pipetting channel pressure signal from the pressure sensor indicating the pressure in the pipetting channel.

In some embodiments, the pipettor includes a valve to selectively control fluid communication between the second plunger mechanism and the pipetting channel, and the method includes automatically and programmatically controlling the valve using the controller.

According to some embodiments, a pipetting system includes a pipettor including: a barrel; a pipetting channel; a passage defined in the barrel and in fluid communication with the pipetting channel, the passage including a rear chamber, and a front chamber between the rear chamber and the pipetting channel; a front plunger mounted in the front chamber to translate relative to the passage through a front plunger stroke; a rear plunger mounted in the rear chamber to translate relative to the passage through a rear plunger stroke; and a front seal about the front plunger. During a first part of the front plunger stroke, the front chamber is fluidly sealed from the rear chamber by the front seal, and translation of the front plunger in the front chamber generates a change in a pressure in the pipetting channel to aspirate or dispense a liquid. During a second part of the front plunger stroke, the front chamber is fluidly coupled to the rear chamber, and translation of the rear plunger in the rear chamber along the rear plunger stroke generates a change in the pressure in the pipetting channel to aspirate or dispense the liquid.

According to some embodiments, the pipettor includes a plunger member including both the front plunger and the rear plunger, and the plunger member is mounted in the passage to translate through a plunger member stroke including the front plunger stroke and the rear plunger stroke.

In some embodiments, the translation of the of the front plunger in the front chamber and the translation of the rear plunger in the rear chamber displace an air cushion in the pipetting channel.

In some embodiments, during the first part of the front plunger stroke, a connecting opening between the front and rear chambers is plugged by the front plunger, and during the second part of the front plunger stroke, the connecting opening is not plugged by the front plunger and the front chamber is fluidly coupled to the rear chamber through the connecting opening.

In some embodiments, the front seal includes an annular seal member slidably engaging the front plunger or the barrel.

According to some embodiments, the pipetting system includes a rear seal about the rear plunger.

The rear seal may include an annular seal member slidably engaging the rear plunger or the barrel.

According to some embodiments, the rear chamber is defined between the front seal and the rear seal.

The pipetting may include a pressure relief valve arranged and configured to relieve pressure in the rear chamber during the first part of the front plunger stroke.

According to some embodiments, the pipetting system includes a pressure sensor arranged and configured to detect the pressure in the pipetting channel.

In some embodiments, the pipetting system includes an opening mechanism selectively operable to place the rear chamber in fluid communication with the front chamber when the front plunger is not in the second part of the front plunger stroke.

In some embodiments, the opening mechanism includes a valve selectively operable to place the rear chamber in fluid communication with the front chamber when the front plunger is not in the second part of the front plunger stroke.

According to some embodiments, the valve is selectively operable to place the rear chamber in fluid communication with a port to atmosphere.

In some embodiments, the pipetting system is configured such that the front seal forms a seal about the front plunger throughout the first part of the front plunger stroke and the second part of the front plunger stroke.

The pipetting system may include a pipette tip removably coupled to the barrel. The pipette tip includes a liquid collection volume fluidly coupled to the pipetting channel, and a tip orifice in fluid communication with the liquid collection volume.

According to some embodiments, the pipetting system includes: at least one actuator to drive the front and rear plungers through the front and rear plunger strokes; and a controller configured to automatically and programmatically operate the at least one actuator.

In some embodiments, the front and rear plunger strokes extend along a plunger axis, the front plunger has a first cross-sectional area in a plane orthogonal to the plunger axis, the rear plunger has a second cross-sectional area in a plane orthogonal to the plunger axis, and the second cross-sectional area is greater than the first cross-sectional area.

In some embodiments, the second cross-sectional area is at least three times the first cross-sectional area.

According to some embodiments, the front plunger displaces an air volume in the front chamber at a first rate of air volume displacement per unit translation, the rear plunger displaces an air volume in the rear chamber at a second rate of air volume displacement per unit translation, and the second rate of air volume displacement per unit translation is greater than the first rate of air volume displacement per unit translation.

In some embodiments, the second rate of air volume displacement per unit translation is at least three times the first rate of air volume displacement per unit translation.

According to some embodiments, the front plunger is configured to provide a first maximum air volume displacement in the front chamber, the rear plunger is configured to provide a second maximum air volume displacement in the rear chamber, and the second maximum air volume displacement is greater than the first maximum air volume displacement.

In some embodiments, the second maximum air volume displacement is at least ten times the first maximum air volume displacement.

According to some embodiments, the front chamber has a front chamber volume, and the rear chamber has a rear chamber volume that is greater than the front chamber volume.

In some embodiments, the rear chamber volume is at least ten times the front chamber volume.

According to some embodiments, a method for pipetting a liquid includes providing a pipettor including: a barrel; a pipetting channel; a passage defined in the barrel and in fluid communication with the pipetting channel, the passage including a rear chamber, and a front chamber between the rear chamber and the pipetting channel; a front plunger mounted in the front chamber to travel a front plunger stroke; a rear plunger mounted in the rear chamber to travel a rear plunger stroke; and a front seal about the front plunger. The method further includes translating the front plunger through the front plunger stroke and translating the rear plunger through the rear plunger stroke to aspirate or dispense a liquid. During a first part of the front plunger stroke, the front chamber is fluidly sealed from the rear chamber by the front seal, and translation of the front plunger in the front chamber generates a change in a pressure in the pipetting channel to aspirate or dispense a liquid. During a second part of the front plunger stroke, the front chamber is fluidly coupled to the rear chamber, and translation of the rear plunger in the rear chamber along the rear plunger stroke generates a second change in the pressure in the pipetting channel to aspirate or dispense the liquid.

According to some embodiments, the pipettor includes a plunger member including both the front plunger and the rear plunger, the plunger member is mounted in the passage to translate a plunger member stroke including the front plunger stroke and the rear plunger stroke, and translating the front plunger through the front plunger stroke and translating the rear plunger through the rear plunger stroke are executed by translating the plunger member through the plunger member stroke.

In some embodiments, the translation of the of the front plunger in the front chamber and the translation of the rear plunger in the rear chamber displace an air volume in the pipetting channel.

In some embodiments, during the first part of the front plunger stroke, a connecting opening between the front and rear chambers is plugged by the front plunger, and during the second part of the front plunger stroke, the connecting opening is not plugged by the front plunger and the front chamber is fluidly coupled to the rear chamber through the connecting opening.

According to some embodiments, the method includes: translating the front plunger in a first direction through the first part of the front plunger stroke to aspirate the liquid; and thereafter, translating the front plunger in a second direction opposite the first direction through the first part of the front plunger stroke to dispense the liquid. The front plunger is not translated through the second part of the front plunger stroke between translating the front plunger in the first direction and translating the front plunger in the second direction.

In some embodiments, the method includes: translating the front plunger in a first direction through the first and second parts of the front plunger stroke to aspirate the liquid using the front plunger and the rear plunger; and thereafter, translating the front plunger in a second direction opposite the first direction through the first and second parts of the plunger stroke to dispense the liquid using the front plunger and the rear plunger.

According to some embodiments, the method includes: with the front plunger in the first part of the front plunger stroke, operating an opening mechanism to place the rear chamber in fluid communication with the front chamber; and thereafter, with the rear chamber in fluid communication with the front chamber, translating the rear plunger along the rear plunger stroke to aspirate the liquid.

In some embodiments, the front seal forms a seal about the front plunger throughout the front plunger stroke and the rear plunger stroke.

According to some embodiments, a pipetting system includes a pipettor including: a barrel; a pipetting channel; a passage defined in the barrel and in fluid communication with the pipetting channel, the passage including a rear chamber, and a front chamber between the rear chamber and the pipetting channel; a front plunger mounted in the front chamber to translate relative to the passage along a plunger axis; and a rear plunger mounted in the rear chamber to translate relative to the passage along the plunger axis. Translation of the front plunger in the front chamber along the plunger axis generates a change in a pressure in the pipetting channel to aspirate or dispense a liquid. Translation of the rear plunger in the rear chamber along the plunger axis generates a change in the pressure in the pipetting channel to aspirate or dispense the liquid. The front plunger has a first cross-sectional area in a plane orthogonal to the plunger axis. The rear plunger has a second cross-sectional area in a plane orthogonal to the plunger axis. The second cross-sectional area is greater than the first cross-sectional area.

In some embodiments, the pipettor includes a plunger member including both the front plunger and the rear plunger, and the plunger member is mounted in the passage to translate along the plunger axis.

According to some embodiments, a pipetting system includes a pipettor, an air displacement pipette tip, and a positive displacement pipette tip. The air displacement pipette tip and the positive displacement pipette tip are alternatively and removably mountable on the pipettor. The pipettor is operable to aspirate a liquid into the air displacement pipette tip when the air displacement pipette tip is mounted on the pipettor. The pipettor is operable to aspirate a liquid into the positive displacement pipette tip when the positive displacement pipette tip is mounted on the pipettor.

According to some embodiments, the pipettor includes a tip mount interface configured to engage and releasably secure the air displacement pipette tip and the positive displacement pipette tip to the pipettor.

In some embodiments, the tip mount interface is configured to form a gas-tight fit with the air displacement pipette tip when the air displacement pipette tip is mounted on the pipettor.

According to some embodiments, the air displacement pipette tip includes an air displacement tip orifice and a liquid collection volume in fluid communication with the air displacement tip orifice, and the positive displacement pipette tip includes a positive displacement tip orifice, a tip passage in fluid communication with the positive displacement tip orifice, and a piston slidably mounted in the tip passage. The positive displacement pipette tip is operative to generate a negative pressure at the positive displacement tip orifice to aspirate the liquid when the piston is translated away from the positive displacement tip orifice.

In some embodiments, the pipettor is operable to displace an air volume in the air displacement pipette tip to generate a negative pressure at the air displacement tip orifice.

In some embodiments, the pipettor includes a plunger that is translatable to generate a negative pressure at the air displacement tip orifice to aspirate the liquid when the air displacement pipette tip is mounted on the pipettor.

In some embodiments, the pipettor includes a plunger configured to engage and translate the piston through the tip passage when the positive displacement pipette tip is mounted on the pipettor.

According to some embodiments, the pipettor includes a plunger, the plunger is translatable to generate a negative pressure at the air displacement tip orifice to aspirate the liquid when the air displacement pipette tip is mounted on the pipettor, and the plunger is configured to engage and translate the piston through the tip passage when the positive displacement pipette tip is mounted on the pipettor.

In some embodiments, the pipettor includes a chamber and a pipetting channel, the pipetting channel is fluidly coupled to the liquid collection volume when the air displacement pipette tip is mounted on the pipettor, and the plunger is mounted to translate in the chamber to generate a negative pressure in the pipetting channel.

In some embodiments, the pipettor is operable in each of an air displacement mode with the air displacement pipette tip mounted on the pipettor and, alternatively, a positive displacement mode with the positive displacement pipette tip mounted on the pipettor, and the chamber is sealed in the air displacement mode, and is not sealed in positive displacement mode.

In some embodiments, the pipettor includes a barrel defining the chamber, and an annular seal about the plunger between the plunger and the barrel. The annular seal seals the chamber in the air displacement mode, and does not seal the chamber in positive displacement mode.

The pipettor may include a pressure sensor arranged and configured to output a detection signal indicating a pressure in the chamber.

According to some embodiments, the pipettor includes at least one plunger actuator to drive the plunger, and a controller configured to automatically and programmatically operate the at least one actuator.

In some embodiments, the at least one plunger actuator includes a linear actuator.

According to some embodiments, the positive displacement pipette tip includes a tip body defining the tip passage; and a venting port in the tip body to relieve a pressure in the tip passage between the piston and the pipettor.

According to some embodiments, a pipettor includes an air displacement mechanism, and a positive displacement mechanism. The pipettor is configured to mount an air displacement pipette tip thereon and, alternatively, a positive displacement pipette tip thereon. When the air displacement pipette tip is mounted on the pipettor, the air displacement mechanism is operable to generate a negative pressure in the air displacement pipette tip to aspirate a liquid into the air displacement pipette tip. When the positive displacement pipette tip is mounted on the pipettor, the positive displacement mechanism is operable to displace a piston of the positive displacement pipette tip to aspirate a liquid into the positive displacement pipette tip.

According to some embodiments, the pipettor includes a plunger, the plunger is translatable to generate the negative pressure in the air displacement pipette tip to aspirate the liquid when the air displacement pipette tip is mounted on the pipettor, and the plunger is configured to engage and translate the piston through a tip passage of the positive displacement pipette tip when the positive displacement pipette tip is mounted on the pipettor.

According to some embodiments, a method for pipetting a liquid includes: with an air displacement pipette tip mounted on a pipettor, operating the pipettor to aspirate a liquid into the air displacement pipette tip; and thereafter, with a positive displacement pipette tip mounted on the pipettor, operating the pipettor to aspirate a liquid into the positive displacement pipette tip.

According to some embodiments, the method includes performing, by at least one control circuit controlling at least one actuator, operations comprising: mounting the air displacement pipette tip mounted on the pipettor; removing the air displacement pipette tip from the pipettor; mounting the positive displacement pipette tip mounted on the pipettor; and removing the positive displacement pipette tip from the pipettor.

According to some embodiments, a pipette tip includes a tip member comprising a first end having an opening therein for aspirating and/or dispensing a liquid, and a second end opposite the first end for connection to a pipettor. A conductive electrode is provided on the tip member and is configured to output a signal responsive to contact with the liquid. The first end of the tip member comprises a non-conductive tip bottom adjacent the opening.

In some embodiments, the conductive electrode is on an outer surface of the tip member between the first end and the second end.

In some embodiments, the conductive electrode is at least partially embedded within a surface of the tip member.

In some embodiments, the non-conductive tip bottom is free of the conductive electrode.

In some embodiments, the non-conductive tip bottom comprises a portion of the conductive electrode having a non-conductive coating thereon.

In some embodiments, a conductive element is provided at the second end of the tip member, and a conductive connection extends along the tip member and electrically connects the conductive electrode to the conductive element.

In some embodiments, the conductive connection extends along the outer surface of the tip member.

In some embodiments, the conductive connection is at least partially embedded within the tip member.

In some embodiments, an inner surface of the tip member is free of the conductive electrode.

In some embodiments, the inner surface of the tip member is non-conductive and the conductive electrode is a single electrode.

In some embodiments, the non-conductive tip bottom comprises a length of about 2 millimeters (mm) or more.

In some embodiments, a shape of the conductive electrode defines a surface area that varies with distance from the opening.

In some embodiments, the conductive electrode is configured to be coupled to a controller circuit that is configured to dynamically detect a level of the liquid and/or predict a loss of contact between the pipette tip and the liquid based on changes in capacitance indicated by the signal output from the conductive electrode.

According to some embodiments, an automated pipetting system includes a robotic arm assembly comprising an arm member that is adapted to hold a pipettor and an actuator mechanism configured to move the arm member along at least one axis responsive to a control signal, and a controller circuit coupled to the robotic arm assembly. The controller circuit is configured to perform operations including receiving a signal from a conductive electrode on a pipette tip, where the conductive electrode is between a first end of the pipette tip having an opening therein for aspirating and/or dispensing a liquid and a second end of the pipette tip that is connected to the pipettor opposite the first end; and transmitting the control signal to the actuator mechanism to move the arm member towards or away from a surface of the liquid along the at least one axis responsive to the signal from the conductive electrode.

In some embodiments, the operations further include dynamically detecting a level of the liquid based on changes in capacitance indicated by the signal from the conductive electrode, optionally independent of a shape or size of a container of the liquid.

In some embodiments, dynamically detecting the level of the liquid includes predicting a loss of contact between the pipette tip and the liquid based on the changes in the capacitance indicated by the signal from the conductive electrode, and transmitting the control signal to the actuator mechanism is responsive to predicting the loss of contact.

In some embodiments, the control signal is varied based on the changes in capacitance to move the arm member towards or away from the surface of the liquid along the at least one axis while maintaining the contact between pipette tip and the liquid.

In some embodiments, the first end of the pipette tip includes a non-conductive tip bottom adjacent the opening.

In some embodiments, the conductive electrode is on an outer surface of the pipette tip between the first end and the second end.

In some embodiments, the conductive electrode is at least partially embedded within a surface of the pipette tip.

In some embodiments, the non-conductive tip bottom is free of the conductive electrode.

In some embodiments, the non-conductive tip bottom includes a portion of the conductive electrode having a non-conductive coating thereon.

In some embodiments, an inner surface of the pipette tip is free of the conductive electrode.

In some embodiments, the inner surface of the tip member is non-conductive and the conductive electrode is a single electrode.

In some embodiments, the actuator mechanism includes a first operating mode where the arm member is restricted to motion towards the surface of the liquid along the at least one axis during the aspirating, and a second operating mode where the arm member is restricted to motion away from the surface of the liquid along the at least one axis during the dispensing.

In some embodiments, the operations further include calculating an aspirated or dispensed volume of the liquid based on a distance of movement of the arm member along the at least one axis; and controlling subsequent motion of the arm member along the at least one axis based on the aspirated or dispensed volume that was calculated.

According to some embodiments, a method of operating an automated pipetting system, includes executing computer readable instructions stored in a non-transitory storage medium by a controller circuit to perform operations including receiving a signal from a conductive electrode on a pipette tip, where the conductive electrode is between a first end of the pipette tip having an opening therein for aspirating and/or dispensing a liquid and a second end of the pipette tip that is connected to the pipettor opposite the first end; and transmitting, to an actuator mechanism of a robotic arm assembly, a control signal to move an arm member that is adapted to hold the pipettor towards or away from a surface of the liquid along at least one axis responsive to the signal from the conductive electrode.

In some embodiments, the operations further include dynamically detecting a level of the liquid based on changes in capacitance indicated by the signal from the conductive electrode, optionally independent of a shape or size of a container of the liquid.

In some embodiments, dynamically detecting the level of the liquid includes predicting a loss of contact between the pipette tip and the liquid based on the changes in the capacitance indicated by the signal from the conductive electrode, and transmitting the control signal to the actuator mechanism is responsive to predicting the loss of contact.

In some embodiments, the control signal is varied based on the changes in capacitance to move the arm member towards or away from the surface of the liquid along the at least one axis while maintaining contact between the pipette tip and the liquid.

In some embodiments, the first end of the pipette tip includes a non-conductive tip bottom extending beyond the conductive electrode.

In some embodiments, the conductive electrode is on an outer surface of the pipette tip between the first end and the second end.

In some embodiments, the conductive electrode is at least partially embedded within a surface of the pipette tip In some embodiments, the non-conductive tip bottom is free of the conductive electrode.

In some embodiments, an inner surface of the pipette tip is free of the conductive electrode.

In some embodiments, the inner surface of the tip member is non-conductive and the conductive electrode is a single electrode.

In some embodiments, the operations further include restricting the arm member to motion towards the surface of the liquid along the at least one axis during the aspirating; and restricting the arm member to motion away from the surface of the liquid along the at least one axis during the dispensing.

In some embodiments, the operations further include calculating an aspirated or dispensed volume of the liquid based on a distance of motion of the arm member along the at least one axis; and controlling subsequent motion of the arm member along the at least one axis based on the aspirated or dispensed volume that was calculated.

According to some embodiments, an automated pipetting system includes a pipettor comprising a channel therein, a pressure sensor coupled to the channel, and at least one controller circuit. The at least one controller circuit is configured to perform operations including receiving, from the pressure sensor, a signal indicating pressure in the channel of the pipettor, and, based on the pressure indicated by the signal, performing at least one of: detecting evaporation of a liquid in the channel; or automatically performing one or more compensation operations.

In some embodiments, the pipettor includes a pipette tip having an opening therein for aspirating the liquid, and detecting the evaporation is performed after removal of the pipette tip from the liquid.

In some embodiments, detecting the evaporation further includes calculating an evaporation rate based on a change in the pressure indicated by the signal after the removal of the pipette tip from the liquid.

In some embodiments, calculating the evaporation rate is independent of a surface tension or type of the liquid.

In some embodiments, the evaporation rate is calculated in proportion to the change in the pressure indicated by the signal over time.

In some embodiments, detecting the evaporation further includes controlling movement of a plunger in the channel after removal of the pipette tip from the liquid. Calculating the evaporation rate is based on the change in the pressure indicated by the signal responsive to the movement of the plunger.

In some embodiments, detecting the evaporation further includes continuously controlling a position of a plunger in the channel of the pipettor such that the pressure indicated by the signal remains substantially constant over time; and calculating an evaporation rate based on displacement of the plunger over time.

In some embodiments, automatically performing the one or more compensation operations includes performing one or more evaporation compensation operations responsive to detecting the evaporation of the liquid in the channel, based on comparison to a threshold.

In some embodiments, performing the one or more evaporation compensation operations includes performing a prewetting operation prior to the aspirating of the liquid; and/or adapting one or more aspiration parameters for the aspirating of the liquid; and/or controlling movement of a plunger in the channel.

In some embodiments, the operations further include estimating an evaporation volume based on the evaporation rate and a duration of the aspirating of the liquid, where the threshold is volume-based.

In some embodiments, the evaporation volume indicates an amount of under-aspiration. Performing the one or more evaporation compensation operations includes adapting the one or more aspiration parameters to aspirate a further amount of the liquid based on the amount of under-aspiration; and aspirating the further amount of the liquid based on the one or more aspiration parameters that were adapted.

In some embodiments, performing the one or more evaporation compensation operations includes, after the removal of the pipette tip from the liquid, controlling the movement of the plunger to aspirate air to reduce or avoid dripping of the liquid from the pipette tip.

In some embodiments, performing the one or more evaporation compensation operations includes, after the removal of the pipette tip from the liquid, controlling the movement of the plunger to maintain a substantially constant pressure in the pipette tip.

In some embodiments, the substantially constant pressure is based on the pressure indicated by the signal after removal of the pipette tip from the liquid.

In some embodiments, the substantially constant pressure is a predetermined pressure.

In some embodiments, the operations further include calculating an aspirated volume of the liquid based on a change in the pressure indicated by the signal.

In some embodiments, automatically performing the one or more compensation operations includes adapting one or more aspiration parameters based on a comparison of the aspirated volume to a target volume; and aspirating the liquid based on the one or more aspiration parameters that were adapted.

In some embodiments, automatically performing the one or more compensation operations includes adapting an aspiration speed based on a change in the pressure indicated by the signal relative to a pressure change threshold; and/or performing a prewetting operation based on a temperature of the liquid relative to a temperature threshold.

According to some embodiments, a method of operating an automated pipetting system includes executing computer readable instructions stored in a non-transitory storage medium by at least one controller circuit to perform operations including receiving, from a pressure sensor, a signal indicating pressure in a channel of a pipettor, and, based on the pressure indicated by the signal, performing at least one of: detecting evaporation of the liquid in the channel; or automatically performing one or more compensation operations.

In some embodiments, the pipettor includes a pipette tip having an opening therein for aspirating the liquid, and detecting the evaporation is performed after removal of the pipette tip from the liquid.

In some embodiments, detecting the evaporation further includes calculating an evaporation rate based on a change in the air pressure indicated by the signal after the removal of the pipette tip from the liquid.

In some embodiments, calculating the evaporation rate is independent of a surface tension or type of the liquid.

In some embodiments, the evaporation rate is calculated in proportion to the change in the pressure indicated by the signal over time.

In some embodiments, detecting the evaporation further includes controlling movement of a plunger in the channel after removal of the pipette tip from the liquid, and calculating the evaporation rate is based on the change in the pressure indicated by the signal responsive to the movement of the plunger.

In some embodiments, detecting the evaporation further includes continuously controlling a position of a plunger in the channel of the pipettor such that the pressure indicated by the signal remains substantially constant over time, and calculating an evaporation rate based on displacement of the plunger over time.

In some embodiments, automatically performing the one or more compensation operations includes performing one or more evaporation compensation operations responsive to detecting the evaporation of the liquid in the channel, based on comparison to a threshold.

In some embodiments, performing the one or more evaporation compensation operations includes performing a prewetting operation prior to the aspirating of the liquid; and/or adapting one or more aspiration parameters for the aspirating of the liquid; and/or controlling movement of a plunger in the channel.

In some embodiments, the operations further include estimating an evaporation volume based on the evaporation rate and a duration of the aspirating of the liquid, where the threshold is volume-based.

In some embodiments, the evaporation volume indicates an amount of under-aspiration. Performing the one or more evaporation compensation operations includes adapting the one or more aspiration parameters to aspirate a further amount of the liquid based on the amount of under-aspiration, and aspirating the further amount of the liquid based on the one or more aspiration parameters that were adapted.

In some embodiments, performing the one or more evaporation compensation operations includes, after the removal of the pipette tip from the liquid, controlling the movement of the plunger to aspirate air to reduce or avoid dripping of the liquid from the pipette tip.

In some embodiments, performing the one or more evaporation compensation operations includes, after the removal of the pipette tip from the liquid, controlling the movement of the plunger to maintain a substantially constant pressure in the pipette tip.

In some embodiments, the substantially constant pressure is based on the pressure indicated by the signal after removal of the pipette tip from the liquid.

In some embodiments, the substantially constant pressure is a predetermined pressure.

In some embodiments, the operations further include calculating an aspirated volume of the liquid based on a change in the pressure indicated by the signal.

In some embodiments, performing the one or more compensation operations includes adapting one or more aspiration parameters based on a comparison of the aspirated volume to a target volume, and aspirating the liquid based on the one or more aspiration parameters that were adapted.

In some embodiments, automatically performing the one or more compensation operations includes adapting an aspiration speed based on a change in the pressure indicated by the signal relative to a pressure change threshold; and/or performing a prewetting operation based on a temperature of the liquid relative to a temperature threshold.

According to some embodiments, an automated pipetting system includes a pipettor comprising a channel therein, a sensor coupled to the channel, and at least one controller circuit. The controller circuit is configured to perform operations comprising receiving, from the sensor, a sensor signal indicating a pressure change in the channel; determining a displaced air volume in the channel based on the sensor signal; and transmitting at least one control signal to control a pressure in the channel based on the displaced air volume.

In some embodiments, the operations further include identifying a rate of air flow in the channel based on the pressure change, and determining the displaced air volume is based on the rate of air flow.

In some embodiments, the at least one control signal includes a flow restriction control signal. A flow restriction mechanism is coupled to the channel and configured to be switched between respective states that provide different flow rates responsive to the flow restriction control signal.

In some embodiments, the sensor is a dual sensor, and the sensor signal comprises first and second pressure data indicating first and second flow rates, respectively.

In some embodiments, the dual sensor includes first and second pressure sensors in a parallel arrangement that provide the first and second pressure data, respectively. A range of measurement of the second pressure sensor is greater than that of the first pressure sensor.

In some embodiments, the range of measurement of the second pressure sensor is more than an order of magnitude greater than that of the first pressure sensor.

In some embodiments, the at least one control signal includes a plunger actuator control signal that is varied based on changes in the displaced air volume indicated by the rate of air flow in the channel. A plunger actuator is configured to dynamically control a position and/or a speed of motion of a plunger in the channel responsive to the plunger actuator control signal.

In some embodiments, the plunger actuator control signal is generated independent of determining a previous position or distance of motion of the plunger in the channel.

In some embodiments, the at least one control signal includes a valve control signal. An air valve is operable to couple the channel to a pressure source responsive to the valve control signal.

In some embodiments, the pressure source includes a negative pressure source and a positive pressure source. One of the negative pressure source or the positive pressure source is configured to be selected to control a direction of the air flow in the channel.

In some embodiments, the operations further include receiving a pressure signal from a pressure sensor in a pipette tip coupled to the pipettor; and determining a volume of a liquid in the pipette tip based on the pressure signal. The at least one control signal is transmitted to control a position of a plunger based on the volume of the liquid in the pipette tip.

In some embodiments, a microfluidic manifold including a plurality of passages is configured to couple the channel to a pipette tip. One or more of the passages has a diameter of about 0.2 to 0.8 mm.

According to some embodiments, a method of operating an automated pipetting system includes executing computer readable instructions stored in a non-transitory storage medium by at least one controller circuit to perform operations including receiving, from a sensor coupled to a channel of a pipettor, a sensor signal indicating pressure change in the channel; determining a displaced air volume in the channel based on the sensor signal; and transmitting at least one control signal to control a pressure in the channel based on the displaced air volume.

In some embodiments, the operations further include identifying a rate of air flow in the channel based on the pressure change indicated by the sensor signal, where determining the displaced air volume is based on the rate of air flow.

In some embodiments, the at least one control signal includes a flow restriction control signal, and the operations further include switching a flow restriction mechanism, which is coupled to the channel, between respective states that provide different air flow rates responsive to the flow restriction control signal.

In some embodiments, the sensor is a dual sensor, and the sensor signal comprises first and second pressure data indicating first and second flow rates, respectively.

In some embodiments, the dual sensor includes first and second pressure sensors in a parallel arrangement that provide the first and second pressure data, respectively. A range of measurement of the second pressure sensor is greater than that of the first pressure sensor.

In some embodiments, the range of measurement of the second pressure sensor is more than an order of magnitude greater than that of the first pressure sensor.

In some embodiments, the at least one control signal includes a plunger actuator control signal that is varied based on changes in the displaced air volume indicated by the rate of air flow in the channel, and the operations further include dynamically controlling a position and/or speed of motion of a plunger in the channel responsive to the plunger actuator control signal.

In some embodiments, the plunger actuator control signal is generated independent of determining a previous position or distance of motion of the plunger in the channel.

In some embodiments, the at least one control signal includes a valve control signal, and the operations further include operating an air valve to couple the channel to a pressure source responsive to the valve control signal.

In some embodiments, the pressure source includes a negative pressure source and a positive pressure source, and the operations further include selecting one of the negative pressure source or the positive pressure source to control a direction of the air flow in the channel.

In some embodiments, the operations further include receiving a pressure signal from a pressure sensor in a pipette tip coupled to the pipettor; and determining a volume of a liquid in the pipette tip based on the pressure signal. The at least one control signal is transmitted to control a position of a plunger based on the volume of the liquid in the pipette tip.

In some embodiments, the sensor is coupled to at least one passage of a microfluidic manifold that is configured to couple the channel to a pipette tip. The at least one passage comprises a diameter of about 0.2 to 0.8 mm.

According to some embodiments, a positive displacement pipette tip includes a tip orifice, a rear chamber, a tip passage between the tip orifice and the rear chamber and in fluid communication with the tip orifice, and a piston slidably mounted in the tip passage. The piston is responsive to a negative pressure in the rear chamber to translate rearwardly away from the tip orifice, whereby the piston generates a negative pressure at the tip orifice to aspirate a liquid into the positive displacement pipette tip.

According to some embodiments, the positive displacement pipette tip includes a body defining the rear chamber, and a sliding seal between the piston and the body. The seal separates the rear chamber from the tip passage. The seal translates through the body with the piston.

In some embodiments, the body includes a body cavity, and the seal partitions the body cavity into the rear chamber and an intermediate chamber between the rear chamber and the tip passage.

The positive displacement pipette tip may include a pressure relief port in fluid communication with the intermediate chamber.

According to some embodiments, the positive displacement pipette tip includes a body and an indexing mechanism. The indexing mechanism includes at least one first indexing feature on the body, and at least one second indexing feature on the piston. The first and second indexing features cooperate to stop displacement of the piston at prescribed positions.

The positive displacement pipette tip may include a seal on the piston that translates through the body with the piston.

According to some embodiments, a pipette includes a pipettor and a positive displacement pipette tip mounted on the pipettor. The positive displacement pipette tip includes a tip orifice, a rear chamber, a tip passage between the tip orifice and the rear chamber and in fluid communication with the tip orifice, and a piston slidably mounted in the tip passage. The pipettor is operable to generate a negative pressure in the rear chamber, which translates the piston rearwardly away from the tip orifice, whereby the piston generates a negative pressure at the tip orifice to aspirate a liquid into the positive displacement pipette tip.

According to some embodiments, the pipettor is coupled to the piston by an air cushion, and the air cushion is displaced within the pipettor and/or the positive displacement pipette tip as the piston translates.

According to some embodiments, a method for pipetting a liquid includes mounting a positive displacement pipette tip on a pipettor. The positive displacement pipette tip includes a tip orifice, a rear chamber, a tip passage between the tip orifice and the rear chamber and in fluid communication with the tip orifice, and a piston slidably mounted in the tip passage. The method further includes using the pipettor, generating a negative pressure in the rear chamber, which translates the piston rearwardly away from the tip orifice, whereby the piston generates a negative pressure at the tip orifice to aspirate a liquid into the positive displacement pipette tip.

According to some embodiments, a positive displacement pipette tip includes a tip orifice, a tip passage in fluid communication with the tip orifice, a piston slidably mounted in the tip passage, a body, and an indexing mechanism. The indexing mechanism includes at least one first indexing feature on the body, and at least one second indexing feature on the piston. The first and second indexing features cooperate to stop displacement of the piston at prescribed positions.

According to some embodiments, the at least one first indexing feature includes a series of first indexing features axially distributed along a lengthwise axis of the positive displacement pipette tip.

According to some embodiments, a pipette includes a pipettor and a positive displacement pipette tip mounted on the pipettor. The positive displacement pipette tip includes a tip orifice, a tip passage in fluid communication with the tip orifice, a piston slidably mounted in the tip passage, a body, and an indexing mechanism. The indexing mechanism includes at least one first indexing feature on the body, and at least one second indexing feature on the piston. The first and second indexing features cooperate to stop displacement of the piston at prescribed positions.

According to some embodiments, a method for pipetting a liquid includes mounting a positive displacement pipette tip on a pipettor. The positive displacement pipette tip includes a tip orifice, a tip passage in fluid communication with the tip orifice, a piston slidably mounted in the tip passage, a body, and an indexing mechanism. The indexing mechanism includes at least one first indexing feature on the body, and at least one second indexing feature on the piston. The first and second indexing features cooperate to stop displacement of the piston at prescribed positions. The pipettor, translating the piston rearwardly away from the tip orifice, whereby the piston generates a negative pressure at the tip orifice to aspirate a liquid into the positive displacement pipette tip.

According to some embodiments, a positive displacement pipette tip for use with a pipettor includes a tip body, a piston, and an integral piston restraint mechanism. The tip body includes a distal tip portion. The distal tip portion defines a tip passage. The piston is slidably mounted in the tip passage. The piston is displaceable to aspirate a liquid into the positive displacement pipette tip. The integral piston restraint mechanism is operable to limit movement between the piston and the tip body.

According to some embodiments, the piston restraint mechanism is positionable in each of a restraining configuration, wherein the piston restraint mechanism prevents the piston from being retracted beyond a prescribed position relative to the tip body, and a release configuration, wherein the piston restraint mechanism does not prevent the piston from being retracted beyond the prescribed position.

In some embodiments, the piston restraint mechanism does not limit movement between the piston and the tip body when in the release configuration.

According to some embodiments, the piston restraint mechanism includes a latch that is movable between a latching position, wherein the latch engages the piston, and a non-latching position, wherein the latch does not engage the piston.

In some embodiments, the latch includes a displaceable sleeve or tab.

In some embodiments, the pipette tip includes an interlock insert mounted on the tip body, wherein the latch forms a part of the interlock insert.

In some embodiments, the piston restraint mechanism includes an integral interlock feature on the piston, and the interlock feature is configured to interlock with the latch when the piston restraint mechanism is in the restraining configuration to limit movement between the piston and the tip body.

According to some embodiments, the piston includes an integral coupling feature configured to secure the piston to a driver forming a part of the pipettor.

According to some embodiments, the tip body includes a mounting section configured to engage the pipettor to removably secure the positive displacement pipette tip to the pipettor.

According to some embodiments, a pipetting system includes a pipettor and a positive displacement pipette tip mounted on the pipettor. The positive displacement pipette tip includes a tip body, a piston, and an integral piston restraint mechanism. The tip body includes a distal tip portion. The distal tip portion defines a tip passage. The piston is slidably mounted in the tip passage. The piston is displaceable to aspirate a liquid into the positive displacement pipette tip. The integral piston restraint mechanism is operable to limit movement between the piston and the tip body.

According to some embodiments, a method for pipetting a liquid includes mounting a positive displacement pipette tip on a pipettor. The positive displacement pipette tip includes: a tip body including a distal tip portion, the distal tip portion defining a tip passage; a piston slidably mounted in the tip passage; and an integral piston restraint mechanism operable to limit movement between the piston and the tip body. The method further includes: using the pipettor, translating the piston through the tip passage to aspirate a liquid into the positive displacement pipette tip; and ejecting the positive displacement pipette tip from the pipettor while the piston restraint mechanism limits movement between the piston and the tip body.

According to some embodiments, mounting the positive displacement pipette tip on the pipettor includes coupling a driver of the pipettor to the piston, and translating the piston through the tip passage includes translating the piston using the driver.

In some embodiments, the piston restraint mechanism is positionable in each of a restraining configuration, wherein the piston restraint mechanism prevents the piston from being retracted beyond a prescribed position relative to the tip body, and a release configuration, wherein the piston restraint mechanism does not prevent the piston from being retracted beyond the prescribed position, translating the piston through the tip passage includes translating the piston using the driver while the piston restraint mechanism is in the release configuration, and ejecting the positive displacement pipette tip from the pipettor includes relatively displacing the driver and the piston while the piston restraint mechanism is in the restraining configuration.

In some embodiments, ejecting the positive displacement pipette tip from the pipettor includes pushing the tip body away from the pipettor using an ejector forming a part of the pipettor while the piston restraint mechanism is in the restraining configuration.

According to some embodiments, the piston restraint mechanism includes an integral interlock feature on the piston; the piston restraint mechanism includes a latch forming a part of the tip body; the latch is positionable in each of a latching position, wherein the latch interlocks with the interlock feature, and a non-latching position, wherein the latch does not interlock with the interlock feature; mounting the positive displacement pipette tip on the pipettor includes inserting a shaft of the pipettor into the tip body and thereby deflecting the latch into the non-latching position; and ejecting the positive displacement pipette tip from the pipettor includes pushing the tip body away from the shaft, responsive to which the latch resiliently returns to the latching position.

BRIEF DESCRIPTION OF THE DRAWINGS

The accompanying drawings, which form a part of the specification, illustrate embodiments of the technology.

DETAILED DESCRIPTION

With reference to FIGS. 1-13, an example pipetting system 101 according to certain embodiments of the present technology is shown. The pipetting system 101 forms a part of an automated liquid handling system 10 (FIG. 1) according to the illustrated embodiments of the present technology. However, it shall be understood that the disclosed methods, systems, and apparatus are not limited to the liquid handling system 10 or use therein, and the present disclosure is applicable to other systems and applications where it is desired to aspirate and/or dispense liquid volumes. The pipetting system 101 aspirates and dispenses liquid volumes within the liquid handling system 10.

Figure 1:
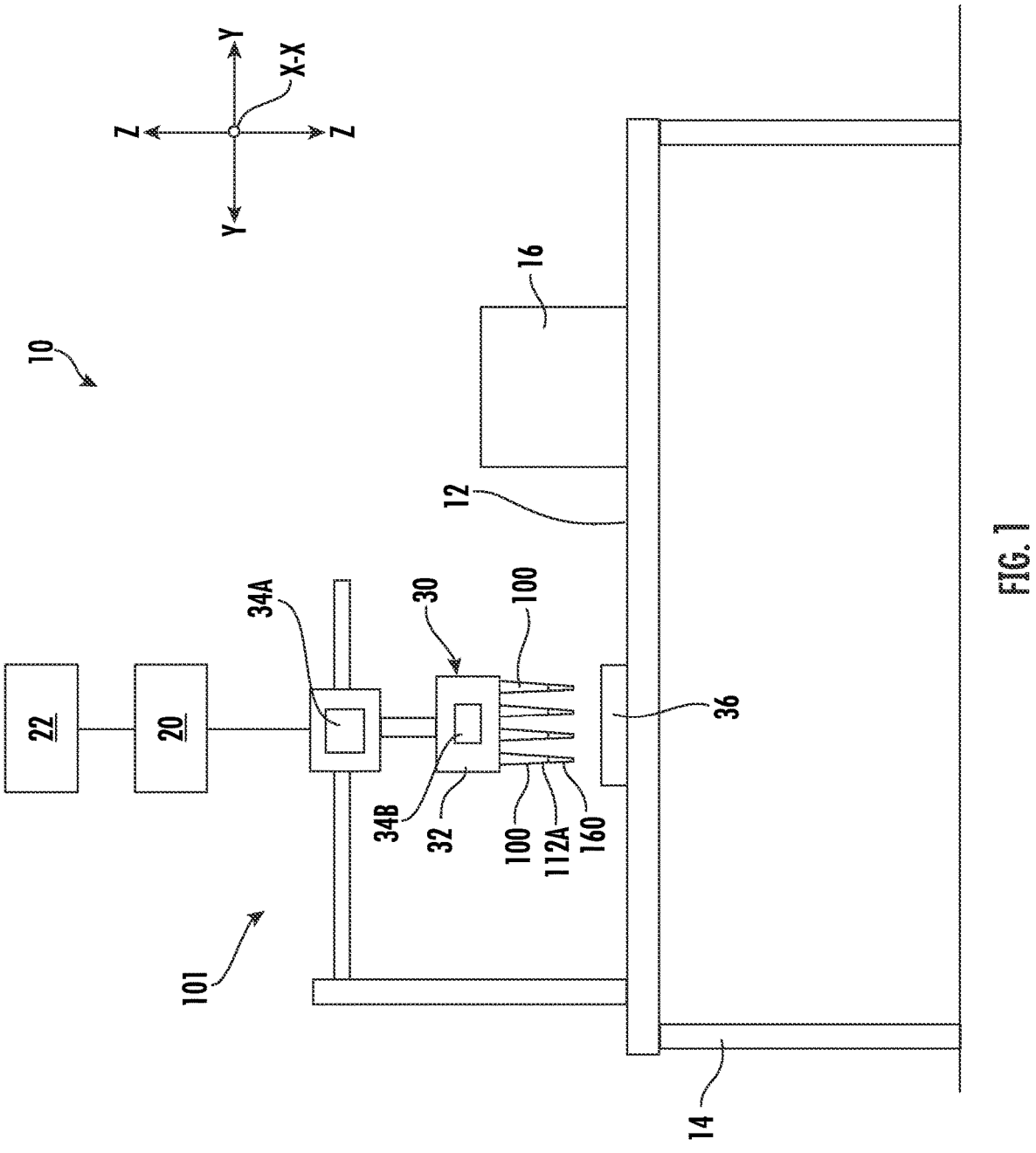
FIG. 1 is a front view of an illustrative laboratory liquid handling system including a pipetting system according to embodiments of the technology.

With reference to FIG. 1, the illustrative liquid handling system 10 includes a platform or deck 12, a frame 14, a controller 20, an analytical instrument 16, a pipetting module 30, a pipetting module positioner 34A, and the pipetting system 101. The pipetting system 101 includes one or more pipettors 100. One or more receptacles, reservoirs, or containers 36 may be provided in the liquid handling system 10 to hold liquid samples.

Figure 3:
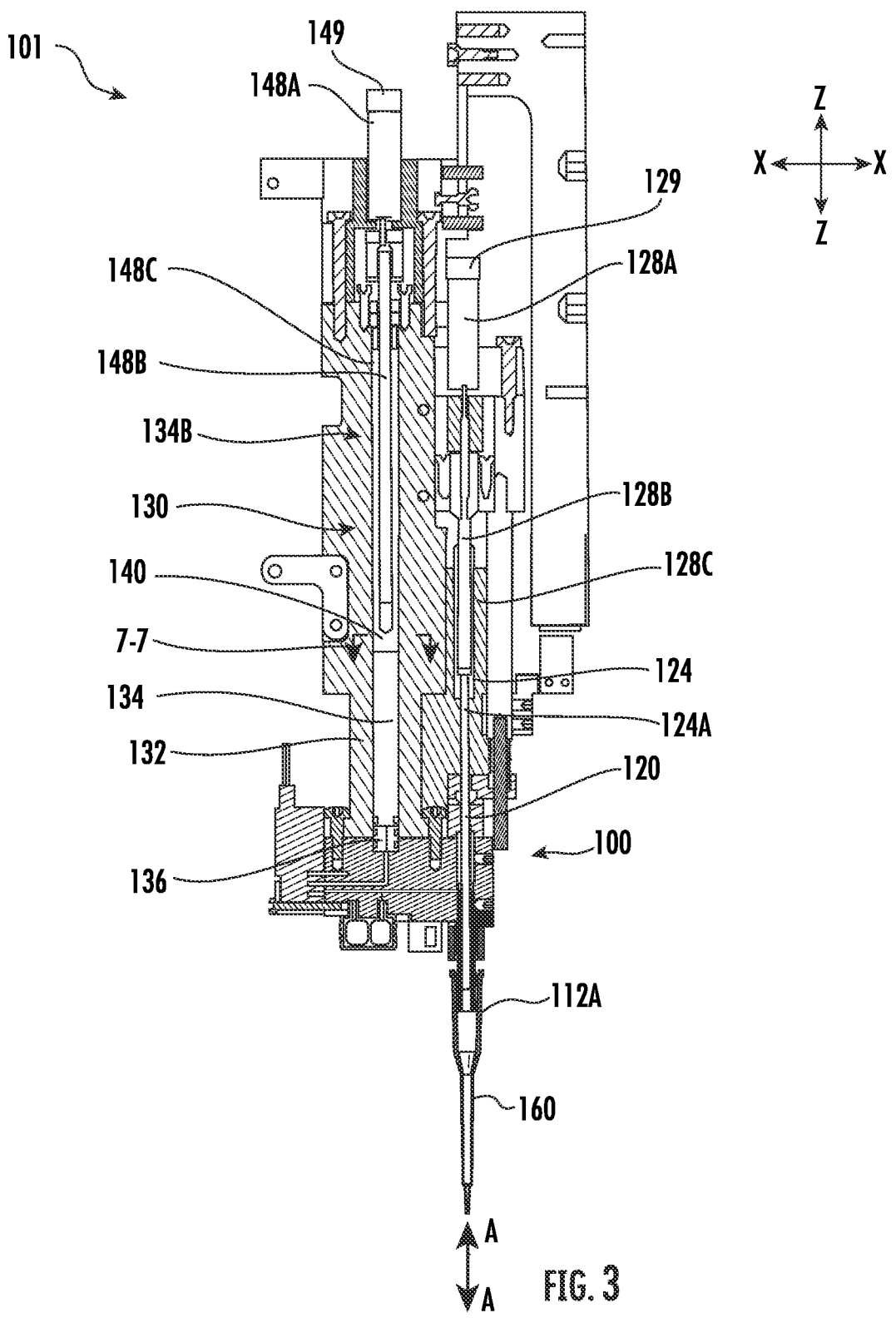
FIG. 3 is a cross-sectional view of the pipettor of FIG. 2 taken along the line 3-3 of FIG. 2.

For the purpose of discussion and as indicated in FIGS. 1 and 3, the liquid handling system 10 includes a workspace that defines a Z-axis corresponding to vertical, and orthogonal X- and Y-axes that together define a horizontal plane.

The pipetting module 30 may include a housing, support or base 32. In the illustrated embodiment, a plurality of pipettors 100 are mounted on the base 32. However, in other embodiments, the pipetting module 30 may carry only a single pipettor 100. The pipettors 100 may be arranged in a single row or in a prescribed X-Y array, for example. The pipetting module positioner 34A is operable to move the pipetting module 30 about the deck 12. The pipetting module 30 may include one or more pipettor actuators 34B to selectively lower and raise (extend and retract) the pipettors 100 with respect to the base 32 and/or to raise and lower the base 32 with respect to the deck 12. The pipetting module positioning system 34A and the actuator(s) 34B may be controlled by the controller 20.

With reference to FIG. 3, and as discussed in more detail herein, each pipettor 100 may be understood to have a lengthwise axis A-A and a distal end portion 112A. Each pipettor 100 includes a shaft 112 that terminates at a distal end portion 112A. In use in accordance with a system according to FIG. 1, each pipettor 100 can be raised and lowered along its lengthwise axis A-A by the pipettor actuator(s) 34B. In some embodiments, the axis A-A is substantially parallel to the vertical axis Z-Z.

Operations described herein can be executed by or through the controller 20. The actuators 34A, 34B, as well as the actuators 128A, 148A discussed below, and other devices of the liquid handling system 10 can be electronically controlled. According to some embodiments, the controller 20 programmatically executes some, and in some embodiments all, of the steps described. According to some embodiments, the movements of the actuators 34A, 34B are fully automatically and programmatically executed by the controller 20. The controller 20 may be provided with an HMI 22 to receive user commands. The controller 20 may comprise one or more controllers.

The pipetting system 101 includes the pipettor(s) 100 and one or more pipette tips 160. In the illustrative embodiment, each pipette tip 160 is mounted on a respective one of the pipettors 100 in the manner discussed below. In some embodiments, the pipette tips 160 are removable and replaceable on the pipettors 100, and may be effectively disposable or consumable components of the pipetting system 101. However, in other embodiments, the pipette tips 160 may be omitted and the structures and functionalities of the pipette tips 160 may be provided as integral parts of the pipettors 100.

The pipetting system 101 may include one or more pipettors 100 on the pipettor module 30. The pipettors 100 may be constructed and operate in the same manner, and it will be appreciated that the description of a representative one of the pipettors 100 that follows may apply equally to each of the pipettors 100. If multiple pipettors 100 are provided, the pipettors 100 may be operated independently of one another or in tandem.

Figure 2:
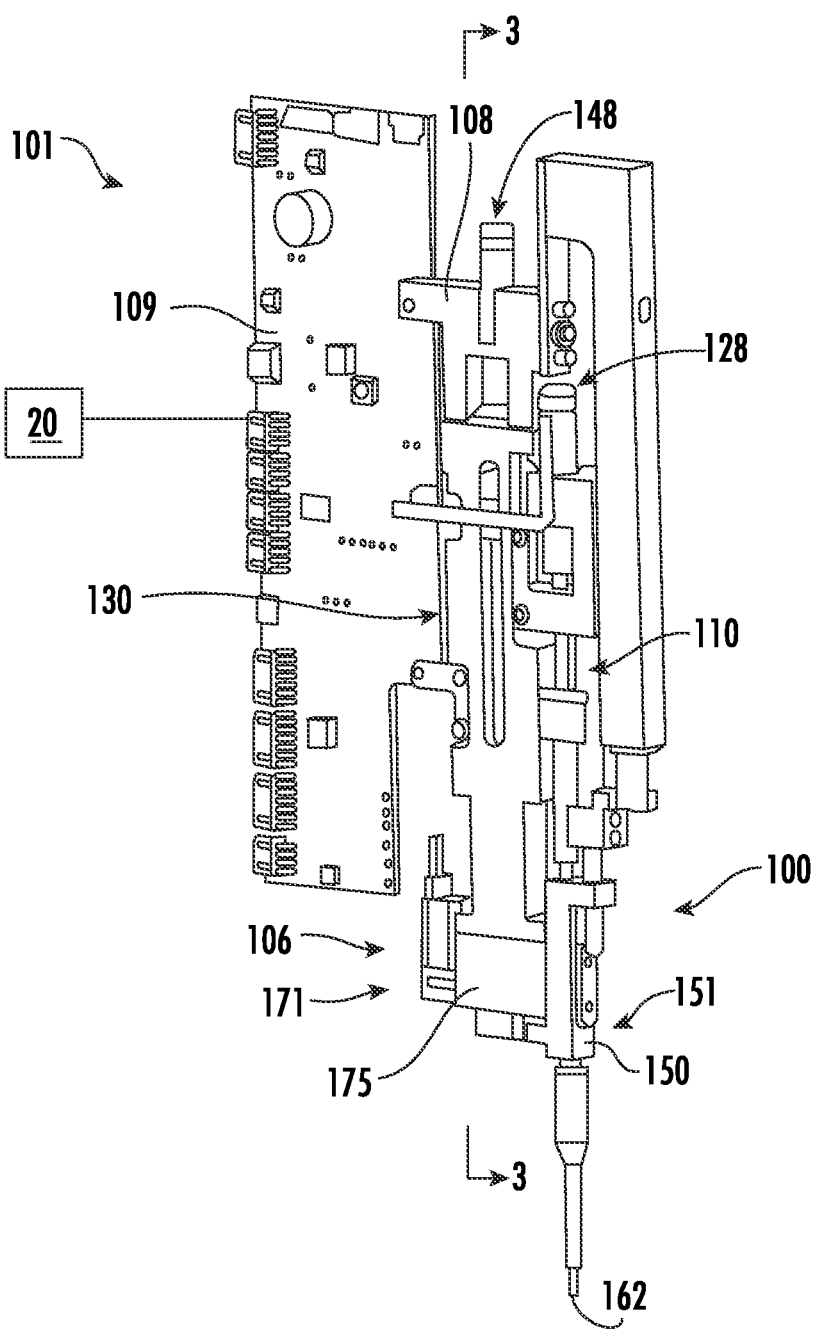
FIG. 2 is a perspective view of a pipettor of the pipetting system of FIG. 1.
Figure 4:
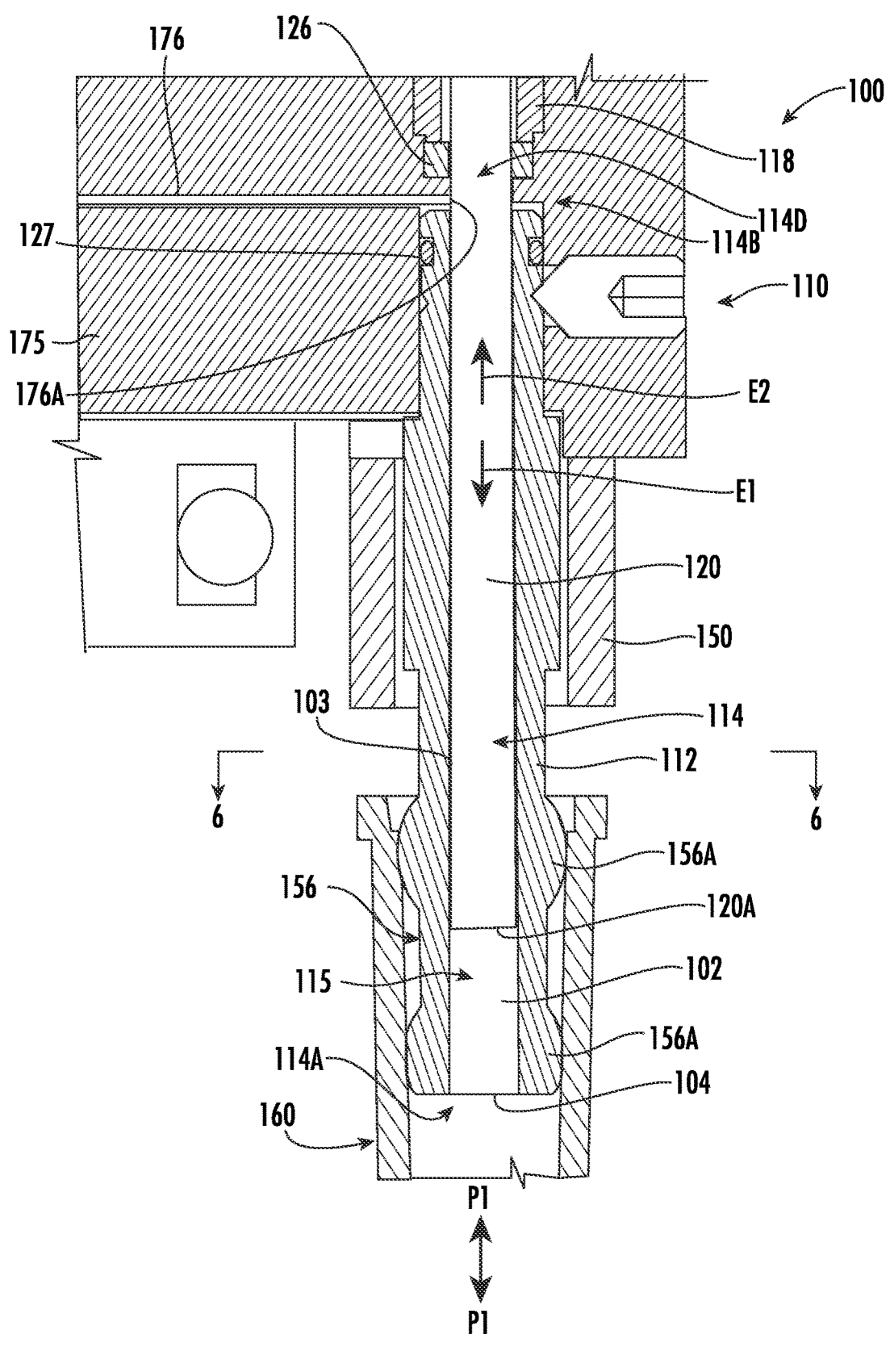
FIG. 4 is an enlarged, fragmentary, cross-sectional view of the pipettor of FIG. 2.

With reference to FIGS. 2-4, the pipettor 100 includes a frame 108, an interface 109, a pipetting channel 102, a pipettor orifice 104, a pressure control system 106, a shaft 112, an ejector mechanism 151, a tip mount feature or adaptor 156, and a manifold 175. The pressure control system 106 includes a first plunger mechanism 110, a second plunger mechanism 130, and an air flow control system 171. In the illustrative embodiment, the pipette tip 160 includes a pipetting orifice 162 and a liquid collection volume 165 that are in fluid communication with the pipetting channel 102. The shaft 112 has a lengthwise or main axis A-A. As discussed herein, the pipettor 100 is operative to selectively operate the first plunger mechanism 110 or the second plunger mechanism 130, or the first plunger mechanism 110 and the second plunger mechanism 130, to change a pressure in the pipetting channel 102 to aspirate or dispense a liquid volume. The first plunger mechanism 110 and the second plunger mechanism 130, may be understood to be operable independently of and in parallel with one another to change a pressure in the pipetting channel 102 to aspirate or dispense a liquid volume.

The components of the pipettor 100 may be mounted on the frame 108, which is in turn mounted on the pipettor module base 32. The electrical interface 109 may be operably mated to an electrical interface of the pipettor module base 30 or another component of the liquid handling system 10 to provide electrical power to the pipettor 100 and control or data communications interconnection between the pipettor 100 and other components of the liquid handling system 10 (e.g., the analytical instrument 16 and/or remote controller(s)). The electrical interface 109 may include a printed circuit board (PCB).

As noted above, the controller 20 may include one or more controllers, which may be distributed within the liquid handling system 10. In some embodiments, the controller 20 includes one or more controllers integral with or embodied in the pipettor 100 and operative to execute some or all of the pipettor control functions described herein. In some embodiments, these controller or controllers is/are embodied in and/or on the PCB 109.

With reference to FIGS. 2-5, the first plunger mechanism 110 includes the shaft 112, a guide sleeve 118, a plunger assembly 122 (including a first plunger 120), a first annular seal (e.g., an O-ring) 126, a second annular seal (e.g., an O-ring) 127, and a first linear drive mechanism 128.

The shaft 112 serves as a barrel for the first plunger 120. The shaft 112 defines a barrel bore 114 aligned with the axis A-A and extending from a first end 114A to an opposing second end 114B (FIG. 4). A top opening or port 114D is defined at the second end 114B and fluidly communicates with the bore 114. The pipettor orifice 104 is defined at the first end 114A and fluidly communicates with the bore 114.

The plunger assembly 122 (FIG. 5) includes an upper sleeve 124 and the first plunger 120 affixed to the upper sleeve 124 at a leading end of the upper sleeve 124. A bore 124A is defined in the upper sleeve 124. The first plunger 120 has a leading end 120A (FIG. 4). The first plunger 120 is mounted in the guide sleeve 118 and the barrel bore 114 such that the first plunger 120 can slidably translate relative to the shaft 112 along a first plunger axis P1-P1 in an extension direction E1 and an opposing retraction direction E2. In some embodiments, the first plunger axis P1-P1 is substantially coincident with the shaft axis A-A.

The first O-ring 126 (FIG. 4) forms an airtight seal between the outer diameter of the first plunger 120 and the manifold 175. The first plunger 120 is able to slide through the O-ring 126. The second O-ring 127 forms an airtight seal between the outer diameter of the shaft 112 and the manifold 175.

The outer diameter D1 (FIG. 6) of the first plunger 120 is less than the inner diameter D2 (FIG. 6) of the bore 114 so that the first plunger 120 and the bore 114A are radially spaced apart along their lengths. This spacing defines a tubular or annular air passage or channel 103 (FIGS. 4 and 6) between the outer diameter of the first plunger 120 and the inner diameter of the bore 114. The channel 103 extends from the O-ring 126 to the pipettor orifice 104.

The linear drive mechanism 128 includes an actuator 128A, a spindle 128B, a spindle nut 128C, and a first plunger position sensor 129 (FIG. 3). The actuator 128A may be an electric motor. The spindle 128B is coupled to the output of the motor 128A to be rotationally driven thereby. In at least some embodiments, the spindle 128B is operatively coupled to the output of the motor 128A via a planetary gear box (not shown). The spindle nut 128C is affixed to the upper end of the upper sleeve 124.

The motor 128A is operable to drive the spindle 128B in each of a first direction (e.g., clockwise) and an opposite second direction (e.g., counterclockwise). When the motor 128A drives the spindle 128B in the first direction, the spindle nut 128C, the upper sleeve 124, and the first plunger 120 are thereby pulled in the retraction direction E2 relative to the bore 114. When the motor 128A drives the spindle 128B in the second direction, the spindle nut 128C, the upper sleeve 124, and the first plunger 120 are thereby pushed in the extension direction E1 relative to the bore 114.

The spindle 128B translates into and out from the upper sleeve bore 124A as the plunger 120 travels.

The first plunger position sensor 129 is connected to the controller 20 to detect and monitor the position of the first plunger 120 in the bore 114. The first plunger position sensor 129 may be an encoder, for example. The first plunger sensor 129 may be electrically connected to the PCB 109. The PCB 109 may contain a controller (which forms one or more of the controller(s) 20) that steers the motor 128A.

In use, a first chamber 115 (FIG. 4) is defined in the barrel bore 114 substantially between the leading end 120A of the first plunger 120 and the first end 114A of the barrel bore 114. As the first plunger 120 is driven in the direction E1, air volume is displaced from the first chamber 115, and the effective volume of the first chamber 115 is reduced. As the first plunger 120 is driven in the direction E2, air volume is replaced in the first chamber 115, and the effective volume of the first chamber 115 is increased.

The first plunger 120 may be formed of any suitable material. In some embodiments, the first plunger 120 is formed of stainless steel.

The shaft 112 may be formed of any suitable material. In some embodiments, the shaft 112 is formed of stainless steel.

The spindle 128B and the spindle nut 128C may be formed of any suitable material(s). In some embodiments, the spindle 128B is formed of ceramic and the spindle nut 128C is formed of brass.

The second plunger mechanism 130 (FIGS. 3 and 5) includes a barrel 132, an end plug 136, a second plunger 140, a first annular seal (e.g., an O-ring) 146, a second annular seal (e.g., an O-ring) 147, and a second linear drive mechanism 148. In some embodiments (as illustrated, for example) and as discussed in more detail below, the second plunger 140 is larger than the first plunger 120.

The barrel 132 defines a barrel bore 134. The barrel bore 134 may be laterally offset from the axis A-A. The barrel bore 134 extends from a first end 134A to an opposing second end 134B. The end plug 136 is located at the first end 134A. A fluid channel 136A is defined in the end plug 136.

The second plunger 140 has a leading end 140A. An axially extending plunger bore 142 is defined in the plunger 140 and is closed at the end 140A. The O-ring 146 (FIGS. 5 and 7) is mounted on the plunger 140 at the leading end 140A. The O-ring 146 forms a sliding seal between the outer diameter of the second plunger 140 and the barrel 132, and translates with the second plunger 140.

The second plunger 140 is mounted in the barrel bore 134 such that the second plunger 140 can slidably translate relative to the barrel bore 134 along a second plunger axis P2-P2 in an extension direction E3 and an opposing retraction direction E4. In some embodiments, the second plunger axis P2-P2 is laterally offset from the shaft axis A-A.

The second linear drive mechanism 148 (FIG. 3) includes an actuator 148A, a spindle 148B, a spindle nut 148C, and a first plunger position sensor 149. The actuator 148A may be an electric motor. The spindle 148B is coupled to the output of the motor 148A to be rotationally driven thereby. The spindle nut 148C is affixed to the upper end of the second plunger 140.

The motor 148A is operable to drive the spindle 148B in each of a first direction (e.g., clockwise) and an opposite second direction (e.g., counterclockwise). When the motor 148A drives the spindle 148B in the first direction, the spindle nut 148C and the first plunger 140 are thereby pulled in the retraction direction E4 relative to the bore 134. When the motor 148A drives the spindle 148B in the second direction, the spindle nut 148C and the second plunger 140 are thereby pushed in the extension direction E3 relative to the bore 134. The spindle 148B translates into and out from the plunger bore 142 as the plunger 140 travels.

The second plunger position sensor 149 is connected to the controller 140 to detect and monitor the position of the first plunger 140 in the bore 134. The second plunger position sensor 149 may be an encoder, for example. The second plunger position sensor 149 may be electrically connected to the PCB 109. The PCB 109 may contain a controller (which forms one or more of the controller(s) 20) that steers the motor 148A.

While the illustrated first and second linear drive mechanisms 128, 148 each include a rotary motor, spindle and spindle nut arrangement, linear drive mechanisms of other types may be used instead in some embodiments. For example, but not limited to, a direct linear motor.

In use, a second chamber 135 (FIG. 5) is defined in the barrel bore 134 substantially between the leading end 140A of the second plunger 140 and the first end 134A of the barrel bore 134. As the first plunger 140 is driven in the direction E3, air volume is displaced from the second chamber 135, and the effective volume of the second chamber 135 is reduced. As the second plunger 140 is driven in the direction E4, air volume is replaced in the second chamber 135, and the effective volume of the second chamber 135 is increased.

The second plunger 140 may be formed of any suitable material. In some embodiments, the second plunger 140 is formed of aluminum.

The barrel 132 may be formed of any suitable material. In some embodiments, the barrel 132 is formed of aluminum.

The spindle 148B and the spindle nut 148C may be formed of any suitable material(s). In some embodiments, the spindle 148B may be formed of ceramic or stainless steel and the spindle nut 148C may be formed of plastic or a high-temperature resistant thermoplastic, e.g., Polyether ether ketone (PEEK).

The tip adaptor 156 is configured to removably secure the pipette tip 160 (and suitably constructed replacement pipette tips) to the end 112A of the shaft 112. In some embodiments, the tip adaptor 156 forms an air-tight, pressure-tight seal between the mount section 166 and the shaft 112. In the illustrated embodiment, the tip adaptor 156 includes annular ribs 156A configured to form a secure friction fit with a mount section 166 of the pipette tip, as well as an air-tight, pressure-tight seal between the mount section 166 and the shaft 112. However, other suitable pipette tip mounting structures may be provided. For example, the tip adaptor and the pipette tip may include interlocking features. The tip adaptor 156 may be integrally formed with the shaft or may be formed as a separate component.

The ejector mechanism 151 (FIGS. 5 and 13) includes an ejector member or sleeve 150 slidably mounted on a guide rod 152. A spring 154 biases the ejector sleeve 150 in a downward direction E6 toward the shaft end 112A. When the pipetting tip 160 is picked up, the ejector sleeve 150 is pushed upwards (direction E5). This upward movement and the sleeve positioning may be used with a magnet on the sleeve 150 and a Hall effect sensor to detect the presence of the pipette tip 160. An upper end 150B of the ejector sleeve 150 is configured to engage the lower end of the upper sleeve 124. A lower end 150A of the ejector sleeve 150 is configured to engage the pipette tip 160, as discussed below. In use, when the plunger assembly 122 is driven downward (direction E1) sufficiently by the first linear drive mechanism 128, it will abut the upper end 114B and drive the ejector sleeve 150 in an ejecting direction E6 to thereby force the pipette tip 160 off of the shaft 112.

The pipette tip 160 (FIG. 8) is an example of a pipette tip that may be used with the pipettor 100. However, it will be appreciated that pipette tips of other designs may be used instead.

The pipette tip 160 is a tubular body having a distal end 160A and a proximal end 160B. The pipette tip 160 defines a tip volume or passage 164 extending from the pipetting orifice 162 (at the distal end 160A) to an interface opening 163 (at the proximal end 160B). The mount section 166 is provided at the proximal end 160B. As discussed herein, a portion (some or all) of the tip passage 164 may serve as a liquid collection volume 165 in use.

Figure 5:
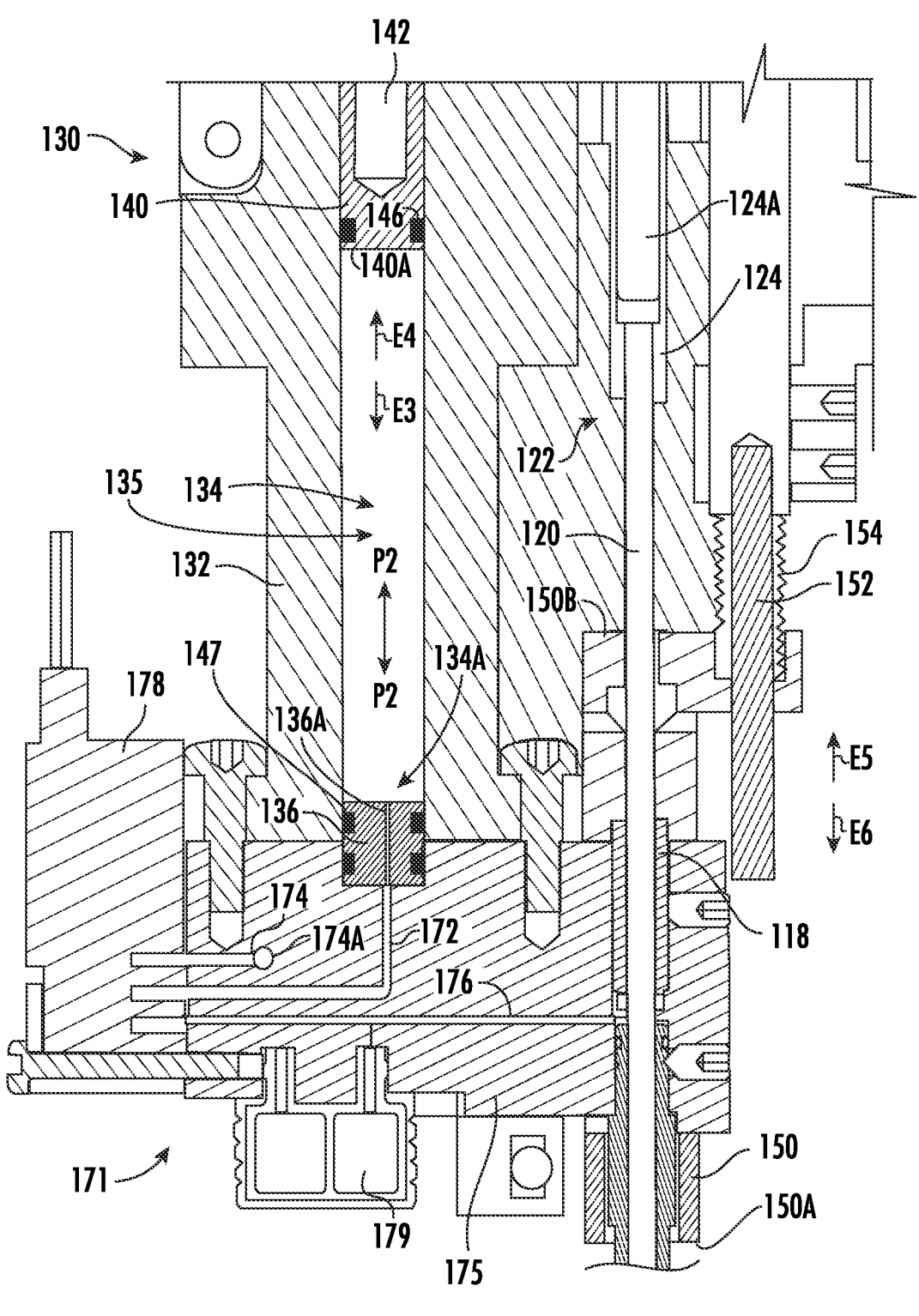
FIG. 5 is an enlarged, fragmentary, cross-sectional view of the pipettor of FIG. 2.
Figure 6:
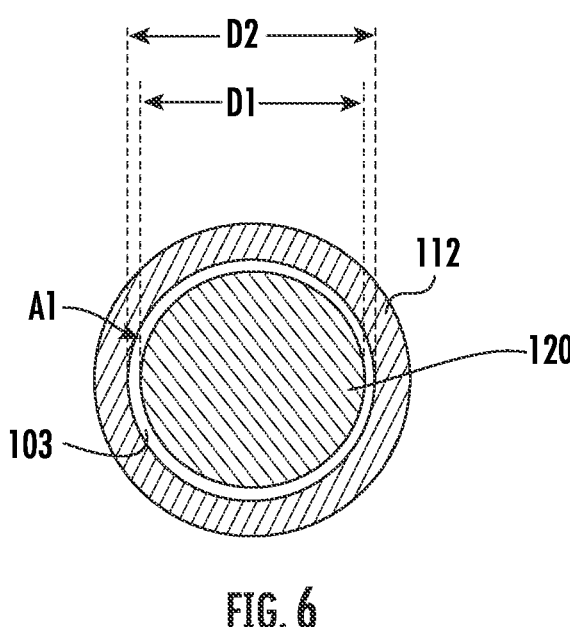
FIG. 6 is a cross-sectional view of the pipettor of FIG. 2 taken along the line 6-6 of FIG. 4.
Figure 7:
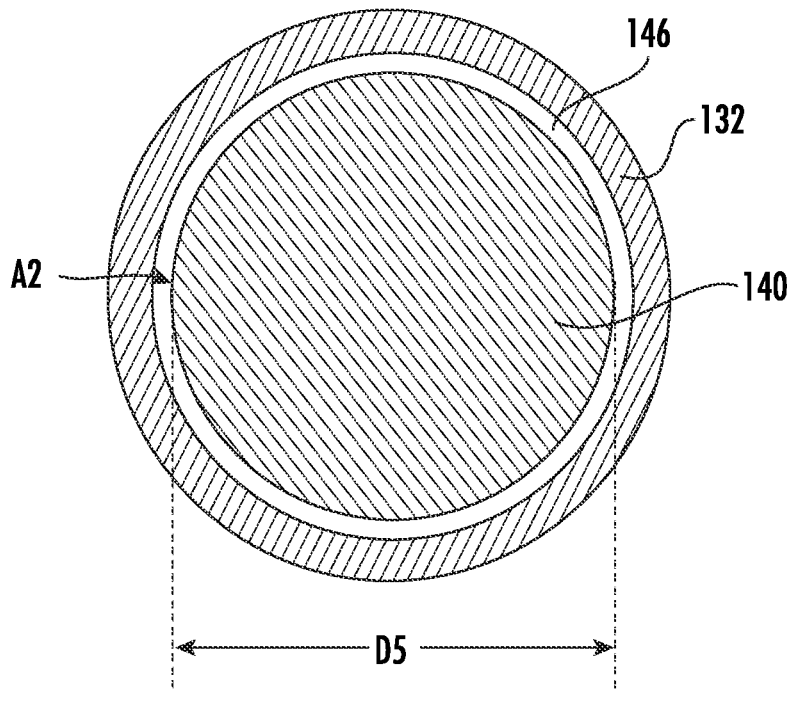
FIG. 7 is a cross-sectional view of the pipettor of FIG. 2 taken along the line 7-7 of FIG. 3.

With reference to FIG. 5, the air flow control system 171 includes a valve 178, a first channel 172, a second channel 174, and a third channel 176.

The first channel 172 fluidly connects or couples the second chamber 135 (via the channel 136A in the end plug 136) to the valve 178.

The second channel 174 fluidly connects or couples the valve 178 to a port 174A to the ambient atmosphere.

With reference to FIG. 4, the third channel 176 fluidly connects or couples the valve 178 to the first barrel bore 114. More particularly, in the illustrative embodiment, the third channel 176 terminates at a port 176A between the O-rings 126, 127. The port 176A is in fluid communication with the barrel port 114D, which in turn fluidly communicates with the annular channel 103 between the first plunger 120 and the shaft 112. The channel 103 permits airflow through the pipetting channel 102 (i.e., through the bore 114) from the barrel port 114D to the pipettor orifice 104.

Some or all of the channels 172, 174, 176 may be formed in whole or in part in the manifold 175. In some embodiments, each channel 172, 174, 176 has a diameter in the range of from about 0.2 to 1 mm.

The pressure control system 106 may also include a pipetting channel pressure sensor 179 (FIG. 5) fluidly coupled to the pipetting channel 102 via the channel 176.

The controller 20 is operative to control the valve 178 to assume first, second, and third valve states. The channel 176 is not fluidly connected to the atmosphere port 174A in any of the three valve states. When the second chamber 135 is fluidly connected to the first bore 114, the second chamber 135 is fluidly connected to the pipetting channel 102 and the pipettor orifice 104 via the first bore 114.

In the first valve state, the valve 178 closes the channel 172 from the channels 174, 176. As a result, the second chamber 135 is not fluidly connected to the first bore 114 (and thereby the pipetting channel 102) or the atmosphere port 174A.

In the second valve state, the valve 178 closes the channel 172 from the channel 176 and opens the channel 172 to the channel 174. As a result, the second chamber 135 is not fluidly connected to the first bore 114 (and thereby the pipetting channel 102), and the second chamber 135 is fluidly connected to the atmosphere port 174A.

In the third valve state, the valve 178 closes the channel 172 from the channel 174 and opens the channel 172 to the channel 176. As a result, the second chamber 135 is fluidly connected to the first bore 114 (and thereby the pipetting channel 102), and the second chamber 135 is not fluidly connected to the atmosphere port 174A.

The liquid handling system 10 and the pipetting system 100 may be used as follows in accordance with some methods to aspirate and/or dispense one or more liquid samples. Generally, the first and second plunger mechanisms 110, 130 are used to displace air volumes in their respective chambers 115, 135 and thereby correspondingly change a pressure in the pipetting channel 102 to aspirate or dispense a liquid sample into or from the liquid collection volume 165.

The pipettor 100 may be operated in each of several different modes of operation. The operator or controller 20 may select and implement the mode of operation depending on the conditions or parameters of the aspirating or dispensing task.

Figure 9:
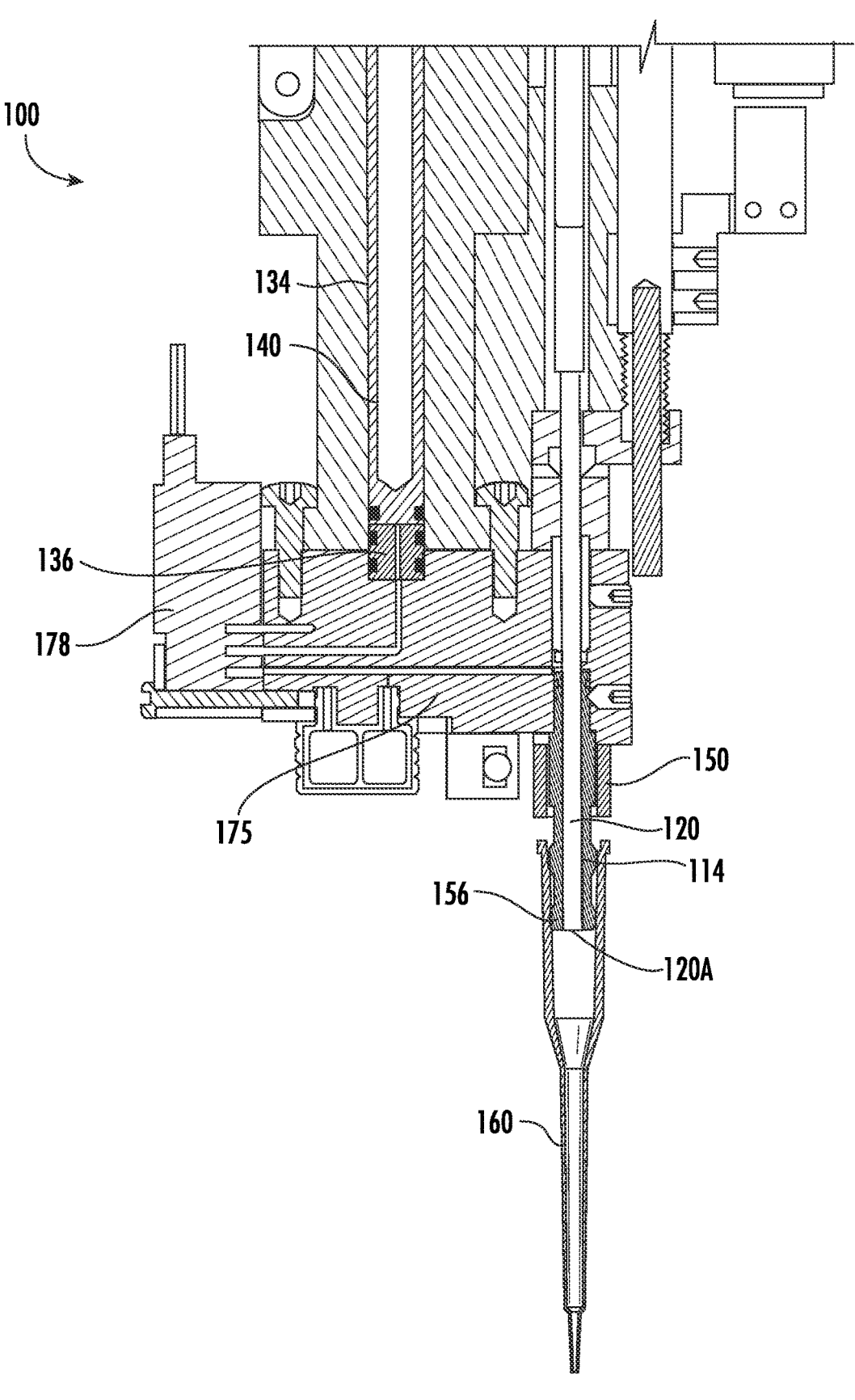
FIGS. 9-13 are fragmentary, cross-sectional views of the pipettor of FIG. 2 illustrating operations of the pipettor.

Typically, the pipettor 100 will initially be set (e.g., by the controller 20) in a start position as shown in FIG. 9. In the start position, the first plunger 120 is positioned in its lowermost position. In some embodiments and as shown, in this lowermost, start position of the first plunger 120, the leading end 120A of the first plunger 120 is substantially flush or axially coincident with the pipettor orifice 104. In the start position, the second plunger 140 is positioned in its lowermost position. In some embodiments and as shown, in this lowermost, start position of the second plunger 140, the leading end 140A of the second plunger 140 is substantially flush or axially coincident with the pipettor orifice end plug 136.

A pipette tip 160 is mounted on the tip adaptor 156, as shown in FIG. 9.

The controller 20 may then operate the actuator(s) 34A, 34B, for example, to position the pipette tip 160 over a liquid sample LS. The sample LS may be disposed in a container 36, for example. The controller 20 may then operate the actuator 34B, for example, to lower the distal end 160A, and thereby the pipetting orifice 162, into the sample LS. In some embodiments, the distal end 160A, and thereby the pipetting orifice 162, are immersed in the sample LS to at least a prescribed depth to ensure that the pipetting orifice 162 remains immersed in the sample during aspiration.

Figure 10:
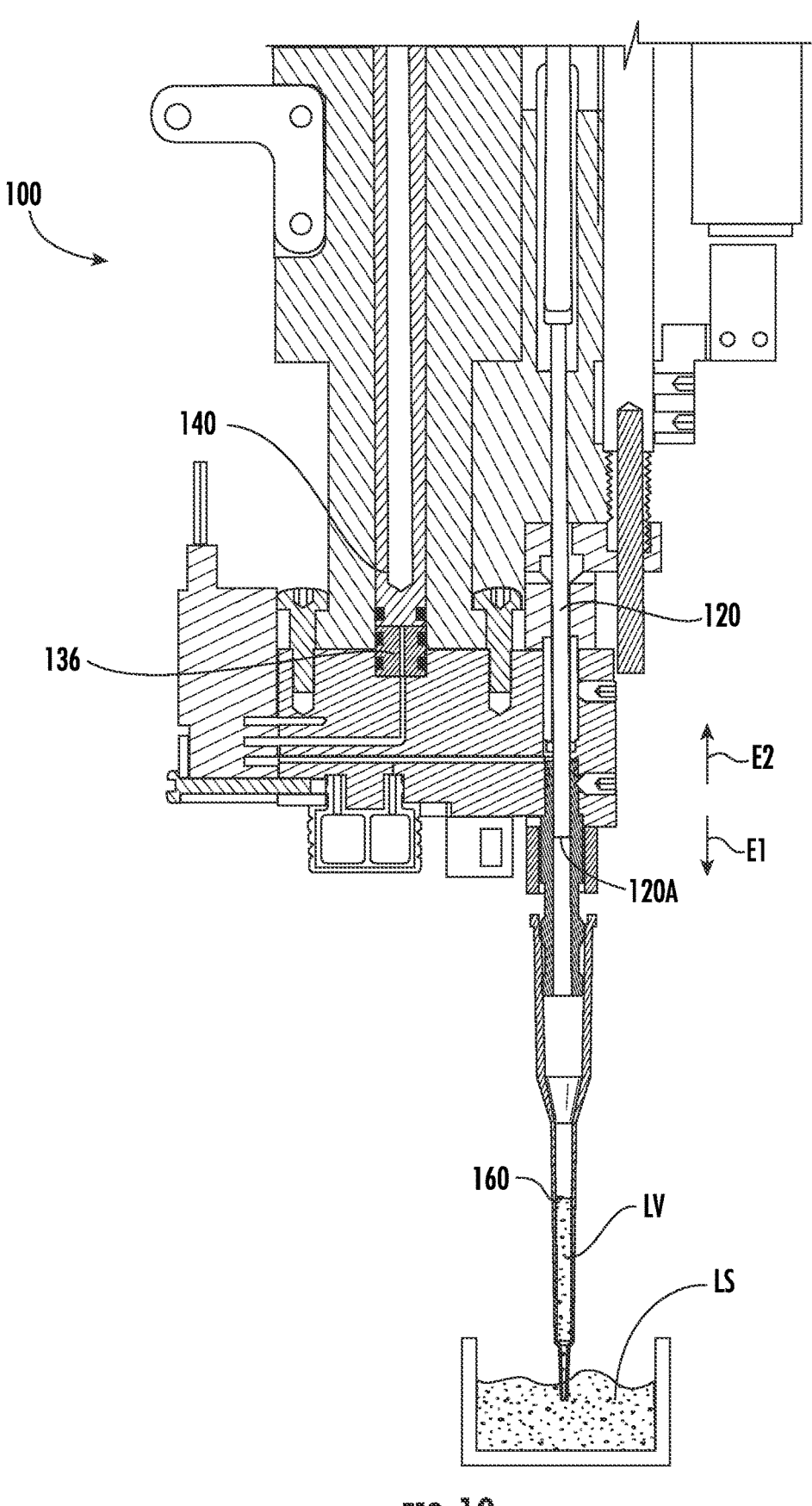

With the pipettor 100 in the start position and the pipetting orifice 162 immersed, the pipetting system 101 may be operated in a first aspirating mode to aspirate a portion of the sample LS. In the first aspirating mode, the valve 178 is set in the first valve state so that the pipetting channel 102 is fluidly sealed from the second chamber 135. The first drive mechanism 128 is then actuated to draw the first plunger 120 away from the pipettor orifice 104 in the retraction direction E2 as shown in FIG. 10, for example. The retraction of the first plunger 120 expands the effective air volume of the first chamber 115, thereby generating a negative pressure at the pipettor orifice 104. The negative pressure draws a liquid sample volume LV of the liquid sample LS into the liquid collection volume 165 (in the tip passage 164) of the pipette tip 160. An air volume or air cushion AC may remain in the tip passage 164 and the first chamber 115 between the proximal end of the liquid sample volume LV and the leading end 120A of the first plunger 120.

The pipettor 100 may then be used to dispense the liquid sample volume LV in a first dispensing mode. In order to dispense the liquid sample volume LV, the valve 178 is set or retained in the first valve state. The first drive mechanism 128 is actuated to push the first plunger 120 toward pipettor orifice 104 in the extension direction E1. The extension of the first plunger 120 displaces air volume from the first chamber 115, thereby generating a positive pressure at the proximal end of the liquid sample volume LV. The positive pressure expels the liquid sample volume LV from the liquid collection volume 165 through the pipetting orifice 162. The air cushion AC may remain between the proximal end of the liquid sample volume LV and the leading end 120A of the first plunger 120 until the liquid sample volume LV is fully dispensed.

Figure 11:
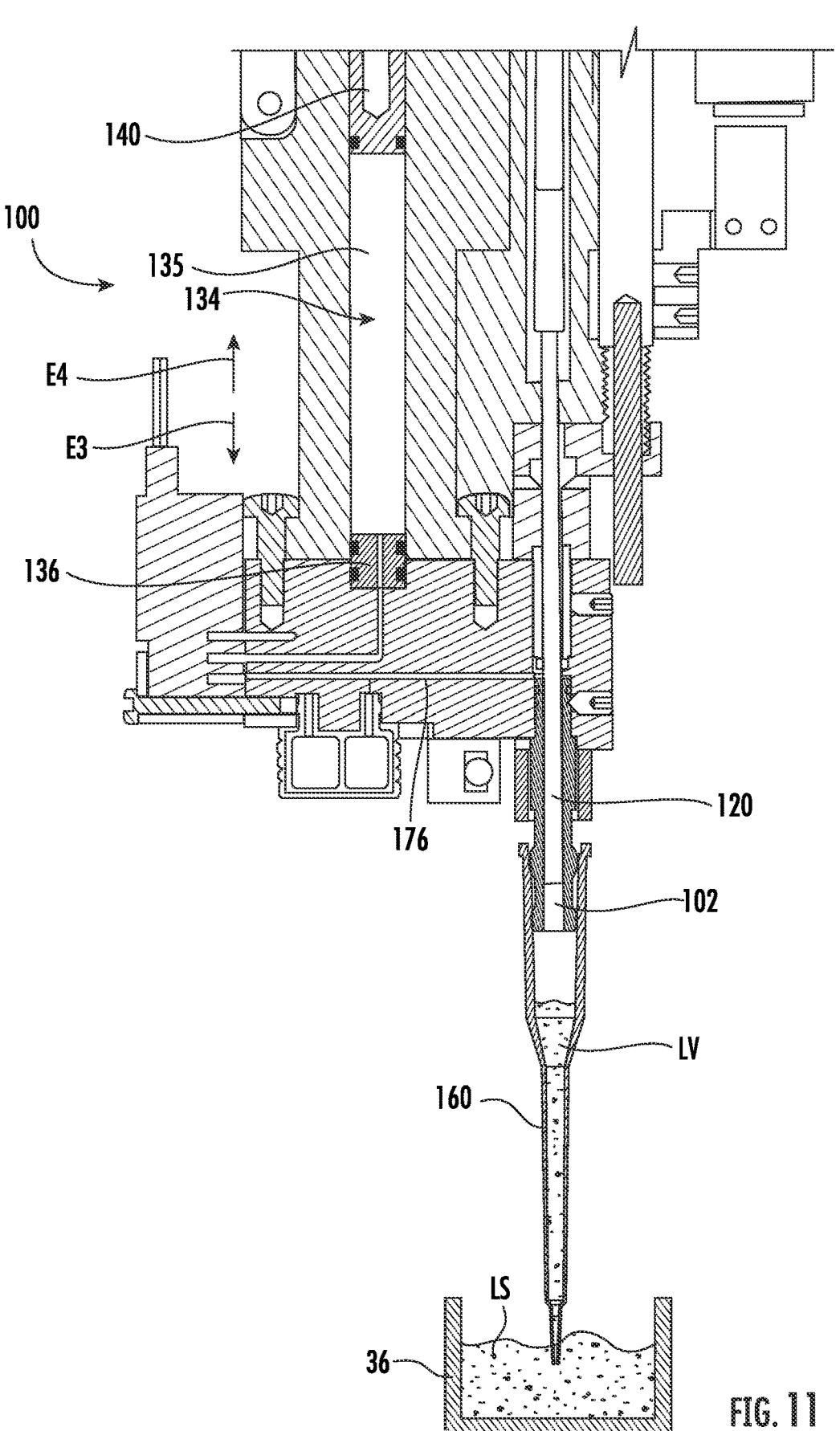

Alternatively, the pipetting system 101 may be operated in a second aspirating mode to aspirate a portion of the liquid sample LS. In the second aspirating mode, the valve 178 is set in the third valve state so that the second chamber 135 is fluidly connected to the pipetting channel 102 and is fluidly sealed from the atmosphere port 174A. With the pipettor 100 in the start position and the pipetting orifice 162 immersed, the second drive mechanism 148 is actuated to draw the second plunger 140 away from the end plug 136 in the retraction direction E4 as shown in FIG. 11, for example. The retraction of the second plunger 140 expands the effective air volume of the second chamber 135, thereby generating a negative pressure at the pipettor orifice 104 (via the channel 172, the valve 178, the channel 176 and the bore 114). The negative pressure draws a liquid sample volume LV of the liquid sample LS into the liquid collection volume 165 (in the tip passage 164) of the pipette tip 160. An air volume or air cushion AC may remain in the tip passage 164 between the proximal end of the liquid sample volume LV and the leading end 120A of the first plunger 120.

The pipettor 100 may then be used to dispense the liquid sample volume LV in a second dispensing mode. In order to dispense the liquid sample volume LV, the valve 178 is set or retained in the third valve state. The second drive mechanism 148 is actuated to push the second plunger 140 toward the end plug 136 in the extension direction E3. The extension of the second plunger 140 displaces air volume from the second chamber 135, thereby generating a positive pressure at the proximal end of the liquid sample volume LV (via the channel 172, the valve 178, the channel 176 and the bore 114). The positive pressure expels the liquid sample volume LV from the liquid collection volume 165 through the pipetting orifice 162. An air cushion AC may remain between the proximal end of the liquid sample volume LV and the leading end 120A of the first plunger 120 until the liquid sample volume LV is fully dispensed.

Figure 12:
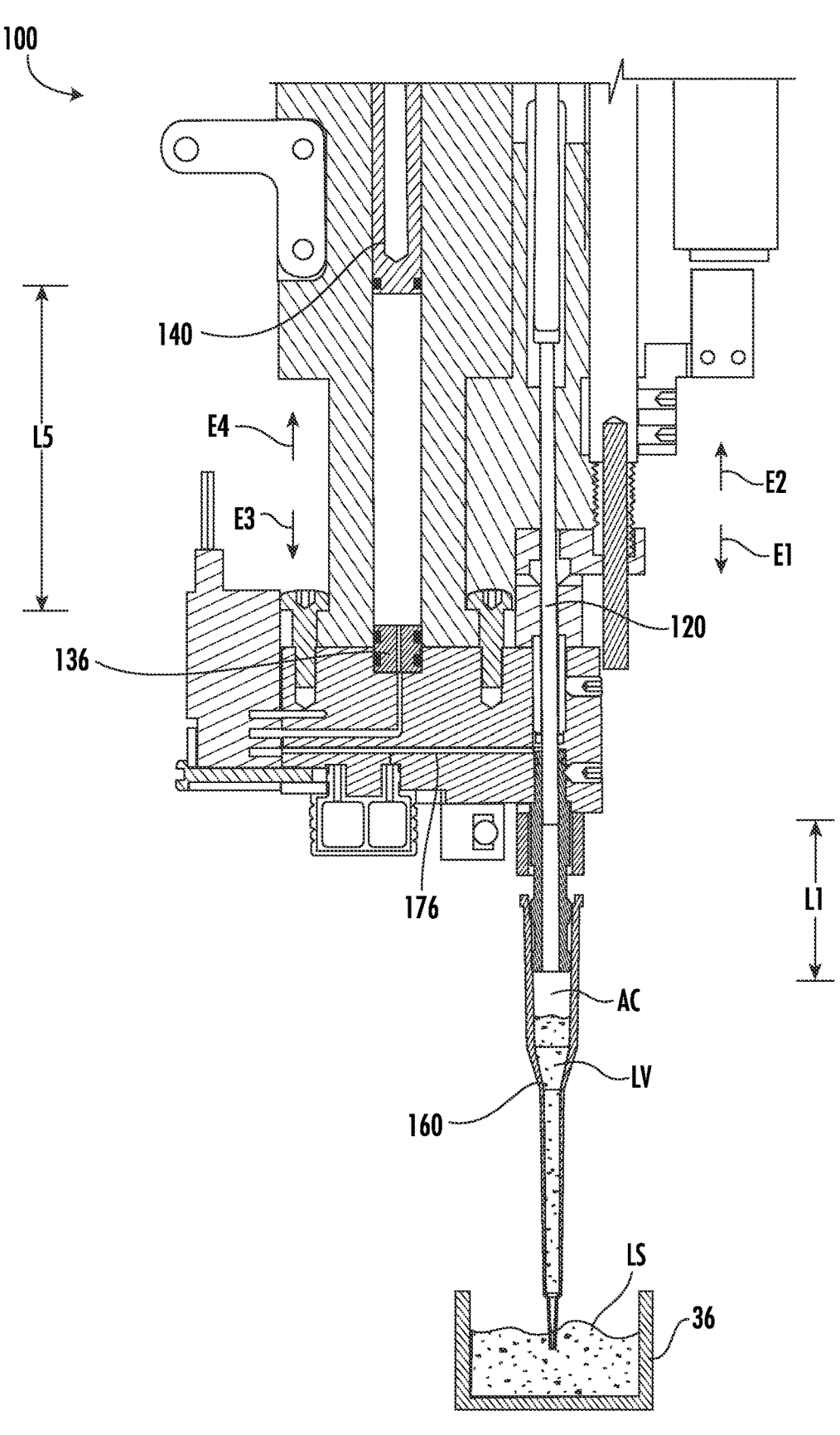

Alternatively, the pipetting system 101 may be operated in a third aspirating mode to aspirate a portion of the liquid sample LS. In the third aspirating mode, the valve 178 is set in the third valve state so that the second chamber 135 is fluidly connected to the pipetting channel 102 and is fluidly sealed from the atmosphere port 174A. The first drive mechanism 128 is then actuated to draw the first plunger 120 away from the pipettor orifice 104 in the retraction direction E2, as shown in FIG. 12, for example. The retraction of the first plunger 120 expands the effective air volume of the first chamber 115, thereby generating a negative pressure at the pipettor orifice 104. Additionally, and simultaneously with the retraction of the first plunger 120, the second drive mechanism 148 is actuated to draw the second plunger 140 away from the end plug 136 in the retraction direction E4, as also shown in FIG. 12. The retraction of the second plunger 140 expands the effective air volume of the second chamber 135, thereby also generating a negative pressure at the pipettor orifice 104. As a result, the displacements of the two plungers 120, 140 both create a negative pressure that draws a liquid sample volume LV of the liquid sample LS into the liquid collection volume 165 (in the tip passage 164) of the pipette tip 160. An air volume or air cushion AC may remain in the tip passage 164 between the proximal end of the liquid sample volume LV and the leading end 120A of the first plunger 120.

The pipettor 100 may then be used to dispense the liquid sample volume LV in a third dispensing mode. In order to dispense the liquid sample volume LV, the valve 178 is set or retained in the third valve state. The first drive mechanism 128 is actuated to push the first plunger 120 toward the pipettor orifice 104 in the extension direction E1. The extension of the first plunger 120 displaces air volume from the first chamber 115, thereby generating a positive pressure at the proximal end of the liquid sample volume LV. Additionally, and simultaneously with the extension of the first plunger 120, the second drive mechanism 148 is actuated to push the second plunger 140 toward the end plug 136 in the extension direction E3, which displaced air volume from the second chamber 135, thereby generating a positive pressure at the proximal end of the liquid sample volume LV (via the channel 172, the valve 178, the channel 176 and the bore 114). As a result, the displacements of the two plungers 120, 140 both create a positive pressure that expels the liquid sample volume LV from the liquid collection volume 165 through the pipetting orifice 162. An air cushion AC may remain between the proximal end of the liquid sample volume LV and the leading end 120A of the first plunger 120 until the liquid sample volume LV is fully dispensed.

Alternatively, the pipetting system 101 may be operated in a fourth aspirating mode to aspirate a portion of the liquid sample LS. In the fourth aspirating mode, the valve 178 is also set in the third valve state, and the first and second drive mechanisms 128, 148 are operated to retract the plungers 120, 140 in the manner described above for the third aspiration mode. However, in the fourth aspirating mode, the first plunger 120 and the second plunger 140 are retracted at different times from one another (e.g., sequentially or alternately) rather than simultaneously.

Similarly, the pipetting system 101 may be operated in a fourth dispensing mode to dispense a portion of the liquid sample LS. In the fourth dispensing mode, the valve 178 is also set in the third valve state, and the first and second drive mechanisms 128, 148 are operated to extend the plungers 120, 140 in the manner described above for the third dispensing mode. However, in the fourth dispensing mode, the first plunger 120 and the second plunger 140 are extended at different times from one another (e.g., sequentially or alternately) rather than simultaneously.

In some operations, the valve 178 is set in the second valve state to connect the second chamber 135 to the atmosphere port 174A. The second drive mechanism 148 is then operated to position in the second plunger 140 in its start position. The air displaced from the chamber 135 by the second plunger 140 is expelled through the atmosphere port 174A so that the air volume in the chamber 135 is not pressurized. The valve 178 may then be set in the first valve state or the second valve state to re-seal the second chamber 135 to the atmosphere port 174A for an aspirating or dispensing operation.

In operations according to some embodiments, the second plunger 140 and the valve 178 are cooperatively operated repetitive or cycling pump in order to aspirate and dispense larger volumes, for example. In this case, the valve 178 is switched between its second and third valve states between movements of the second plunger 140. More particularly, the valve 178 and the second plunger 140 may be operated as follows. With the valve 178 in the third valve state (fluidly connecting the second chamber 135 to the pipetting channel 102, and closing the second chamber 135 from the atmosphere port 174A), the second plunger 140 is retracted (direction E4) to draw liquid sample volume LV into the pipette tip 160. The valve 178 is then placed in the second valve state (fluidly connecting the second chamber 135 to the atmosphere port 174A, and closing the second chamber 135 from the pipetting channel 102). With the valve 178 in the second valve state, the second plunger 140 is extended (direction E3) to expel air from the second chamber 135 and return the second plunger 140 to or toward its starting position. Because the valve 178 is in the second valve state, the aspirated liquid sample volume LV remains in the pipette tip 160 (i.e., is not dispensed by the extension of the second plunger 140. The valve 178 is then again placed in the third valve state and, with the valve 178 in the third valve state, the second plunger 140 is again retracted (direction E4) to draw additional liquid sample volume LV into the pipette tip 160. This sequence may be repeated multiple times to incrementally aspirate liquid sample volumes LV into the pipette tip 160. For example, the sequence may be repeated five times, each aspirating 1 ml, to aspirate a total of 5 ml into the pipette tip 160. The operation may also be reversed to dispense increments of a larger volume from the pipette tip 160 (e.g., to dispense a series of five 1 ml liquid volumes from a pipette tip 160 containing 5 ml of the liquid sample).

As discussed above, the pipetting system 101 aspirates liquid sample by decreasing the pressure in the pipetting channel and dispenses liquid sample by increasing the pressure in the pipetting channel 102. However, the pressure in the pipetting channel 102 may fluctuate in response to other actions or conditions in the procedure. For example, in some embodiments for aspirating, the pressure in the pipetting channel 102 increases as the plunger 120 or 140 is retracted. After the plunger 120, 140 stops, the inflow into the pipette tip 160 stops and the pressure drops associated with the plunger movement goes to zero. However, the pressure in the pipetting channel 102 may remain negative, caused by the weight of the liquid sample in the pipette tip 160. After the pipette tip 160 is removed from the liquid sample supply, the pressure in the pipetting channel 102 may drop further slightly because of diminished buoyancy. The pressure in the pipetting channel 102 may then increase slowly after that, caused by evaporation of the liquid sample in the pipette tip 160. Therefore, it will be appreciated that the pressure changes in the pipetting channel 102 may be caused or determined by phenomena other than and in addition to the movement of the plungers 120, 140.

The aspirating modes and dispensing modes described above can be implemented as desired in different combinations. For example, the third aspirating mode (simultaneous plunger retraction) may be used to aspirate a liquid sample volume, and the fourth dispensing mode (sequential plunger extension) may be used to dispense the liquid sample volume.

The pipettor 100 may be relocated as desired between steps of aspirating and dispensing. An aspirating procedure may include aspirating a liquid volume from a single liquid sample source or multiple liquid sample sources. A dispensing procedure may include dispensing a liquid volume to a single location or to multiple locations. For example, a quantity of the liquid sample may be aspirated from a single source, and then smaller quantities of the aspirated liquid sample may be dispensed into respective different locations (e.g., wells of a well plate). In some embodiments, the liquid sample volume LV (or a portion thereof) is dispensed by the pipettor 100 into the analytical apparatus 16.

In some embodiments, the controller 20 automatically and programmatically operates the valve 178 and the actuators 128A, 148A to set the valve states and to extend and retract the plungers 120, 140 as described herein.

In some embodiments, the controller 20 receives pressure signals from the pipetting channel pressure sensor 179 indicating the air pressure in the pipetting channel 102. The controller 20 may continuously monitor the pressure in the pipetting channel 102.

Figure 13:
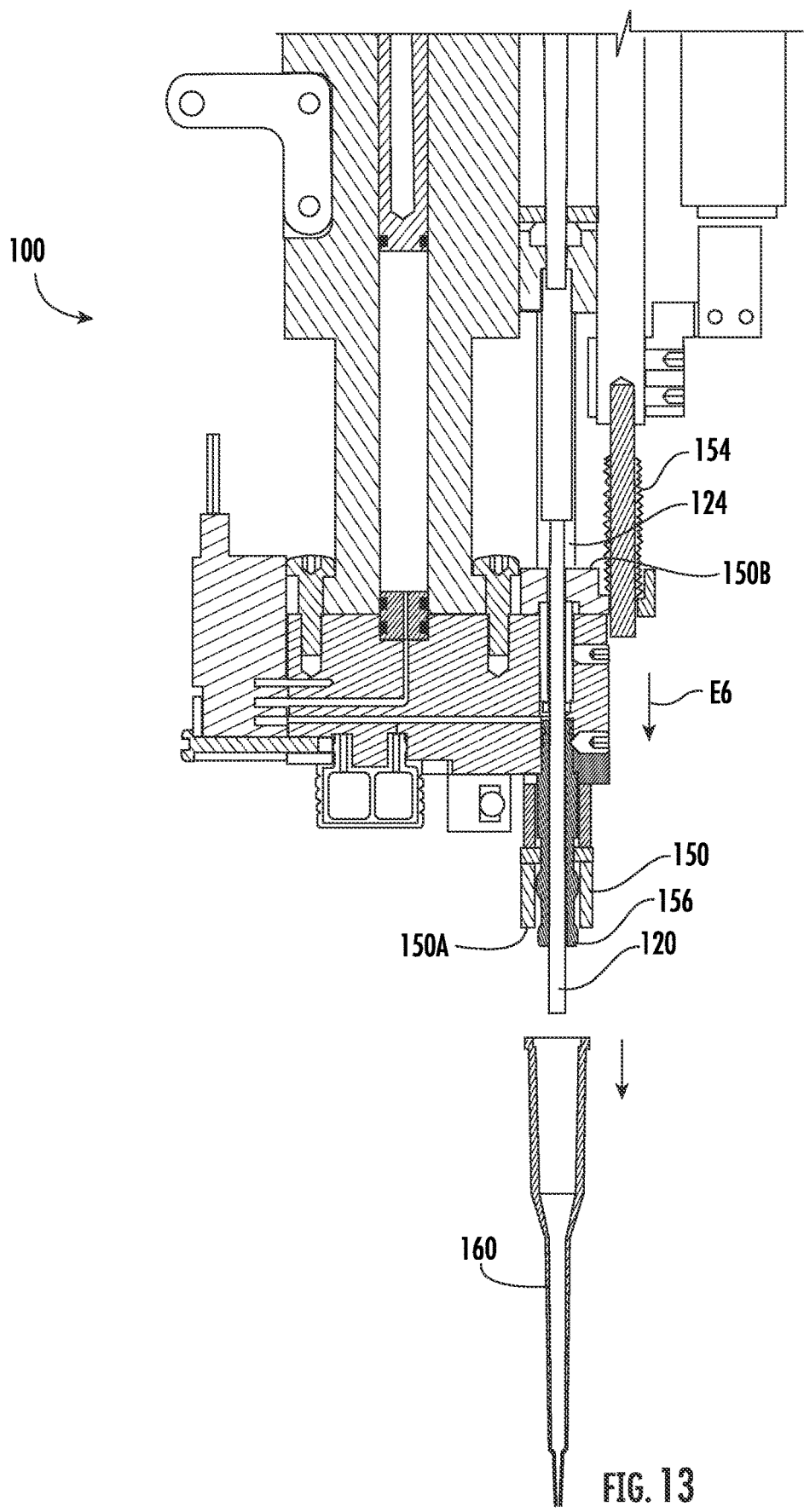

With reference to FIG. 13, the pipetting system 101 may be operated to automatically remove the pipette tip 160 from the pipettor 100 using the ejector mechanism 151. In order to eject the pipette tip 160, the controller 20 operates the first drive mechanism 128 to push the plunger assembly 122 in the extension direction E6. The leading end 124B of the plunger sleeve 122 will engage the upper end 150B of the ejector sleeve 150 and push the ejector sleeve 150 in the direction E6 as the first drive mechanism 128 continues to drive the plunger assembly 122. The lower end 150A of the ejector sleeve 150 engages the mount section 166 of the pipette tip 160 and pushes the pipette tip 160 off of the tip adaptor 156. In some embodiments, the controller 20 automatically and programmatically operates the actuator 128A to eject the pipette tip 160.

As described herein, the first and second plunger mechanisms 110, 120 can be operated independently of one another or together to aspirate and dispense liquid sample volumes. The choice of which plunger mechanism(s) 120, 140 to operate for a given aspirating or dispensing procedure can be a function of or tailored to the conditions or parameters of the aspirating or dispensing procedure. By employing dual plunger mechanisms, the volume range of the pipettor 100 can be enlarged, and process specific volume accuracy and precision can be supported without the need for multiple pipetting channels.

For example, when only a relatively small quantity of the liquid sample is to be aspirated or dispensed, the pipettor 100 may be operated in the first aspirating mode or first dispensing mode. The use of the smaller plunger 120 can provide higher resolution, and thereby better accuracy and precision.

When a relatively large quantity of the liquid sample is to be aspirated or dispensed, the pipettor 100 may be operated in the second aspirating mode or second dispensing mode. The use of the larger plunger 140 can enable the pipettor 100 to draw and hold a greater quantity of the liquid sample at once. The use of the larger plunger 140 can enable the pipettor 100 to aspirate or dispense the liquid sample at a higher rate.

When a relatively large quantity of the liquid sample is to be aspirated or dispensed, the pipettor 100 may also be operated in the third aspirating mode or third dispensing mode, as well as in the fourth aspirating mode or fourth dispensing mode. The use of the smaller plunger 120 and the larger plunger 140 together can enable the pipettor 100 to draw and hold an even greater quantity of the liquid sample at once. Displacing the smaller plunger 120 and the larger plunger 140 simultaneously can enable the pipettor 100 to aspirate or dispense the liquid sample at an even higher rate.

For example, in an illustrative embodiment, the first plunger 120 has a stroke distance L1 (FIG. 12) of 25 mm and a diameter D1 (FIG. 6) of 2 mm, so that the first plunger mechanism 110 can displace up to 55 microliters of air. In the illustrative embodiment, the second plunger 140 has a stroke distance L5 (FIG. 12) of 45 mm and a diameter D5 (FIG. 7) of 6 mm, so that the second plunger mechanism 130 can displace up to 1100 microliters of air. When operated in the first aspirating mode, the pipettor 100 can aspirate up to 55 microliters of liquid sample. When operated in the second aspirating mode, the pipettor 100 can aspirate up to 1100 microliters of liquid sample. When operated in the third or fourth aspirating mode, the pipettor 100 can aspirate up to 1155 microliters of liquid sample.

In some embodiments, the controller 20 automatically and programmatically executes the steps of operating the actuators 128A, 148A to extend and retract the plungers 120, 140 and eject the pipette tip 160.

In some embodiments, the controller 20 automatically and programmatically executes the steps of operating the actuators 34A, 34B to position the pipettor 100.

As mentioned above, in some embodiments the second plunger 140 is larger than the first plunger 120. The first plunger 120 has a cross-sectional area A1 (FIG. 6) in a cross-sectional plane orthogonal to the first plunger axis P1-P1 (i.e., the axis along which the first plunger is translated to aspirate and dispense). The second plunger 140 has a cross-sectional area A2 (FIG. 7) in a cross-sectional plane orthogonal to the second plunger axis P2-P2 (i.e., the axis along which the second plunger is translated to aspirate and dispense). In some embodiments (as illustrated, for example), the cross-sectional area A2 of the second plunger 140 is greater than the cross-sectional area A1 of the first plunger 120. In some embodiments, the cross-sectional area A2 is at least three times the cross-sectional area A1.

In some embodiments, the cross-sectional area A1 is in the range of from about 0.1 to 4 mm$^2$, and the cross-sectional area A2 is in the range of from about 1.25 to 50 mm$^2$.

The smaller first plunger 120 displaces an air volume in the first chamber 115 at a first rate of air volume displacement per unit translation. The larger second plunger displaces an air volume in the second chamber 135 at a second rate of air volume displacement per unit translation. Because the larger plunger 120 has a greater cross-sectional area, the second rate of air volume displacement per unit translation is greater than the first rate of air volume displacement per unit translation. In some embodiments, the second rate of air volume displacement per unit translation is at least three times the first rate of air volume displacement per unit translation.

In some embodiments, the first rate of air volume displacement per unit translation is in the range of from about 0.01 microliters/s to 100 microliters/s, and the second rate of air volume displacement per unit translation is in the range of from about 0.1 microliters/s to 2500 microliters/s.

In some embodiments, pipettor is configured such that the maximum air volume displaceable by the second plunger 140 (when the second plunger 140 is translated through its full stroke) is greater than the maximum air volume displaceable by the first plunger 120 (when the first plunger 120 is translated through its full stroke). In some embodiments, the maximum air volume displaceable by the second plunger 140 is at least ten times the maximum air volume displaceable by the first plunger 120.

In some embodiments, the maximum air volume displaceable by the second plunger 140 is in the range of from about 10 microliters to 5000 microliters, and the maximum air volume displaceable by the first plunger 120 is in the range of from about 1 microliter to 100 microliters.

In some embodiments, the maximum air volume of the second chamber 135 (when the second plunger 140 is in its fully retracted position) is at least ten times the maximum air volume of the first chamber 115 (when the first plunger 120 is in its fully retracted position). In some embodiments, the maximum air volume of the second chamber 135 is in the range of from about 11 microliters to 5500 microliters, and the maximum air volume of the first chamber 115 is in the range of from about 1.5 microliters to 110 microliters.

In some embodiments and as shown in the illustrative embodiment of FIGS. 2-7, the first chamber 115 (FIG. 4; i.e., the chamber containing the air volume displaced by the first plunger 120 as it translates) occupies a portion of the pipetting channel 102. Accordingly, the first plunger 120 may be disposed in and travel through the pipetting channel 102. In some embodiments, the distal end 120A of the first plunger 120 is coincident with or extends past the pipetting orifice 104 when the first plunger 120 is fully extended. The provision of the first plunger 120 in the shaft 112 and the positioning of the distal end 120A at the start position can help to minimize the death volume in the pipetting channel 102 and permit a more compact pipettor. The arrangement of the first plunger mechanism 110, the shaft 112 and the ejection mechanism 151 also enables the use of a single drive mechanism to execute the aspirating/dispensing functions and the tip ejection function.

With reference to FIGS. 14-19, an example pipetting system 201 according to further embodiments of the present technology is shown. The pipetting system 201 can aspirate and dispense liquid volumes within a liquid handling system. The pipetting system 201 may be used in place of the pipetting system 101 in the automated liquid handling system 10 (FIG. 1), for example. However, it shall be understood that the disclosed methods, systems, and apparatus are not limited to the liquid handling system 10 or use therein, and the present disclosure is applicable to other systems and applications where it is desired to aspirate and/or dispense liquid volumes. The pipetting system 201 includes a pipettor 200.

The pipetting system 201 includes one or more pipettors 200. The pipettor(s) may be mounted on the pipettor module 30. The pipettors 200 may be constructed and operate in the same manner, and it will be appreciated that the description of a representative one of the pipettors 200 that follows may apply equally to each of the pipettors 200. If multiple pipettors 200 are provided, the pipettors 200 may be operated independently of one another or in tandem.

Figure 8:
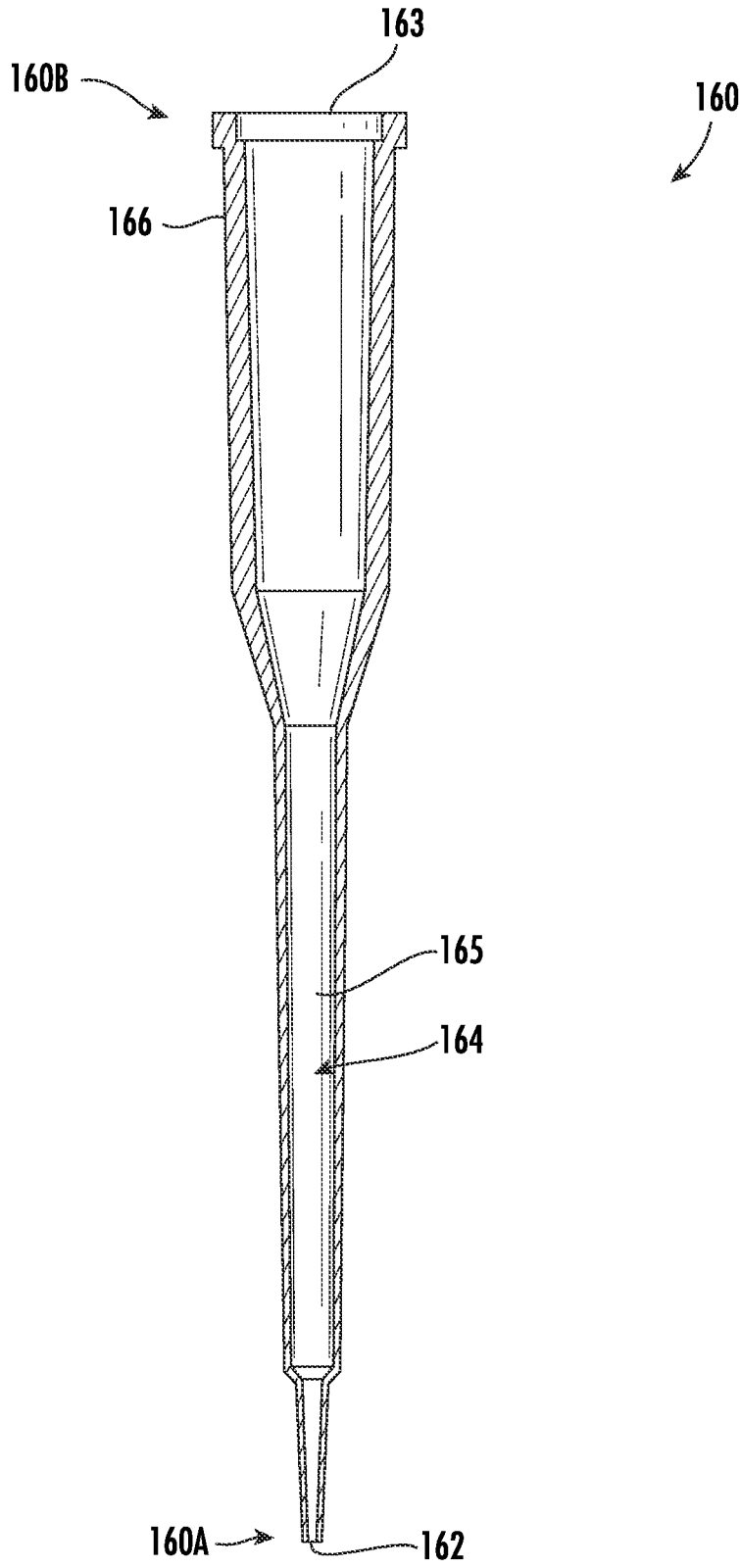
FIG. 8 is a cross-sectional view of a pipette tip for use with the pipettor of FIG. 2.

The pipetting system 201 includes the pipettor(s) 200, the controller 20, and one or more pipette tips 160 (as described herein with reference to FIG. 8). In some embodiments, the pipette tips 160 are removable and replaceable on the pipettors 200, and may be effectively disposable or consumable components of the pipetting system 201. However, in other embodiments, the pipette tips 160 may be omitted and the structures and functionalities of the pipette tips 160 may be provided as integral parts of the pipettors 200. A filter media 169 may be provided in the pipette tip 160 (FIG. 15).

Figure 14:
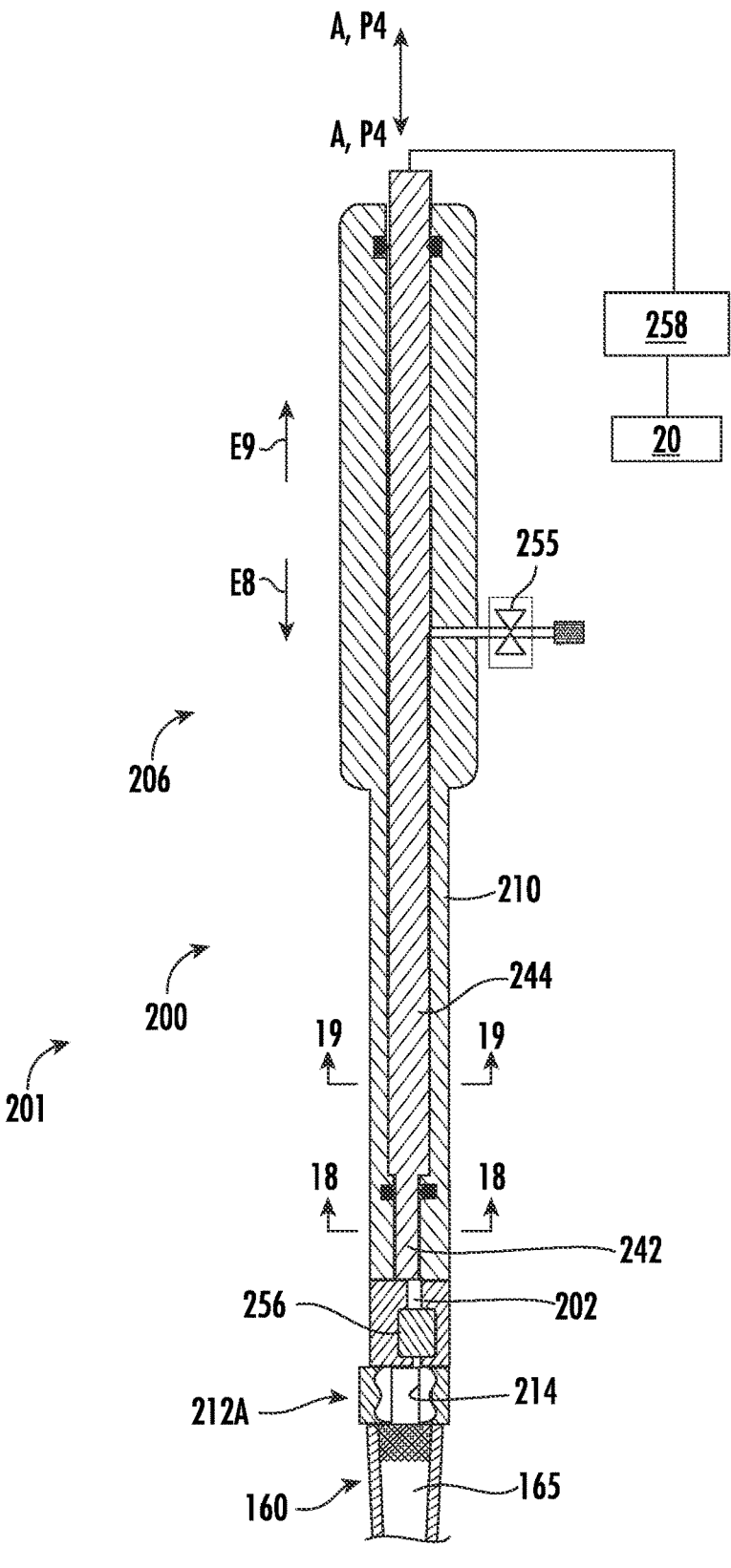
FIG. 14 is a fragmentary, cross-sectional view of a pipetting system according to further embodiments.
Figure 15:
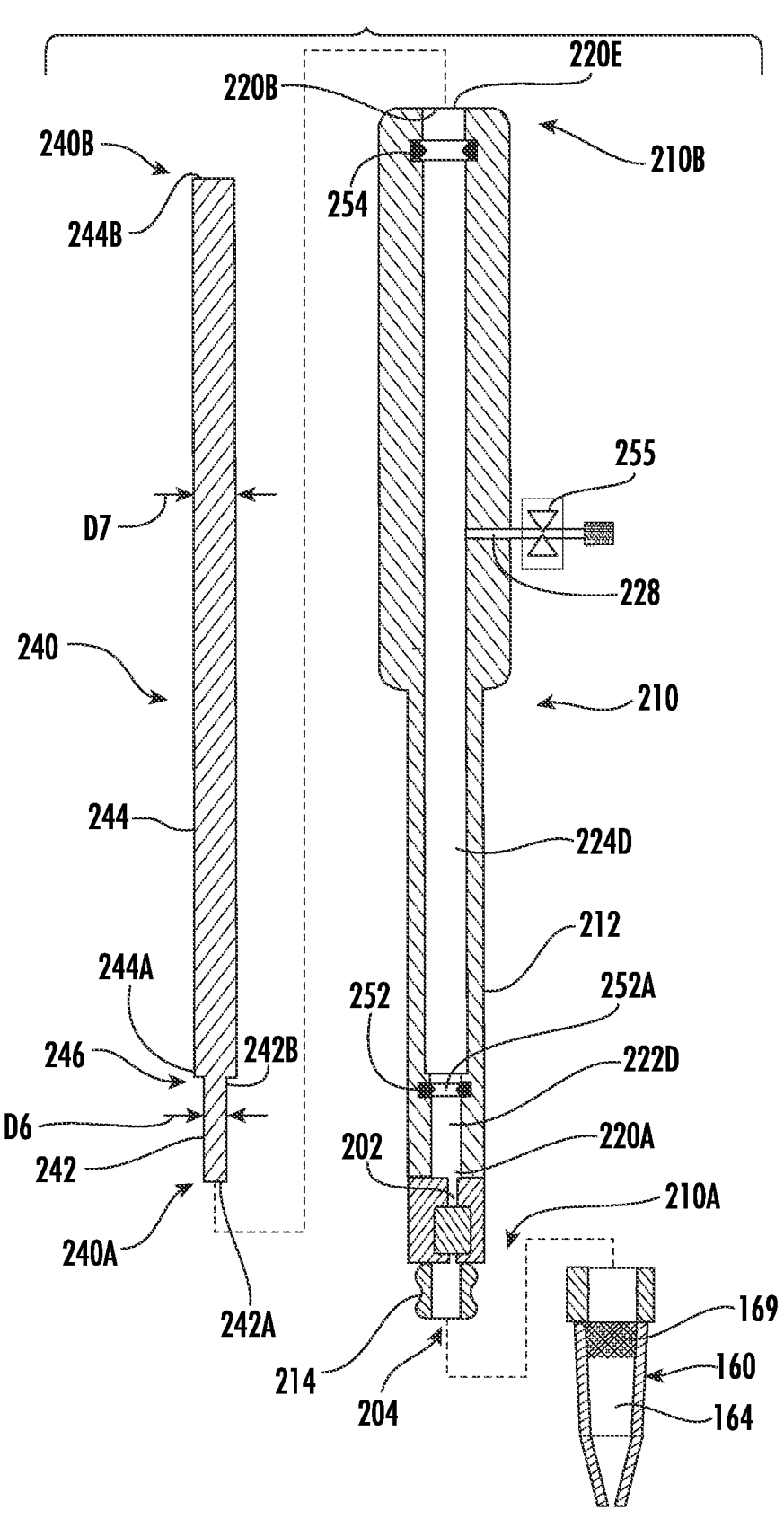
FIG. 15 is an exploded, fragmentary, cross-sectional view of the pipetting system of FIG. 14.

With reference to FIGS. 14 and 15, and as discussed in more detail herein, the pipettor 200 may be understood to have a lengthwise axis A-A and a distal end portion 212A. The pipettor 200 includes a tubular barrel 210, a pressure control system 206, a pipetting channel 202, a pipettor orifice 204, a tip adaptor 214. The barrel 210 extends from a distal end 210A to as proximal end 210B. The barrel 210 includes a shaft 212 that terminates at the distal end 210A. The pipettor orifice 204 is located at the distal end 210A and fluidly communicates with the pipetting channel 202.

The pressure control system 206 system includes a barrel bore or passage 220, a pressure relief port 228 to atmosphere, a plunger member 240 (including a front plunger 242 and a rear plunger 244), a front seal 252, a rear seal 254, a plunger drive mechanism 258, a pressure relief valve 255, and a pressure sensor 256.

The passage 220 is aligned lengthwise with the axis A-A and extends from a front end 220A to an opposing rear end 220B. With reference to FIG. 15, the passage 220 includes a front section 222D and a rear section 224D. The front seal 252 is located axially between the front section 222D and the rear section 224D. The rear seal 254 is located axially between the rear section 224D and a rear opening 220E at the rear end 210B. A front chamber 222 is defined by the front section 222D and the front seal 252 between the front seal 252 and the pipetting channel 202. A rear chamber 224 is defined by the rear section 224D, the front seal 252 and the rear seal 254 between the front seal 252 and the rear seal 254.

The front and rear seals 252, 254 may each be an annular seal (e.g., an O-ring). The front O-ring 252 (or other type seal) defines a seal opening 252A therein.

The plunger member 240 has a front or leading end 240A, an opposing rear end 240B, and an intermediate transition 246. The front plunger 242 extends from a leading end 242A (at the front end 240A) to a rear end 242B (at the transition 246). The rear plunger 244 extends from a leading end 244A (at the transition 246) to a rear end 244B (at the rear end 240B).

The front plunger 242 and the rear plunger 244 are joined, merged, or connected at the transition 246. In some embodiments, the front plunger 242 and the rear plunger 244 together form a unitary member. In some embodiments, the plungers 242, 244 form a rigid, unitary member. In some embodiments, the front plunger 242 and the rear plunger 244 together form a monolithic member.

The plunger member 240 is mounted in the passage 220 such that the plunger member 240 can slidably translate relative to the barrel 210 along a plunger axis P4-P4 in an extension direction E8 and an opposing retraction direction E9. In some embodiments, the plunger axis P4-P4 is substantially coincident with the shaft axis A-A.

Figure 17:
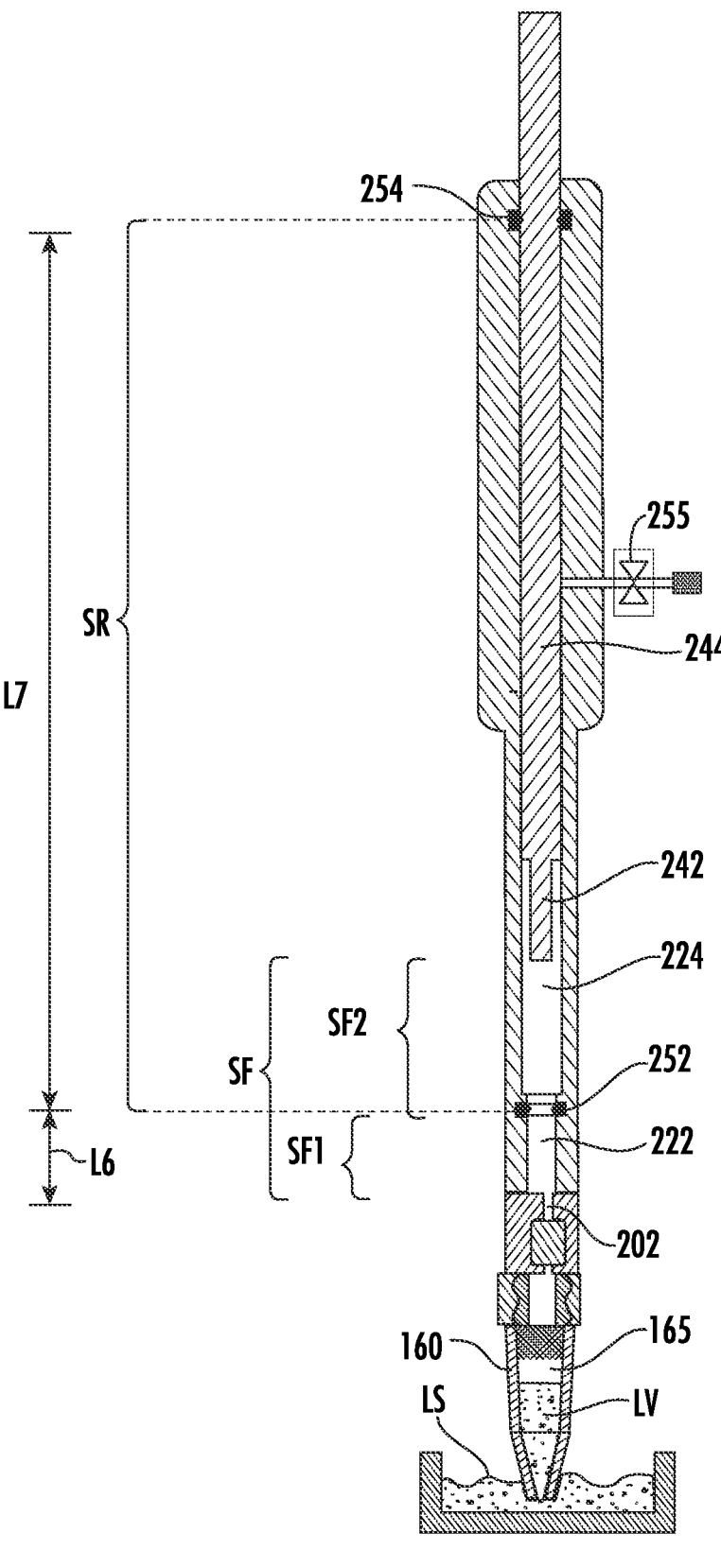
Figure 18:
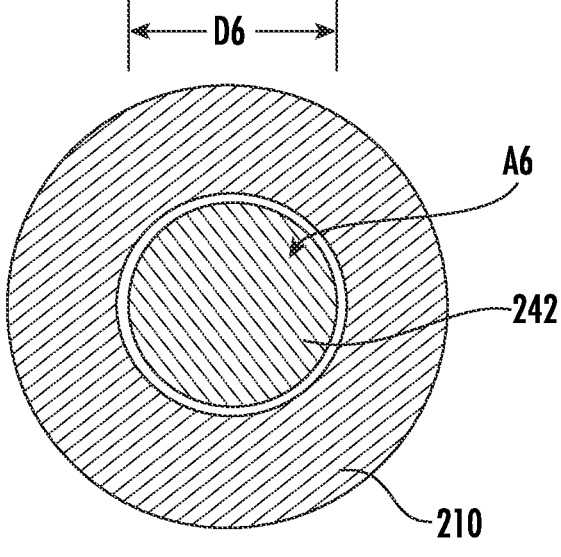
FIG. 18 is a cross-sectional view of the pipetting system of FIG. 14 taken along the line 18-18 of FIG. 14.
Figure 19:
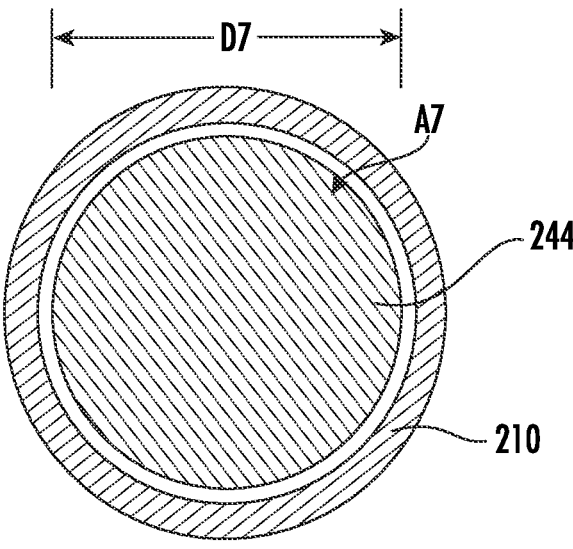
FIG. 19 is a cross-sectional view of the pipetting system of FIG. 14 taken along the line 19-19 of FIG. 14.
Figure 20:
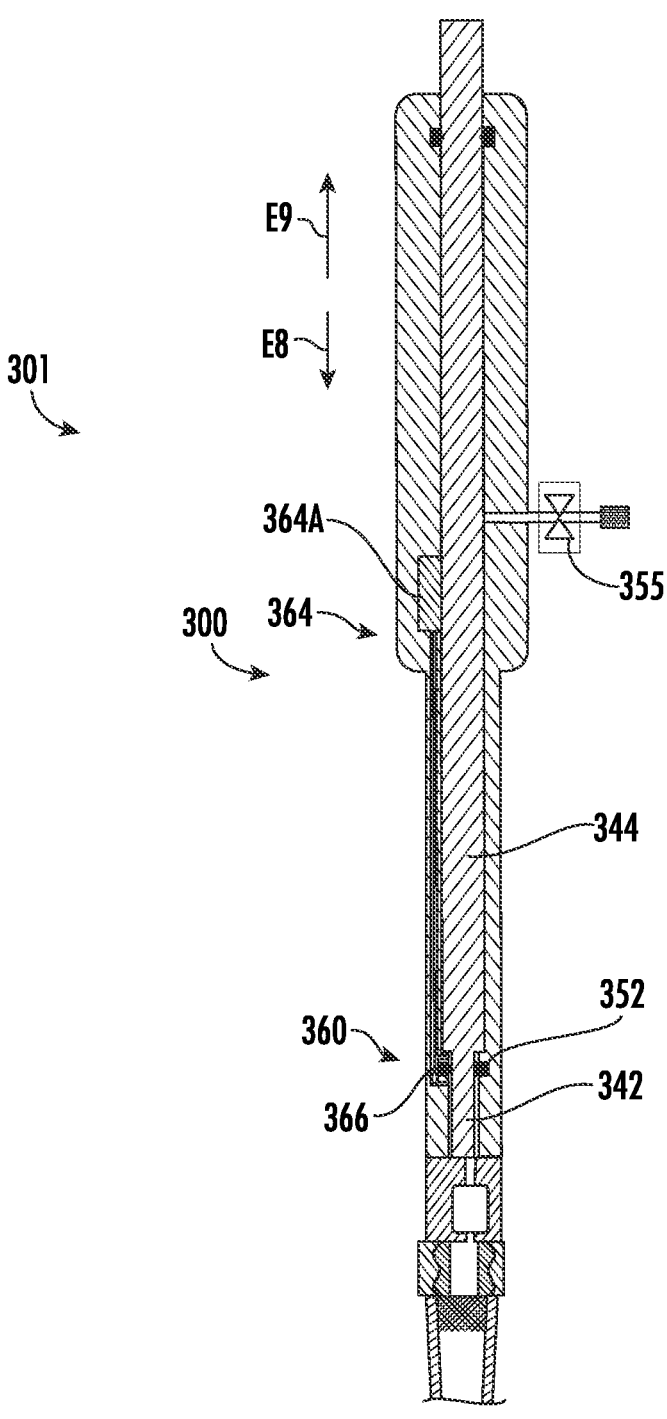
FIG. 20 is a fragmentary, cross-sectional view of a pipetting system according to further embodiments.

The plunger member 240 is slidable to translate (relative to the passage 220, through a plunger member stroke) between a starting or fully extended position, as shown in FIG. 14, and a fully retracted position, as shown in FIG. 17. In the fully extended position, the front plunger 242 resides in the front chamber 222 with its leading end 242A proximate the pipetting channel 202, the rear plunger 244 resides in the rear chamber 224 with its leading end 244A proximate the front O-ring 252, and the front plunger 242 extends through the opening 252A in the front O-ring 252. The front O-ring 252 forms a stationary, airtight, pressure tight seal between the front O-ring 252 and the barrel 210, and an airtight, pressure tight seal between the outer diameter of the front plunger 242 and the inner diameter of the front O-ring 252. The front plunger 242 is able to slide through the front O-ring 252 while maintaining the airtight, pressure tight seal therewith. The rear O-ring 254 forms an airtight, pressure tight seal between the outer diameter of the rear plunger 244 and the barrel 210. The rear plunger 244 is able to slide through the rear O-ring 254 while maintaining the airtight, pressure tight seal therewith.

In the illustrative pipettor 200, the stroke of the plunger member 240 corresponds to the strokes of the front plunger 242 and the rear plunger 244. Referring to FIG. 17, the front plunger 242 is translatable relative to the passage 220 through a front plunger stroke SF. The rear plunger 244 is translatable relative to the passage 220 through a rear plunger stroke SR. During a first part SF1 of the front plunger stroke SF, the front chamber 222 is fluidly sealed from the rear chamber 224 by the front seal 252. During a second part SF2 of the front plunger stroke SF, the front chamber 222 is fluidly coupled or connected to the rear chamber 224 through the opening 252A of the front seal 252.

The plunger drive mechanism 258 is selectively operable to drive the plunger member 240 in each of an extension direction E8 and retraction direction E9. The plunger drive mechanism 258 may be a linear drive mechanism. The plunger drive mechanism 258 may include an actuator and may be any suitable type of linear drive mechanism. In some embodiments, the actuator includes an electric motor. In some embodiments, the linear drive mechanism 258 includes a spindle and spindle nut linkage driven by an electric motor. In some embodiments, the plunger drive mechanism 258 is manually operable and does not include a powered actuator. For example, the plunger member 240 may be pushed and pulled using an extension, lever, knob or other feature that is hand-driven.

In use, as the front plunger 242 is driven in the extension direction E8, air volume is displaced from the front chamber 222, and the effective volume of the front chamber 222 is reduced. As the front plunger 242 is driven in the retraction direction E9, air volume is replaced in the front chamber 222, and the effective volume of the front chamber 222 is increased.

Similarly, in use, as the rear plunger 244 is driven in the extension direction E8, air volume is displaced from the rear chamber 224, and the effective volume of the rear chamber 224 is reduced. As the rear plunger 244 is driven in the retraction direction E9, air volume is replaced in the rear chamber 224, and the effective volume of the rear chamber 224 is increased.

The plunger member 240 may be formed of any suitable material(s). In some embodiments, the plunger member 240 is formed of stainless steel.

The barrel 210 may be formed of any suitable material. In some embodiments, the barrel 210 is formed of aluminum.

The tip adaptor 214 is configured to removably secure the pipette tip 160 (and suitably constructed replacement pipette tips) to the end 212A of the shaft 212 in the same manner as described above for the tip adaptor 156.

The pipette tip 160 (FIG. 8) is an example of a pipette tip that may be used with the pipettor 100. However, it will be appreciated that pipette tips of other designs may be used instead.

The pressure sensor 256 is fluidly coupled to the pipetting channel 202. In some embodiments, the pressure sensor 256 is an in-line pressure sensor positioned in or along the pipetting channel 202.

The controller 20 is operative to control the pressure relief valve 255 to assume an open valve state and a closed valve state. In the open valve state, the rear chamber 224 is fluidly connected to the ambient atmosphere through the relief port 228. In the closed valve state, the rear chamber 224 is not fluidly connected to the ambient atmosphere through the relief port 228.

The liquid handling system 10 and the pipetting system 201 may be used as follows in accordance with some methods to aspirate and/or dispense one or more liquid samples. Generally, the front and rear plungers 242, 244 are used to displace air volumes in their respective chambers 222, 224 and thereby correspondingly change a pressure in the pipetting channel 202 to aspirate or dispense a liquid sample into or from the liquid collection volume 165.

The pipettor 200 may be operated in each of several different modes of operation. The operator or controller 20 may select and implement the mode of operation depending on the conditions or parameters of the aspirating or dispensing task.

Typically, the pipettor 200 will initially be set (e.g., by the controller 20) in a first start position. The start position may be a lowermost position as FIG. 14, for example. In other embodiments, the start position is somewhat raised or retracted from the lowermost, fully extended position of FIG. 14 (i.e., the plunger member 240 is partially retracted relative to its position shown in FIG. 14). Starting aspiration with this offset can help to assure that the pipette tip is fully emptied by the dispensing operation. For example, the offset of the plunger member distal end 242A from the distal end of the front chamber 222D may be in the range of from about 10 to 20% of the pipetting volume.

A pipette tip 160 is mounted on the tip adaptor 214, as shown in FIG. 14.

The controller 20 may then operate the actuator(s) 34A, 34B, for example, to position the pipette tip 160 over a liquid sample LS. The sample LS may be disposed in a container 36, for example. The controller 20 may then operate the actuator 34B, for example, to lower the distal end 160A, and thereby the pipetting orifice 162, into the sample LS. In some embodiments, the distal end 160A, and thereby the pipetting orifice 162, are immersed in the sample LS to at least a prescribed depth to ensure that the pipetting orifice 162 remains immersed in the sample during aspiration.

With the pipettor 200 in the first start position and the pipetting orifice 162 immersed, the pipetting system 201 may be operated in a first aspirating mode to aspirate a portion of the sample LS. In the first aspirating mode, the pressure relief valve 255 is set in the open valve state so that the rear chamber 224 is fluidly connected to the relief port 228. In the first aspirating mode, the pipetting channel 202 is fluidly sealed from the rear chamber 224 by the front seal 252. More particularly, the front plunger 242 plugs (airtight) the connecting opening 252A in the front seal 252.

Figure 16:
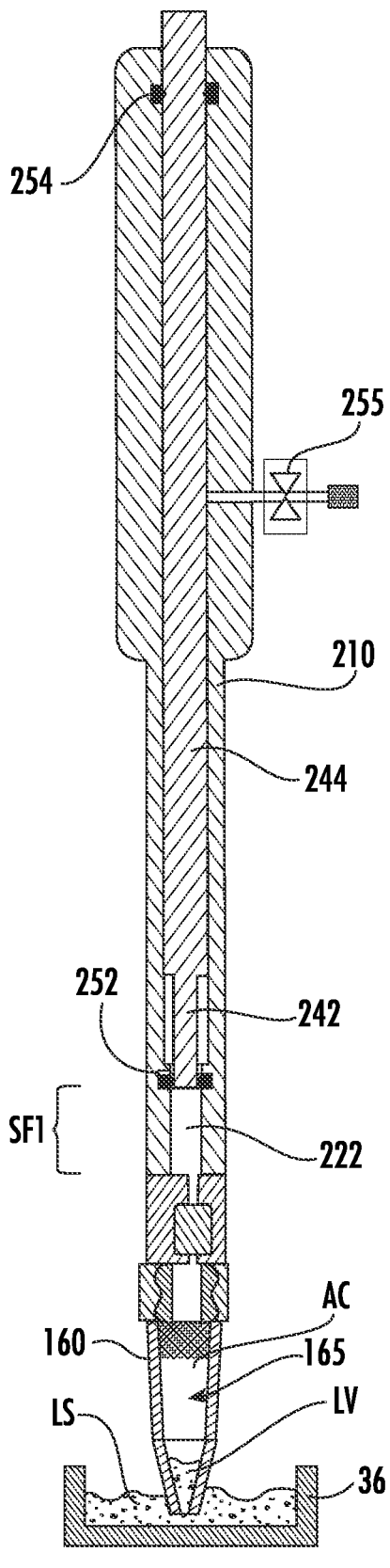
FIGS. 16 and 17 are fragmentary, cross-sectional views of the pipetting system of FIG. 14 wherein a plunger member thereof is disposed in different positions.

The drive mechanism 258 is then actuated to displace the plunger member 240 in the retraction direction E9 and thereby draw the front plunger 242 away from the pipettor orifice 204. The front plunger 242 is thereby translated through a portion of its first stroke SF1, but not into the second portion SF2 of its stroke, as illustrated in FIG. 16. The front chamber 222 remains sealed from the rear chamber 224 by the front seal 252. The retraction of the front plunger 242 expands the effective air volume of the front chamber 222, thereby generating a negative pressure at the pipettor orifice 204. The negative pressure draws a liquid sample volume LV of the liquid sample LS into the liquid collection volume 165 (in the tip passage 164) of the pipette tip 160. An air volume or air cushion AC may remain in the tip passage 164 and the front chamber 222 between the proximal end of the liquid sample volume LV and the leading end 220A of the front chamber 222.

The pipettor 200 may then be used to dispense the liquid sample volume LV in a first dispensing mode. The front plunger 242 is in the first part SF1 of its stroke so that the front chamber 222 remains sealed from the rear chamber 224 by the front seal 252. The pressure relief valve 255 is set or retained in the open valve state. The drive mechanism 258 is then actuated to displace the plunger member 240 in the extension direction E8 and to thereby to push the front plunger 242 toward the pipettor orifice 204 in the extension direction E8. The extension of the front plunger 242 displaces air volume from the front chamber 222, thereby generating a positive pressure at the proximal end of the liquid sample volume LV. The positive pressure expels the liquid sample volume LV from the liquid collection volume 165 through the pipetting orifice 162. The air cushion AC may remain between the proximal end of the liquid sample volume LV and the leading end 242A of the front plunger 242 until the liquid sample volume LV is fully dispensed.

Alternatively, the pipetting system 101 may be operated in a second aspirating mode to aspirate a portion of the liquid sample LS. The pressure relief valve 255 is initially set in the open valve state so that the rear chamber 224 is fluidly connected to the relief port 228. The plunger member 240 is placed in a second start position. In the second start position, the distal end 242A of the plunger member 240 is located rearward of the front seal 252 (e.g., slightly aft of the front seal 252) so that the plunger member 242 and the front seal 252 do not seal the front chamber 222 off from the rear chamber 224. The controller 20 then sets the pressure relief valve 255 in the closed valve state so that the rear chamber 224 is fluidly sealed from the relief port 228. With the pipettor 200 in the second start position and the pipetting orifice 162 immersed, the drive mechanism 258 is actuated to draw the plunger member 240 in the retraction direction E9. The front plunger 242 is thereby translated through some or all of the second portion SF2 of its stroke as shown in FIG. 17. The retraction of the rear plunger 244 expands the effective air volume of the rear chamber 224, thereby generating a negative pressure at the pipettor orifice 204. The negative pressure draws additional liquid sample volume LV of the liquid sample LS into the liquid collection volume 165 of the pipette tip 160. An air volume or air cushion AC may remain in the tip passage 164 between the proximal end of the liquid sample volume LV and the leading end 242A of the first plunger 242.

Similarly, the pipettor 200 may then be used to dispense the liquid sample volume LV in a second dispensing mode. The pressure relief valve 255 is set or retained in the closed valve state. The drive mechanism 258 is actuated to push the plunger member 240 in the extension direction E8. The extension translation of the plunger member 240 displaces air volume from the rear chamber 224, thereby generating a positive pressure at the proximal end of the liquid sample volume LV. The positive pressure expels the liquid sample volume LV from the liquid collection volume 165 through the pipetting orifice 162.

The plunger member 240 may be extended beyond the front seal 252. In this case, once the leading end 242A of the front plunger 242 reaches and closes the opening 252A of the front seal 252, the controller 20 may open the pressure relief valve 255. The drive mechanism 258 then continues to push the plunger member 240 in the extension direction E8. The continued extension of the plunger member 240 displaces air volume from the front chamber 222, thereby generating a positive pressure at the proximal end of the liquid sample volume LV. The positive pressure expels the additional liquid sample volume LV from the liquid collection volume 165 through the pipetting orifice 162.

During the foregoing operations, the valve 255 is opened at certain times to permit air to be expelled from the rear chamber 224 through the relief port 228 so that the air volume in the chamber 224 is not unduly pressurized (negatively or positively) by the displacement of the rear plunger 244. When the pressure relief valve 255 is closed, the rear chamber 224 is sealed from the atmosphere so that the displacement of the rear plunger 244 can generate a pressure change in the rear chamber 224 for the aspirating or dispensing operation.

As discussed above, the pipetting system 201 aspirates liquid sample by decreasing the pressure in the pipetting channel and dispenses liquid sample by increasing the pressure in the pipetting channel 202. However, the pressure in the pipetting channel 202 may fluctuate in response to other actions or conditions in the procedure, for example, as discussed above with regard to the pipetting system 101.

In some embodiments, the controller 20 automatically and programmatically operates the pressure relief valve 255 and the actuator of the linear drive mechanism 258 to open and close the valve 255 and to extend and retract the plunger member 240 as described herein.

In some embodiments, the controller 20 receives pressure signals from the pipetting channel pressure sensor 256 indicating the air pressure in the pipetting channel 202. The controller 20 may continuously monitor the pressure in the pipetting channel 202.

The choice of which aspirating or dispensing mode to use for a given aspirating or dispensing procedure can be a function of or tailored to the conditions or parameters of the aspirating or dispensing procedure. By employing serial plungers of different sizes, the volume range of the pipettor 200 can be enlarged, and process specific volume accuracy and precision can be supported without the need for multiple pipetting channels.

For example, when only a relatively small quantity of the liquid sample is to be aspirated or dispensed, the pipettor 200 may be operated in the first aspirating mode or first dispensing mode. The use of the smaller front plunger 242 can provide higher resolution, and thereby better accuracy and precision.

When a relatively large quantity of the liquid sample is to be aspirated or dispensed, the pipettor 200 may be operated in the second aspirating mode or second dispensing mode. The use of the larger rear plunger 244 can enable the pipettor 200 to draw and hold a greater quantity of the liquid sample at once. The use of the larger rear plunger 244 can enable the pipettor 200 to aspirate or dispense the liquid sample at a higher rate.

For example, in an illustrative embodiment, the first part SF1 of the stroke of the front plunger 242 has a stroke distance L6 (FIG. 17) of 25 mm and the front plunger 242 has a diameter D6 (FIG. 18) of 2 mm, so that the front plunger 242 can displace up to 78.5 microliters of air. In the illustrative embodiment, the rear plunger 244 has a stroke distance L7 (FIG. 17) of 50 mm and a diameter D7 (FIG. 19) of 6 mm, so that the rear plunger 244 can displace up to 1413 microliters of air. When operated in the first aspirating mode, the pipettor 200 can aspirate up to 60 microliters of liquid sample. When operated in the second aspirating mode, the pipettor 200 can aspirate up to 1300 microliters of liquid sample.

As mentioned above, in some embodiments the rear plunger 244 is larger than the front plunger 242. The front plunger 242 has a cross-sectional area A6 (FIG. 18) in a cross-sectional plane orthogonal to the plunger axis P4-P4 (i.e., the axis along which the first plunger is translated to aspirate and dispense). The rear plunger 244 has a cross-sectional area A7 (FIG. 19) in a cross-sectional plane orthogonal to the plunger axis P4-P4 (i.e., the axis along which the rear plunger 244 is translated to aspirate and dispense). In some embodiments (as illustrated, for example), the cross-sectional area A7 of the rear plunger 244 is greater than the cross-sectional area A6 of the front plunger 242. In some embodiments, the cross-sectional area A7 is at least three times the cross-sectional area A6. In some embodiments, the cross-sectional area A6 is in the range of from about 3 to 64 times the cross-sectional area A6.

In some embodiments, the cross-sectional area A6 is in the range of from about 0.5 to 5 mm², and the cross-sectional area A7 is in the range of from about 5 to 85 mm².

The smaller front plunger 242 displaces an air volume in the front chamber 222 at a first rate of air volume displacement per unit translation. The larger rear plunger 244 displaces an air volume in the rear chamber 224 at a second rate of air volume displacement per unit translation. Because the rear plunger 244 has a greater cross-sectional area, the second rate of air volume displacement per unit translation is greater than the first rate of air volume displacement per unit translation. In some embodiments, the second rate of air volume displacement per unit translation is at least three times the first rate of air volume displacement per unit translation.

In some embodiments, the first rate of air volume displacement per unit translation is in the range of from about 0.1 microliters/second to 100 microliters/second, and the second rate of air volume displacement per unit translation is in the range of from about 1 microliters/second to 2500 microliters/second.

In some embodiments, pipettor 200 is configured such that the maximum air volume displaceable by the rear plunger 244 (when the rear plunger 244 is translated through its full stroke) is greater than the maximum air volume displaceable by the front plunger 242 (when the front plunger 242 is translated through its full stroke). In some embodiments, the maximum air volume displaceable by the rear plunger 244 is at least ten times the maximum air volume displaceable by the front plunger 242.

In some embodiments, the maximum air volume displaceable by the rear plunger 244 is in the range of from about 100 microliters to 5000 microliters, and the maximum air volume displaceable by the front plunger 242 is in the range of from about 10 microliters to 200 microliters.

In some embodiments, the volume of the rear chamber 224 is greater that the volume of the front chamber 222. In some embodiments, the volume of the rear chamber 224 is at least ten times volume of the front chamber 222.

With reference to FIGS. 20-24, a pipetting system 301 according to further embodiments is shown therein. The pipetting system 301 is constructed and may be used in the same manner as the pipetting system 201, except as discussed below.

The pipetting system 301 includes a pipettor 300 in place of the pipettor 200. The pipettor 300 is constructed and may be used in the same manner as the pipettor 200, except as follows. The pipettor 300 further includes an opening mechanism in the form of an interchamber valve 360. The interchamber valve 360 includes a connecting passage 362 and a valve control mechanism 364. The connecting passage 362 may be formed in the barrel 310 and fluidly couples the rear chamber 324 to the front chamber 322. The valve control mechanism 364 includes an actuator 364A (e.g., a solenoid) and a valve member 366.

Figure 21:
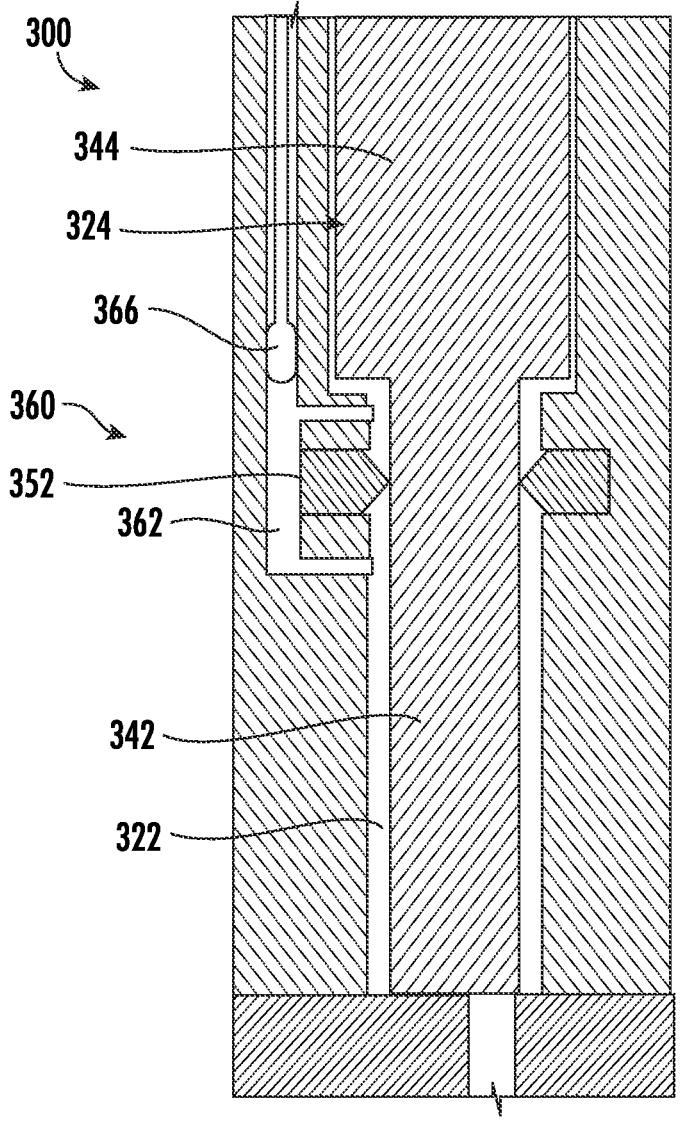
FIG. 21 is an enlarged, fragmentary, cross-sectional view of the pipetting system of FIG. 20 wherein an interchamber valve thereof is in an open position.
Figure 22:
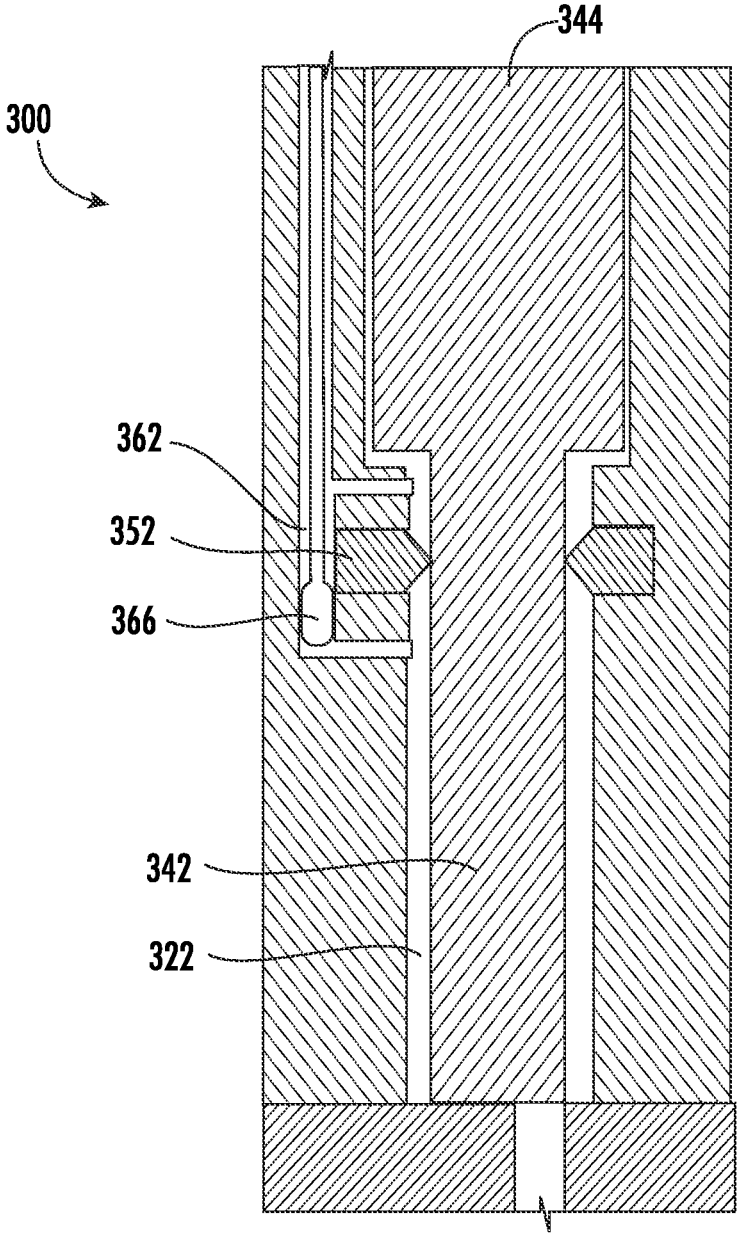
FIG. 22 is an enlarged, fragmentary, cross-sectional view of the pipetting system of FIG. 20 wherein the interchamber valve is in a closed position.
Figure 23:
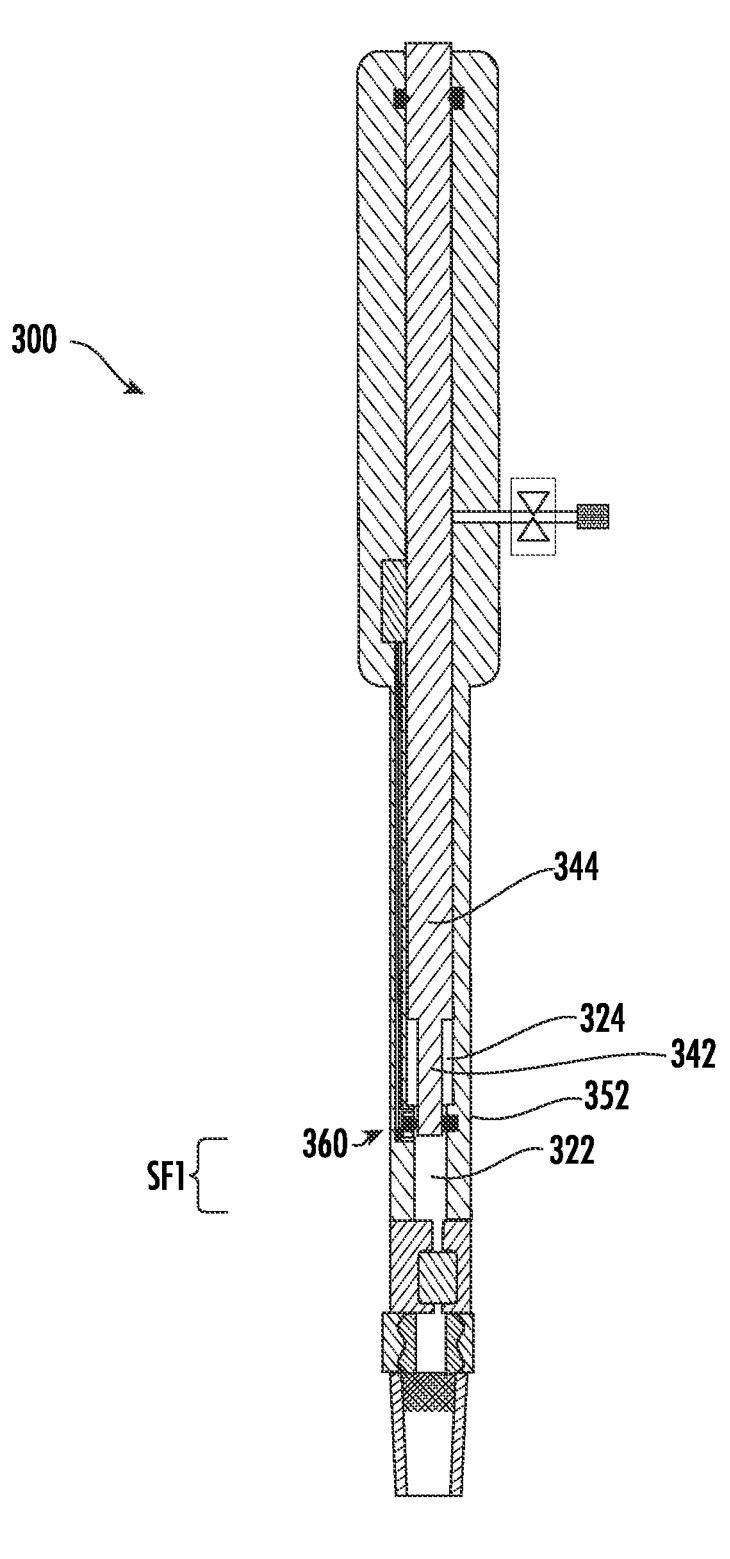
FIGS. 23 and 24 are fragmentary, cross-sectional views of the pipetting system of FIG. 20 wherein a plunger member thereof is disposed in different positions.
Figure 24:
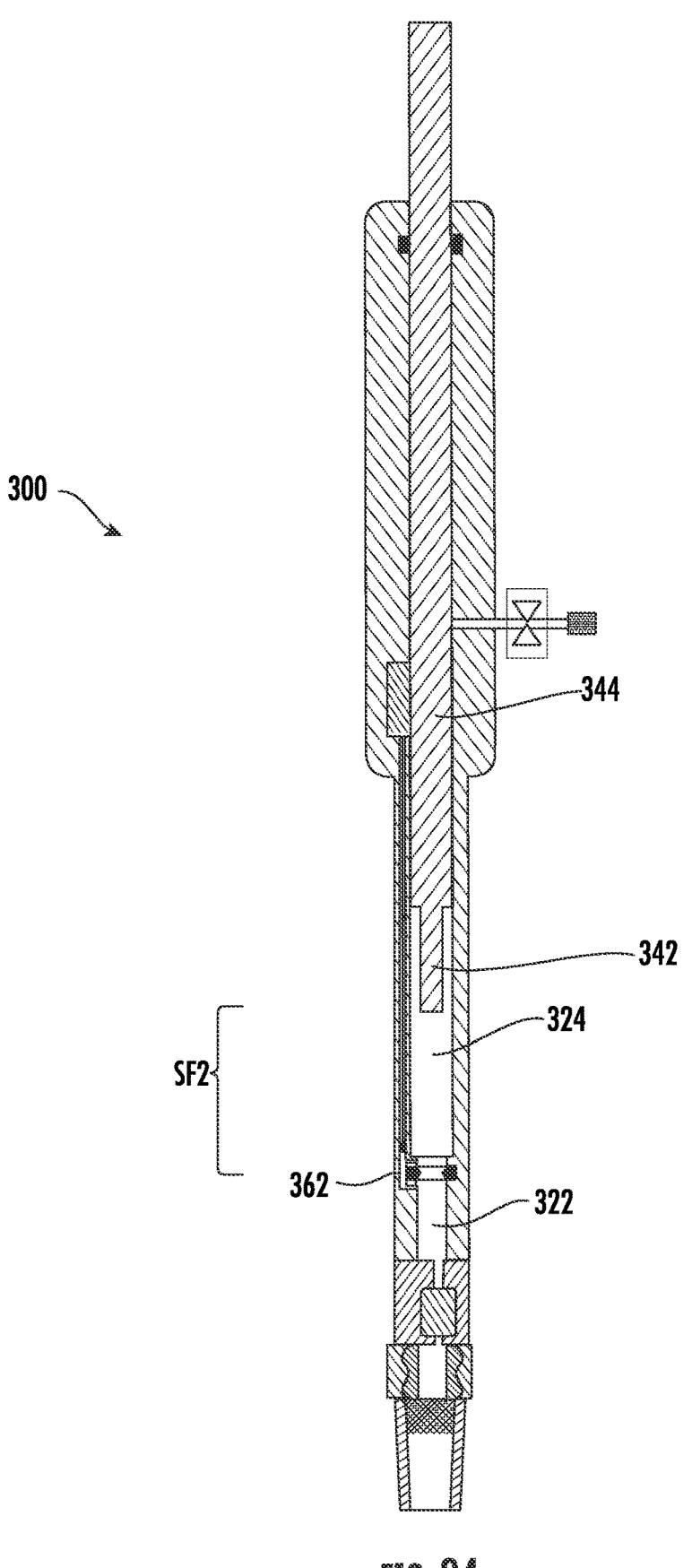

The actuator 364A is selectively operable to place the valve member 366 in each of a closed position (FIGS. 20, 22 and 23) and an open position (FIGS. 21 and 24). In the closed position, the valve member 366 blocks the connecting passage 362 so that the rear chamber 324 is not fluidly connected to the front chamber 322 through the connecting passage 362. In the open position, the valve member 366 does not block the connecting passage 362 so that the rear chamber 324 is fluidly connected to the front chamber 322 through the connecting passage 362.

In use, the valve member 366 is closed when aspirating or dispensing in the first aspirating mode or the first dispensing mode as described above with regard to the pipettor 200 (i.e., aspirating and dispensing using the front plunger 342 and not using the rear plunger 344; as illustrated in FIG. 23). Thus, in these procedures, the connecting passage 362 is sealed by the valve member 366 and the opening of the front seal 352 is sealed by the front plunger 342, so that the front chamber 322 is fluidly sealed from the rear chamber 324. The pressure relief valve 355 is opened during these procedures, as discussed above.

The pipettor 300 can also be used to aspirate or dispense in a second aspirating mode or a second dispensing mode similar to the second aspirating mode or the second dispensing mode as described above with regard to the pipettor 200.

When aspirating in the second aspirating mode (i.e., aspirating using both the front plunger 342 and the rear plunger 344; as illustrated in FIG. 24), the valve member 366 is opened and the pressure relief valve 355 is closed. In this embodiment, the plunger member 340 is positioned in the first start position at the beginning of the aspiration step. That is, the plunger member 340 is positioned such that the front plunger 342 extends through the front seal 352 and occupies the front chamber 322. In the first start position, the distal end of the plunger member 340 may be at a lowermost position or offset from the lowermost position as discussed above for the pipettor 200. With the plunger member 340 in this first start position, the valve member 366 open and the pressure relief valve 355 closed, the plunger member 340 is then translated in the retraction direction E9 to aspirate. The plunger member 340 is translated such that the front plunger 342 travels through the first part SF1 of its stroke and into the second part SF2 of its stroke. In this case, the rear chamber 324 will be fluidly connected to the front chamber 322 (via the connecting passage 362) during both stroke parts SF1, SF2 and both plungers 342, 344 will contribute in parallel to the aspiration throughout the stroke of the plunger member 340.

To dispense in the second dispensing mode (i.e., dispensing using both the front plunger 342 and the rear plunger 344), the plunger member 340 is translated in the extension direction E8 with the valve member 366 open and the pressure relief valve 355 closed. The plunger member 340 is translated such that the front plunger 342 travels through the second part SF2 of its stroke and the first part SF1 of its stroke. In this case, the rear chamber 324 will be fluidly connected to the front chamber 322 (via the connecting passage 362) during both stroke parts SF1, SF2 and both plungers 342, 344 will contribute in parallel to the dispensing throughout the stroke SF.

By fluidly connecting the front chamber 322 and the rear chamber 324 during the second aspirating and dispensing modes, the pipettor 300 can initiate the aspiration retraction of the plunger member 340 while the front section 342 is disposed in the front chamber 322 and the front seal 252 is sealed about the plunger member 340. As a result, the pipettor 300 can reduce the dead volume in the rear chamber 324.

Figure 25:
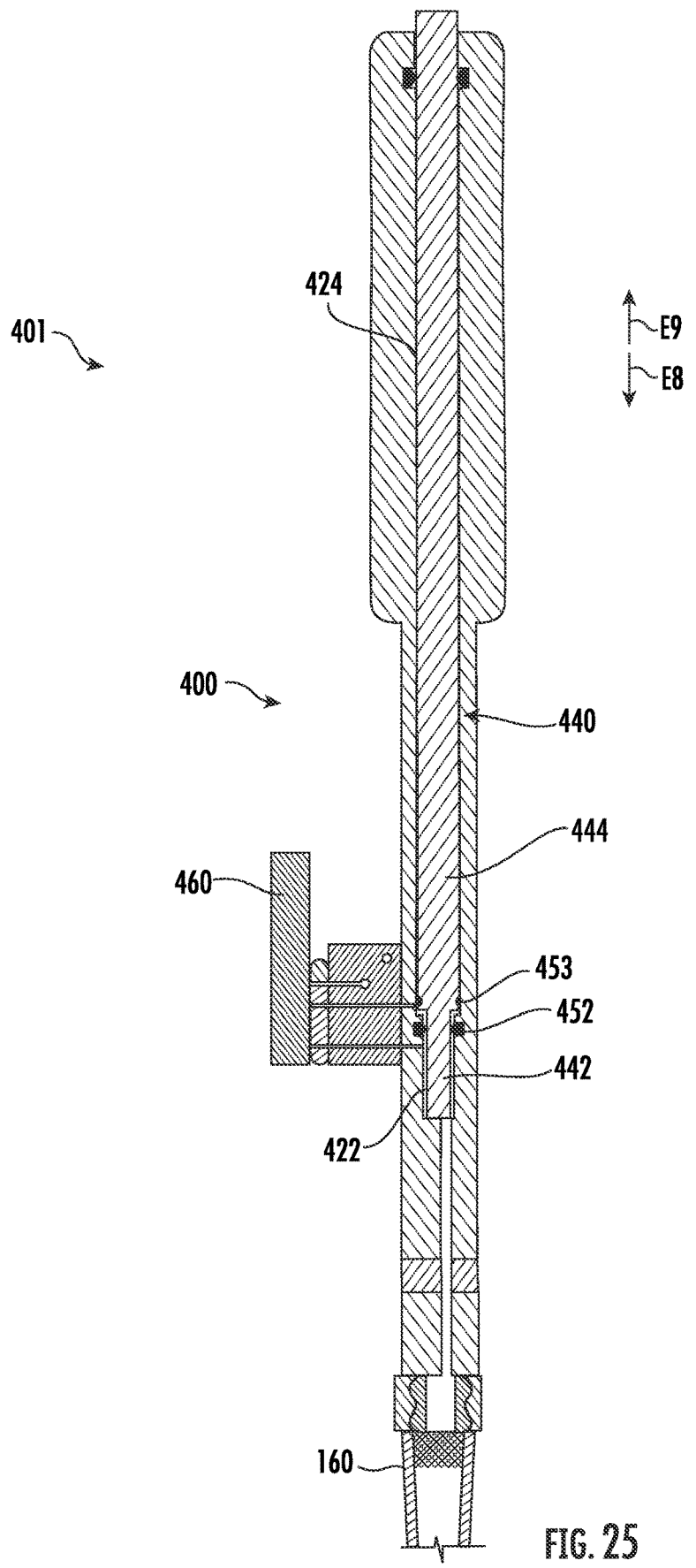
FIG. 25 is a fragmentary, cross-sectional view of a pipetting system according to further embodiments.
Figure 26:
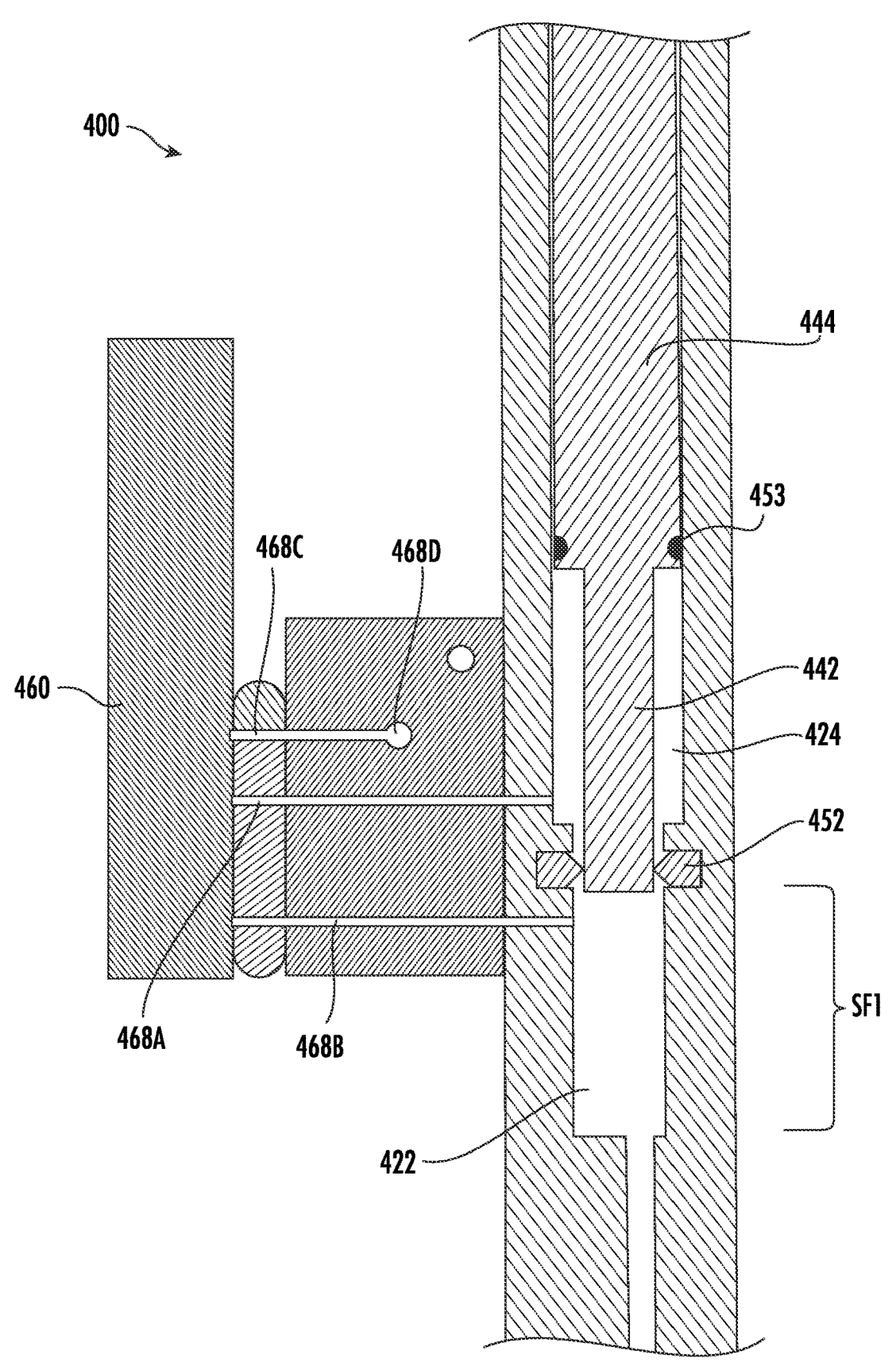
FIGS. 26 and 27 are enlarged, fragmentary, cross-sectional views of the pipetting system of FIG. 25 illustrating operations of the pipetting system.
Figure 27:
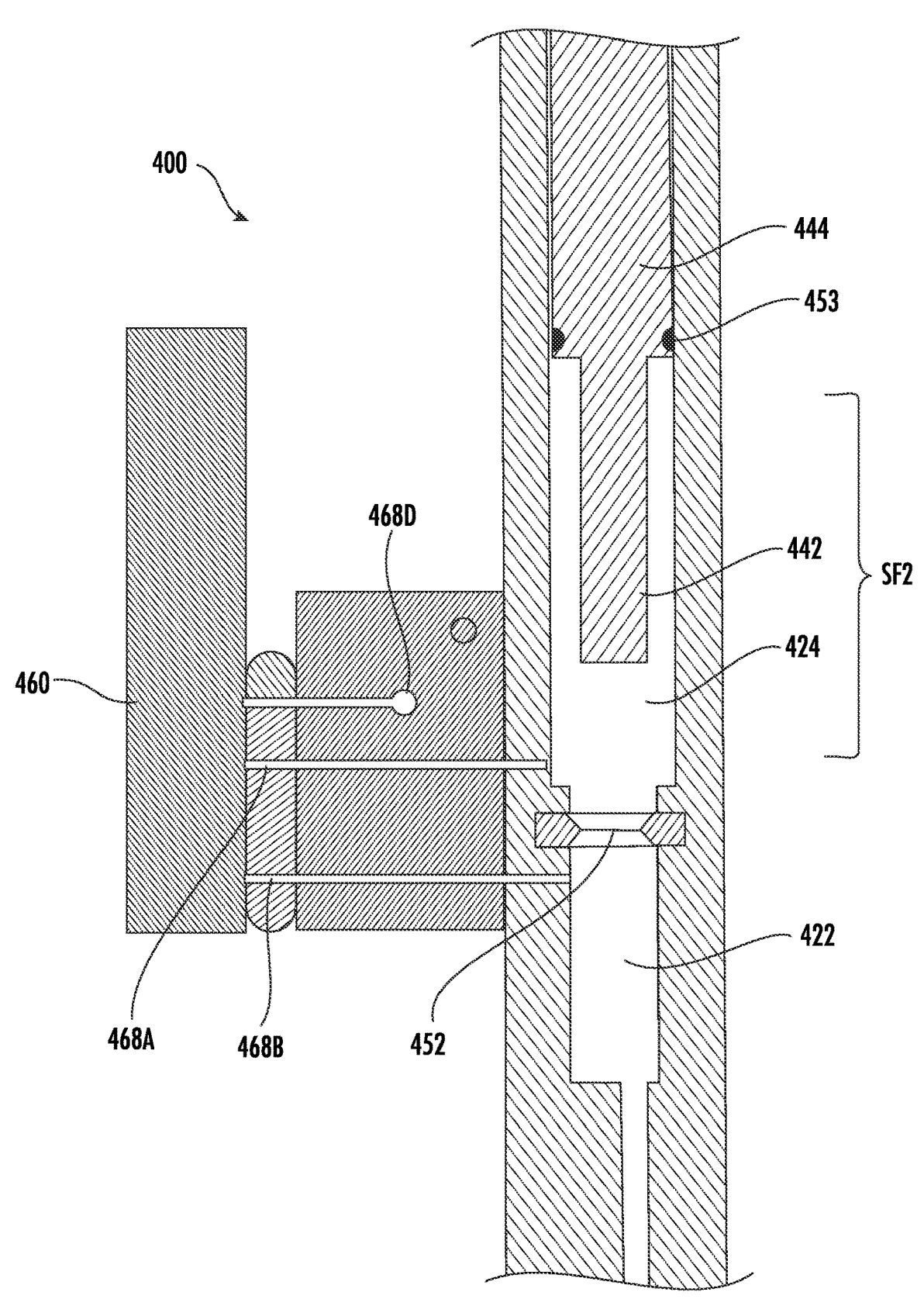

With reference to FIGS. 25-27, a pipetting system 401 according to further embodiments is shown therein. The pipetting system 401 is constructed and may be used in the same manner as the pipetting system 301, except as discussed below.

The pipetting system 401 includes a pipettor 400 in place of the pipettor 300. The pipettor 400 is constructed and may be used in the same manner as the pipettor 300, except as follows.

The pipettor 400 includes a connecting valve 460 in place of the interchamber valve 360 and the pressure relief valve 355. The connecting valve 460 is selectively operable to fluidly connect the rear chamber 424 to the front chamber 422 (via channels 468A, 468B on either side of the front seal 452) and to the atmosphere (via a channel 468C to a relief port 468D). In a first valve state, the connecting valve 460 closes the rear chamber 424 from the front chamber 422 and opens the rear chamber 424 to the pressure relief port 468D to atmosphere. In a second valve state, the connecting valve 460 opens the rear chamber 424 to the front chamber 422 and closes the rear chamber 424 from the pressure relief port 468D. The connecting valve 460 may be an electronically controlled valve.

In use, the connecting valve 460 is set in the first valve state when aspirating or dispensing in the first aspirating mode or the first dispensing mode as described above with regard to the pipettor 200 (i.e., aspirating and dispensing using the front plunger 442 and not using the rear plunger 444; as illustrated in FIG. 27).

When aspirating in the second aspirating mode (i.e., aspirating using both the front plunger 442 and the rear plunger 444; as illustrated in FIG. 26), the connecting valve 460 is set in the second valve state. With the connecting valve 460 is set in the second valve state, the plunger member 440 is then translated in the retraction direction E9 to aspirate. The plunger member 440 is translated such that the front plunger 442 travels through the first part SF1 of its stroke and into the second part SF2 of its stroke. In this case, the rear chamber 324 will be fluidly connected to the front chamber 422 (via the connecting valve 460) during both stroke parts SF1, SF2 and both plungers 442, 444 will contribute in parallel to the aspiration throughout the stroke of the plunger member 340.

To dispense in the second dispensing mode (i.e., dispensing using both the front plunger 442 and the rear plunger 444), the plunger member 440 is translated in the extension direction E8 with the connecting valve 460 set in the second valve state. The plunger member 440 is translated such that the front plunger 442 travels through the second part SF2 of its stroke and the first part SF1 of its stroke. In this case, the rear chamber 424 will be fluidly connected to the front chamber 422 (via the connecting valve 460) during both stroke parts SF1, SF2 and both plungers 442, 444 will contribute in parallel to the dispensing throughout the stroke SF.

The pipettor 400 further includes an annular seal (e.g., an O-ring) 453 mounted on the rear plunger 444 to travel with the rear plunger 444 through the rear chamber 424. The seal 453 forms a sliding air-tight, pressure-tight seal between the front end of the rear plunger 444 and the volume of the rear chamber 424 rearward of the front end of the rear plunger 444. In this way, the seal 453 can reduce the death volume in the rear chamber 424 around the rear plunger 444. Pipettors according to other embodiments (e.g., the pipettors 200 and 300) may include seals corresponding to the seal 453.

According to a further embodiment, the pipettor 400 may be configured and/or operated such that the front plunger 442 extends through the front seal 452 throughout both the first part SF1 of the plunger stroke and the second part SF2 of the plunger stroke (with the front seal 452 maintaining a seal about the front plunger 442 throughout the stroke). That is, also in the second aspirating mode (when the connecting valve 460 is set in the second valve state and fluidly connects the rear chamber 424 to the front chamber 422), the front seal 452 remains plugged by the plunger member 440 throughout the full aspiration stroke SF1, SF2. In this way, the front plunger 442 will always be engaged within the front seal 452. Any pressure jumps due to deformation of the front seal 452 are thereby avoided. The front seal will experience fewer mechanical forces, thus improving the stability and reliability of the seal.

In order to accomplish this effect or function of not unsealing or disengaging the front plunger 442 from the front seal 452, the front plunger 442 may be extended or lengthened as compared to that shown in FIG. 25. In some embodiments, the length of the front plunger 442 is at least as long as the second part SF2 of the plunger stroke.

In other embodiments, the pressure sensor (e.g., pressure sensor 256) can be positioned and configured to detect the air pressure in the rear chamber (e.g., the rear chamber 224), and the controller 20 may use the pressure detection data from the rear pressure sensor in the same manner as described for the front pressure sensor to control operation of the pipettor.

With reference to FIGS. 28-35, an example pipetting system 601 according to further embodiments of the present technology is shown. The pipetting system 601 can aspirate and dispense liquid volumes within a liquid handling system. The pipetting system 601 may be used in place of the pipetting system 101 in the automated liquid handling system 10 (FIG. 1), for example. However, it shall be understood that the disclosed methods, systems, and apparatus are not limited to the liquid handling system 10 or use therein, and the present disclosure is applicable to other systems and applications where it is desired to aspirate and/or dispense liquid volumes.

The pipetting system 601 is configured to be used in each of an air displacement (AD) mode and an alternative displacement (PD) mode. In the AD mode, the pipetting system 601 is operated to aspirate and/or dispense a liquid using an air displacement pipette tip. In the PD mode, the pipetting system 601 is operated to aspirate and/or dispense a liquid using a positive displacement pipette tip.

The pipetting system 601 includes one or more pipettors 600. The pipettor(s) may be mounted on the pipettor module 30. The pipettors 600 may be constructed and operate in the same manner, and it will be appreciated that the description of a representative one of the pipettors 600 that follows may apply equally to each of the pipettors 600. If multiple pipettors 600 are provided, the pipettors 600 may be operated independently of one another or in tandem. For the purpose of discussion, only a single pipettor is described below.

Figure 35:
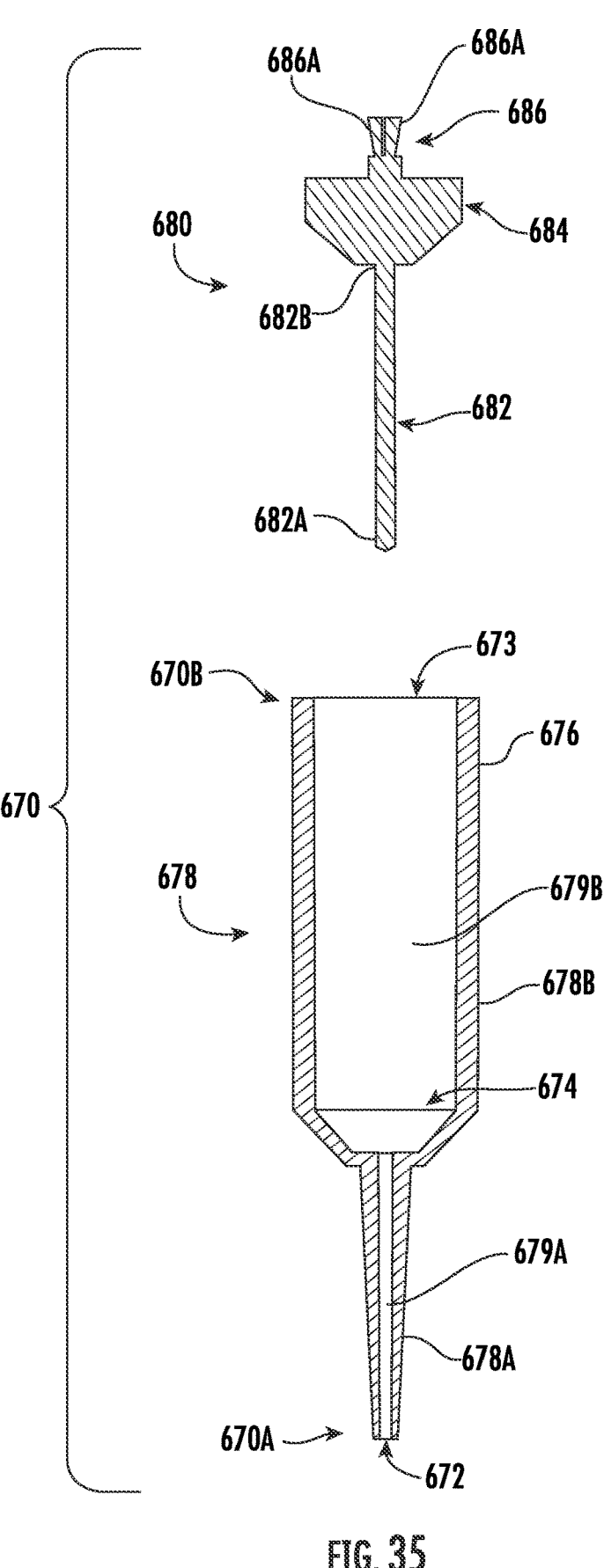
FIG. 35 is an exploded, cross-sectional view of positive displacement tip for use with the pipetting system of FIG. 28.

The pipetting system 601 includes the pipettor 600, the controller 20, one or more air displacement (AD) pipette tips 660 (FIG. 34), and one or more positive displacement (PD) pipette tips 670 (FIG. 35). The pipette tips 660, 670 are removable and replaceable on the pipettor 600, and may be effectively disposable or consumable components of the pipetting system 601.

Figure 28:
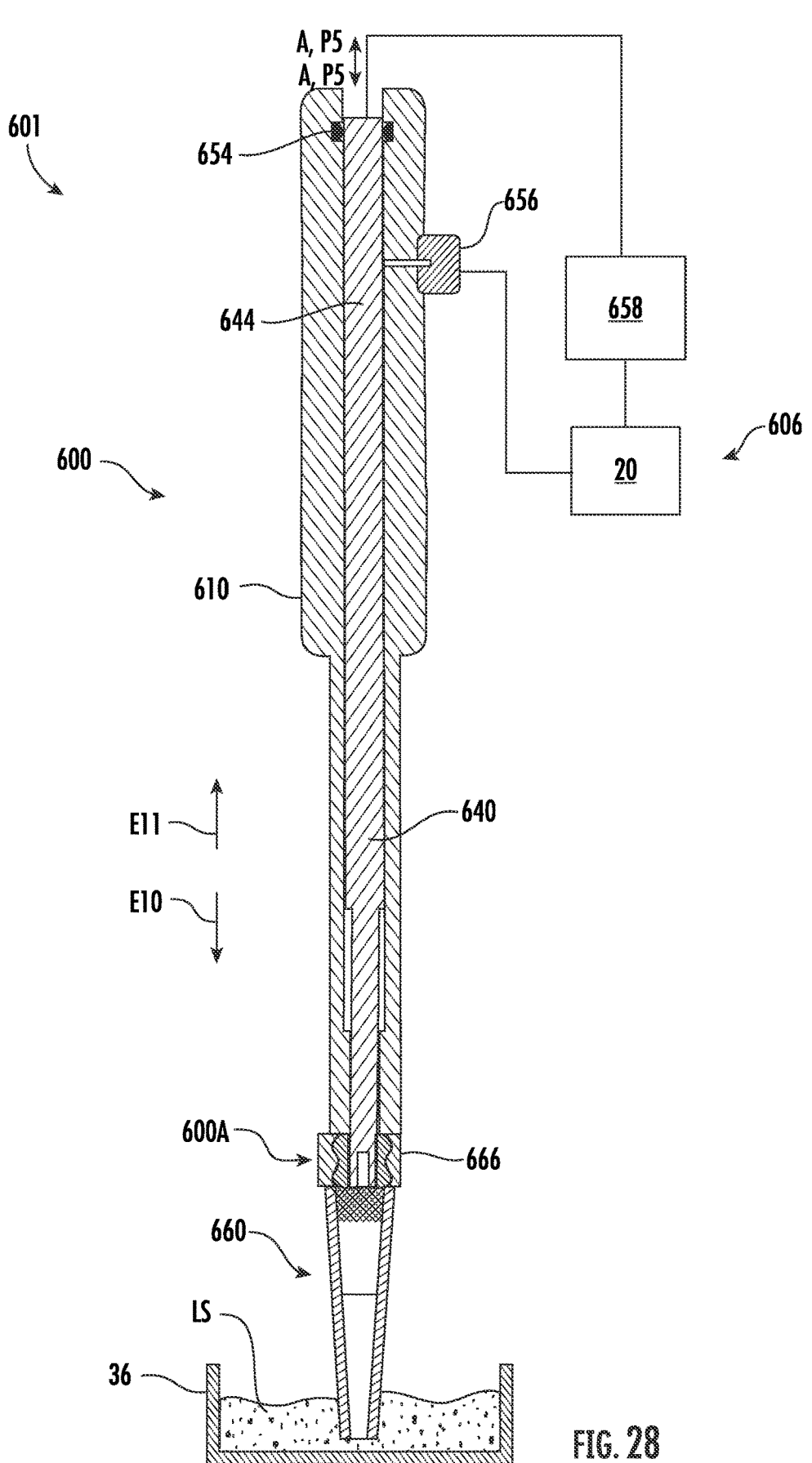
FIG. 28 is a cross-sectional view of a pipetting system according to further embodiments of the technology.
Figure 29:
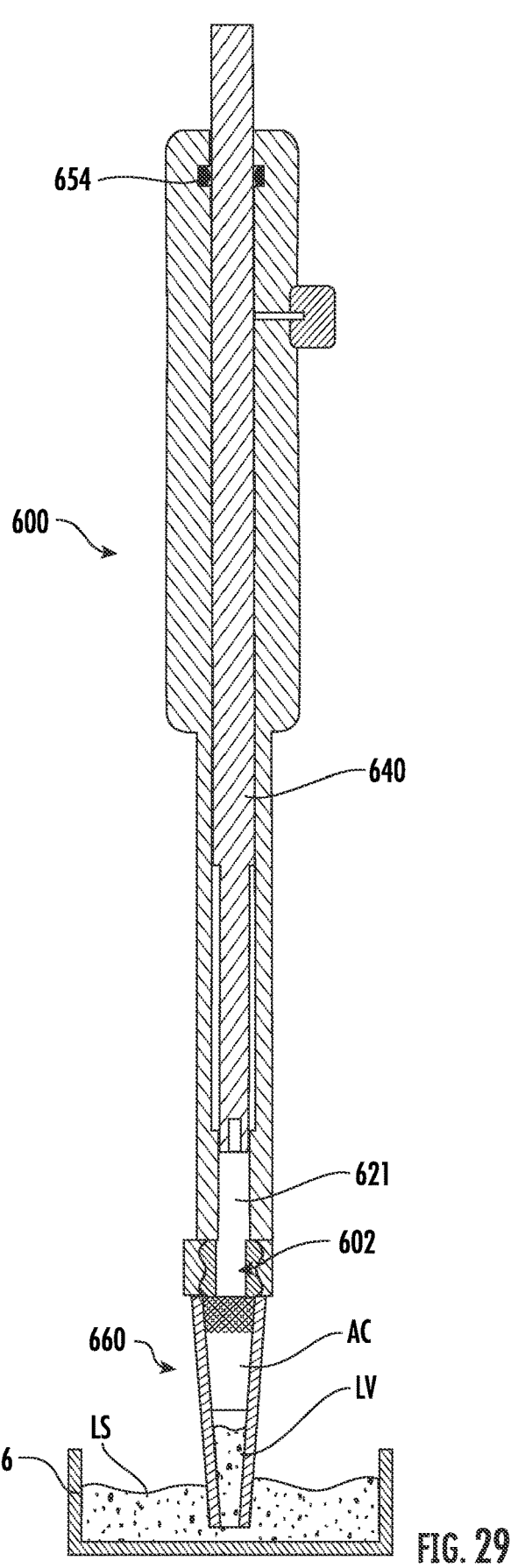
FIGS. 29-32 are cross-sectional views of a pipettor of the pipetting system of FIG. 28 illustrating operations of the pipetting system.
Figure 33:
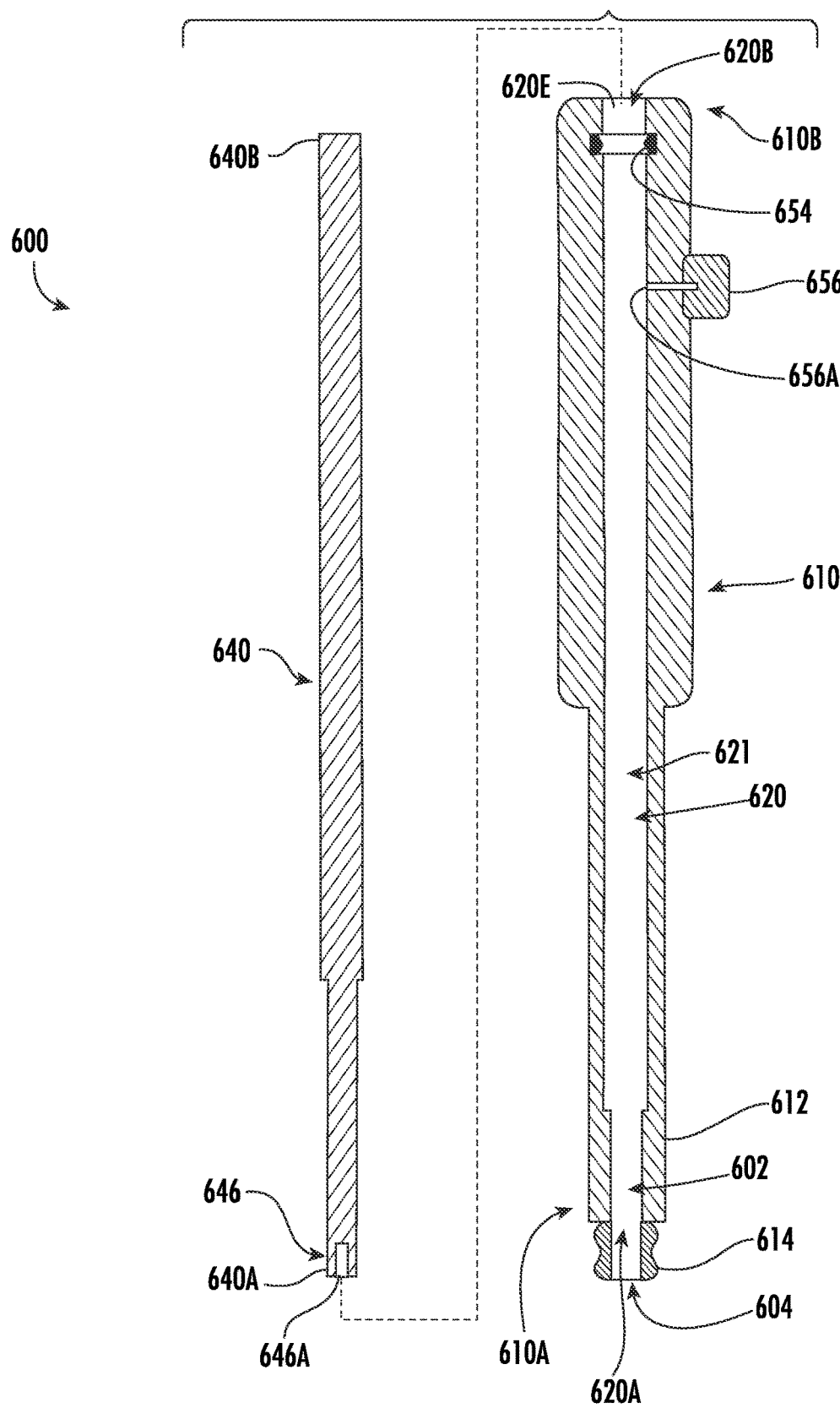
FIG. 33 is an exploded, cross-sectional view of the pipettor of FIG. 28.
Figure 34:
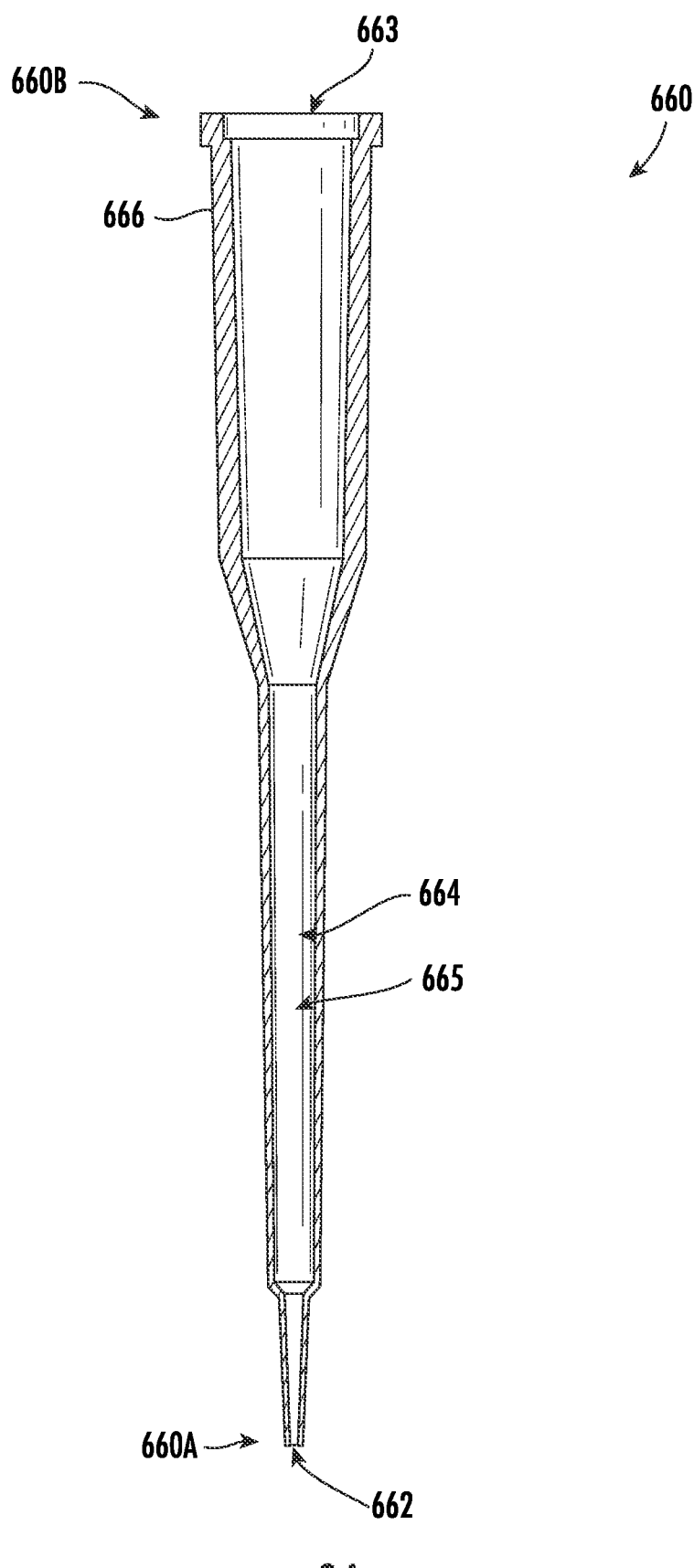
FIG. 34 is a cross-sectional view of an air displacement tip for use with the pipetting system of FIG. 28.

With reference to FIGS. 28 and 33, and as discussed in more detail herein, the pipettor 600 may be understood to have a lengthwise axis A-A and a distal end 600A. The pipettor 600 includes a tubular barrel 610, a pressure control system 606, a pipetting channel 602, a pipettor orifice 604, and a tip adaptor 614. The barrel 610 extends from a distal end 610A to a proximal end 610B. The barrel 610 includes a shaft 612 that terminates at the distal end 610A. The tip adaptor 614 is mounted or formed in the distal end 610A. The pipettor orifice 604 is located at the distal end 600A and fluidly communicates with the pipetting channel 602.

The pressure control system 606 includes the barrel 610, a plunger 640, a rear seal 654, a plunger drive mechanism 658, and a pressure sensor 656.

With reference to FIG. 33, the barrel 610 includes a barrel passage 620. The passage 620 is aligned lengthwise with the axis A-A and extends from a front end 620A to an opposing rear end 620B. The passage 620 terminates at and communicates with a rear opening 620E at a proximal end 610B of the barrel 610. The barrel passage 620 includes a barrel chamber 621. The rear seal 654 is located axially between the barrel chamber 621 and a rear opening 620E at the proximal end 610B. The barrel chamber 621 fluidly communicates with the pressure sensor 656 via a sensor port 656A.

The rear seal 654 may be an annular seal (e.g., an O-ring).

The plunger 640 has a front or leading end 640A and an opposing rear end 640B, and a rear plunger section 644.

The plunger 640 further includes an integral piston engagement feature 646 on the leading end 640A. In some embodiments and as illustrated in FIG. 33, the piston engagement feature 646 includes a slot 646A. The slot 646A may be configured as a blind hole, for example, as shown. The piston engagement feature may have any suitable construction and is not limited to a slot or opening.

The plunger 640 is mounted in the passage 620 such that the plunger 640 can slidably translate relative to the barrel 610 along a plunger axis P5-P5 in an extension direction E11) and an opposing retraction direction E11. In some embodiments, the plunger axis P5-P5 is substantially coincident with the shaft axis A-A.

Figure 30:
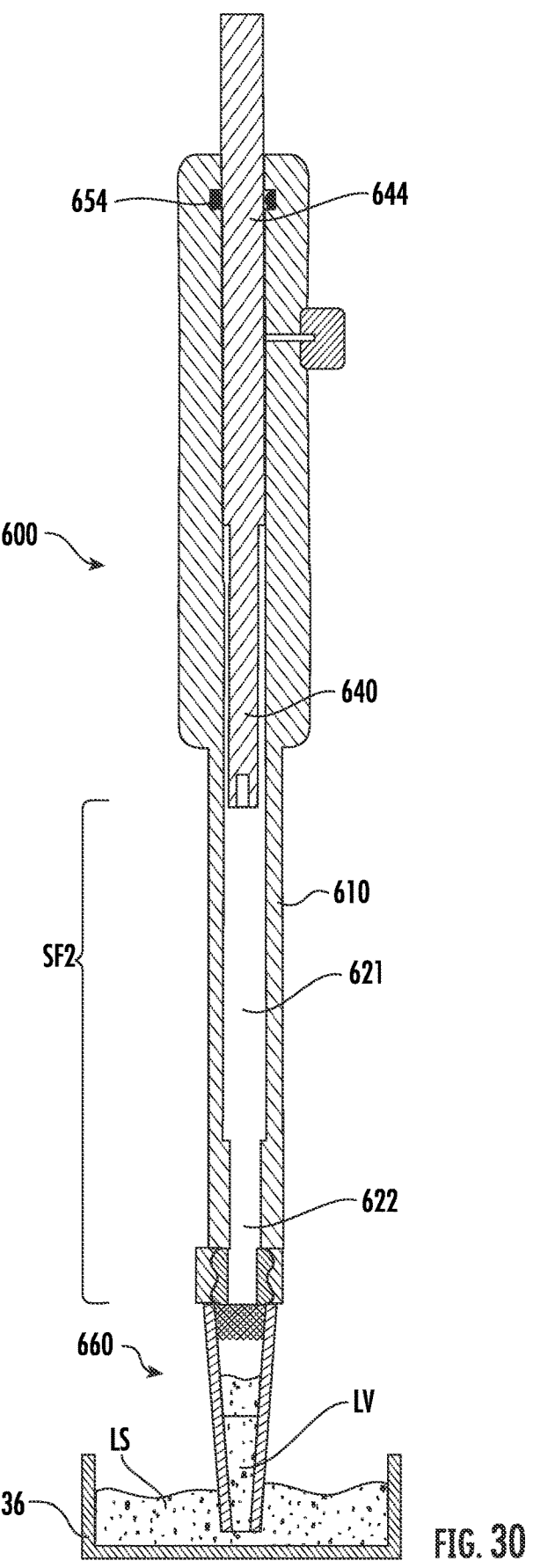
Figure 31:
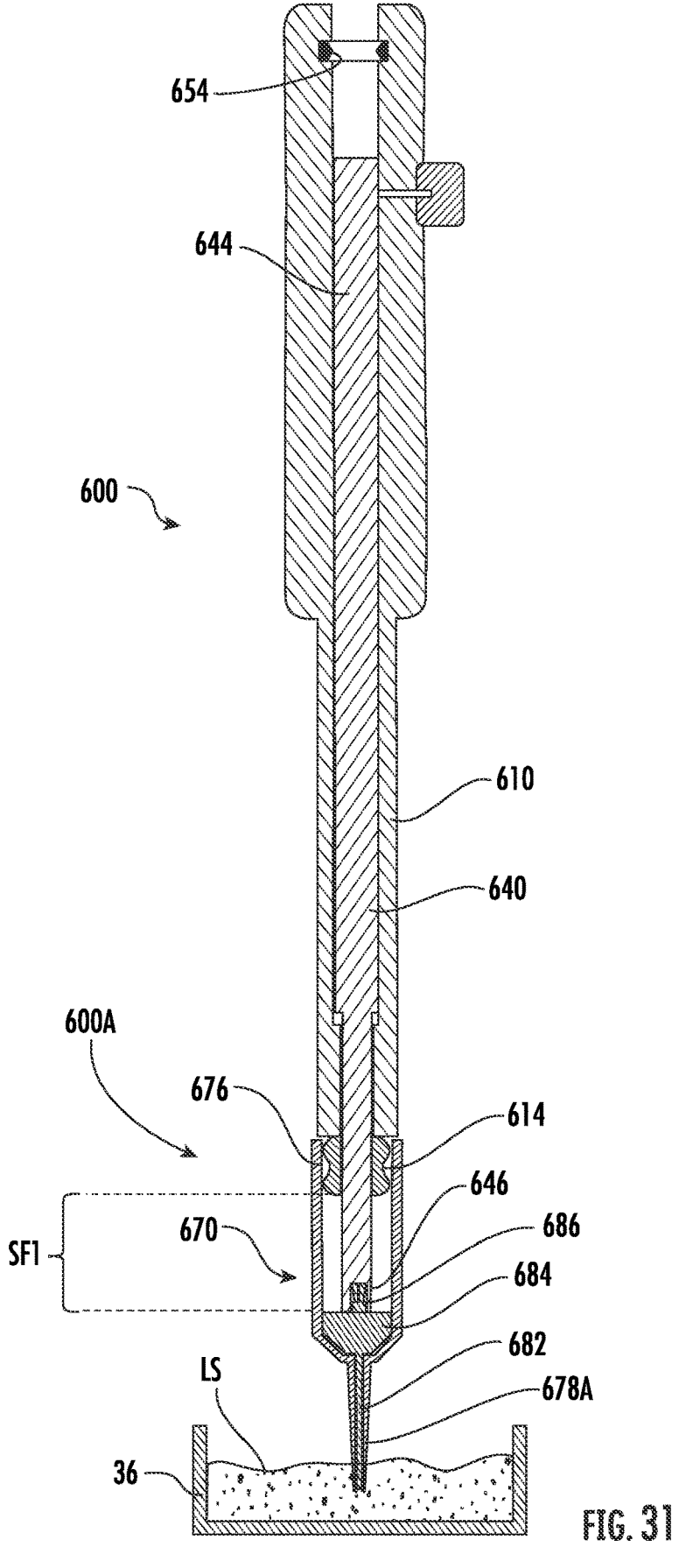

The plunger 640 is slidable to translate (relative to the passage 620, through a plunger stroke) between a fully extended position, as shown in FIG. 31, and a fully retracted position, as shown in FIG. 30. As discussed below, the plunger 640 can also be slid into an AD mode starting position as shown in FIG. 28 and, alternatively, a PD mode starting position as shown in FIG. 31.

In the fully extended position (FIG. 31), a portion of the front plunger section 642 extends distally beyond the distal end 600A of the pipettor 600. Through a first part SF1 of the retraction stroke (FIG. 31; starting from the fully extended position), the rear end 640B of the plunger 640 is forward of the rear seal 654 so that the passage 620 is open to the rear opening 620E.

Through a second part SF2 of the retraction stroke (FIG. 30; following the first part SF1), the rear end 640B of the plunger 640 is rearward of the rear seal 654 so that the plunger rear section 644 is disposed in the rear seal 654. In this portion of the stroke, the rear O-ring 654 forms an airtight, pressure tight seal between the outer diameter of the rear plunger section 644 and the barrel 610, which seals the passage 620 from the rear opening 620E. The rear plunger section 644 is able to slide through the rear O-ring 654 while maintaining the airtight, pressure tight seal therewith.

The plunger drive mechanism 658 is selectively operable to drive the plunger 640 in each of an extension direction E10 and retraction direction E11. The plunger drive mechanism 658 may be a linear drive mechanism. The plunger drive mechanism 658 may include an actuator and may be any suitable type of linear drive mechanism. In some embodiments, the actuator includes an electric motor. In some embodiments, the linear drive mechanism 658 includes a spindle and spindle nut linkage driven by an electric motor. In some embodiments, the plunger drive mechanism 658 is manually operable and does not include an actuator. For example, the plunger member 640 may be pushed and pulled using an extension, lever, knob or other feature that is hand-driven.

In use, as the plunger 640 is driven in the extension direction E10 through the stroke portion SF2, air volume is displaced from the barrel chamber 621, and the effective volume of the barrel chamber 621 is reduced. As the plunger 240 is driven in the retraction direction E11, air volume is replaced in the barrel chamber 621, and the effective volume of the barrel chamber 621 is increased.

The plunger 640 may be formed of any suitable material(s). In some embodiments, the plunger 640 is formed of stainless steel.

The barrel 610 may be formed of any suitable material. In some embodiments, the barrel 610 is formed of aluminum.

The tip adaptor 614 is configured to removably secure the pipette tips 660 and 670 to the end 600A of the pipettor 600 in the same manner as described above for the tip adaptor 156.

The AD pipette tip 660 (FIGS. 28-30 and 34) is an example of a pipette tip that may be used with the pipettor 600 for aspirating and dispensing in the AD mode. However, it will be appreciated that pipette tips of other designs may be used instead. The AD pipette tip 660 may be a tubular body constructed in same manner as described for the AD pipette tip 160, and includes a distal end 660A, a proximal end 660B, a tip volume or passage 664, a pipetting orifice 662, an interface opening 663, a mount section 666, and a liquid collection volume 665 corresponding to the components 160A, 160B, 164, 162, 163, 166, and 165, respectively.

The PD pipette tip 670 (FIGS. 31, 32 and 35) includes a tubular tip body 678 and a piston 680 slidably mounted in the tip body 678. The piston 680 is slidable between an extended or ready position (FIG. 31) and a retracted position (e.g., FIG. 32).

With reference to FIG. 35, the tip body 678 extends from a distal end 670A to a proximal end 670B. The tip body 678 includes a front section 678A and a rear section 678B which together define a tip volume or passage 674. The front section 678A defines a front chamber 679A and the rear section 678B defines a rear chamber 679B, each forming a part of the passage 674. The rear section 678B includes a mount section 676 and defines an interface opening 673. A pipetting orifice 672 is defined in the distal end 670A. The passage 674 terminates at the interface opening 673 and the pipetting orifice 672.

The piston 680 includes a shaft 682, a base 684, and a plunger engagement feature 686. In some embodiments, the shaft 682, the base 684, and the plunger engagement feature 686 form a rigid, unitary member. In some embodiments, the shaft 682, the base 684, and the plunger engagement feature 686 together form a monolithic member.

The shaft 682 extends from a proximal end 682B secured to the base 684 to an opposing distal end 682A. In some embodiments, the distal end 682A is positioned at or proximate the pipetting orifice 672 when the piston 680 is in the ready position. The front side of the base 684 may have a convex or otherwise contoured shape to fit the facing profile of the tip body 678.

The illustrated plunger engagement feature 686 includes two or more opposed legs 686A. The plunger engagement feature 686 is configured to be received in the slot 646A to releasably secure the piston engagement feature 646A to the plunger engagement feature 686. In some embodiments, the legs 686A have a relaxed width that is greater than the width of the slot 646A and are elastically deflectable.

The liquid handling system 10 and the pipetting system 601 may be used as follows in accordance with some methods to aspirate and/or dispense one or more liquid samples. As discussed above, the pipetting system 601 is configured to be used in each of an air displacement (AD) mode and an alternative displacement (PD) mode.

Generally, in the AD mode, the AD pipette tip 660 is mounted on the pipettor 600. The plunger 640 is driven to displace an air volume in the passage 620 and thereby correspondingly change a pressure in the pipetting channel 602 to aspirate or dispense a liquid sample into or from the liquid collection volume 665. In the AD mode, the displacement of the plunger 640 displaces or expands air volume in the barrel 614, which generates the pressure change, and an air cushion may be (and typically is) present and maintained between the liquid sample in the liquid collection volume 665 and the distal end 640A of the plunger 640.

Generally, in the PD mode, PD pipette tip 660 is mounted on the pipettor 600. The piston 680 is driven via the plunger 640 to displace an air volume in the front chamber 679A and thereby correspondingly change a pressure in the front chamber 679A to aspirate or dispense a liquid sample into or from the liquid collection volume 675. In the PD mode, the displacement of the piston 680 displaces or expands air volume in the front chamber 679A, which generates the pressure change. In some embodiments, the distal end 682A of the piston 680 contacts the liquid sample in the front chamber 679A.

The operator or controller 20 may select and implement the mode of operation (AD mode or PD mode). For example, the operator may instruct the controller 20 using the HMI 22, for example, that the pipette tip installed on the pipettor 600, or to be installed on the pipettor 600, is an AD-type tip 660 or is a PD-type tip 670. The controller 20 may then automatically and programmatically operate the pipetting system 601 in a manner corresponding to the type of pipette tip (e.g., as described below).

Operation of the pipetting system in the AD mode will now be described in more detail. The AD pipette tip 660 is mounted on the tip adaptor 614 as shown in FIG. 28. For example, the AD pipette tip may be held in a tray and the controller 20 may operate the operate the actuator(s) 34A, 34B, for example, to position the pipettor 600 over the AD pipette tip 660, then drive the pipettor 600 down to insert the tip adaptor 614, and then raise the pipettor 600 to remove the AD pipette tip 660 from the tray. During this pickup operation, the plunger 640 may be in the AD mode starting position.

The controller 20 may then operate the actuator(s) 34A, 34B, for example, to position the pipette tip 660 over a liquid sample LS. The sample LS may be disposed in a container 36, for example. If the plunger 640 is not in the AD mode starting position, it is placed in the AD mode starting position, as shown in FIG. 28. The controller 20 may then operate the actuator 34B, for example, to lower the distal end 660A, and thereby the pipetting orifice 662, into the sample LS. In some embodiments, the distal end 660A, and thereby the pipetting orifice 662, are immersed in the sample LS to at least a prescribed depth to ensure that the pipetting orifice 662 remains immersed in the sample during aspiration.

With the plunger 640 in the AD mode starting position and the pipetting orifice 662 immersed, the drive mechanism 658 is operated to displace the plunger 640 in the retraction direction E11 through some or all of the stroke portion SF2, and thereby draw the plunger 640 away from the pipettor orifice 604. Throughout the stroke portion SF2 of the retraction stroke, the pipetting channel 602 is sealed (except at the pipettor orifice 604) by the engagement between the rear seal 654 and the rear section 644 of the plunger 640.

The retraction of the plunger 640 expands the effective air volume of the barrel chamber 621, thereby generating a negative pressure at the pipettor orifice 604. The negative pressure draws a liquid sample volume LV of the liquid sample LS into the liquid collection volume 665 (in the tip passage 664) of the pipette tip 660. The plunger 640 may be further retracted until the desired amount of liquid sample volume LV has been aspirated into the collection volume 665. An air volume or air cushion AC may remain in the tip passage 664 and the barrel chamber 621 between the proximal end of the liquid sample volume LV and the pipettor 600.

The pipettor 600 may then be used to dispense the liquid sample volume LV from the AD pipette tip 660. The drive mechanism 658 is operated to displace the plunger 640 in the extension direction E10 and thereby push the plunger 640 toward the pipettor orifice 604. Throughout the extension stroke, the pipetting channel 602 is sealed (except at the pipettor orifice 604) by the engagement between the rear seal 654 and the rear section 644 of the plunger 640. The extension of the plunger 640 displaces air volume from the barrel chamber 621, thereby generating a positive pressure at the proximal end of the liquid sample volume LV. The positive pressure expels the liquid sample volume LV from the liquid collection volume 665 through the pipetting orifice 662. The air cushion AC may remain between the proximal end of the liquid sample volume LV and the leading end 640A of the plunger 640 until the liquid sample volume LV is fully dispensed.

In the illustrated embodiment, the pipettor 600 is not provided with a front seal corresponding to the front seal 252 (FIG. 17). Therefore, the front portion of the barrel chamber 621 is not sealed from the rear portion of the barrel chamber 624. In some embodiments or applications, the PD tip 670 is used for smaller volumes and the AD tip 660 is used for relatively larger volumes. However, in other embodiments, the pipettor 600 may be configured to operate in AD mode as discussed for the pipettor 200 (FIG. 14), for example.

In some embodiments, when executing the aspirating or dispensing operations in the AD mode, the controller 20 receives pressure signals from the pressure sensor 656 indicating the air pressure in the pipetting channel 602. The controller 20 may continuously monitor the pressure in the pipetting channel 602.

As discussed above, the pipetting system 601 aspirates liquid sample by decreasing the pressure in the pipetting channel 602 and dispenses liquid sample by increasing the pressure in the pipetting channel 602. However, the pressure in the pipetting channel 602 may fluctuate in response to other actions or conditions in the procedure, for example, as discussed above with regard to the pipetting system 101.

Operation of the pipetting system in the PD mode will now be described in more detail. The PD pipette tip 670 is mounted on the tip adaptor 614 as shown in FIG. 31. For example, the PD pipette tip 670 may be held in a tray and the controller 20 may operate the operate the actuator(s) 34A, 34B, for example, to position the pipettor 600 over the PD pipette tip 670, then drive the pipettor 600 down to insert the tip adaptor 614, and then raise the pipettor 600 to remove the PD pipette tip 670 from the tray.

During this pickup operation, the plunger 640 is disposed in the PD mode starting position (FIG. 31). The pipettor 600 is configured such that, when the PD pipette tip 670 is sufficiently mounted on the tip adaptor 614 and the piston 680 is in its forwardmost position relative to the tip body 678, the plunger engagement feature 686 is received in the slot 646A of the plunger 640. In this way, the piston 680 is releasably captured by or affixed to the distal end of the plunger 640.

The controller 20 may then operate the actuator(s) 34A, 34B, for example, to position the PD pipette tip 670 over a liquid sample LS. The sample LS may be disposed in a container 36, for example. The controller 20 may then operate the actuator 34B, for example, to lower the distal end 670A, and thereby the pipetting orifice 672, into the sample LS. In some embodiments, the distal end 670A, and thereby the pipetting orifice 672, are immersed in the sample LS to at least a prescribed depth to ensure that the pipetting orifice 672 remains immersed in the sample during aspiration.

With the plunger 640 in the PD mode starting position and the pipetting orifice 672 immersed, the drive mechanism 658 is operated to displace the plunger 640 in the retraction direction E11 through some or all of the stroke portion SF1, and thereby draw the plunger 640 away from the pipettor orifice 604. Throughout the retraction stroke, the pipetting channel 602 is not sealed because the rear seal 654 does not seal the rear section 644 from the rear opening 620E.

Figure 32:
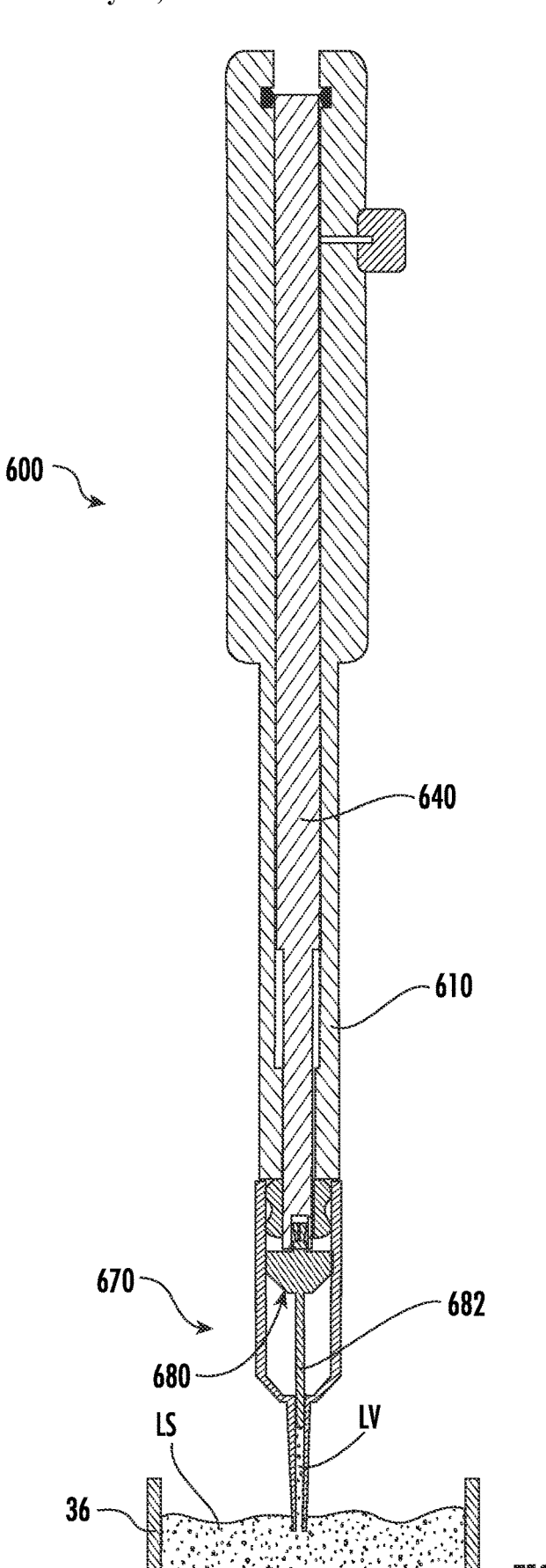

The retraction of the plunger 640 retracts the piston 680 in the retraction direction E11 as shown in FIG. 32, for example. The retraction of the piston 680 expands the effective fluid volume of the front chamber 679A, thereby generating a negative pressure at the pipetting orifice 672. The negative pressure draws a liquid sample volume LV of the liquid sample LS into the liquid collection volume 675 (in the front chamber 679A) of the PD pipette tip 670. The plunger 640 may be further retracted until the desired amount of liquid sample volume LV has been aspirated into the collection volume 675. In some embodiments, no air cushion or air volume is present between the distal end 682A of the piston 680 and the liquid sample volume LV.

The pipettor 600 may then be used to dispense the liquid sample volume LV from the PD pipette tip 670. The drive mechanism 658 is operated to displace the plunger 640 in the extension direction E10 and thereby push the plunger 640 toward the pipettor orifice 604. Throughout the extension stroke, the pipetting channel 602 is not sealed because the rear seal 654 does not seal the rear section 644 from the rear opening 620E.

The extension of the plunger 640 extends the piston 680 in the extension direction E10. The extension of the piston 680 displaces fluid volume from the front chamber 679A, thereby expelling the liquid sample volume LV from the liquid collection volume 675 through the pipetting orifice 672.

The pipetting system 601 and the pipettor 600 can be used to execute aspirating and dispensing procedures as described above using AD pipette tips 660 and PD pipette tips 670 selectively and interchangeably.

For example, an AD pipette tip 660 may be mounted on the pipettor 600 and used to aspirate and dispense in the AD mode. The AD pipette tip 660 is then removed (e.g., ejected) from the pipettor 600, and a PD pipette tip 670 is then mounted on the pipettor 600 and used to aspirate and dispense in the PD mode. Likewise, a PD pipette tip 670 can be mounted on the pipettor 600, used to aspirate and dispense in the PD mode then removed, and replaced with an AD pipette tip 660 that is used to aspirate and dispense in the AD mode.

Any number of each type of pipette tip may be used in a sequence of procedures (e.g., the pipetting system 601 may aspirate and dispense in the AD mode (or, alternatively, the PD mode) using a series of AD pipette tips 660 before switching to aspirate and dispense in the PD mode (or the AD mode) using one or more PD pipette tips 670.

It is not necessary for a user to use the pipetting system 601 and the pipettor 600 in with both AD pipette tips 660 and PD pipette tips 670.

The pipette tips 660, 670 may be removed from the pipettor 600 using any suitable technique and hardware. In some embodiments, the pipettor 600 includes an ejector (not shown in FIGS. 28-33; e.g., an ejector sleeve) that pushes the pipette tips 660, 670 off of the tip adaptor 614. The pipettor 600 may include an ejector mechanism corresponding to the ejector mechanism 151 of the pipettor 100, for example.

In some embodiments, the PD pipette tip 670 is removed from the pipettor 600 as follows. The plunger 640 is retracted in direction E11 until the base 684 of the piston 680 abuts the tip adaptor 614. The plunger 640 is retracted in direction E11 until the piston engagement feature 646 is decoupled or disengaged from the plunger engagement feature 686, thereby releasing the piston 680. The PD pipette tip 670 is then removed using any suitable technique or mechanism for removing the tip body 678 from the tip adaptor 614.

It will be appreciated that the pipetting systems and the pipettors as described (e.g., the pipetting system 601 and the pipettor 600) support both positive displacement pipetting and air displacement pipetting in a single pipetting channel. If both types of tips are required to be used on one instrument, no tool change is required.

Figure 36:
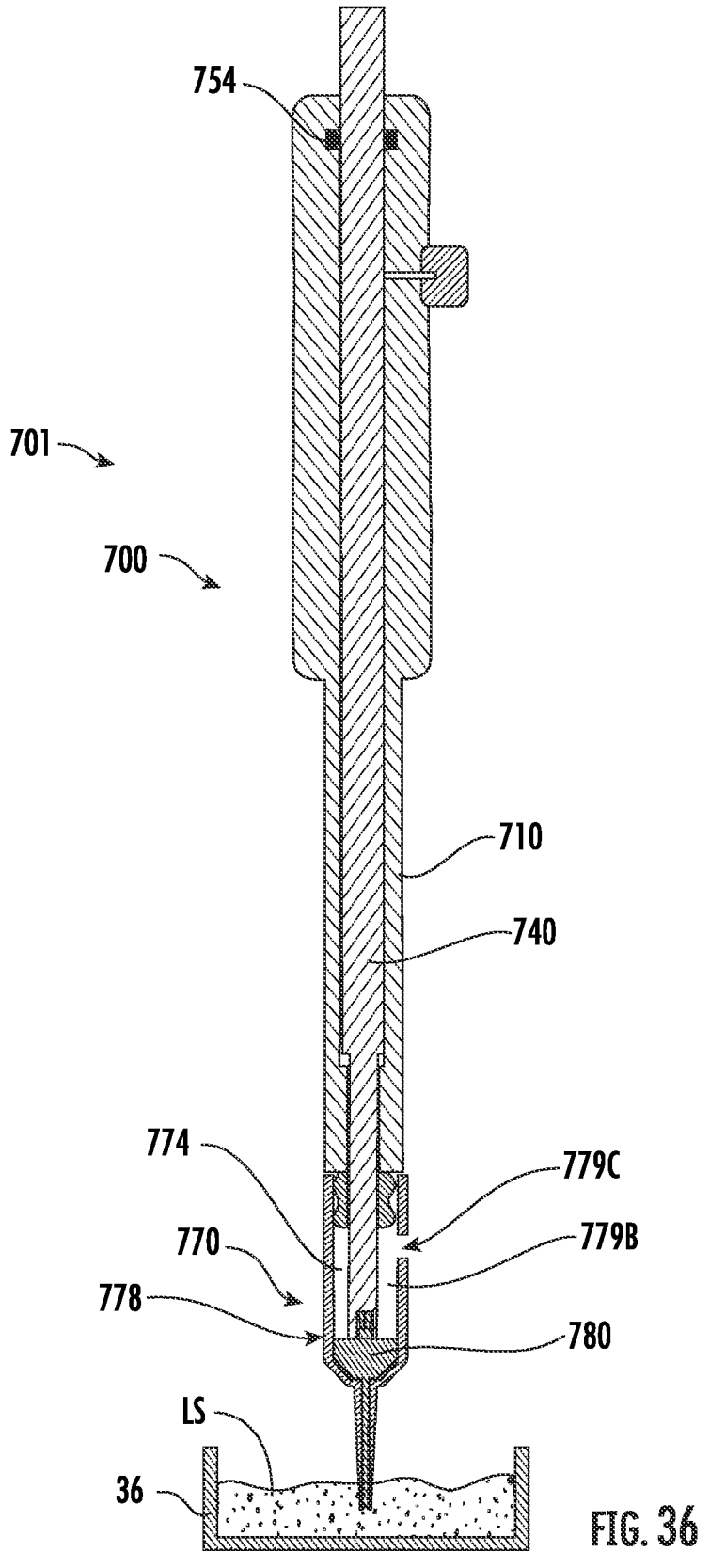
FIG. 36 is a cross-sectional view of a pipetting system according to further embodiments of the technology.

With reference to FIG. 36, a pipetting system 701' according to further embodiments is shown therein. The pipetting system 701' corresponds to, is constructed, and operates in the same manner as the pipetting system 601, except as discussed below. The pipetting system 701' includes one or more AD pipette tips 660 (not shown in FIG. 36), and also a pipettor 700' and one or more PD pipette tips 770' that correspond to, are constructed and operate in the same manner as the pipettor 600 and the PD pipette tips 770', except as discussed below.

In the pipettor 600, the plunger 740' is lengthened or extended (as compared to the plunger 640) so that the rear portion of the plunger 740' maintains an air-tight seal with the rear seal 754' throughout operation of the pipettor 700' in its AD and PD aspirating and dispensing procedures, even when the plunger 740' is fully extended (as shown in FIG. 36). Additionally, the tip body 778' of the PD pipette tip 770' includes a venting port 779C' that fluidly connects the rear chamber 779B' of the tip passage 774' to the ambient atmosphere. The venting port 779C' serves as a pressure relief port or passage from the tip passage 774' between the piston 780' and the pipettor 700'. In this way, the venting port 779C' can prevent the translation of the piston 780' (in the tip body 778') and the plunger 740' (in the barrel 710') from generating negative or positive pressures in rear chamber 779B' that may interfere with control of the piston 780'.

As discussed above, automated liquid handling systems may be used to transfer specific quantities of liquids, such as reagents or samples, between designated containers. Such systems may use pipettors both for aspirating and dispensing liquids. Advantages of automating liquid handling processes include increasing throughput and efficiency of operations and eliminating human errors, but may be contingent on the accuracy and repeatability of pipetting operations.

Figure 37:
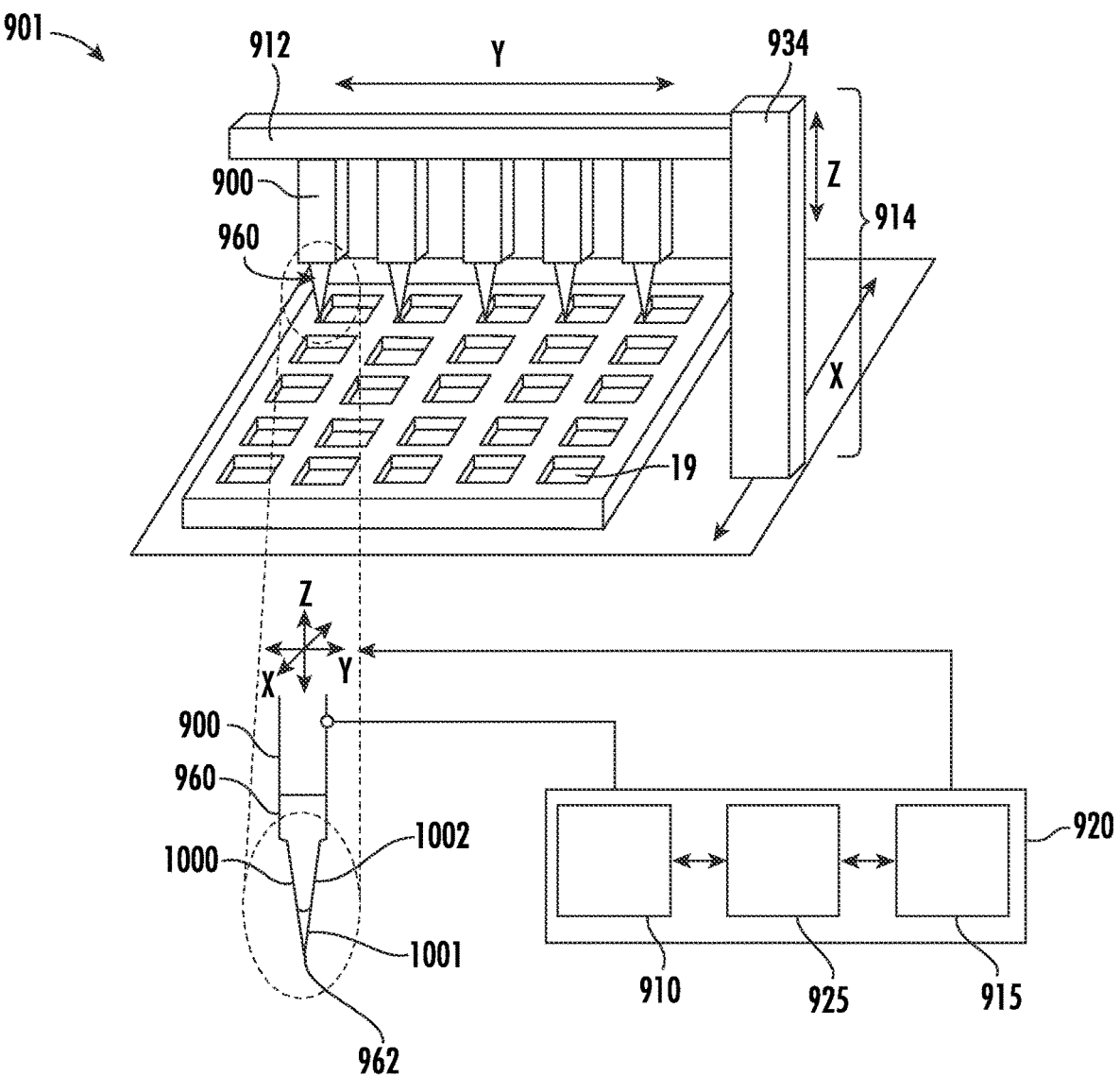
FIG. 37 is a schematic perspective view illustrating a further example of an automated liquid handling system according to some embodiments.

FIG. 37 is a schematic perspective view illustrating a further example of an automated liquid handling system 901 according to some embodiments. The system 901 includes elements similar to the pipetting system 101 and automated liquid handling system 10 described above, and description of similar elements may be omitted for brevity.

With reference to FIG. 37, the automated liquid handling system 901 includes a robotic arm assembly 914 comprising an arm member 912 that is adapted to hold one or more pipettors 900 (which may include one or more of the pipettors 100 or any other suitable pipettor(s)), and an actuator mechanism 934 (which may include the pipetting module positioning system 34A and the actuator(s) 34B of FIG. 1). The actuator mechanism 934 is configured to move the arm member 912 along at least one axis responsive to a control signal from a control circuit 920 (which may include the controller 20 of FIG. 1). In the example of FIG. 36, the robotic arm 914 has a first horizontal movement axis (X-direction, e.g., forward and backward), a second horizontal movement axis (Y-direction, e.g., left and right) and a vertical movement axis (Z-direction, e.g., up and down). The controller circuit 920 may include at least one processor 925, memory 910, and input/output (I/O) circuit 915 that are operable to generate and transmit control signals to the actuator mechanism 934 to move the arm member 912 towards or away from a surface of a liquid sample LS along the at least one axis. More generally, the memory 910 may be a non-transitory storage medium configured to store computer readable instructions therein, and the controller circuit 920 may be configured to execute the computer readable instructions stored in the memory 910 to perform operations as described herein.

FIG. 37 illustrates each of the pipettors 900 with an attached pipette tip 960. The pipette tip 960 may be similar to the pipette tip 160 described herein in some aspects. For example, the pipette tip 960 may include a pipette orifice or opening 962 that provides a passage through the tip 960 to the pipettor 900, where the passage can serve as a liquid sample collection volume. The pipette tip 960 may be an air displacement type tip or a positive displacement type tip as described herein. The pipette tip 960 may be retrieved from a pipette tip holder and moved vertically upwards by the robotic arm assembly 914 under control of the controller circuit 920 in an automated manner.

Further embodiments described herein may arise from realization that, as a liquid is aspirated by a pipettor 900 (in a liquid handler system 901 or in a standalone pipettor 900), the volume of the liquid in the container is decreasing. If the container is of an unknown size, etc., the placement of the pipette tip 160 may impact whether the correct amount of liquid is effectively being aspirated into the pipettor 900 (i.e., if the pipette tip 160 is positioned too high relative to the level of the liquid, the desired amount of liquid may not be aspirated). Thus, effective pipetting may require knowledge of variables such as the container from which the liquid is aspirated, the type of liquid, the container into which liquid will be transferred, etc.

Capacitive liquid level detection (LLD) can be used to determine the level difference between immersion in and emersion from a sample liquid. Liquid level detection may be used to detect the fill level at a start of an aspiration or dispensation when the level is unknown to the instrument. The aspirated or dispensed volume can be calculated from the level difference and the cross-sectional area of the vessel. However, these methods may be too inaccurate for small volumes and large cross-sectional areas. Parasitic capacitances can also cause an inaccurate determination of the processed sample quantities or liquid volumes.

Embodiments described herein provide a conductive pipette tip 960 that is configured to provide a control window for axial movement of the pipettor(s) 100. In contrast to some existing technologies, which may use conductive tips that can detect the surface of the liquid when in contact with the liquid, embodiments described herein allow for dynamic liquid level detection, based on changes in capacitance indicated by the signal from a conductive electrode 1002 on the pipette tip 960, in some embodiments independent of a shape and/or size of a container of the liquid.

Figure 38:
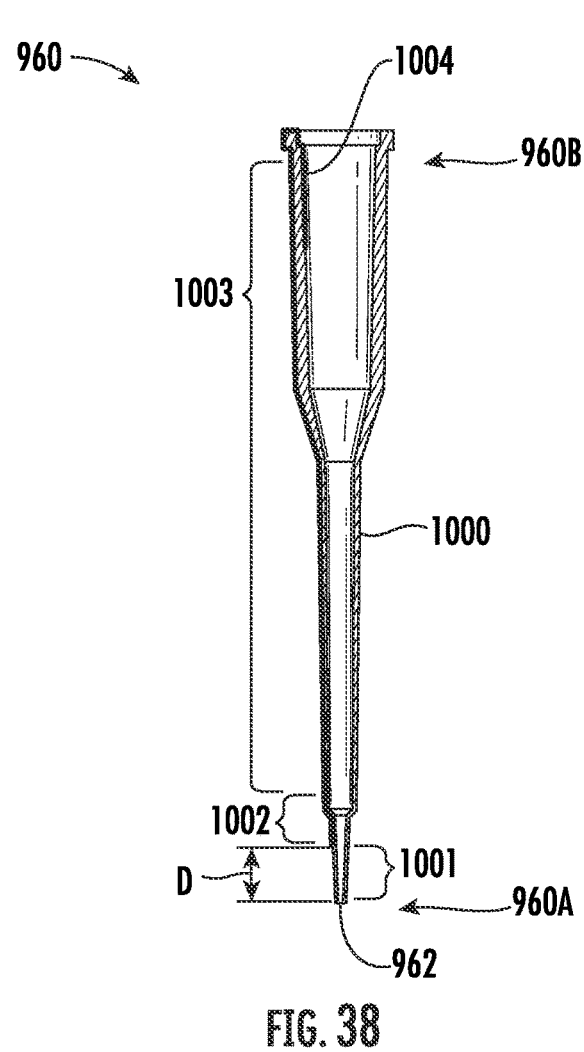
FIG. 38 is an enlarged side view illustrating a conductive pipette tip according to some embodiments.

The conductive pipette tip 960 includes an arrangement of conductive 1002 and non-conductive 1001 areas. FIG. 38 is an enlarged side view illustrating a conductive pipette tip 960 according to some embodiments described herein. The pipette tip 960 includes a tip member 1000 having a distal end 960A with an opening or orifice 962 that is sized and configured for aspirating and/or dispensing a liquid, and an opposite, proximal end 960B that is configured for connection to an end portion the pipettor 900. A conductive electrode 1002 extends along a surface of the pipette tip 960 (e.g., on an outer surface of the tip member 1000, and/or including portions integrated in a sidewall of the tip member 1000). The tip member 1000 includes a non-conductive or electrically isolated tip "bottom" or "pod" 1001 at the end 960A of the pipette tip 960, between the pipetting orifice or opening 962 and the conductive electrode 1002. A learning circuit may be implemented by (or may otherwise be in communication with) the controller circuit 920 that controls the axial movement of the pipettor 900 (e.g., along the Z-axis or depth direction of the liquid to be aspirated). The learning circuit may be configured to detect and continuously monitor changes in capacitance due to contact between the conductive electrode 1002 and a liquid, as described herein. The inner surface of the tip member 1000 defines a passage through the pipette tip 960, and can serve as a liquid sample collection volume. The inner surface of the tip member 1000 may be non-conductive, and the conductive electrode 1002 may be configured as a single electrode in some embodiments.

With reference to FIG. 38, the isolated tip bottom 1001 protrudes from the conductive electrode 1002 or is otherwise between the conductive or functional portion of the conductive electrode 1002 and the opening 962 at the end 960A of the pipette tip 1000. An external surface of the isolated tip bottom 1001 may be free of the conductive material or layer that forms the conductive electrode 1002. For example, in some embodiments a lower portion of the conductive electrode 1002 adjacent the opening 962 may include a nonconductive material coating thereon to provide the isolated tip bottom 1001. In some embodiments, the isolated tip bottom 1001 may be provided by a non-conductive portion of the tip member 1000 that extends beyond the conductive electrode 1002. The isolated tip bottom 1001 may extend by a length or distance D of about 2 millimeters (mm) or more. The opposing end 960B of the tip member 1000 includes an electrical interface (shown as conductive element 1004) connected to a conductive interconnection 1003, and a mechanical interface for connection to the pipettor 900 (e.g., the end portion 112A of the pipettor 100 described herein).

The conductive connection 1003 extends along the tip member 1000 and electrically connecting the conductive electrode 1002 to the conductive element 1004 for signal transmission (e.g., to transmit signals from the conductive electrode 1002 to the controller circuit 920). The conductive portions 1002, 1003, 1004 of the tip member 1000 may be copper (Cu) or any suitable conductive material.

Figure 39A:
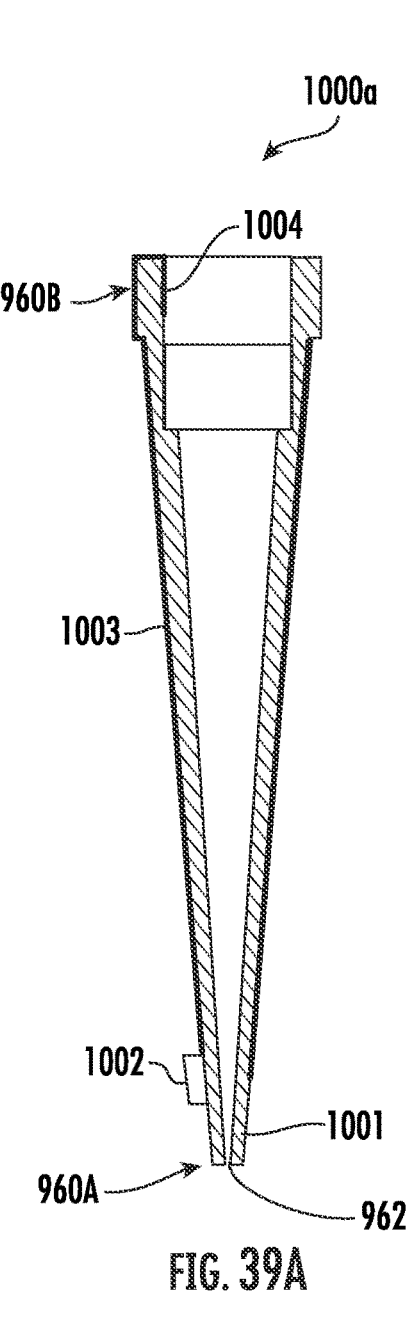
FIGS. 39A, 39B, and 39C are cross-sectional views illustrating embodiments of the tip member of FIG. 38.
Figures 39B, 39C, 40A:
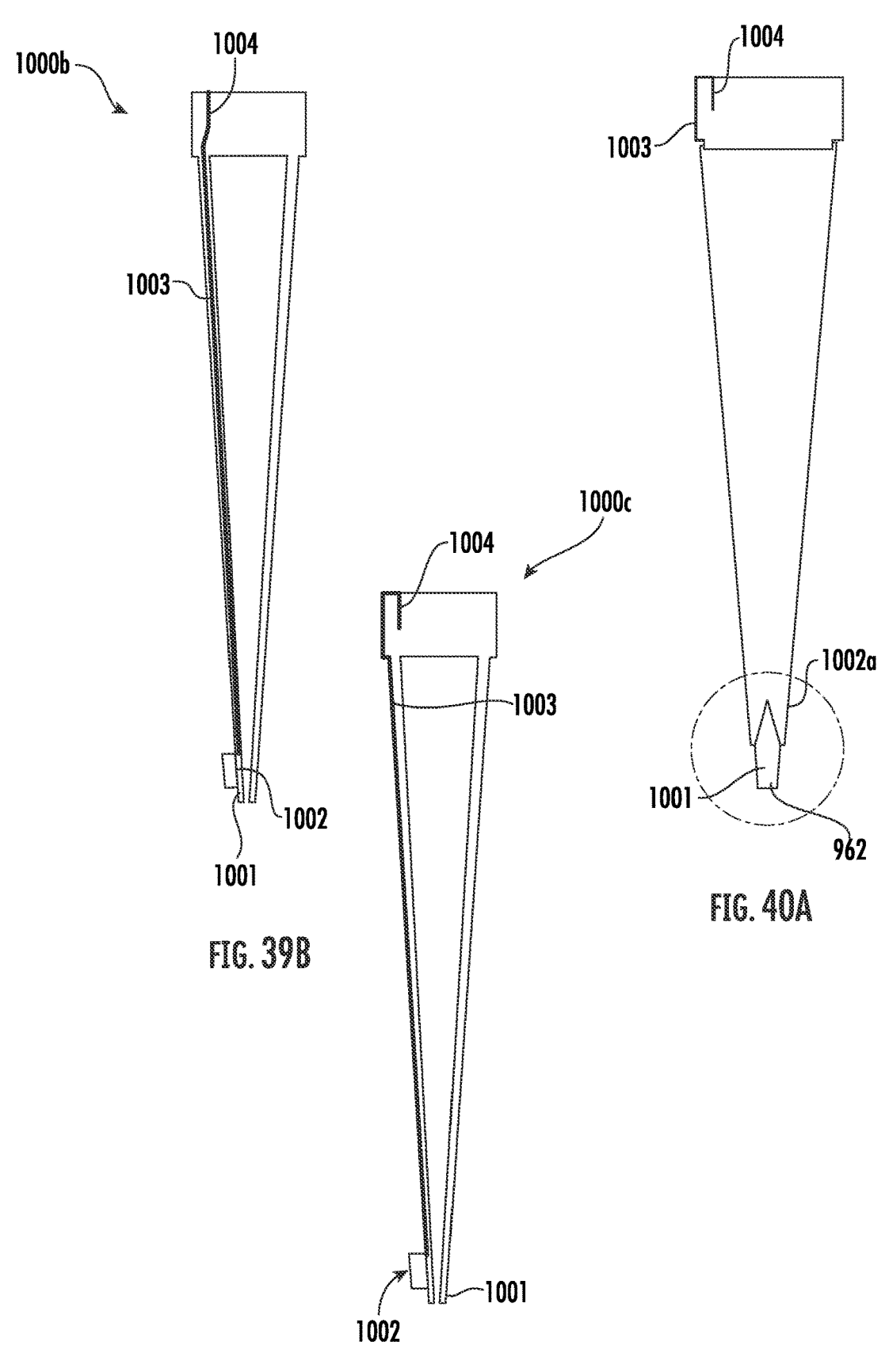
FIGS. 40A, 40B, and 40C are cross-sectional views illustrating embodiments of the conductive electrode in various "crown" shapes.

FIGS. 39A, 39B, and 39C are cross-sectional views illustrating embodiments 1000a, 1000b, 1000c of the tip member 1000 of FIG. 38. As shown in the embodiment of FIG. 39A, the conductive electrode 1002 and conductive interconnection 1003 may extend along an outer surface of the tip member 1000a between the opposing ends 960A and 960B thereof, defining a conductive "wall" of the tip member 1000a, in some embodiments extending on opposing sidewalls or even completely around the sidewalls of the tip member 1000a. In some embodiments, as shown in FIG. 39B, the conductive interconnection 1003 may be injection molded or otherwise at least partially integrated or embedded in the sidewall(s) of the tip member 1000b, rather than extending along the outside surface of the tip member 1000*b*. In some embodiments, as shown in FIGS. 38 and 39C, the conductive electrode 1002 and/or the conductive interconnection 1003 may not completely extend around a perimeter or circumference of the tip member 1000*c*. More generally, the tip member 1000 includes one conductive area 1002 at the bottom or distal end 960A, one conductive area 1004 at top or proximal end 960B (e.g., inside the tip member 1000) and a conductive interconnection 1003, which may be embedded within a surface of or may be on an outside or external surface of the tip member 1000.

Figure 40B:
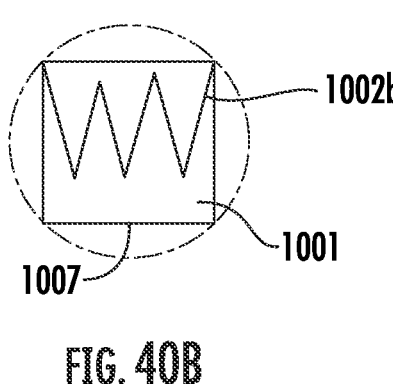
Figure 40C:
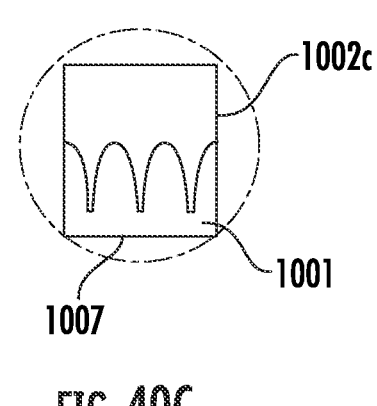

The conductive electrode 1002 adjacent the end 960A of the tip member 1000 may be provided in various different shapes. FIGS. 40A, 40B, and 40C are cross-sectional views illustrating embodiments 1002*a*, 1002*b*, 1002*c* of the conductive electrode 1002 in various "crown" shapes. The crown shapes of the conductive electrode 1002*a*, 1002*b*, 1002*c* include a plurality of end portions that protrude toward the non-conductive tip bottom 1001 such that, when submerged in a liquid to be dispensed, the conductive surface area may increase with submersion depth. More generally, the shape of the conductive electrode 1002 may define a surface area that varies with distance from the opening 962. This feature can support dynamic LLD-proportional regulation in conductive liquids, as further described in the examples below.

Figure 41:
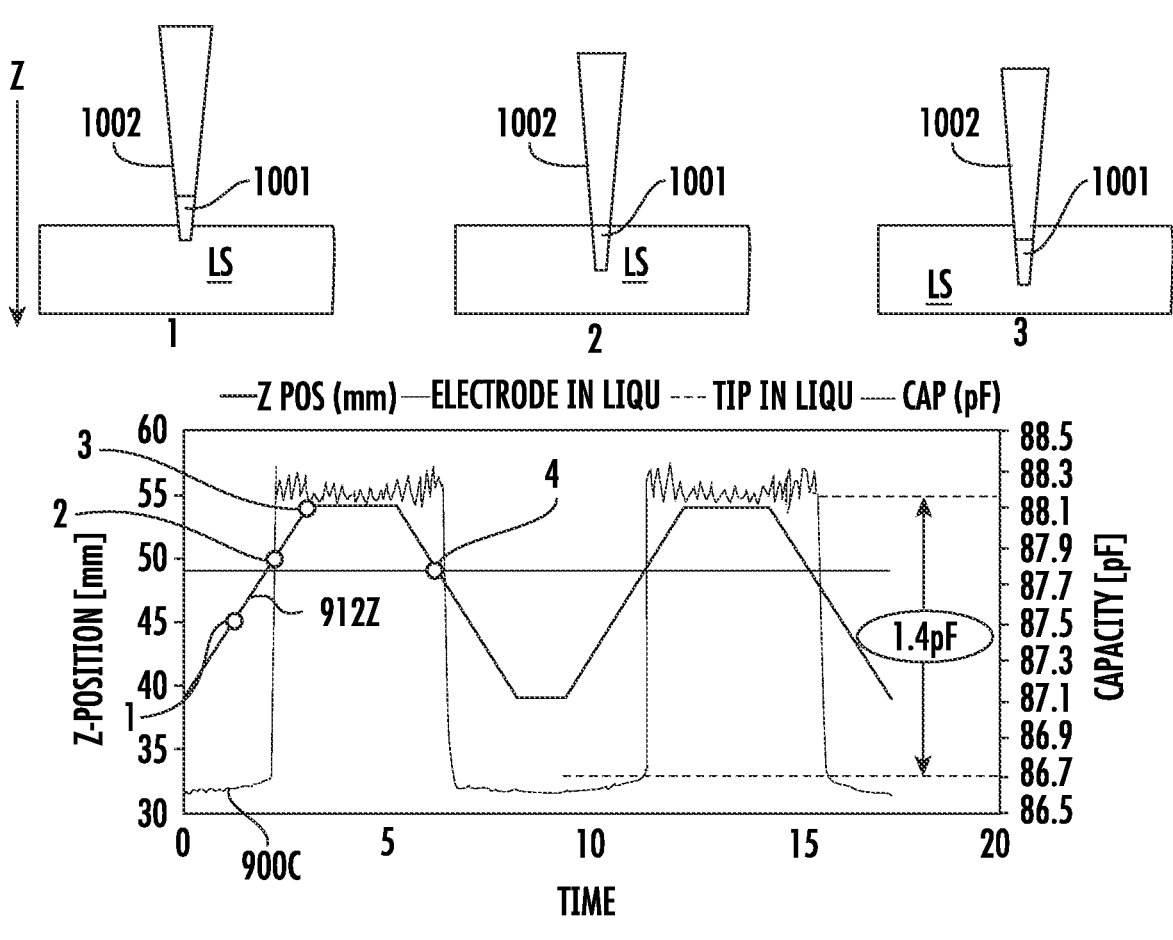
FIG. 41 is a diagram illustrating changes in capacitance with vertical position of a pipette tip including a conductive electrode and non-conductive tip bottom in accordance with some embodiments.

Contact between the liquid to be aspirated and the conductive electrode 1002 may be detected as a capacitance by controller circuit 920 based on a signal received from the conductive electrode 1002. FIG. 41 is a diagram illustrating changes in capacitance 900*c* with vertical position 912*z* of a pipette tip 960 including a conductive electrode 1002 and non-conductive tip bottom 1001 in accordance with some embodiments, relative to a surface of a liquid LS.

With reference to FIG. 41, the capacitance 900*c* indicated by the signal from the conductive electrode 1002 is substantially constant as the end 960A of the tip member 1000 is moved towards a surface of a liquid LS, shown by the vertical position 912*z*. When the non-conductive tip bottom 1001 contacts the liquid surface at time t=1 (as shown by (1)), the capacitance 900*c* remains substantially unchanged. The capacitance 900*c* remains substantially constant until the conductive electrode 1002 of the tip member 1000 contacts the surface of the liquid LS at time t=2 (as shown by (2)), at which point a near-instantaneous increase in the capacitance 900*c* is indicated by the signal from the electrode 1002. The increase in the capacitance 900*c* remains substantially constant even as the submersion depth of the conductive electrode 1002 below the surface of the liquid LS is increased at time t=3 (as shown by (3)).

Still referring to FIG. 41, when contact is lost between the conductive electrode 1002 and the surface of the liquid LS at time t=6 (e.g., when the liquid level falls below the conductive electrode 1002 due to the motion of the robotic arm 912 being insufficient to maintain contact between the conductive electrode 1002 and the liquid as the level of the liquid falls or rises due to aspiration or dispensing, as shown by (4)), a near-instantaneous decrease in the capacitance 900*c* is indicated by the signal from the electrode 1002. That is, contact (or absence of contact) between the conductive electrode 1002 and the surface of the liquid LS may be indicated as an abrupt change or jump in the detected capacitance. The detected capacitance may change or vary over a range of several picofarads (pF). For example, the change or difference in detected capacitance between contact and loss of contact between the conductive electrode 1002 and the surface of the liquid LS may vary over a range of about 0.1 to 15 pF, e.g., about 0.5 to 10 pF or about 1 to 3 pF. In the example of FIG. 40, the detected capacitance variation is about 1.4 pF for contact versus loss of contact between the conductive electrode 1002 the liquid LS.

In some embodiments, the capacitance indicated by the signal from the electrode 1002 may not vary based on the depth by which the conductive electrode 1002 is submerged below the surface of the liquid LS (as shown by the substantially constant capacitance 900*c* between time t=3 and t=6). That is, the detected capacitance may be substantially independent of an area of contact between the conductive electrode 1002 and the liquid LS, such that submersion depth variation may not alter the measured or indicated capacitance.

In other embodiments, the capacitance indicated by the signal from the conductive electrode 1002 may more gradually change or vary based on the depth by which the conductive electrode 1002 is submerged below the surface of the liquid, for example, with conductive electrode shapes 1002*a*, 1002*b*, 1002*c* that increase in surface area with submersion depth as shown in the examples of FIGS. 12A to 12C.

The configurations of a conductive electrode 1002 and non-conductive tip bottom 1001 in the example tip members 1000 described herein may thus implement a capacitive sensor as an integrated circuit connected to the pipette tip 960. For example, the capacitive sensor may be integrated on a printed circuit board (e.g., which may also include the controller circuit 920 and associated motor driver circuits, readout circuits, etc.), and may be routed to the tip adapter of the pipettor 900 for connection to the conductive contact 1004 of the pipette tip 960 via a single conductive wire or cable. In some embodiments the capacitive sensor may be configured to indicate capacitance with a resolution of up to about 1 femtofarad (fF) at a desired data acquisition rate (e.g., about 1000 sample per second). The amplitude and time resolution may allow precise detection of the liquid level.

The controller circuit 920 may thus dynamically detect and continuously monitor changes in the level of the liquid based on the changes in the detected capacitance due to contact (or loss of contact) between the conductive electrode 1002 and the liquid. The detected capacitance from the conductive electrode 1002 on the tip member 1000 may be used as a feedback signal or control loop to provide dynamic liquid level detection and liquid level following, without loss of contact between the pipetting orifice 962 of the pipette tip 960 and the liquid. In particular, based on the capacitance indicated by the signal from the conductive electrode 1002, the controller circuit 920 may be configured to generate and transmit a control signal to the actuator mechanism 934 of the robotic arm assembly 914. The control signal may be varied based on changes in the detected capacitance indicated by the signal from the conductive electrode 1002 to move the arm member 912 holding the pipettor(s) 100 towards or away from a surface of the liquid along the at least one axis (e.g., the Z-axis), thereby maintaining contact between the pipette tip 960 and the liquid such that the non-conductive tip bottom 1001 of the tip member 1000 can be constantly submerged, regardless of changes in the liquid level.

To provide dynamic liquid level detection (LLD) and following, the non-conductive tip bottom 1001 of the tip member 1000 is sized to be larger than the desired control window, e.g., extending by a length or dimension D of about 2 mm or more. The isolated tip bottom 1001 thus functions as a buffer between the conductive electrode 1002 and the surface of the liquid to be aspirated, and is thus submerged before the conductive electrode 1002 contacts the surface of the liquid. As such, the isolated tip bottom 1001 shifts the jump in capacitance 900c beyond the initial submersion of the tip bottom 1001 (as shown in (1) in FIG. 40) to the submersion of or contact with the conductive electrode 1002 (as shown in (2) in FIG. 40).

The delay in the change in capacitance 900c due to the distance D of protrusion of the non-conductive tip bottom 1001 can be used to maintain submersion of the pipette tip 960 within the liquid. As the liquid level in a container is reduced, a loss of contact between the liquid and the conductive electrode 1002 is identified based on the change in detected capacitance 900c, before contact between the opening 962 and the liquid surface is lost. In response, the arm member 912 is controlled to move the pipettor(s) 100 along the Z-axis, such that the pipette tip 960 follows the liquid level during aspiration or dispensing while maintaining the opening 962 submerged or immersed in the liquid.

The control signal provided to the actuator mechanism 934 may thus be varied based on changes in the detected capacitance indicated by the signal from the conductive electrode 1002. The movement of the arm member 912 can be stepwise or continuous in some embodiments. For example, based on previous movement along the Z-axis, the controller circuit 920 can control the motion along the Z-axis to be more continuous or smooth.

In some embodiments, the direction of movement of the arm member 912 along the Z-axis may be mode-dependent, which may further reduce oscillation and smooth movement. For example, in aspirating mode the arm member 912 may be constrained so as to allow movement of the pipette tip 960 only in the downward direction towards the liquid, while in dispensing mode the arm member 912 may be constrained so as to allow movement of the pipette tip 960 only in the upward direction away from the liquid. That is, the actuator mechanism 934 may have a first operating mode in which the arm member 912 is restricted to motion towards the surface of the liquid along the at least one axis during the aspirating, and a second operating mode in which the arm member 912 is restricted to motion away from the surface of the liquid along the at least one axis during the dispensing.

In some embodiments, the controller circuit 920 may calculate or estimate an aspirated or dispensed volume of the liquid based on a distance of motion of the arm member 912 along the Z-axis, and may control subsequent motion of the arm member 912 along the Z-axis based on the aspirated or dispensed volume that was calculated or estimated. That is, the controller circuit 920 may utilize the variation in capacitance along with the previous movement of the arm member 912 along the z-axis to estimate the amount of liquid that has been dispensed or aspirated, and may generate the control signals to the actuator mechanism 934 to predictively move the arm member 912 in response.

The controller circuit 920 thus uses the signal from the conductive electrode 1002 to measure or determine the capacitance, and monitor variations in the capacitance to predict (e.g., from the jump or abrupt change in detected capacitance caused by a loss of contact between the conductive electrode 1002 and the liquid) that the non-conductive tip bottom 1001 of the pipette tip 960 will soon lose contact with the liquid, thereby continuously and dynamically monitoring the liquid level as it changes. In response, the controller circuit 920 transmits a control signal to the actuator mechanism 934 to move the arm member 912 holding the pipettor(s) 100 along the Z-axis (e.g., down/ towards the liquid in aspirating mode, or up/away from the liquid in dispensing mode), providing dynamic liquid level following.

The extension of the non-conductive tip bottom 1001 below or beyond the portion of the conductive electrode 1002 providing the signal for capacitance detection can allow the controller to move the arm member 912 to follow the liquid level while maintaining the opening 962 of the pipette tip 960 submerged or immersed in the liquid (due to the buffer provided by the distance D between the conductive electrode 1002 and the opposite end of the non-conductive tip bottom 1001).

Dynamic liquid level detection and following as described herein may be used with various liquid solutions, including conductive and non-conductive liquids, independent of a shape or size of a container of the liquid. For example, embodiments described herein may (but are not limited to) be used with ethanol, MilliQ water, and salted buffer solutions. The control signals provided to the actuator mechanism 934 may be continuously regulated (e.g., with non-conductive liquids), or may be regulated in a stepwise manner (e.g., for high conductive liquids).

Further embodiments described herein may arise from realization that, during or after the aspiration of liquid in a pipetting or other liquid handling system, some of the liquid will evaporate in the channel, thereby increasing the volume of trapped air, which may cause less liquid to be aspirated than intended. Precision and accuracy in pipetting performance may not be possible without compensation for evaporation.

Embodiments described herein thus provide methods for detecting whether there is evaporation in the pipetting channel, for example, during or after aspiration of a liquid. If an increase in pressure is detected in the channel, systems described herein are configured to automatically deploy countermeasures to prevent (or reduce the rate of) the evaporation. Some conventional technology may require analysis and development of liquid classes, where for each developed liquid class, compensation parameters may need to be determined and updated in the software. In contrast, some embodiments described herein do not require differentiation of liquid classes and/or the amount of evaporation to be expected per liquid class in order to quantify and/or compensate for evaporation.

Figure 42:
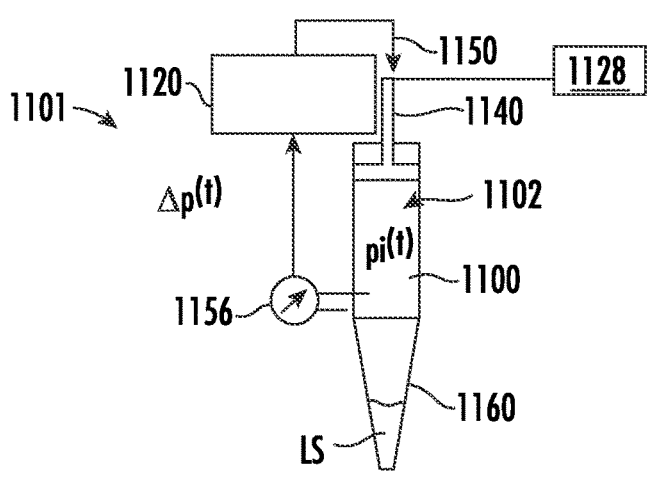
FIG. 42 is a schematic diagram illustrating an automated pipetting system configured for evaporation detection and compensation according to some embodiments.
Figure 43A:
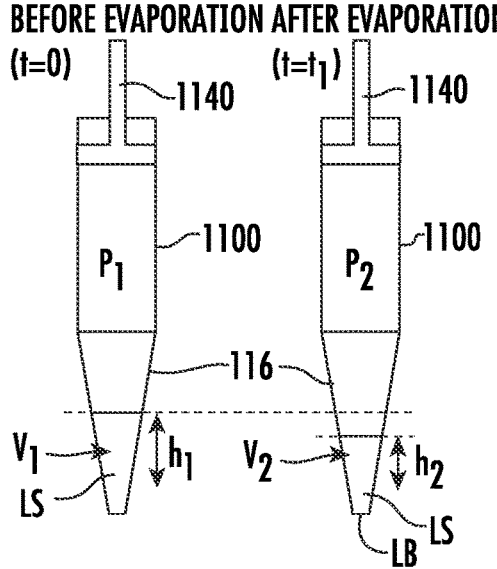
FIG. 43A is a schematic diagram illustrating evaporation detection according to some embodiments.
Figure 43B:
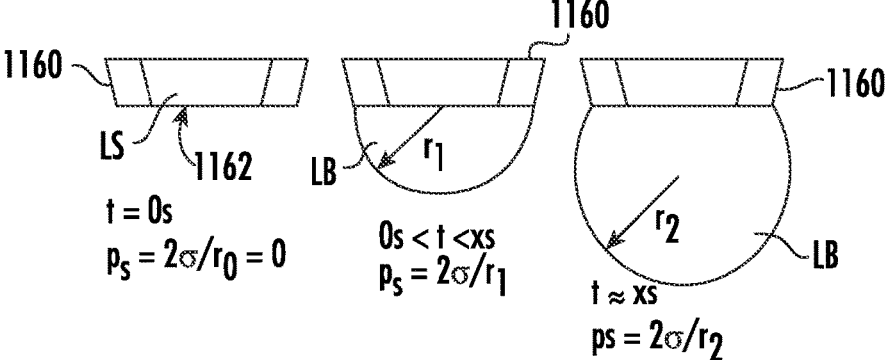
FIG. 43B is an enlarged view of the orifice of the pipette tip of FIG. 43A, illustrating liquid bead formation due to evaporation.

FIGS. 42, 43A, and 43B schematically illustrate evaporation detection in a pipette tip of an automated pipetting system 1101 according to some embodiments described herein. The system 1101 includes elements similar to the pipetting systems 101, 901 and automated liquid handling system 10 described above, and description of similar elements may be omitted for brevity.

With reference to FIGS. 42 and 43A, the system 1101 includes a pipettor 1100, one or more pressure sensors 1156 coupled to a channel 1102 of the pipettor 1100, and a controller or control circuit 1120. The controller circuit 1120 may include the controller(s) 20, 920 and associated processor 925, memory 910, and I/O circuits 915 described herein. The pressure sensor(s) 1156 are fluidly coupled to the pipetting channel 1102. In some embodiments, the pressure sensor 1156 is an in-line pressure sensor positioned in or along the pipetting channel 1102, similar to or including the pressure sensor 256 of FIG. 14, or in the pipette tip 1160 attached to the distal end of the pipettor 1100. In other embodiments, the channel 1102 fluidly communicates with the pressure sensor 1156 via a sensor port. The pipette tip 1160 can be removable or replaceable (such as the pipette tips 160, 960 described herein) or may be integrated into the pipettor 1100. More generally, the pipettor 1100 may be of any suitable type or design, and may include any suitable plunger configuration (which may include any of the pipettor and plunger configurations described herein). A drive mechanism 1128 (including one or more actuators) may be operated to drive the plunger 1140 to aspirate, dispense, and/or perform compensation operations as described herein responsive to control signals from the controller circuit 1120. The drive mechanism 1128 may be and/or may operate in a manner similar to any of the drive mechanisms (e.g., 128, 148) described herein.

Operations described herein can be executed by or through the controller circuit 1120. The controller circuit 1120 receives pressure signals from the pressure sensor 1156 indicating the pressure in the pipetting channel 1102. In particular, based on the pressure signals from the pressure sensor 1156, the controller circuit 1120 may determine a quantitative measurement of the pressure (or pressure difference) in the channel 1102. The pressure measurement may indicate air pressure or pressure of one or more other gases in the channel 1102. The controller circuit 1120 may operate the drive mechanism 1128 to control movement of the plunger 1140 in response to the signals from the pressure sensor 1156 (e.g., via feedback loop 1150) to perform aspiration, dispensing, and/or compensation operations described herein.

With reference to FIG. 43A, the controller circuit 1120 can detect evaporation of a liquid in the channel based on the pressure indicated by the signal from the pressure sensor 1156. For example, after aspiration of a liquid, a liquid sample LS may occupy a volume V1 (with a fill level h1) in the pipette tip 1160 attached to the distal end of the pipettor 1100, with an initial pressure p1 in the channel 1102. The controller circuit 1120 removes the pipette tip 1160 from the container including the liquid volume, for example, by controlling movement of the arm member 912 away from the container of a liquid volume via the actuator mechanism 934 as described herein. If evaporation occurs, the number of molecules in the gas phase in channel 1102 (and the volume between the plunger 1140 and the liquid sample LS) increases. As a result, a portion of the liquid sample LS is pushed through the opening 1162 in the pipette tip 1160 and forms a bead LB, resulting in a reduction in the volume V2 (and fill level h2) occupied by the liquid sample LS in the pipette tip 1160. The surface tension at the surface of the bead LB increases the internal pressure p2 in the channel 1102.

FIG. 43B illustrates an example of bead LB formation due to evaporation of an EtOH solution LS, for a 1 ul target volume with a 10 ul tip volume. As shown in FIG. 43B, after removal of the pipette tip 1160 from the liquid volume but before evaporation occurs, the liquid sample LS is fully contained in the pipette tip 1160. With the pipette tip 1160 removed from the liquid volume, the opening 1162 is sealed by the effect of surface tension, such that changes in pressure in the channel 1102 can be attributed to evaporation. As evaporation occurs, pressure in the channel 1102 may increase, such that the liquid sample LS is forced out of the opening 1162 in the tip 1160, forming a bead LB as long as the radius of the bead decreases. With ongoing evaporation, the bead reaches the shape of a hemisphere (shown with radius r1), at that time the bead radius starts increasing (shown with radius r2) and the pressure inside the channel 1102 decreases again.

The controller circuit 1120 utilizes the signals from the pressure sensor(s) 1156 to measure the pressure inside the channel and the displacement volume. More particularly, the signals from the pressure sensor(s) 1156 can be used to monitor the pressure change inside the channel 1102 after aspiration, due to the change in volume caused by evaporation and bead formation (e.g., from volume V1 before evaporation to volume V2 after evaporation was ongoing for some time).

Figure 44A:
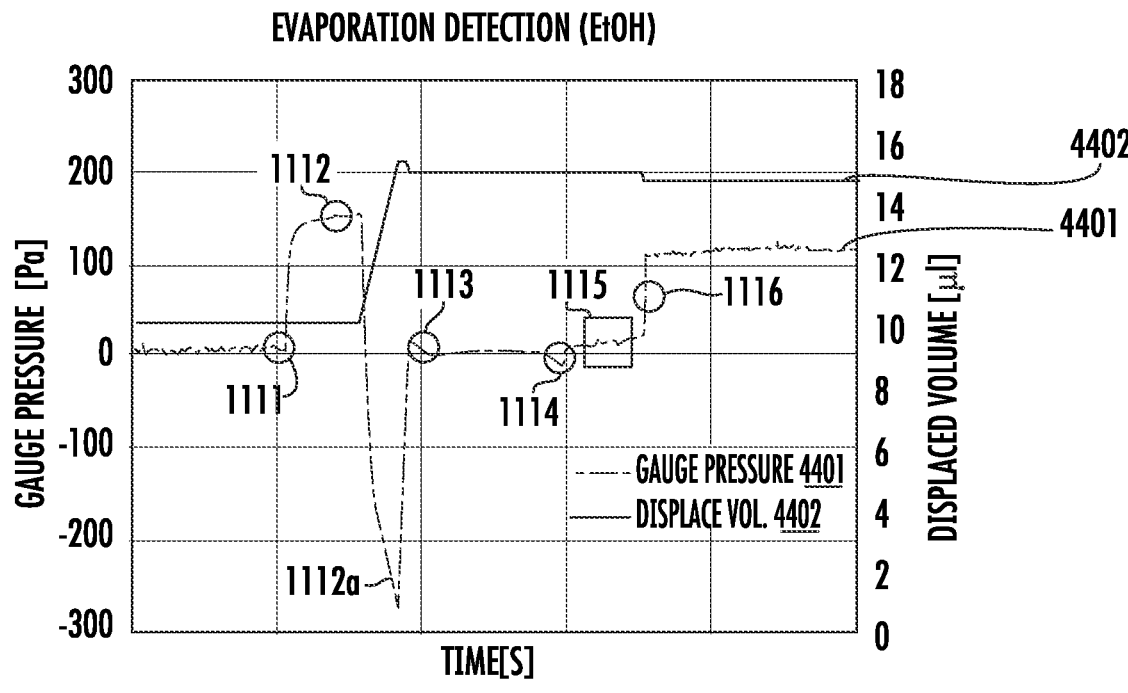
FIG. 44A is a graph illustrating changes in pressure and displaced volume in operations for evaporation detection operations according to some embodiments.
Figure 44B:
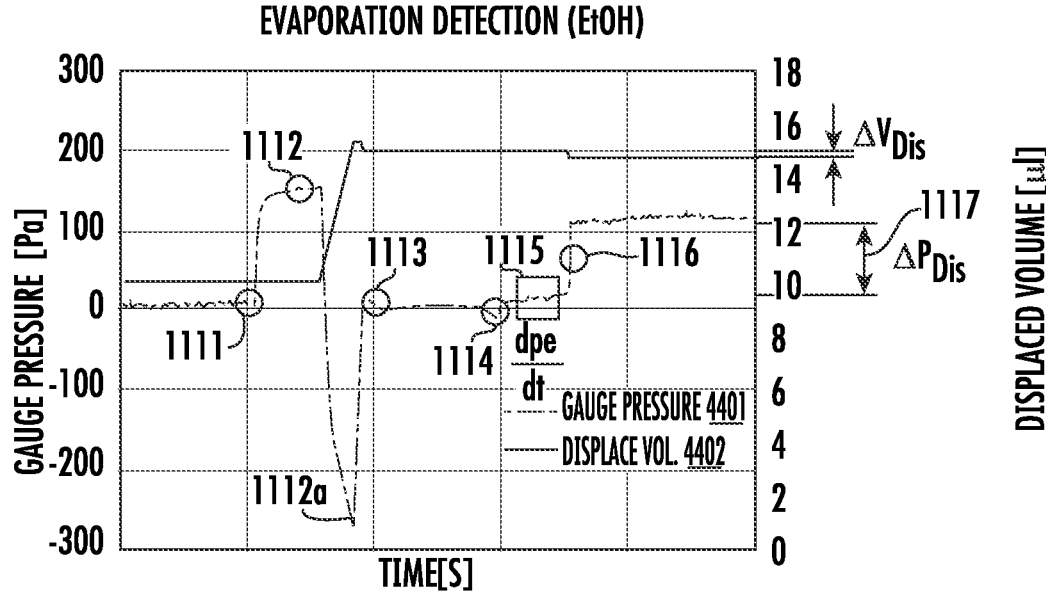
FIG. 44B is a graph illustrating changes in pressure and displaced volume in operations for evaporation detection operations according to further embodiments.

Operations which may be performed by the controller circuit 1120 to control the position and aspiration of the pipettor 1100 and detecting changes in pressure in the channel 1102 to detect evaporation are described below with reference to the graphs of FIGS. 44A and 44B and the flowchart of FIG. 45. In the graphs of FIGS. 44A and 44B, line 4401 indicates the gauge pressure (in Pascals (Pa)) determined from the signals from the pressure sensor(s) 1156, and line 4402 indicates the volume displaced by the plunger 1140 (in microliters (A)).

Figures 45, 46A, 46B:
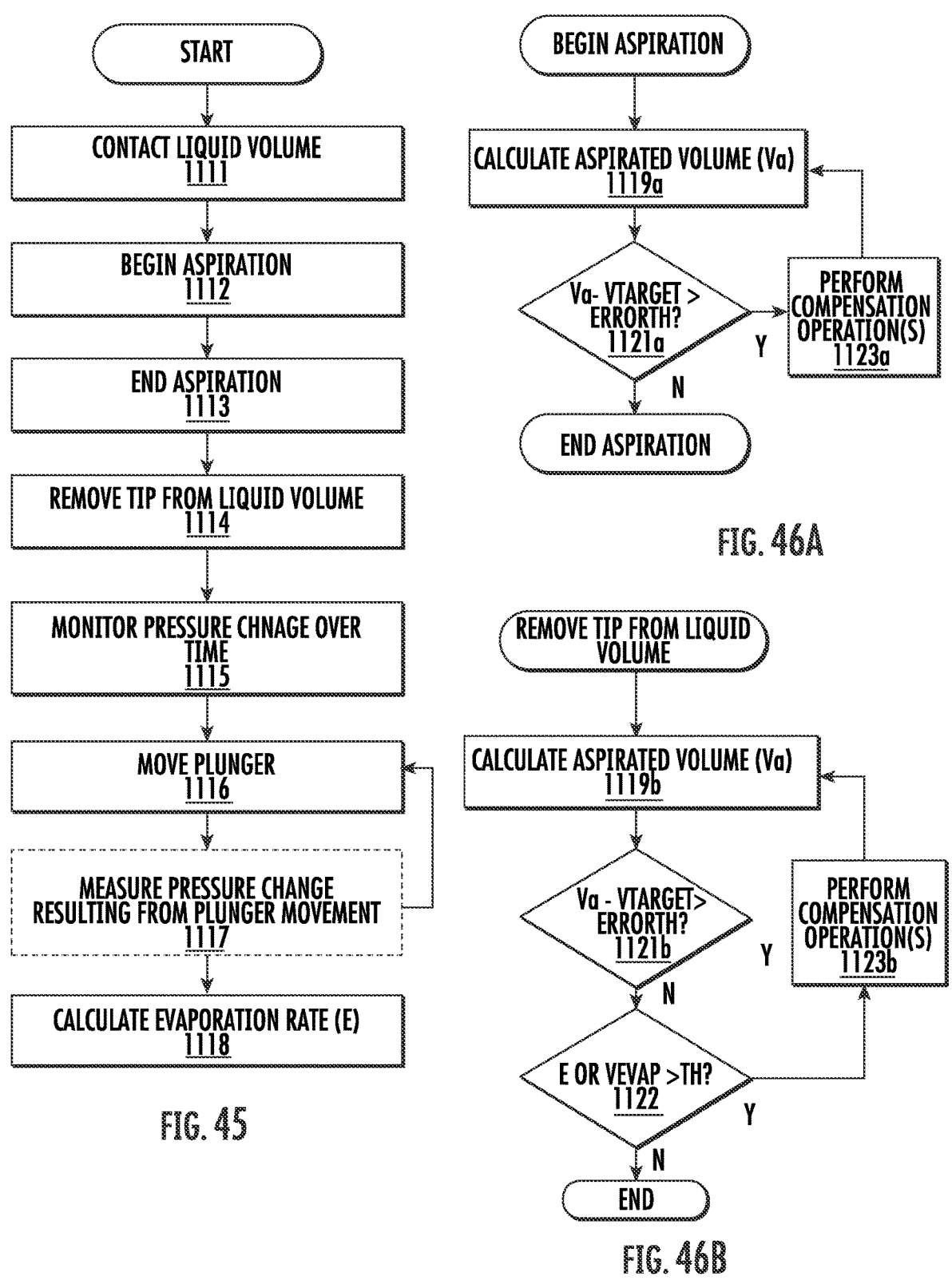
FIG. 45 is a flowchart diagram illustrating operations for evaporation detection in a pipette tip according to some embodiments.
FIGS. 46A and 46B re flowchart diagrams illustrating operations for evaporation compensation in a pipette tip according to some embodiments.

With reference to FIGS. 44A, 44B and FIG. 45, the pipettor 1100 is moved (e.g., via arm member 912 responsive to control signals provided to actuator 934) such that the pipette tip 1160 contacts a liquid volume to be aspirated, as shown at step 1111. Capillary effects may force the liquid into the pipette orifice 1162 in response to the contact (thereby increasing the pressure in the pipetting channel 1102 as shown at step 1112). The liquid sample LS is aspirated into the pipettor 1100, as shown at step 1112a, by driving the plunger 1140 responsive to control signals from the controller circuit 1120. At step 1113, aspiration is completed, and at step 1114 the pipette tip 1160 is removed from the liquid volume (e.g., via arm member 912 and actuator 934). When the pipette tip 1160 is in the air, the orifice 1162 may be substantially sealed by the surface tension of the liquid sample LS, such that changes in pressure in the channel 1102 may be due to evaporation. With the tip 1160 in the air or otherwise removed from the liquid volume, the pressure change over time dp/dt is monitored as shown at step 1115 based on the signals from the pressure sensor(s) 1156. The plunger 1140 may also be moved in the channel 1102 (e.g., by the drive mechanism 1128 responsive to a control signals from the controller 1120) by a relatively small distance or displacement $\Delta V_{Dis}$ to probe the elasticity of the system (e.g., a combination of air cushion elasticity and surface tension) at step 1116. The change in volume $\Delta V_{Dis}$ due to displacement of the plunger 1140 may be small enough to avoid dripping of the liquid bead LB from the tip 1160.

Evaporation of the liquid sample LS may be detected if the signals from the pressure sensor(s) 1156 indicate an increase in pressure over time, e.g., between 1114 and 1116. The pressure may be monitored at step 1115 immediately after removal of the tip 1160 from the liquid volume (i.e., prior to bead formation LB), to ensure accuracy.

In addition to detection of evaporation, the rate of evaporation is calculated at step 1118, in some embodiments along with estimation of an aspiration error induced by the evaporation. For example, the evaporation rate may be calculated based on a change in the pressure indicated by the pressure signal over time (i.e., the slope of the line 4401) as monitored at step 1115, in some embodiments together with the measurement of a pressure change resulting from the movement of the plunger 1140 at step 1116. The evaporation rate may be proportional to the change in the pressure over time dp/dt. As shown in FIG. 44A, the pressure change rate measurement (and thus the evaporation rate) can be determined by line fit to the pressure curve between removal of the pipette tip 1160 from the liquid volume at step 1114 and piston or plunger displacement at step 1116.

As noted above, in some embodiments the evaporation rate may be calculated using in addition the measurement of a pressure change resulting from the movement of the plunger 1140 at step 1116. In particular, at step 1117, the change in the pressure $\Delta p_{Dis}$ (as indicated by the pressure signal from the pressure sensor(s) 1156) caused by the change in volume $\Delta V_{Dis}$ resulting from the plunger displacement at step 1116 is measured and used to calculate the evaporation rate at step 1118. That is, as shown in FIG. 44B, the pressure response $\Delta p_{Dis}$ due to the small volume change $\Delta V_{Dis}$ responsive to the movement of the plunger 1140 in the channel 1102 may be used to calculate the evaporation rate $E=dVe/dt$ from the pressure change rate measurement, using the following equation:

$$\frac{dV_e}{dt} = \frac{\Delta V_{Dis}}{\Delta p_{Dis}}\frac{dp_e}{dt}$$

Note that the described methods do not require prior knowledge of the aspirated liquid class for the determination of the evaporation rate. Liquid class dependencies are eliminated because the dependence on surface tension of the terms $\Delta V_{Dis}/\Delta p_{Dis}$ and dpe/dt cancel each other in the proposed formula.

The evaporation rate may be determined by continuously controlling the position or displacement of the plunger 1140 in the channel 1102 based on the pressure indicated by the pressure signal, such that the pressure in the channel 1102 is maintained substantially constant. Under the condition of constant pressure, the evaporation rate is directly given by the displacement rate of the plunger 1140 as the following equation illustrates:

$$\frac{dV_e}{dt} = \frac{dV_{Dis}}{dt}$$

As such, the system 1101 can detect that evaporation has occurred based on the pressure (or change in pressure) in the channel 1102 or tip 1160, as indicated by the signals from the pressure sensor(s) 1156. While the graphs of FIGS. 44A and 44B illustrate example operations from experimental data using EtOH as the liquid sample LS, it will be understood that the detected pressure changes (and calculated evaporation rates) may significantly differ based on the material of the liquid sample LS. For example, using $H_2O$ as the liquid sample LS may result in a significantly smaller pressure change and calculated evaporation rate in response to the operations of FIG. 45. In some embodiments, comparison of the differences in pressure change and/or evaporation rate may be used for identification of the liquid sample LS in the pipette tip 1160. However, in the example operations described herein, the evaporation rate may be calculated independent of a surface tension or type of the liquid of the aspirated liquid sample LS. That is, evaporation detection and calculation of evaporation rate as described herein can be performed based on the pressure change rate measurement without determining the surface tension of the liquid sample LS, and without prior knowledge or identification of the liquid class of the liquid sample LS.

The evaporation rate E (as calculated at step 1118) and the aspiration time (i.e., the duration of the aspiration between steps 1112 and 1113) can be used to estimate the additional gas or vapor volume that is generated by evaporation during aspiration, also referred to herein as the evaporation volume (Vevap). The evaporation volume Vevap may be equal to or otherwise indicate the amount of under-aspiration caused by the evaporation. Embodiments described herein may thus use the estimated evaporation volume Vevap as a relevant parameter to decide whether the evaporation rate is low enough to be tolerated, or whether evaporation is greater than a predetermined threshold (TH) for reducing or compensating for the evaporation. The threshold for such a determination may vary based on the desired accuracy; for example, if 5% accuracy is acceptable for a particular dispensing application, an evaporation volume of less than 5% of the target volume may be tolerable, while an evaporation volume of more than 5% of the target volume may require compensation.

Referring again to FIG. 42, a feedback loop 1150 may be used to perform compensation operations automatically or programmatically, e.g., based on calculation of the evaporation rate from the pressure signals and comparison of the evaporation rate to the threshold. For example, if the evaporation rate E is above the threshold TH, one or more countermeasures may be initiated by the controller circuit 1120 (e.g., by repeating the aspiration and by operating the drive mechanism 1128 to adapt the aspiration by the plunger 1140) to compensate for the detected evaporation.

FIGS. 46A and 46B are flowcharts illustrating evaporation compensation operations during aspiration (e.g., between blocks 1112 and 1113 of FIG. 45) and after tip removal (e.g., after block 1114 of FIG. 45), respectively, in accordance with some embodiments. The compensation may include multiple operations performed by the controller circuit 1120 based on the pressure signals from the pressure sensor 1156 to compensate for the evaporation. For example, the evaporation compensation operations may include performing a prewetting operation (by which an amount of the liquid is aspirated and dispensed prior to aspirating the liquid for delivery), adapting one or more aspiration parameters (e.g., to over-aspirate a further amount of the liquid volume to compensate for under-aspiration due to evaporation), and/or controlling movement of the plunger 1140 in the pipetting channel 1102 (e.g., to maintain a defined or predetermined constant pressure in the pipetting channel 1102 and/or in the pipette tip 1160 to avoid dripping).

With reference to FIG. 46A, aspiration (e.g., at or during step 1112 of FIG. 45) may include calculating an aspirated volume (Va) of the liquid sample LS at step 1119a. The calculation of the aspirated volume Va at step 1119a may account for expansion of the air cushion (AC in FIG. 16). For example, the aspirated volume Va may change by an equal amount or in proportion to changes in the air cushion volume. In some embodiments, the aspirated volume Va may be calculated as follows:

$$Va=(pi-pa)V_0/pa+A\Delta x,$$

where pi/pa represents the pressure inside/outside the channel, $V_0$ represents the initial air cushion volume, A is the plunger cross sectional area, and $\Delta x$ represents the distance of plunger movement.

At step 1121 the calculated aspirated volume Va is compared to a desired or target volume (Vtarget). In some embodiments, a control loop may be used to reduce or minimize a difference between the aspirated volume Va and the target volume Vtarget. For example, the controller circuit 1120 may include a proportional-integral-derivative controller (PID controller) that uses a control loop mechanism employing feedback to continuously calculate an error value as the difference between a desired target volume Vtarget and the aspirated volume Va and apply a correction to the plunger movement. In particular, if the comparison of the aspirated volume Va to the target volume Vtarget is beyond a desired error threshold (i.e., if Va−Vtarget>errorTH), compensation operations may be performed at step 1123*a*. For example, one or more aspiration parameters may be adapted to reduce the aspiration error, and the aspiration may be altered or repeated based on the adapted parameters. The operations of FIG. 46A for calculating the aspirated volume Va at step 1119*a*, comparing the aspirated volume Va to the target volume Vtarget at block 1121*a*, and using the comparison result (Va−Vtarget) as input to a control loop for controlling or correcting the plunger movement may be continuously performed during aspiration in order to reduce or minimize the difference between the calculated aspirated volume Va and the target volume Vtarget. The operations of FIG. 46A are performed with the tip submerged (e.g., before step 1114 of FIG. 45). The calculation at step 1119*a* is based on a known plunger position and the air volume expansion (or contraction) derived from the measured gauge pressure. The operations of FIG. 46A may be independent of evaporation, and thus may be performed even if the evaporation rate was not assessed in a previous pipetting step.

Additionally or alternatively, in FIG. 46B, the aspirated volume Va may be calculated (or recalculated if the operations of FIG. 46A have been previously performed) at step 1119*b* based on the change in the pressure indicated by the signals from the pressure sensors 1156 after the removing the pipette tip 1160 from the liquid volume (e.g., at step 1114 of FIG. 45). At this time, effects of unintended liquid inflow during withdrawal of the tip as may be caused by the effect of surface tension is reflected in the aspirated volume Va. If the (re)calculated aspirated volume Va is less than the target volume Vtarget by a sufficient margin at step 1121*b*, one or more aspiration parameters are adapted at step 1123*b*, and aspiration is repeated. For example, a further amount of liquid may be over-aspirated (based on the calculated or estimated evaporation rate) to compensate for the initial under-aspiration caused by the evaporation, thereby ensuring that the desired amount of liquid is delivered. In some cases, it may be enough to report or log the aspiration error (Va−Vtarget).

At step 1122, the calculated evaporation rate E (or evaporation volume Vevap) is compared to a threshold TH. For example the threshold TH may be volume-based for comparison to the calculated evaporation volume Vevap. If the evaporation volume or rate is below the threshold TH, no action may be taken. If the evaporation rate or volume exceeds the threshold TH, one or more compensation operations are performed at step 1123*b*, and the aspirated volume Va is recalculated at step 1119*b*. As such, the evaporation rate can be accounted for in the calculation of Va. Based on the recalculated aspirated volume Va at step 1119*b*, the system can decide on and perform compensation measures at step 1123*b* to increase accuracy (e.g., repeating a pipetting step, prewetting, adapting parameters, or simply logging or reporting the deviation from the target volume Vtarget).

The operations shown in FIGS. 46A and 46B may be performed in combination, or independently of one another. That is, the operations of FIGS. 46A and 46B may be performed sequentially, or the operations of FIG. 46A may be performed during aspiration without further performing the operations of FIG. 46B after tip removal, or the operations of FIG. 46B may be performed after tip removal without performing the operations of FIG. 46A during aspiration.

As noted above, the evaporation compensation operations at steps 1123*a*, 1123*b* may include, but are not limited to, prewetting, adapting aspiration parameter(s), and/or controlling plunger movement. For example, a prewetting operation may be performed at step 1123*a*, 1123*b* to reduce or prevent evaporation in the tip 1160. Prewetting can increase humidity within the pipette tip 1160, thereby reducing or prevent evaporation in the tip air space and increasing accuracy of the aspiration. Prewetting of the pipette tip can thus reduce or eliminate the pressure change indicated by the signals from the pressure sensor(s) 1156.

Additionally or alternatively, one or more aspiration parameters may be adapted at steps 1123*a*, 1123*b* (e.g., to over-aspirate to compensate for under-aspiration, or vice versa), as discussed above. For example, when aspirating water, water surface tension may lead to a measurable inflow into the tip 1160 during withdrawal at step 1114, which can be corrected by reducing the amount of aspiration.

In addition to or as an alternative to the above, at step 1123*b*, the plunger 1140 in the pipetting channel 1102 may be controlled to move by a distance sufficient to maintain a defined or predetermined constant pressure in the pipette tip 1160 and/or channel 1102. For example, the position or displacement of the plunger 1140 in the channel 1102 may be continuously controlled based on the pressure indicated by the pressure signal, such that the pressure in the channel 1102 and/or tip 1160 is maintained substantially constant, as discussed above. The constant pressure may be a predetermined pressure, or may be based on the measured pressure in the channel immediately after removal of the pipette tip from the liquid volume (e.g., at step 1114). Keeping the pressure constant or moving the plunger 1140 to aspirate a small amount of air (after liquid aspiration and removal of the tip 1160 from the liquid volume) may thus reduce or avoid dripping from the bead formation LB at the orifice 1162 of the pipette tip 1160. The pressure sensor(s) 1156 may be provided in the channel 1102 or pipette tip 1160 to provide the pressure signals with a high level of precision (sufficient to counteract tip bead formation LB) even with small volumes of trapped air, e.g., as described herein with reference to dual plunger pipettor (e.g., pipettor 100), serial plunger pipettor (e.g., pipettor 200), and/or dual metering pipette (e.g., pipettor 1200) embodiments.

It will be understood that the adaptation of pipetting parameters and/or other compensation operations at steps 1123*a*, 1123*b* are not limited to evaporation compensation. For example, as noted above, adapting the aspiration based on a difference between the calculated aspirated volume Va and the target volume Vtarget may also provide hydrostatic and capillary pressure compensation. The compensation operations may also include providing a viscosity-dependent pipetting speed (e.g., by adapting the aspiration speed based on the change in the pressure Δp indicated by the signals from the pressure sensors 1156 relative to a target pressure change Δp$_{target}$), and/or heat transfer compensation (e.g., by initiating prewetting if the temperature of the liquid is below a minimum temperature). Such operations may be used to effectively compensate for differences in liquid density, surface tension, wettability, and/or viscosity of the liquid sample LS.

Further embodiments described herein may arise from realization that, in conventional pipetting or other liquid handling systems, a precise piston or plunger control system is typically used to control the displacement of air. For example, some pipetting systems aspirate liquid into a disposable tip and dispense the liquid into another container, with an air cushion AC between the liquid sample LS and the pipetting channel, also referred to as an air displacement pipette or pipette tip. This may avoid cross-contamination of the pipettor with different liquid samples. The pipetting performance may primarily be derived from the geometry (i.e., based on the distance of movement or stroke of the piston or plunger within the interior volume or bore of the pipette) and precision and/or accuracy of the plunger control motor that operates the plunger, with the higher the positioning precision and accuracy, the better the pipetting performance (e.g., with respect to over- or under-aspiration). Therefore, conventional pipetting performance may be limited to the resolution of the encoder for the plunger control motor.

Embodiments described herein provide a dual metering pipetting system that is configured to control plunger position based on an amount of displaced air in the pipetting channel, as determined from a sensor signal (for example, as output from a flow rate sensor coupled to the pipetting channel). The system may also include a negative or positive pressure source coupled to a valve and/or flow restriction mechanism. The air flow over time (flow rate) indicated by the sensor signal can be used to determine the amount of air displaced (i.e., a displaced air volume) in the channel. The flow rate sensor may have sufficient sensitivity to measure a wide range of flow rates (e.g., over a range of measurement of an order of magnitude or more), which may be difficult to implement using conventional encoder and plunger control motors.

In some embodiments, the flow rate sensor may be implemented by a pressure sensor with sufficient sensitivity to provide a feedback loop for controlling the channel pressure/air displacement volume. For example, the flow rate sensor may be implemented by two pressure sensors in a parallel arrangement (also referred to herein as a dual metering or dual flow sensor) across a flow restriction mechanism. The flow rate sensor, valve, and pressure source (s) may thus provide a control loop to control the liquid flow inside the pipetting channel, with the inline measurement provided by the flow rate sensor, allowing for precise and accurate control of the liquid flow. As the plunger position can be determined based on the air displacement volume calculated from the flow rate or pressure change measurement, highly precise plunger movement may not be required, and thus precision requirements for the plunger control motor and/or encoder may be relaxed.

Figures 47, 48:
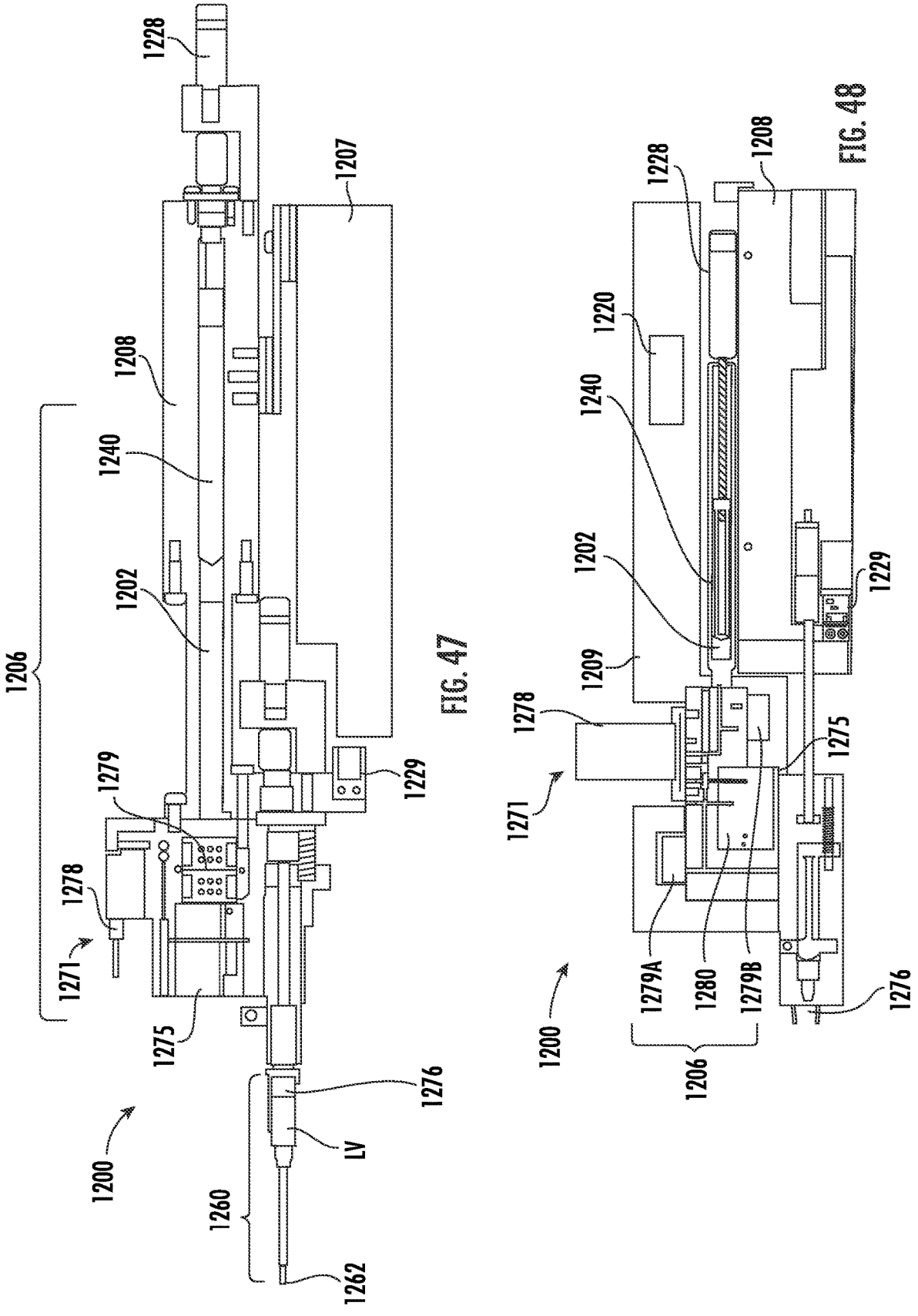
FIG. 47 is a side view illustrating a dual metering pipettor that may be used in an automated pipetting system according to some embodiments.
FIG. 48 is an enlarged schematic diagram illustrating a dual metering pipettor according to some embodiments.

FIG. 47 is a side view illustrating a dual metering pipettor that may be used in an automated pipetting system according to some embodiments. FIG. 48 is an enlarged schematic diagram illustrating the dual metering pipettor of FIG. 47 with the pipette tip removed. The automated pipetting system (e.g., 101, 901, 1101) may include one or more of the illustrated pipettors 1200. If multiple pipettors 1200 are provided, the pipettors 1200 may be operated independently of one another or in tandem. For the purpose of discussion, only a single pipettor is described below.

With reference to FIGS. 47 and 48, the pipettor 1200 includes a mechanical interface 1207, a frame 1208, an electrical interface (shown as a printed circuit board) 1209, a pressure control system 1206, a tip mount feature or adaptor 1276, and a manifold 1275. The pressure control system 1206 includes sensors 1279A, 1279B, 1280, a plunger 1240 in the pipetting channel 1202 and controlled by a drive mechanism 1228, and an air flow control system 1271 including a valve 1278 and a switchable flow restriction mechanism 1277 (see FIG. 53) that is operable to couple the channel 1202 to a pressure source. A pipette tip 1260 can be attached to the tip adaptor 1276 and includes a pipetting orifice 1262 and a liquid collection volume LV that are in fluid communication with the pipetting channel 1202 via passages 1274 in the manifold 1275. As used herein, the pipetting channel 1202 may generally include features in communication between the tip 1260/adaptor 1276 and the chamber or barrel including the plunger 1240 therein.

The plunger mechanism is operable in response to control signals provided to the drive mechanism 1228 to translate the plunger 1240 to change a pressure in the pipetting channel 1202 to aspirate or dispense a liquid volume. The drive mechanism 1228 may be a linear drive system including a plunger actuator and an encoder. A linear sensor 1229 (e.g., with about 1 μm resolution) may be configured to measure a deflection caused by a tip 1260 which touches the side wall of a vessel.

The components of the pipettor 1200 may be mounted on the frame 1208. The mechanical interface 1207 may couple the pipettor 1200 to automated pipetting systems (e.g., 101, 1101) as described herein. For example, the mechanical interface 1207 may provide a mechanical coupling between the frame 1208 (including the components of the pipettor 1200 thereon) and an arm member (e.g., 912) of a robotic arm assembly (e.g., 914) to control movement of the pipettor 1200 along one or more axes (e.g., the Z-axis) as described herein.

The electrical interface 1209 may include one or more controller circuits 1220 (which may include any of the controller circuits 20, 920, 1120 described herein), including an input/output (I/O) circuit (e.g., 915), memory (e.g., 910), processor/microcontroller (e.g., 925), and driver circuits for the motors/drive mechanisms 1228. Readout and preprocessing functions of the sensors 1279, 1280 may also be performed via the electrical interface 1209. More generally, the memory may be a non-transitory storage medium configured to store computer readable instructions therein, and the controller circuit 1220 may be configured to execute the computer readable instructions stored in the memory to perform operations as described herein.

Accordingly, pipetting control operations described herein can be executed by or through the controller circuit 1220. The controller circuit 1220 receives sensor signals from one or more of the sensors 1279A, 1279B, 1280 coupled to the pipetting channel 1202. The sensors include pipetting channel pressure sensors 1279A, 1279B (which may include the pressure sensors 179 described herein) and sensor 1280 configured to output a sensor signal from which the air displacement in the channel 1202 can be determined, described herein primarily with reference to a flow rate sensor 1280. The pipetting channel pressure sensors 1279A, 1279B may include the pressure sensors 179 described herein. The flow rate sensor 1280 may be configured to output sensor signals indicating a flow rate in the channel 1202, for example, as detected or otherwise identified based on pressure change data of air (or other gases) in the channel 1202.

Based on the sensor signals from the sensor 1280, the controller circuit 1220 may determine a displaced air volume in the channel 1202. The controller circuit 1120 may transmit one or more control signals (e.g., to a pressure source) to control a position of the plunger 1240 in the channel 1202 based on the displaced air volume in the channel 1202 or otherwise in response to the signals from the pressure sensor 1279A, 1279B, 1280 to perform aspiration and/or dispensing operations described herein. The control signals may include, but are not limited to, the plunger actuator signals that directly operate the drive mechanism 1228 and/or associated control signals, such as flow restriction control signals that operate or control the operating state of a flow rate or flow restriction mechanism 1277 (see FIG. 53), and/or valve control signals that operate or control the operating state of the valve 1278. The pressure source to provide the pressure difference which drives the flow can thus be the plunger 1240/actuator 1228, a pressure reservoir 1290 (see FIG. 53), or other pump mechanism.

The valve 1278 is operable to couple the channel 1202 to a pipette tip 1260 mounted on the tip adaptor 1276 and/or to a pressure source (see FIG. 53) responsive to a valve control signal from the controller circuit 1220. As described in greater detail below, the pressure source may include a negative pressure source and a positive pressure source, which can be selected (responsive to operation of the valve 1278 and the switchable flow restriction 1277) to control a direction of the air flow in the channel 1202.

Figure 49:
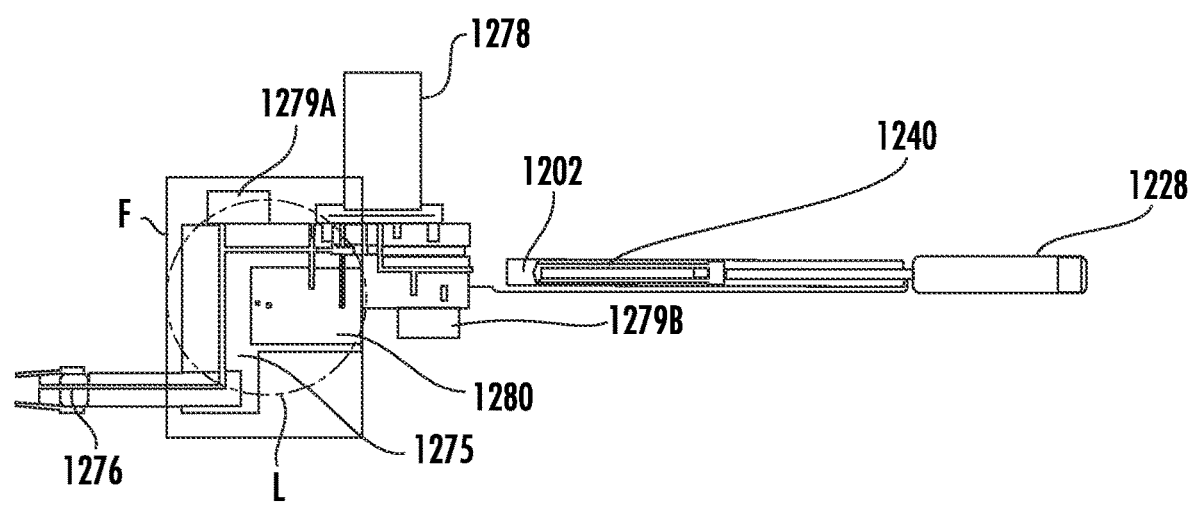
FIG. 49 is a simplified schematic diagram illustrating the plunger and manifold assembly of a dual metering pipettor according to some embodiments.
Figure 50:
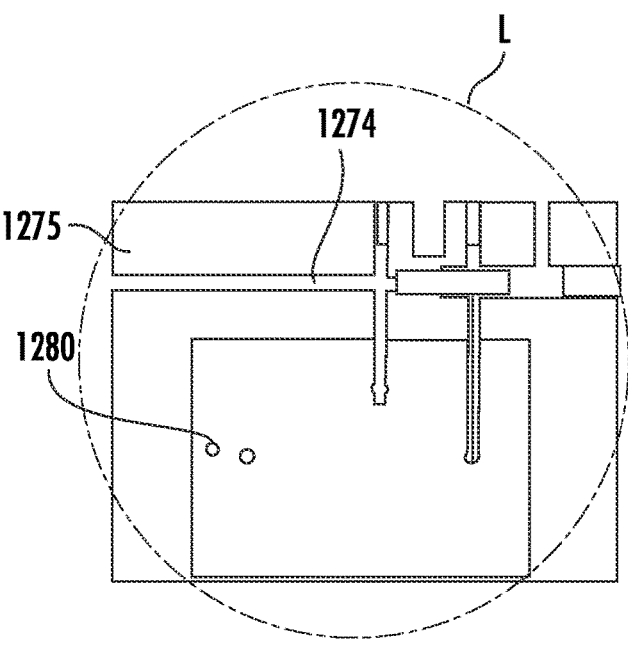
FIG. 50 is an enlarged schematic diagram illustrating the manifold and flow rate sensor of the dual metering pipettor of FIG. 49 according to some embodiments.

FIG. 49 is a simplified schematic diagram illustrating the plunger 1240 and manifold assembly 1275 of the dual metering pipettor of FIG. 48. FIG. 50 is an enlarged view of the area L in FIG. 49, illustrating the microfluidic manifold 1275 and the flow rate sensor 1280 in greater detail. With reference to FIGS. 49 and 50, the manifold 1275 interconnects the pipet-Ling channel 1202 and plunger 1240 with the pressure sensors 1279, 1280 and the valve 1278. The manifold 1275 includes a plurality of microfluidic passages 1274 therein that are configured to couple the channel 1202 to the tip adaptor 1276 responsive to operation of the valve 1278. A dead volume or death volume (i.e., a residual volume of the aspirated liquid that may be lost to waste) may be defined within the area F, for example, as resulting from connections provided by the microfluidic passages 1274 and/or sensor volumes.

The manifold 1275 compactly integrates the pipette channels 1274, sensors 1279A, 1279B, 1280, and valve 1278 operably coupled with the plunger 1240, thus reducing the distances of all interconnected fluid channels. In some such embodiments, the manifold 1275 may be configured to reduce or minimize the dead volume (for example, to provide death volumes of less than about 120 μl) based on one or more dimensions of the microfluidic passages or channels 1274 therein. For example, each passage 1274 in the microfluidic manifold 1275 may have a diameter in the range of from about 0.2 mm to 0.8 mm. In the illustrated embodiment, the flow rate sensor 1280 is coupled to the microfluidic passages 1274 to provide the pressure change measurements described herein. Some embodiments described herein may provide precise pressure change measurements with death volumes of less than about 50 μl, or with a volume range from about 50 μl to 100 μl.

Figures 51, 52:
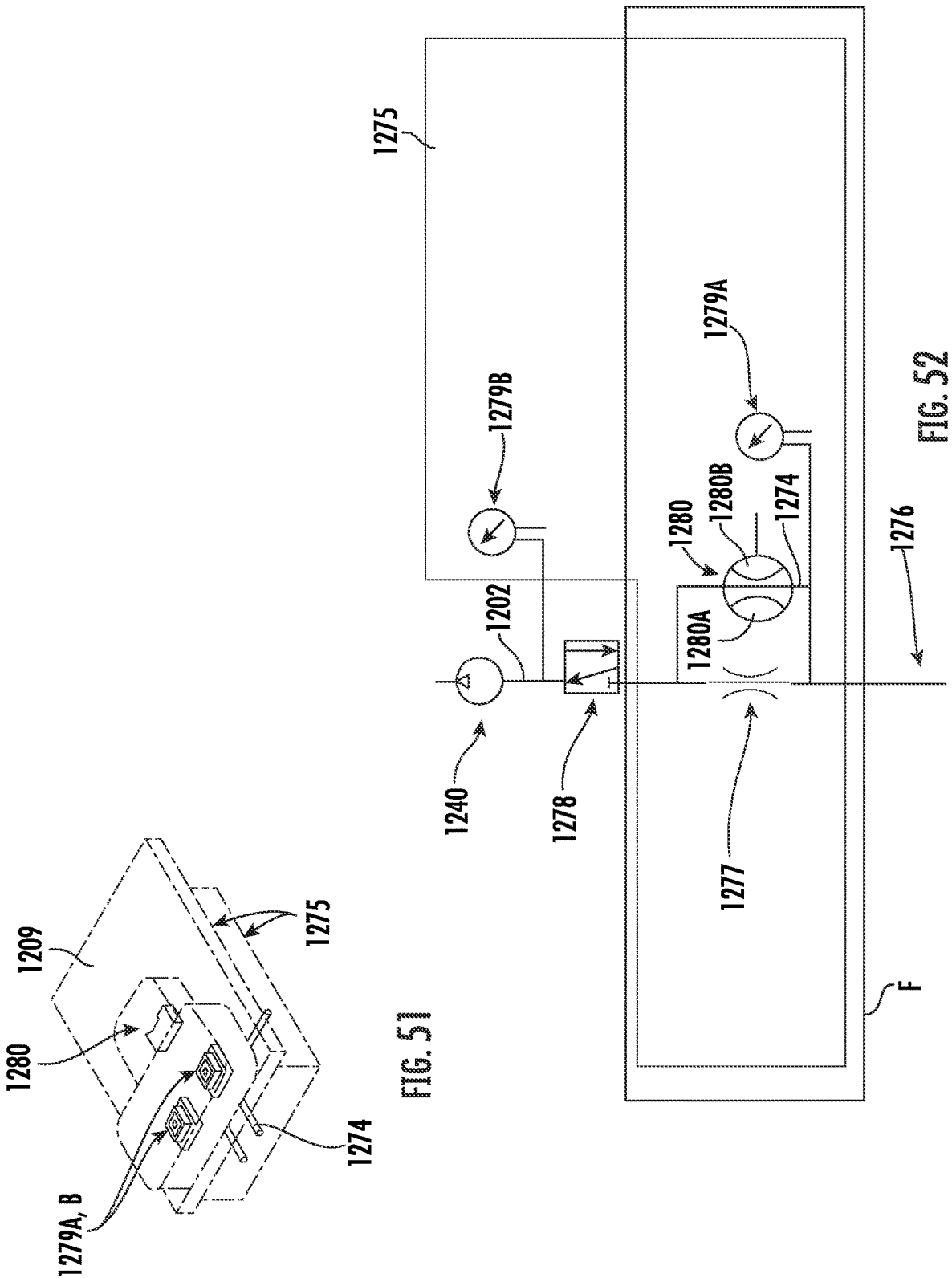
FIG. 51 is an enlarged perspective view further illustrating a manifold assembly according to some embodiments.
FIG. 52 is a schematic diagram illustrating connections of pressure sensors in dual metering pipettor according to some embodiments.

FIG. 51 is a perspective view of the manifold 1275 mounted on a portion of the PCB 1209 including the pressure sensors 1279A, 1279B and the flow rate sensor 1280, also referred to herein as a manifold assembly. As shown in the manifold assembly of FIG. 51, the manifold 1275 and the sensors 1279, 1280 may be mounted on opposite sides of the PCB 1209 in some embodiments, with the microfluidic passages 1274 routed under and/or through the PCB 1209 for coupling to the sensor(s) 1279 and/or 1280. The PCB 1209 may include metallized holes to prevent swelling when exposed to moisture. The air connections and/or sensor connections provided by the microfluidic passages 1274 may provide a death volume of less than about 50 μl in some embodiments. The manifold 1275 may also be used in some embodiments without the flow rate sensor 1280 (e.g., in the dual plunger embodiments of FIGS. 2-13), with a further reduction in death volume (e.g., less than about 20 μl). That is, it will be understood that dual metering pipettors as described herein may be operable with single- or dual-plunger embodiments, as the air displacement is precisely measured based on integration of two or more pressure sensors 1279A, 1279B in the manifold 1275 as described herein.

FIG. 52 is a schematic circuit diagram illustrating connections of the sensors 1279, 1280 in the manifold 1275. With reference to FIG. 52, the valve 1278 is operable to couple the channel 1202 (including the plunger 1240 therein) to the pipette tip 1260 mounted on the tip adaptor 1276. A pressure sensor 1279B configured to provide a relatively higher range of pressure measurement (e.g., up to about 350 millibar or more) is mounted on the manifold 1275 and is coupled via the microfluidic passages 1274 to the channel 1202, which may define a relatively large swept volume (e.g., with a relatively large diameter (~6 mm) plunger 1240 therein). A pressure sensor 1279A configured to provide a relatively lower range of pressure measurement (e.g., up to about 10 millibar or more) is mounted on the manifold 1275 and coupled via the microfluidic passages 1274 to the pipette tip 1260 on the tip adaptor 1276. In some embodiments, an additional pressure sensor 1256 (such as the pressure sensors 256, 1156 described herein) may be included in or coupled to the pipette tip 1260. A relatively small death volume may be defined by the connections provided by the microfluidic passages 1274 and/or sensor volumes within the area F.

The flow rate sensor 1280 is coupled to the pipetting channel 1202 (e.g., between the pipetting channel 1202 and the pipette tip 1260 or tip adaptor 1276) and is configured to output a sensor signal indicating a rate of air flow in the channel 1202, for example, based on detected pressure or pressure change data. For example, the flow rate sensor 1280 may be a dual metering or differential pressure sensor including first and second pressure sensors 1280A and 1280B coupled to the channel 1202 via the microfluidic passages 1274 in a parallel arrangement. The first and second pressure sensors 1280A and 1280B may output respective signals including first and second pressure data indicating first and second flow rates, respectively. In some embodiments, a range of measurement of the second pressure sensor 1280B may be greater than that of the first pressure sensor 1280A, e.g., by an order of magnitude or more, which may allow for flow measurements with increased dynamic range. For example, changes in flow rate near zero may result in extremely small pressure differences, which may be difficult or impossible to detect using a pressure sensor that is configured to detect larger pressure variations in the channel 1202.

As such, in some embodiments, the first pressure sensor 1280A may be highly-sensitive so as to detect sub-pascal (Pa) variations at low pressures (e.g., less than about 50 Pa), while the second pressure sensor 1280B may have a broad measurement range, so as to detect variations at high pressures (e.g., up to about 5000 Pa). The first and second pressure data indicated by the respective outputs of the first and second pressure sensors 1280A and 1280B may be combined by the controller circuit 1220. That is, the controller circuit 1220 may include signal processing capability so as to stitch together the respective pressure data provided by the first and second pressure sensors 1280A and 1280B, thereby providing an increased dynamic range of flow measurement.

Referring again to FIGS. 47 and 48, the controller circuit 1220 may be configured to determine a displaced air volume in the channel 1202 based on the flow rate in the channel 1202 indicated by the signal output from the sensor 1280 (e.g., as indicated by the change in pressure) and may output a plunger actuator control signal to the drive mechanism 1228 based on the displaced air volume, which may improve accuracy in aspiration and/or dispensing. The plunger actuator control signal may be continually varied based on changes in the displaced air volume in the channel 1202 (as indicated by a varying output from the sensor 1280) to dynamically control the position and/or speed of motion of the plunger 1240 in the channel 1202. For example, the controller circuit 1220 may implement a control loop by which (i) the controller circuit 1220 transmits a plunger actuator control signal to the drive mechanism 1228 to move the plunger 1240 in the channel 1202 to aspirate or dispense, (ii) the flow rate sensor 1280 outputs a signal indicating a pressure change in the channel 1202 (e.g., based on the first and/or second pressure data indicated by the sensor signals from the first and second pressure sensors 1280A, 1280B) resulting from the movement of the plunger 1240, and (iii) the controller circuit 1220 determines the air displacement in the channel 1202 from the pressure change (or flow rate indicated thereby) and transmits another plunger actuator control signal to the drive mechanism 1228 to move the plunger 1240 based on the determined air displacement. The controller circuit 1220 may thus continually monitor the pressure in the channel 1202 and generate the plunger actuator control signals based on the output of the sensor 1280, independent of determining a previous position or movement of the plunger 1240 in the channel 1202, in contrast to some conventional motor/encoder assemblies that may determine displaced air volume based on tracking the distance of movement of the plunger in the pipetting channel.

Referring again to FIG. 52, a flow restriction mechanism 1277 is coupled to the channel 1202, for example, via the microfluidic passages 1274 of the manifold 1275. The flow restriction mechanism 1277 may be configured to be switched between respective states that can allow for different ranges of flow rates responsive to a flow restriction control signal from the controller circuit 1220, for example, to increase or decrease flow rate based on outputs of the dual pressure sensors 1280A and 1280B. The valve 1278 is coupled to the channel 1202, for example, between the flow restriction mechanism 1277 and the channel 1202. In some embodiments, the flow restriction mechanism 1277 and the valve 1278 may be configured to couple the channel 1202 to a pressure source 1290, as described with reference to the example of FIG. 53.

Figure 53:
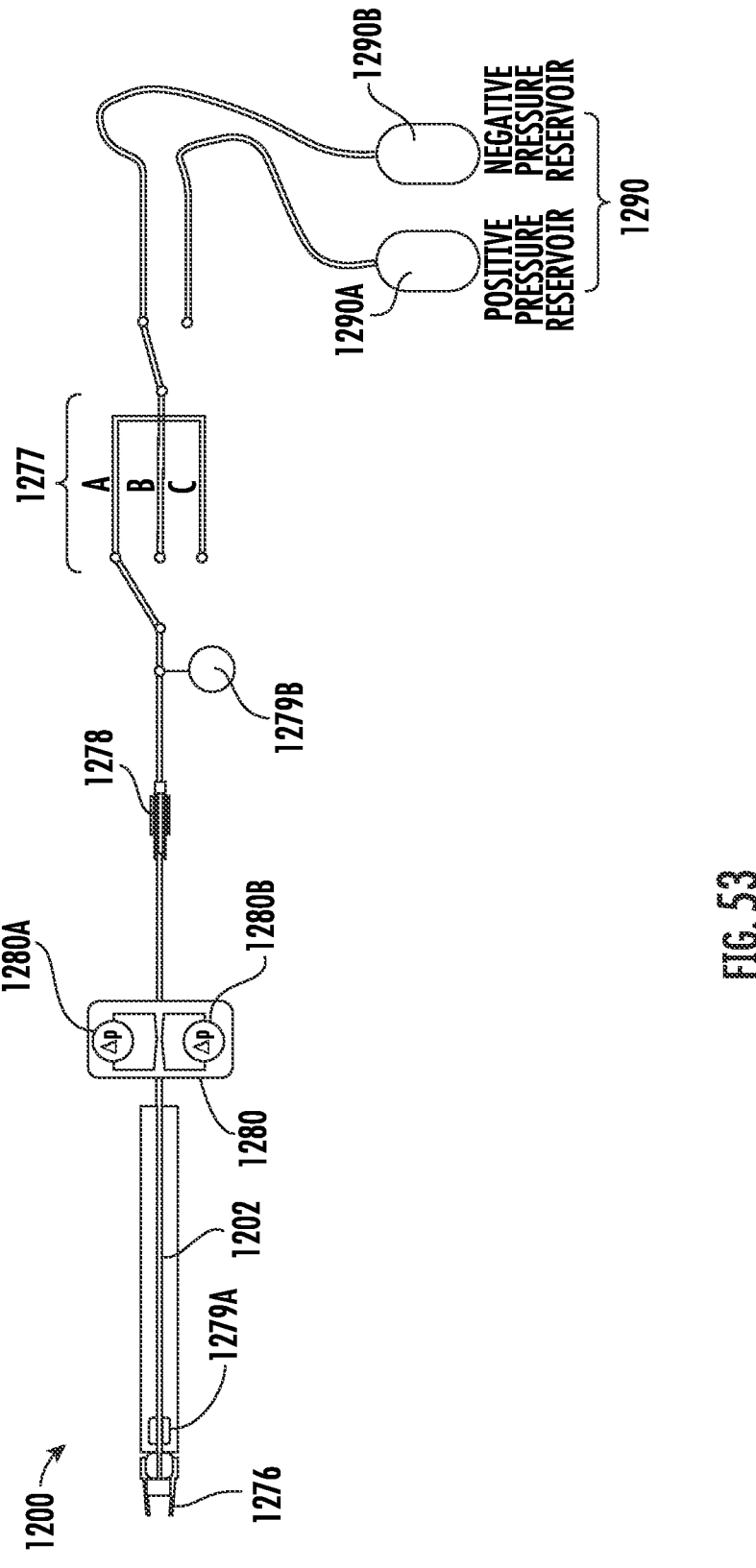
FIG. 53 is a schematic diagram illustrating operation of a dual metering pipettor according to some embodiments.

FIG. 53 is a schematic diagram illustrating operation of various components of the dual metering pipettor 1200 according to some embodiments in greater detail. With reference to FIG. 53, the dual metering pipettor 1200 includes a flow rate sensor 1280 that is coupled to a pipetting channel 1202 and a switchable flow restriction 1277 via an inline valve 1278, as discussed above with reference to FIG. 52. The flow rate sensor 1280 is implemented by a dual metering sensor including first and second pressure sensors 1280A and 1280B to measure a flow rate inside the pipetting channel 1202, for example, based on the pressure differences or changes across the variable flow restriction 1277. The first pressure sensor 1280A may be configured to measure a first, narrower pressure range (e.g., about 0 to 25 Pa or $\Delta p$=about 0.0036 psi) for lower flow rates, while the second pressure sensor 1280B may be configured to measure a second, wider pressure range (e.g., about 0 to 500 Pa or $\Delta p$=about 0.0725 psi) for higher flow rates. In some embodiments, the second, wider pressure range may be more than an order of magnitude higher than the first pressure range. Utilizing two (narrower range and wider range) pressure sensors 1280A, 1280B in parallel across a flow restriction 1277 provides the dual metering pipettor 1200 with sufficient sensitivity to measure a wide range of flows. For example, the differential pressure sensors 1280A, 1280B may be operable to provide a flow rate measurement range from about 1 μl/s to 1000 μl/s.

The flow restriction mechanism 1277 is configured to provide a variable flow rate in the channel 1202, e.g., over a corresponding range of about 1 μl/s to 1000 μl/s. In the embodiment of FIG. 53, the flow restriction mechanism 1277 is coupled between the channel 1202 and a pressure source 1290. The pressure source 1290 may include a positive pressure reservoir 1290A and a negative pressure reservoir 1290B. The positive pressure reservoir 1290A may be configured to provide a fixed positive pressure, and the negative pressure reservoir 1290B may be configured to provide a fixed negative pressure. The flow restriction mechanism 1277 and/or the valve 1278 may be coupled to and configured to switch between the positive pressure reservoir 1290A and the negative pressure reservoir 1290B to apply a positive or negative pressure (and thus control a direction of air flow) in the channel 1202, e.g., during dispensing or aspirating, respectively.

In greater detail with reference to the example of FIG. 53, the flow restriction mechanism 1277 is configured to be switched between respective flow restriction states that provide different ranges of flow rates responsive to a flow restriction control signal from the controller circuit 1220, e.g., to increase or decrease flow rate based on the range of measurement of the sensors 1280A and/or 1280B. For example, the switchable flow restriction mechanism 1277 may include three flow restriction states A, B, C, each providing a stepwise decrease in flow restriction. That is, state B provides less flow restriction than state A, and state C provides less flow restriction than state B. However, the stepwise flow restriction mechanism is illustrated by way of example only, and it will be understood that the flow restriction mechanism 1277 may include fewer, more, or continuously varying (rather than stepwise) flow restriction states than those illustrated. The switchable flow restriction mechanism 1277 and valve 1278 may thus be operable to provide (i) switchable flow rates (provided by the multiple flow restriction states A, B, C), and (ii) switchable flow directions (provided by the positive and negative pressure reservoirs 1290A and 1290B).

In some embodiments, the control circuit 1220 may be configured to transmit a valve control signal to the valve 1278 to stop the flow if the displaced air volume indicated by the flow rate sensor 1280 exceeds a threshold air displacement volume, effectively functioning to stop the movement of the plunger 1240 in other embodiments described herein. The threshold air displacement volume may be determined from the target volume and may be calculated to compensate for various side effects during pipetting operation.

The range of flow rates in the channel 1202 may be based on the pressures provided by the pressure source 1290 and the switchable restrictions of the flow restriction mechanism 1277 (e.g., a lower pressure source may allow for switching between flow rates over a range of about 1 μl/s to 100 μl/s, while a higher pressure source may allow for switching between flow rates over a range of about 10 μl/s to 1000 μl/s), which is within the dynamic range of flow rate measurement provide by the dual pressure sensors 1280A and 1280B. In some embodiments, the flow rate sensor 1280 response time may be less than about 5 ms, and the inline valve 1278 may be switchable between open and closed states in less than about 1 ms, e.g., about 200 μs or less.

As discussed above, a control mechanism or loop may be implemented by the controller circuit 1220 based on the pressure data from the pressure sensors 1280A, 1280B to improve the accuracy of over and/or under-aspiration. The pressure data indicated by the signals from the pressure sensors 1280A, 1280B can also be used to dynamically control the speed or plunger position (i.e., the end position of the plunger 1240 in the channel 1202). As such, the end position of the plunger 1240 may be controlled based on changes in the pressure data indicated by the sensor 1280, rather than by tracking the distance of movement of the plunger. That is, the position of the plunger 1240 in the channel 1202 may be dynamically controlled based on changes in the flow rate or otherwise based on the displaced air volume in the channel 1202 as indicated by a signal from the sensor 1280, independent of a previous position and/or distance of movement of the plunger 1240. In some embodiments, the pressure sensors 1279A, 1279B may be distributed along the channel, with the pressure sensor 1279A included in or coupled to the pipette tip 1260 (e.g., in place of the pressure sensors 256, 1156 described herein), and the pressure sensor 1279B positioned further along the channel, as shown in FIG. 53. The tip pressure sensor 1279A may output a pressure signal, which may be used by the controller circuit 1220 to determine a volume of a liquid LV in the pipette tip 1260 based on the pressure signal, and to control the position of the plunger 1240 based on the determined volume of the liquid in the pipette tip 1260.

With reference to FIGS. 54-59, an example positive displacement (PD) pipette tip 1360 according to further embodiments of the present technology is shown. The PD pipette tip 1360 may be used in combination with a pipettor to form a pipetting system. An example pipetting system 1301 according to embodiments of the present technology is shown in FIGS. 54-59 and includes the PD pipette tip 1360 and a pipettor 1300.

The pipetting system 1301 can aspirate and dispense liquid volumes within a liquid handling system. The pipetting system 1301 may be used in place of the pipetting system 101 in the automated liquid handling system 10 (FIG. 1), for example. However, it shall be understood that the disclosed methods, systems, and apparatus are not limited to the liquid handling system 10 or use therein, and the present disclosure is applicable to other systems and applications where it is desired to aspirate and/or dispense liquid volumes.

The PD pipette tip 1360 is not limited to use with the pipettor 1300. The PD pipette tip 1360 may be used with any suitable air displacement-type pipettor. The PD pipette tip 1360 may be used in place of the air displacement pipette tips 160, for example.

The pipetting system 1301 includes one or more pipettors 1300. The pipettor(s) may be mounted on the pipettor module 30 (FIG. 1). The pipettors 1300 may be constructed and operate in the same manner, and it will be appreciated that the description of a representative one of the pipettors 1300 that follows may apply equally to each of the pipettors 1300. If multiple pipettors 1300 are provided, the pipettors 1300 may be operated independently of one another or in tandem. For the purpose of discussion, only a single pipettor is described below.

The pipetting system 1301 includes the pipettor 1300, the controller 20, and one or more of the PD pipette tips 1360. The pipette tips 1360 are removable and replaceable on the pipettor 1300, and may be effectively disposable or consumable components of the pipetting system 1301.

Figure 54:
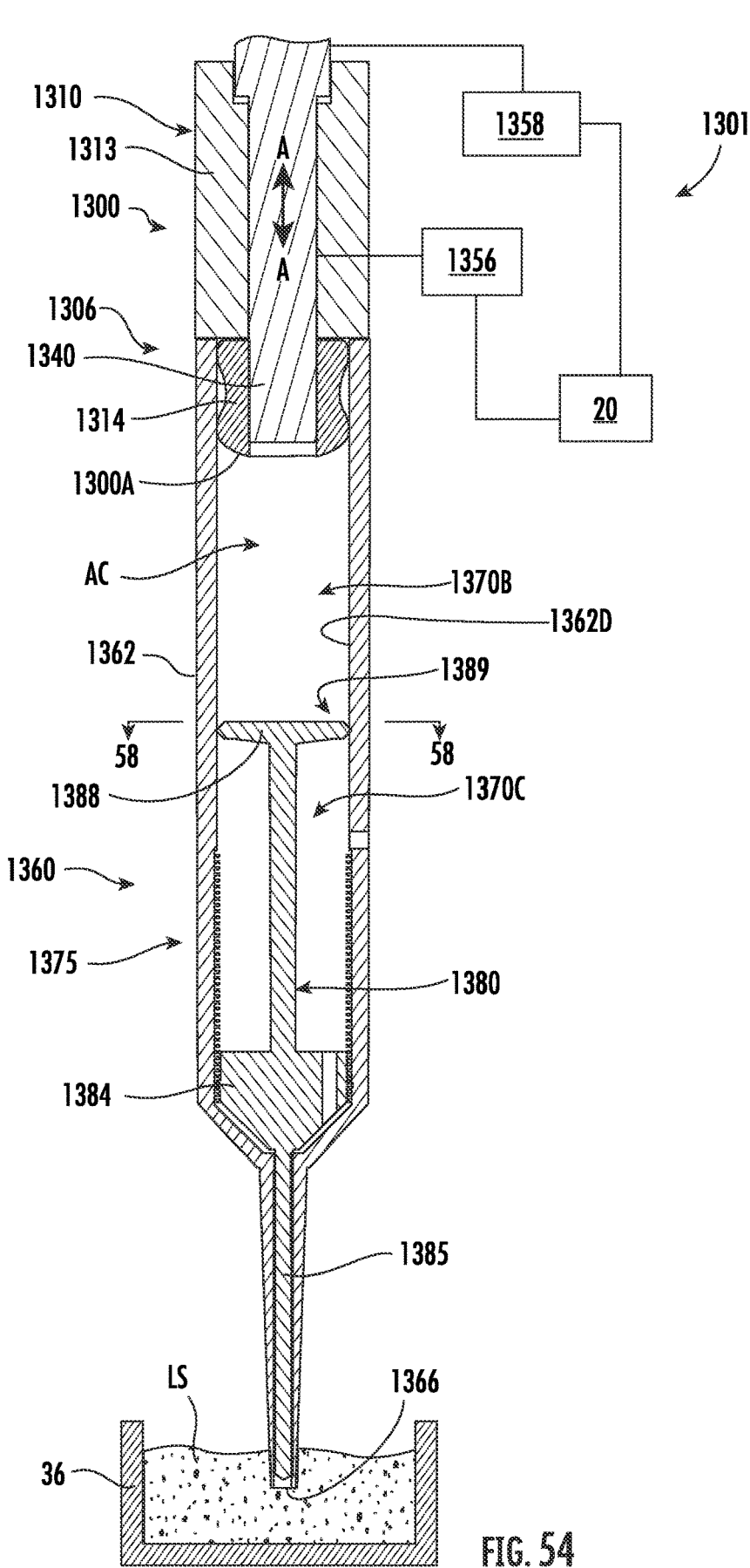
FIG. 54 is a cross-sectional view of a pipetting system and PD pipette tip according to further embodiments of the technology, wherein the PD pipette tip is in an extended position.
Figure 55:
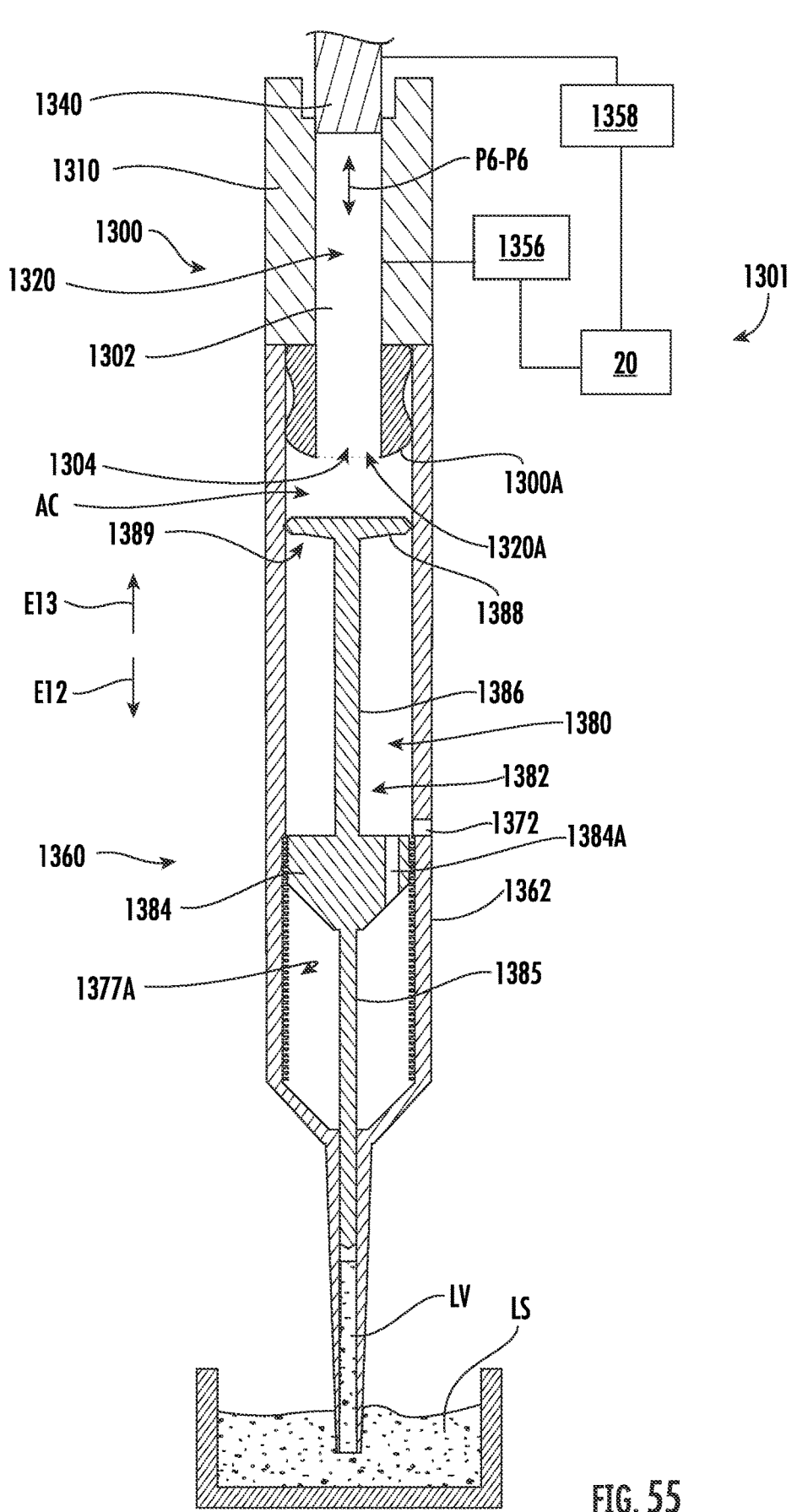
FIG. 55 is a cross-sectional view of the pipetting system of FIG. 54 wherein the PD pipette tip is in a retracted position.

With reference to FIGS. 54 and 55, the pipettor 1300 may be understood to have a lengthwise axis A-A and a distal end 1300A. The pipettor 1300 includes a tubular barrel 1310, a pressure control system 1306, a pipetting channel 1302, a pipettor orifice 1304, and a tip adaptor 1314. The barrel 1310 includes a shaft 1313 that terminates at the distal end 1300A. The tip adaptor 1314 is mounted or formed on the distal end 1300A. The pipettor orifice 1304 is located at the distal end 1300A and fluidly communicates with the pipetting channel 1302.

In some embodiments, the pressure control system 1306 includes a plunger mechanism (e.g., as described below and illustrated). The pipettor 1300 may be constructed and operable in the same manner as described herein for any one of the pipettors 100, 200, 300, 400, 600, for example.

However, the pressure control system 1306 is not limited to plunger mechanisms and the pressure control system 1306 may include and use any suitable type of mechanism for controlling the pressure in the tip 1360 as discussed herein. For example, other suitable types of pressure control mechanisms may include one or more pumps of other designs that are integrated into the pipettor 1300 or that are remote from and fluidly connected to the pipettor 1300.

The example pressure control system 1306 includes the barrel 1310, a plunger 1340, a plunger drive mechanism 1358 (shown schematically in FIGS. 54 and 55), and a pressure sensor 1356 (shown schematically in FIGS. 54 and 55).

With reference to FIG. 55, the barrel 1310 includes a barrel passage 1320. The passage 1320 is aligned lengthwise with the axis A-A and extends rearwardly from a front end 1320A to an opposing rear end.

The plunger 1340 is mounted in the passage 1320 such that the plunger 1340 can slidably translate relative to the barrel 1310 along a plunger axis P6-P6 in an extension direction E12 and an opposing retraction direction E13.

The plunger drive mechanism 1358 is selectively operable to drive the plunger 1340 in each of the extension direction E12 and the retraction direction E13. The plunger drive mechanism 1358 may be a linear drive mechanism. The plunger drive mechanism 1358 may include an actuator and may be any suitable type of linear drive mechanism. In some embodiments, the actuator includes an electric motor. In some embodiments, the plunger drive mechanism 1358 is manually operable and does not include an actuator. For example, the plunger member 1340 may be pushed and pulled using an extension, lever, knob, or other feature that is hand-driven.

The tip adaptor 1314 is configured to removably secure the pipette tip 1360 to the end 1300A of the pipettor 1300 in the same manner as described above for the tip adaptor 156.

Figure 56:
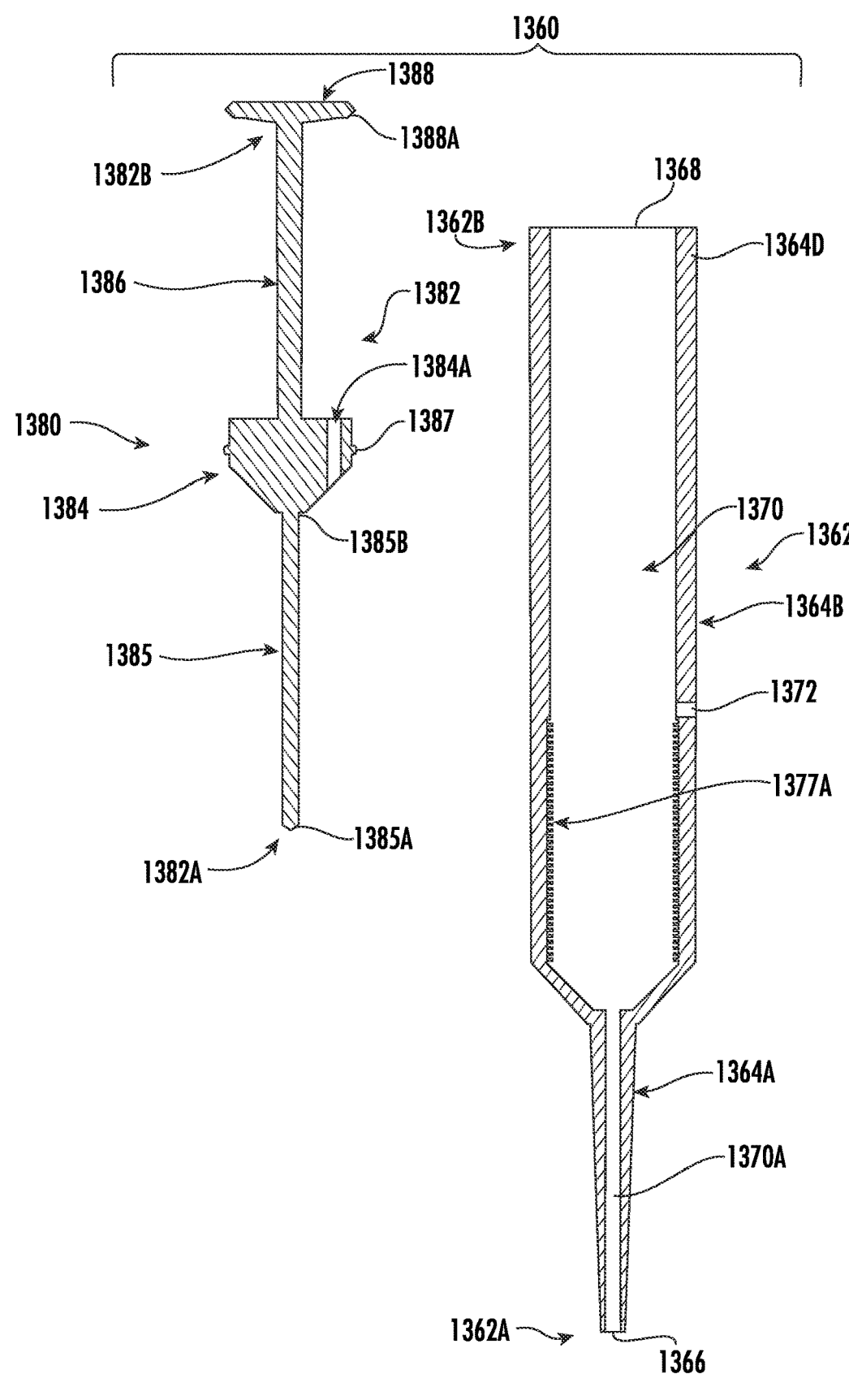
FIG. 56 is an exploded, cross-sectional view of the PD pipette tip of FIG. 54.

With reference to FIGS. 54 and 56, the PD pipette tip 1360 includes a tubular tip body 1362 and a piston unit 1380 slidably mounted in the tip body 1362. The piston unit 1380 is slidable between an extended or ready position (FIG. 54) and a retracted position (e.g., FIG. 55). In some embodiments, the pipette tip 1360 further includes an indexing mechanism 1375.

With reference to FIG. 56, the tip body 1362 extends from a distal end 1362A to a proximal end 1362B. The tip body 1362 includes a front section 1364A, and a rear section 1364B, which together define a combined volume or body passage 1370. The front section 1364A defines a front chamber or tip passage 1370A. The rear section 1364B defines a rear chamber 1370B (FIG. 54) and an intermediate chamber 1370C (FIG. 54) between the tip passage 1370A and the rear chamber 1370B. The tip passage 1370A and the chambers 1370B, 1370C each form a part of the passage 1370. The rear section 1364B includes a mount section 1364D and defines an interface opening 1368. A tip or pipetting orifice 1366 is defined in the distal end 1362A. The passage 1370 terminates at the interface opening 1368 and the pipetting orifice 1366.

A pressure relief port 1372 is provided in fluid communication with the intermediate chamber 1370C. The pressure relief port 1372 may vent to and from ambient atmosphere.

The piston unit 1380 includes a piston 1382 and a seal member 1388. The piston 1382 and the seal member 1388 may be constructed as a single member that forms the piston unit 1380 as a unitary member, or the piston 1382 and the seal member 1388 may be separate parts that are joined to form the piston unit 1380 as an assembly of parts.

The piston 1382 extends from a distal end 1382A to a proximal end 1382B. The piston 1380 includes a base 1384, a shaft 1385, and a rear extension 1386. In some embodiments, the base 1384, the shaft 1385, and the rear extension 1386 form a rigid, unitary member. In some embodiments, the base 1384, the shaft 1385, and the rear extension 1386 together form a monolithic member.

The shaft 1385 extends from a proximal end 1385B secured to the base 1384 to an opposing distal end 1385A. In some embodiments, the distal end 1385A is positioned at or proximate the pipetting orifice 1366 when the piston 1382 is in the ready or extended position. The front side of the base 1384 may have a convex or otherwise contoured shape to fit the facing profile of the tip body 1362. A pressure relief passage 1384A is defined in the base 1384.

The example seal member 1388 is a generally disc-shaped body or portion. The seal member 1388 is secured to (i.e., affixed to or integral with) the piston 1382 on the proximal end 1382B of the extension 1386. The seal member 1388 has an annular peripheral sealing edge section 1388A.

The piston 1382 and the seal member 1388 may be formed together (e.g., molded or co-molded), or formed separately and then attached to one another. In some embodiments, the piston 1382 and the seal member 1388 form a unitary member or assembly. In some embodiments, the piston 1382 and the seal member 1388 together form a monolithic member.

In some embodiments, the piston 1382 and the seal member 1388 are formed of the same material. In some embodiments, the piston 1382 and the seal member 1388 are formed of different materials from one another. In some embodiments, the piston 1382 is formed of a harder material than the material of the seal member 1388. For example, the seal member 1388 may be formed of an elastomer or thermoplastic elastomer while the piston 1382 is formed of a thermoplastic. Suitable materials for the piston 1382 may include, but are not limited to, polyethylene (PE). Suitable materials for the seal member 1388 may include, but are not limited to, Silicone. Other types of seals (e.g., an O-ring) may be used in place of or in addition to the seal member 1388.

Figure 58:
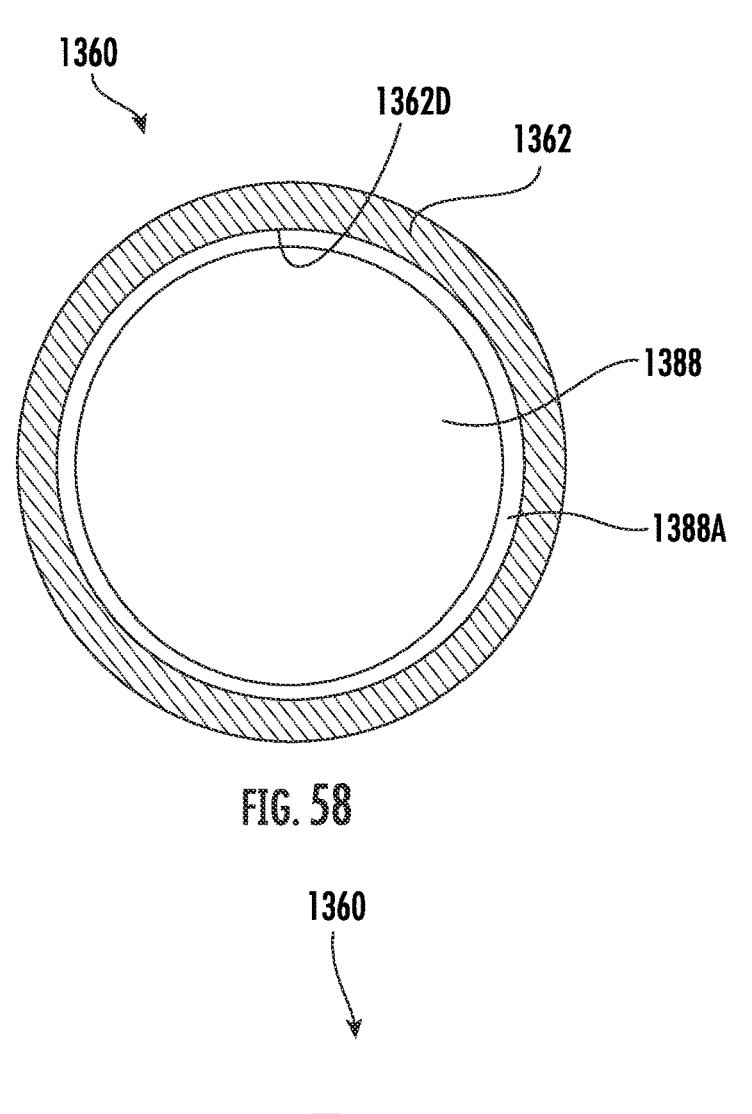
FIG. 58 is cross-sectional view of the PD pipette tip taken along the line 58-58 of FIG. 54.
Figure 59:
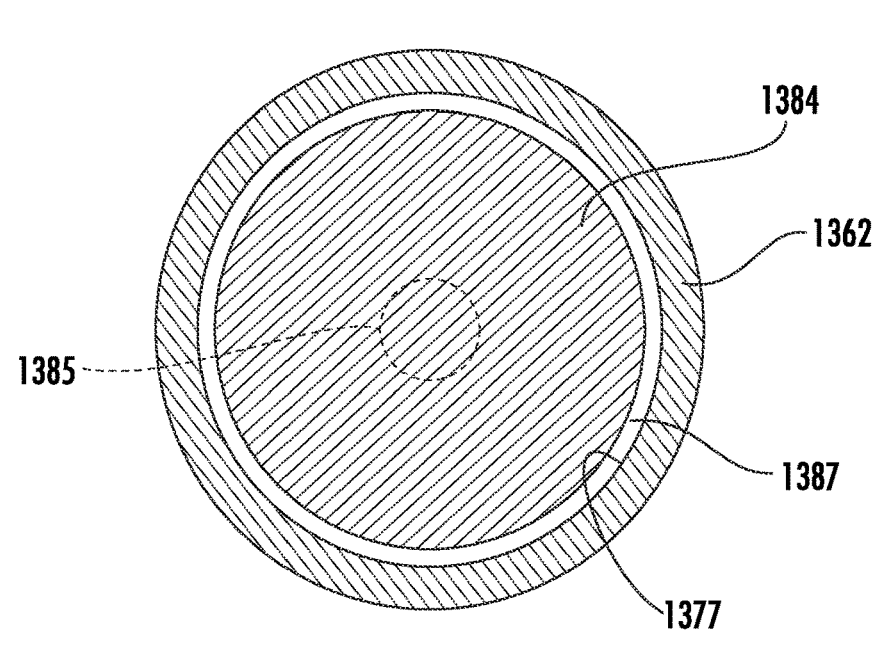
FIG. 59 is cross-sectional view of the PD pipette tip taken along the line 59-59 of FIG. 57.

With reference to FIGS. 54 and 58, the peripheral sealing edge section 1388A slidably engages the inner wall surface 1362D of the rear section 1364B to form a sliding seal 1389 between the piston unit 1380 and the tip body 1362. The sliding seal 1389 can slide axially along the axis P6-P6 relative to the tip body 1362. The seal member 1388 and the seal 1389 divide, separate and fluidly seal the intermediate chamber 1370C from the rear chamber 1370B.

In use, the seal 1389 translates through the body 1362 with the seal member 1388 and the piston 1382. It will be appreciated that, as the seal 1389 translates along the axis P6-P6 relative to the body 1362, the boundaries and volumes of the intermediate chamber 1370C and the rear chamber 1370B will change correspondingly. That is, as the piston unit 1380 translates in the direction E12, the volume of the rear chamber 1370B increases and the volume of the intermediate chamber 1370C decreases. As the piston unit 1380 translates in the direction E13, the volume of the rear chamber 1370B decreases and the volume of the intermediate chamber 1370C increases.

Figure 57:
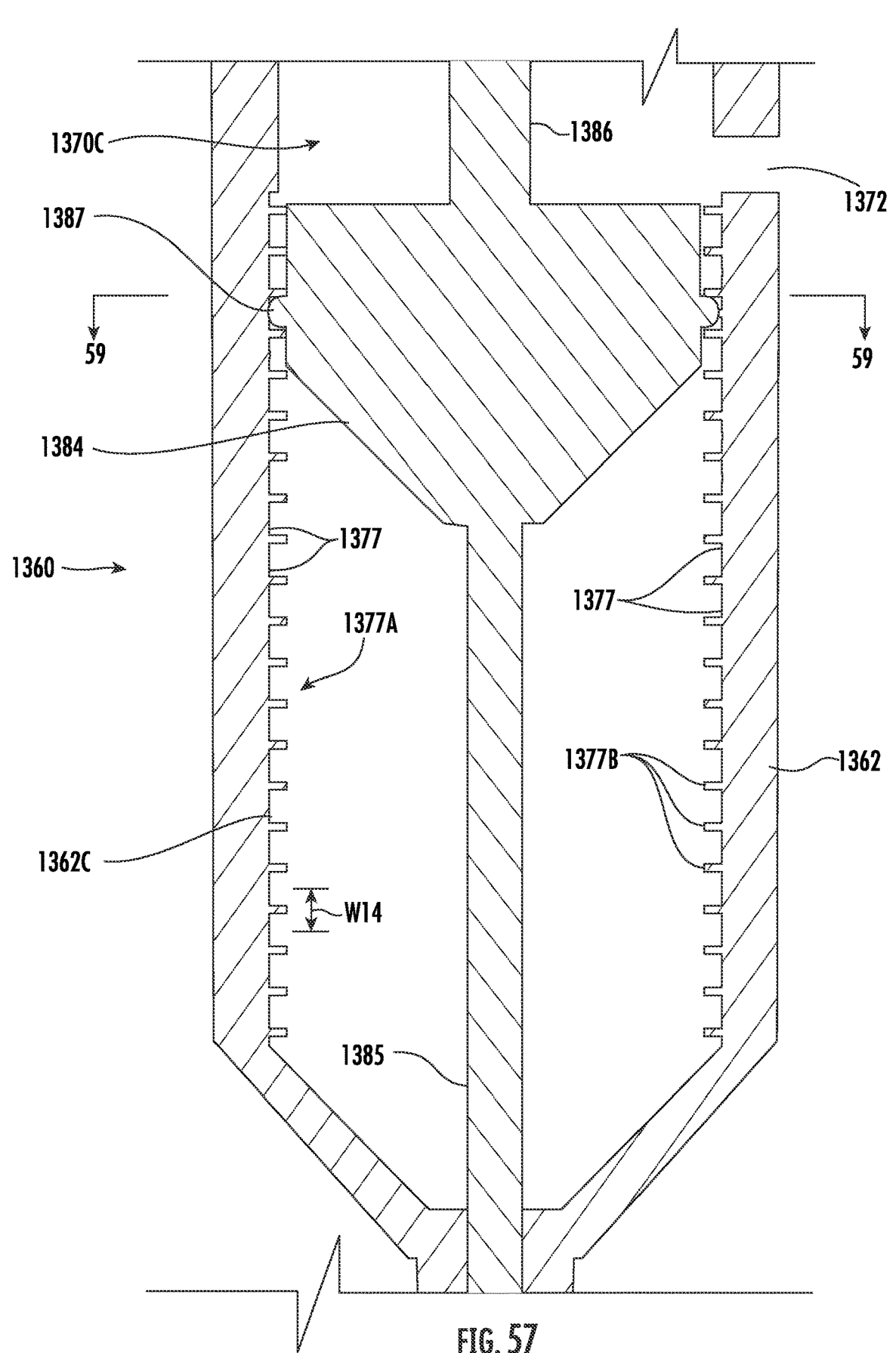
FIG. 57 is an enlarged, cross-sectional view of the PD pipette tip of FIG. 54 showing an indexing mechanism of the PD pipette tip.

With reference to FIG. 57, the indexing mechanism 1375 includes a first indexing feature in the form of a set 1377A of recesses or annular grooves 1377 on the inner wall 1362C of the tip body 1362, and a second indexing feature in the form of a protrusion or annular rib 1387 formed on the base 1384. The grooves 1377 and rib 1387 are relatively arranged and configured such that the rib 1387 can seat in each groove 1377 to hold the piston 1382 in a corresponding axial position relative to the tip body 1362, but the rib 1387 can be dislodged from the groove 1377 (upon application of sufficient force) to axially reposition the piston 1382 relative to the tip body 1362. For example, the tip body 1362 and/or the rib 1387 may be formed of an elastically deformable material.

The grooves 1377 are serially distributed along the axis P6-P6. In some embodiments, the grooves 1377 have a substantially uniform pitch W14 (FIG. 57) between adjacent grooves 1377. In some embodiments, the grooves 1377 have a pitch W14 in the range of from 0.05 mm to 0.5 mm.

In some embodiments, the set 1377A of grooves includes at least 10 grooves 1377. In some embodiments, the number of grooves 1377 in the set 1377A is in the range of from about 10 to 400.

It will be appreciated that the first and second indexing features may take other forms. For example, an annular groove may be provided on the base 1384 in place of the rib 1387, and a series of annular ribs may be provided on the tip body 1362 that seat in the annular groove of the base 1384. The grooves 1377 may be defined between upstanding annular ribs 1377B, or the grooves 1377 may be flush with the inner diameter of the inner wall 1362C.

The liquid handling system 10 and the pipetting system 1301 may be used as follows in accordance with some methods to aspirate and/or dispense one or more liquid samples.

Generally, the PD pipette tip 1360 is mounted on the pipettor 1300. The tip body 1362 forms an air-tight, pressure-tight seal with the tip adaptor 1314 so that the rear chamber 1370B is sealed air-tight and pressure-tight.

The plunger 1340 is driven to displace an air volume in the pipettor passage 1320 and thereby correspondingly change a pressure in the pipetting channel 1302 and the rear chamber 1370B (which is in fluid communication with the pipetting channel 1302). The change in pressure in the rear chamber 1370B draws the piston unit 1380 in the retraction direction E13 (responsive to a negative pressure change in the rear chamber 1370B), or pushes the piston unit 1380 in the extension direction E12 (responsive to a positive pressure change in the rear chamber 1370B). The piston assembly 1380 is shown in its ready or fully extended position in FIG. 54, and in a retracted position in FIG. 55.

When the piston unit 1380 is drawn in the retraction direction E13, the shaft 1385 is displaced in the direction E13 relative to the front section 1364A, which expands the fluid volume in the tip passage 1370A. This expansion generates a negative pressure in the tip passage 1370A, which aspirates a liquid volume LV of a liquid sample LS into the tip passage 1370A through the orifice 1366.

When the piston unit 1380 is pushed in the extension direction E12, the shaft 1385 is displaced in the direction E12 relative to the front section 1364A, which displaces or reduces the fluid volume in the tip passage 1370A. This reduction generates a positive pressure in the tip passage 1370A, which expels or dispenses a liquid volume LV of the liquid sample LS from the tip passage 1370A through the orifice 1366.

Thus, the piston 1382 is responsive to a negative pressure in the rear chamber 1370B to translate rearwardly (direction E13) away from the tip orifice 1366, whereby the piston 1382 generates a negative pressure at the tip orifice 1366 to aspirate a liquid into the positive displacement pipette tip 1360 through the tip orifice 1366.

The piston 1382 is responsive to a positive pressure in the rear chamber 1370B to translate forwardly (direction E12) toward the tip orifice 1366, whereby the piston 1382 generates a positive pressure in the tip passage 1370A to expel the liquid from the positive displacement pipette tip 1360 through the tip orifice 1366.

It will be appreciated that the piston unit 1380 is operatively coupled to the drive mechanism of the pipettor 1300 via the pipetting channel 1302 and an air cushion AC in the rear chamber 1370B, rather than by a direct mechanical engagement or linkage between a plunger and the piston 1382. The intervening air cushion AC is present and maintained between the distal end 1300A of the pipettor 1300 and the piston unit 1380.

The pressure relief passage 1384A permits egress and ingress of air from and into intermediate chamber 1370C forward of the base 1384 as the base 1384 translates. The pressure relief port 1372 permits the egress and ingress of air from and into the intermediate chamber 1370C as the seal 1389 translates. In this way, the pressure in the intermediate chamber 1370C can be maintained substantially constant (e.g., at ambient pressure) so that a variation in the pressure in the intermediate chamber 1370C does not interfere with the displacement of the piston unit 1380.

During operation, the indexing system 1375 serves to stop the displacement of the piston 1380 at prescribed, discrete axial positions relative to the tip body 1362. That is, the indexing system 1375 causes the piston 1380 to move along the axis P6-P6 in a stepwise manner from one groove 1377 to the next. The step movement can enable or ensure that the pipette tip 1360 dispenses or aspirates a known, discrete volume for each step. The resolution or precision of the volume dispensed can be determined by the number of steps (e.g., grooves) provided. In some embodiments, the grooves 1377 are equidistant apart so that the discrete volumes for each step are substantially equal.

When the pipette tip 1360 is provided with an indexing system 1375 as disclosed herein, the pressure change provided by the pipettor 1300 to displace the piston 1382 must also be sufficient to overcome the engagement or interlock between the indexing features (e.g., the rib 1387 and the groove 1377 in which the rib 1387 is seated). In some embodiments, the controller 20 operates the pipettor 1300 to deliver pressure pulses to the rear chamber 1370B with each pressure pulse being sufficient to move the piston 1382 one step.

In some embodiments, when executing the aspirating or dispensing operations, the controller 20 receives pressure signals from the pressure sensor 1356 indicating the air pressure in the pipetting channel 1302. The controller 20 may continuously monitor the pressure in the pipetting channel 1302. In some embodiments, the controller 20 monitors the pressure in the pipetting channel 1302 using a dual metering flow sensor as described herein (e.g., the dual metering flow sensor 1280).

As discussed above, the pipetting system 1301 aspirates liquid sample by decreasing the pressure in the pipetting channel 1302 and dispenses liquid sample by increasing the pressure in the pipetting channel 1302. However, the pressure in the pipetting channel 1302 may fluctuate in response to other actions or conditions in the procedure, for example, as discussed above with regard to the pipetting system 101.

With reference to FIGS. 60-75, an example positive displacement (PD) pipette tip 1440 according to further embodiments of the present technology is shown. The PD pipette tip 1440 may be used in combination with a pipettor to form a pipetting system. An example pipetting system 1401 according to embodiments of the present technology is shown in FIGS. 60-75 and includes the PD pipette tip 1440 and a pipettor 1400.

The pipetting system 1401 can aspirate and dispense liquid volumes within a liquid handling system. The pipetting system 1401 may be used in place of the pipetting system 101 in the automated liquid handling system 10 (FIG. 1), for example. However, it shall be understood that the disclosed methods, systems, and apparatus are not limited to the liquid handling system 10 or use therein, and the present disclosure is applicable to other systems and applications where it is desired to aspirate and/or dispense liquid volumes.

The PD pipette tip 1440 is not limited to use with the pipettor 1400. The PD pipette tip 1440 may be used with any suitable positive displacement-type pipettor. The PD pipette tip 1440 may be used in place of the air displacement pipette tips 160, for example.

Figure 60:
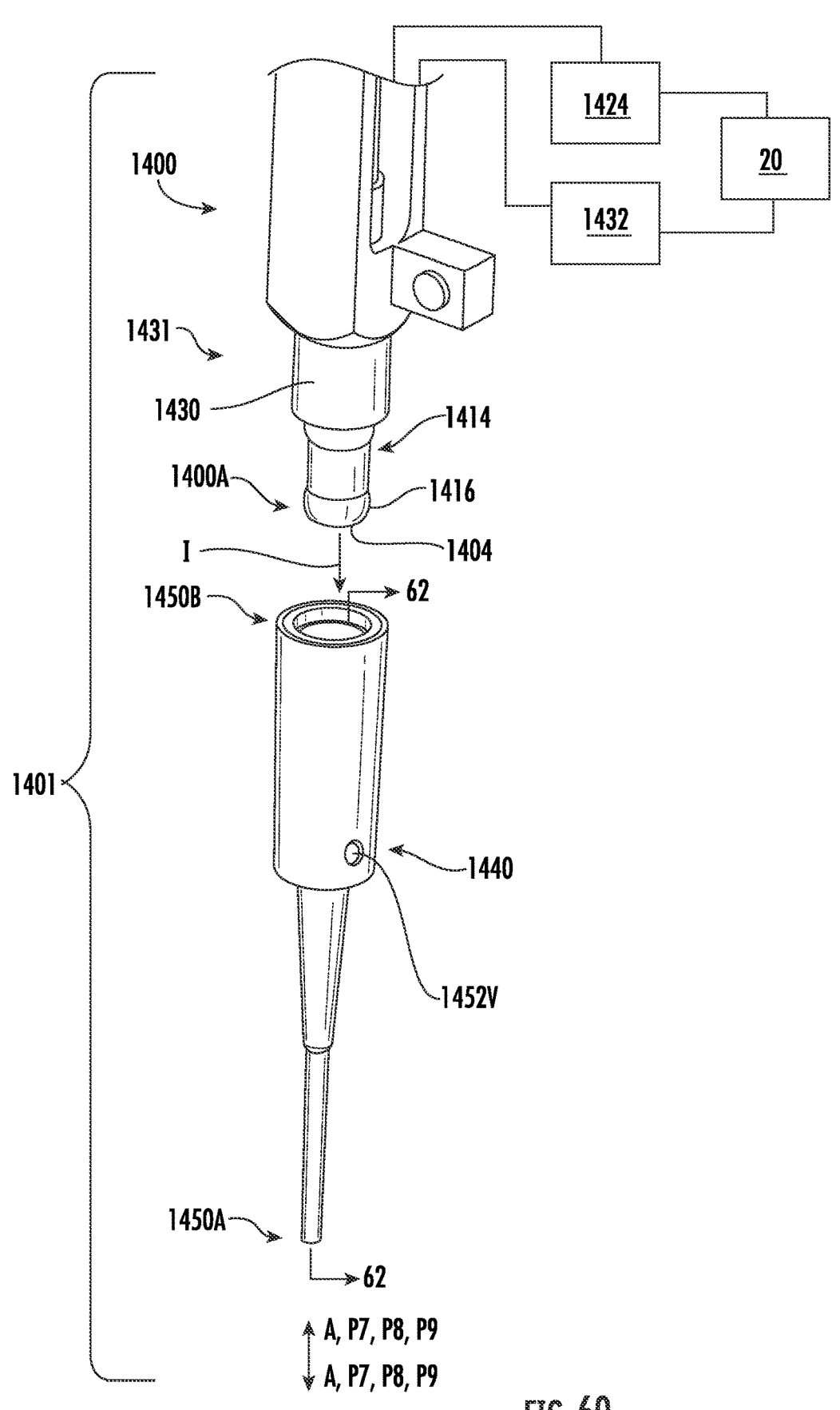
FIG. 60 is an exploded view of a pipetting system including a positive displacement pipette tip according to some embodiments.
Figure 61:
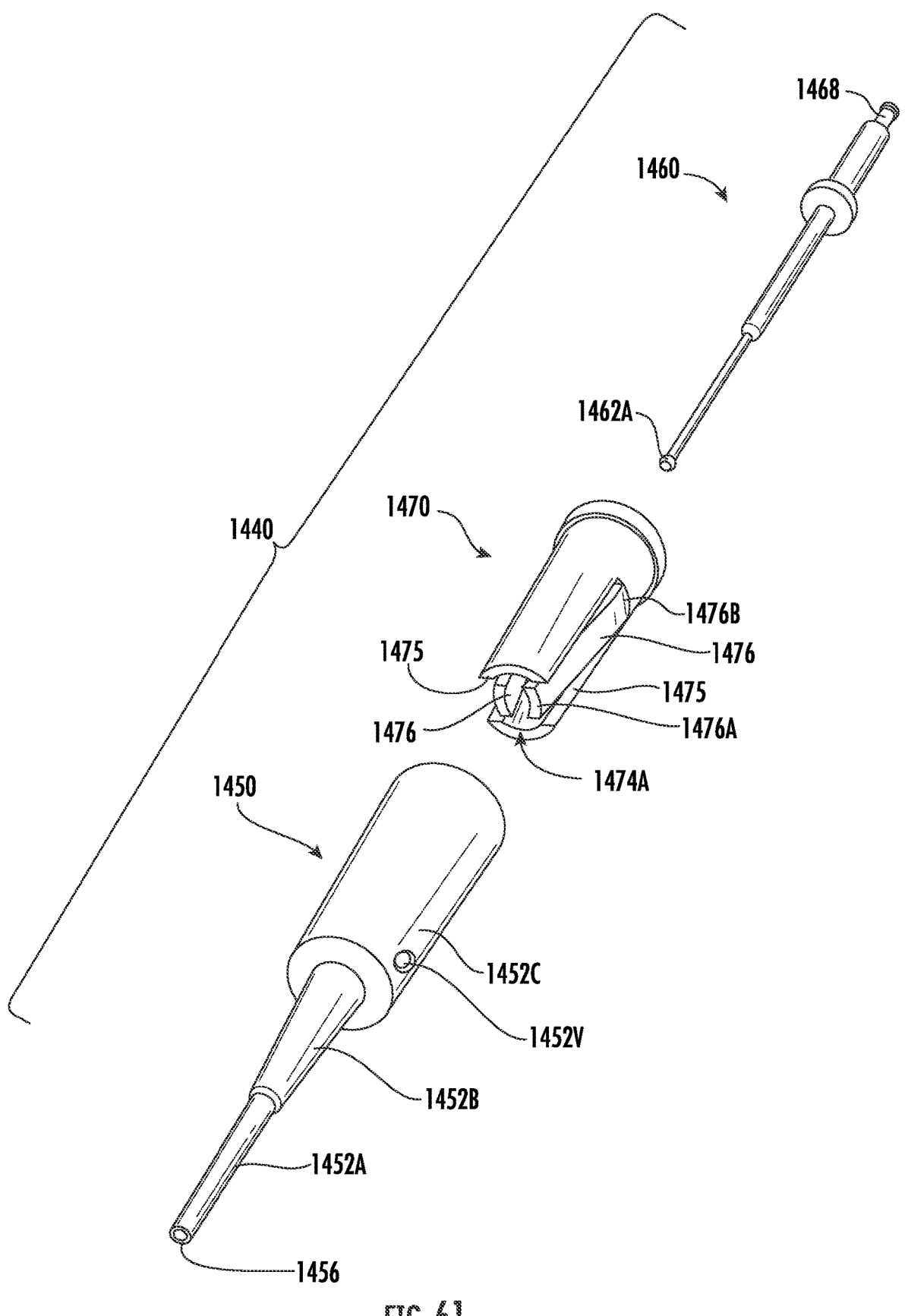
FIG. 61 is an exploded, bottom perspective view of the positive displacement pipette tip of FIG. 60.

With reference to FIG. 60, the pipetting system 1401 includes one or more pipettors 1400. The pipettor(s) may be mounted on the pipettor module 30 (FIG. 1). The pipettors 1400 may be constructed and operate in the same manner, and it will be appreciated that the description of a representative one of the pipettors 1400 that follows may apply equally to each of the pipettors 1400. If multiple pipettors 1400 are provided, the pipettors 1400 may be operated independently of one another or in tandem. For the purpose of discussion, only a single pipettor is described below.

The pipetting system 1401 includes the pipettor 1400, the controller 20, and one or more of the PD pipette tips 1440. The pipette tips 1440 are removable and replaceable on the pipettor 1400, and may be effectively disposable or consumable components of the pipetting system 1401.

The pipettor 1400 may be constructed and operable in the same manner as described herein for the pipettor 600, for example.

Figures 66, 67:
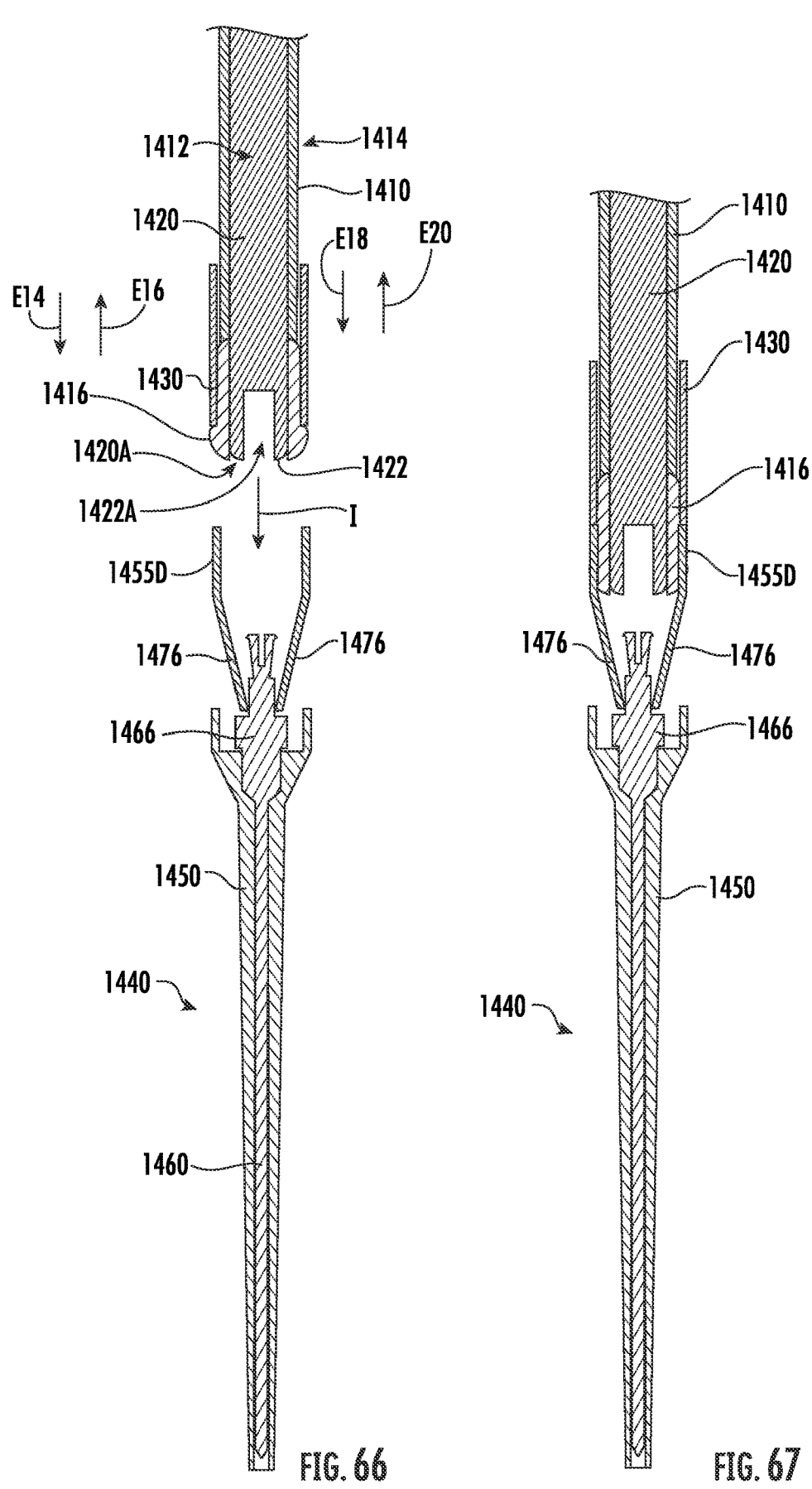
FIGS. 66-75 are schematic, cross-sectional views of the pipetting system of FIG. 60 illustrating operations using the pipetting system.

With reference to FIGS. 60 and 66, the pipettor 1400 may be understood to have a lengthwise axis A-A and a distal end 1400A. The pipettor 1400 includes a pipettor orifice 1404, a tubular barrel 1410, a tubular tip adaptor 1416, a driver (in the form of a plunger) 1420, a plunger drive mechanism 1424, and an ejection system 1431. The barrel 1410 includes a pipettor shaft 1414 that terminates at the distal end 1400A. The tip adaptor 1416 is mounted or formed on the distal end 1400A. The pipettor orifice 1404 is located at the distal end 1400A.

With reference to FIG. 66, the barrel 1410 includes a barrel passage 1412. The passage 1412 is aligned lengthwise with the axis A-A and extends rearwardly from the distal end 1400A to an opposing rear end.

The plunger 1420 serves as a driver and is mounted in the passage 1412 such that the plunger 1420 can slidably translate relative to the barrel 1410 along a plunger axis P7-P7 in an extension direction E14 and an opposing retraction direction E16 (FIG. 66).

The plunger 1420 includes an integral piston engagement or coupling feature 1422 (FIG. 66) on its leading end 1420A. In some embodiments and as illustrated, the piston coupling feature 1422 includes a slot 1422A. The piston coupling feature 1422 may be configured and operative in the same manner as described herein for the piston coupling feature 646, for example.

The plunger drive mechanism 1424 is selectively operable to drive the plunger 1420 to translate in each of the extension direction E14 and the retraction direction E16. The plunger drive mechanism 1424 may be a linear drive mechanism. The plunger drive mechanism 1424 may include an actuator and may be any suitable type of linear drive mechanism. In some embodiments, the actuator includes an electric motor. In some embodiments, the plunger drive mechanism 1424 is manually operable and does not include an actuator. For example, the plunger member 1424 may be pushed and pulled using an extension, lever, knob, or other feature that is hand-driven.

The tip adaptor 1416 is configured to removably secure the pipette tip 1440 to the end 1400A of the pipettor 1400 in the same manner as described above for the tip adaptor 156.

With reference to FIGS. 60 and 66, the ejection system 1431 includes an ejector member or sleeve 1430 and an ejector drive mechanism 1432. The ejector sleeve 1430 is mounted around the barrel 1410 such that the ejector sleeve 1430 can slidably translate relative to the barrel 1410 along an ejector axis P8-P8 in an extension direction E18 and an opposing retraction direction E20. The ejector axis P8-P8 may be coaxial with the plunger axis P7-P7.

With reference to FIGS. 61-65, the PD pipette tip 1440 includes a tubular tip body 1450, a piston 1460 slidably mounted in the tip body 1450, and an integral piston restraint mechanism 1471. The piston restraint mechanism 1471 includes an interlock insert 1470.

Figure 63:
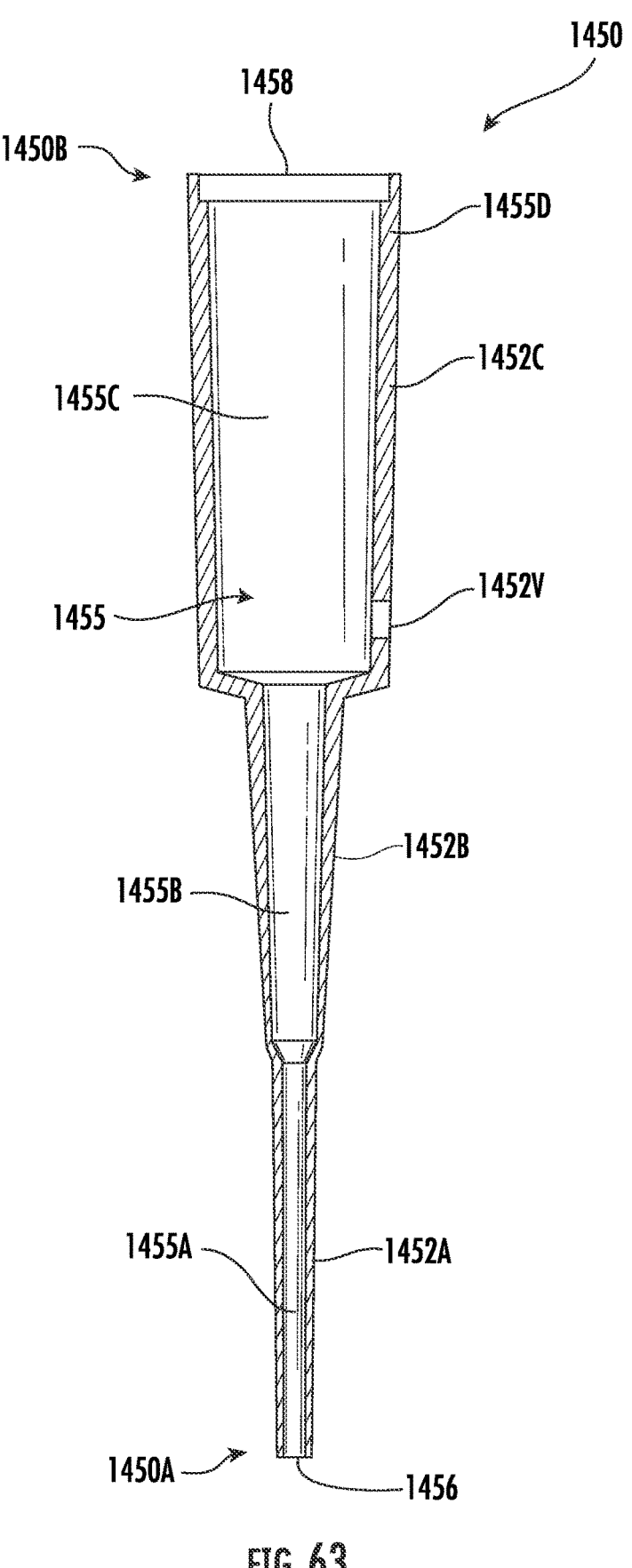
FIG. 63 is a cross-sectional view of a tip body forming a part of the positive displacement pipette tip of FIG. 60 taken along the line 62-62 of FIG. 60.
Figure 64:
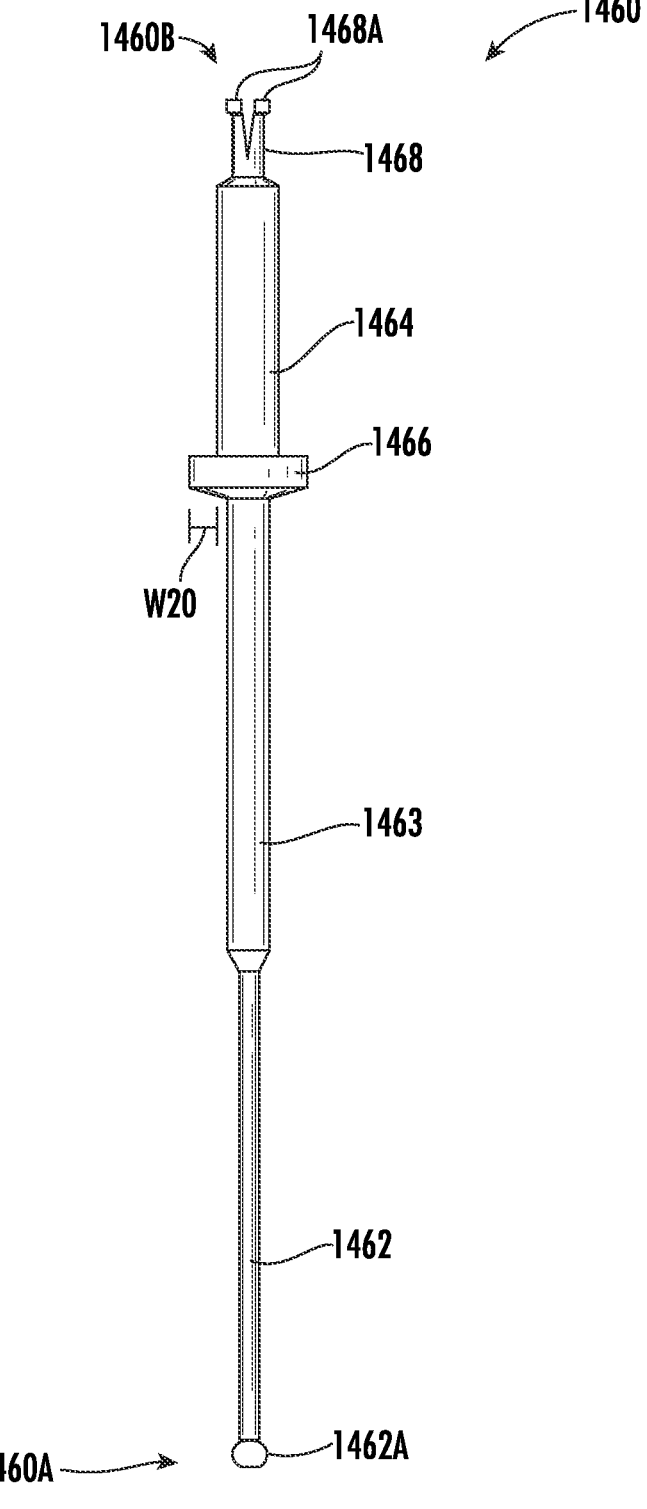
FIG. 64 is a side view of a piston forming a part of the positive displacement pipette tip of FIG. 60.

With reference to FIG. 63, the tip body 1450 extends from a distal end 1450A to a proximal end 1450B. The tip body 1450 includes a distal tip portion or front section 1452A, an intermediate section 1452B, and a rear section 1452C. The front section 1452A defines a front chamber or tip passage 1455A. The rear section 1452C defines a rear chamber 1455C. The intermediate section 1452B defines an intermediate chamber 1455B between the tip passage 1455A and the rear chamber 1455C. The tip passage 1455A and the chambers 1455B, 1455C collectively form a combined volume or tip body passage 1455.

The rear section 1452C includes a mount section 1455D and defines an interface opening 1458. A tip or pipetting orifice 1456 is defined in the distal end 1450A. The passage 1455 terminates at the interface opening 1458 and the pipetting orifice 1456.

The tip body 1450 may be formed of any suitable material(s). In some embodiments, the tip body 1450 is formed of a polymer. In some embodiments, the tip body 1450 is formed of a thermoplastic. Suitable materials for the tip body 1450 may include, but is not limited to, polyethylene (PE). In some embodiments, the tip body 1450 is a rigid, unitary member. In some embodiments, the tip body 1450 is a monolithic member.

Figure 70:
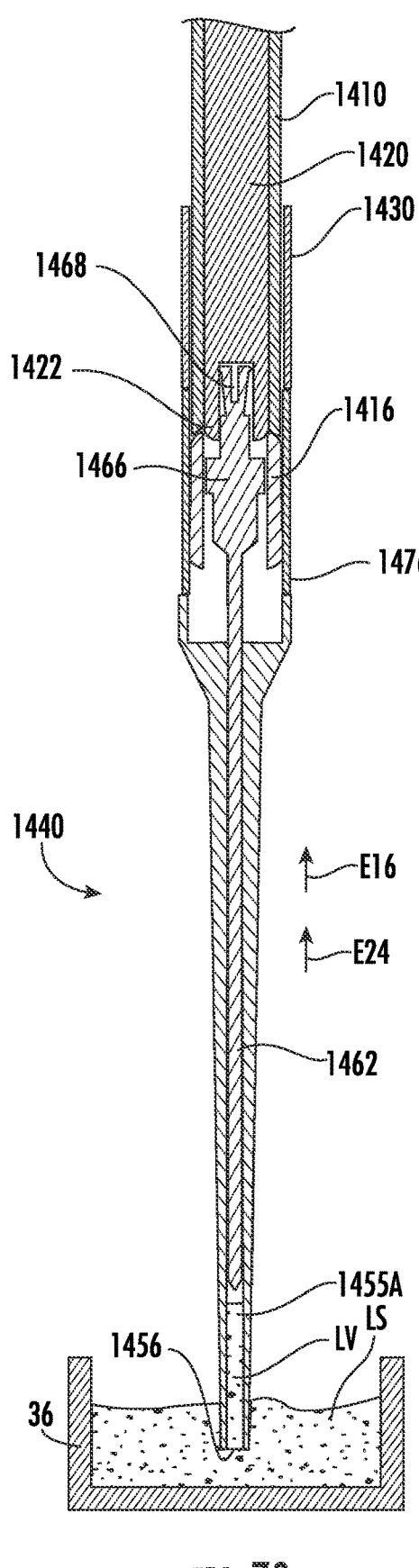

The piston 1460 is slidable relative to the tip body 1450 along a piston axis P9-P9 (FIG. 62) in an extension direction E22 and an opposing retraction direction E24 between an extended or ready position (FIGS. 62 and 66) and a retracted position (e.g., FIG. 70).

The piston 1460 (FIG. 64) extends from a distal end 1460A to a proximal end 1460B. The piston 1460 includes a piston shaft 1462, a sealing feature or rib 1462A, an intermediate section 1463, a rear extension 1464, an interlock feature or flange 1466, and an integral plunger engagement or coupling feature 1468.

The piston shaft 1462 extends rearward from the distal end 1460A. The annular sealing rib 1462A is located that the distal end 1460A and forms a moving seal with the inner diameter of the front passage 1455A. In some embodiments, the distal end 1460A is positioned at or proximate the pipetting orifice 1456 when the piston 1460 is in the ready or extended position.

The intermediate section 1463 extends rearward from the proximal end of the piston shaft 1462. In some embodiments, the outer diameter of the intermediate section 1463 is greater than the outer diameter of the piston shaft 1462.

The rear extension 1464 extends rearward from the proximal end of the intermediate section 1463. In some embodiments, the outer diameter of the rear extension 1464 is greater than the outer diameter of intermediate section 1463.

The plunger coupling feature 1468 is located or formed on the proximal end of the rear extension 1464. The plunger coupling feature 1468 is configured to be received in the slot 1422A to releasably secure the piston coupling feature 1422 to the plunger coupling feature 1468. The illustrated plunger coupling feature 1468 includes two or more opposed, elastically deflectable legs 1468A configured to be received in the slot 1422A to releasably secure the piston coupling feature 1422 to the plunger coupling feature 1468. However, any suitable structure that enables releasable coupling of the plunger coupling feature 1468 to the piston coupling feature 1422 may be used for the plunger coupling feature 1468.

For example, the plunger coupling feature 1468 may include two or more opposed, elastically deflectable legs 1468A configured to be received in the slot 1422A to releasably secure the piston coupling feature 1422 to the plunger coupling feature 1468.

The flange 1466 is annular and positioned axially between the plunger coupling feature 1468 and the intermediate section 1463. The flange 1466 projects radially outwardly from the rear extension 1464. In some embodiments, the flange 1466 is substantially concentric with the axis P9-P9. In some embodiments, the flange 1466 has a width W20 (FIG. 64) in the range of from about 0.5 mm to 3 mm.

The piston 1460 may be formed of any suitable material(s). In some embodiments, the piston 1460 is formed of a polymer. In some embodiments, the piston 1460 is formed of a thermoplastic. Suitable materials for the piston 1382 may include a plastic, a thermoplastic, or a high-temperature resistant thermoplastic, e.g., polyether ether ketone (PEEK). In some embodiments, the piston shaft 1462, the intermediate section 1463, the rear extension 1464, the flange 1466, and the plunger coupling feature 1468 form a rigid, unitary member. In some embodiments, the piston shaft 1462, the intermediate section 1463, the rear extension 1464, the flange 1466, and the plunger coupling feature 1468 collectively form a monolithic member.

Figure 62:
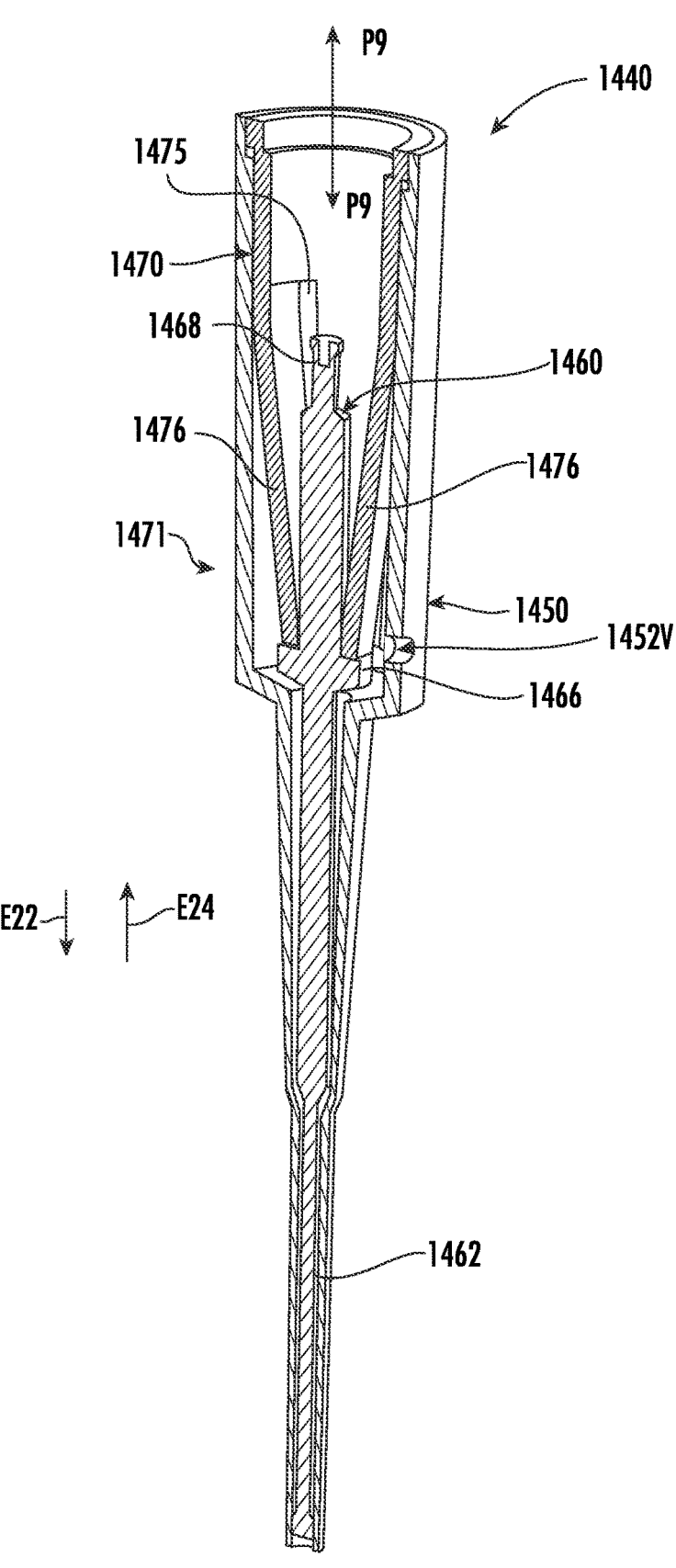
FIG. 62 is a cross-sectional, perspective view of the positive displacement pipette tip of FIG. 60 taken along the line 62-62 of FIG. 60.

The interlock insert 1470 is seated in the rear chamber 1455C as shown in FIG. 62. The interlock insert 1470 is secured in the rear chamber 1455C to prevent relative axial displacement between the interlock insert 1470 and the tip body 1450.

The interlock insert 1470 (FIG. 65) has a distal end 1470A and an opposing proximal end 1470B. The interlock insert 1470 is tubular and includes a front section 1472A (at the end 1470A) defining a front opening 1474A, and a rear section 1472B (at the end 1470B) defining a rear opening 1474B. A passage 1474 extends from the opening 1474A to the opening 1474B. A pair of opposed slots 1475 extend through the front section 1472A from the rear section 1472B toward the distal end 1470A.

The interlock insert 1470 further includes latches in the form of a pair of opposed latch legs 1476. Each leg 1476 has a leg axis P10-P10 and extends axially from a proximal end 1476B to a distal end 1476A. Each proximal end 1476B is connected to the rear section 1472B and each distal end 1476A is free so that the legs 1476 are cantilevered from the rear section 1472B. The legs 1476 are circumferentially spaced apart from one another about the axis P9-P9 and are circumferentially aligned with the slots 1475.

The interlock insert 1470 may be formed of any suitable material(s). In some embodiments, the interlock insert 1470 is formed of a polymer and/or synthetic polymer. In some embodiments, the interlock insert 1470 is formed of a thermoplastic. Suitable materials for the interlock insert 1470 may include, but are not limited to, polyvinyl chloride (PVC). In some embodiments, the interlock insert 1470 is a rigid, unitary member. In some embodiments, the interlock insert 1470 is a monolithic member.

The interlock insert 1470 may be fastened or bonded (e.g., by adhesive or co-molding) to the tip body 1450. In other embodiments, the interlock insert 1470 is integrally formed with the tip body 1450. In some embodiments, the interlock insert 1470 and the tip body 1450 collectively form a unitary or monolithic member. In other embodiments, the interlock insert 1470 is secured to the tip body 1450 by cooperating mechanical features on the interlock insert 1470 and the tip body 1450.

Figures 68, 69:
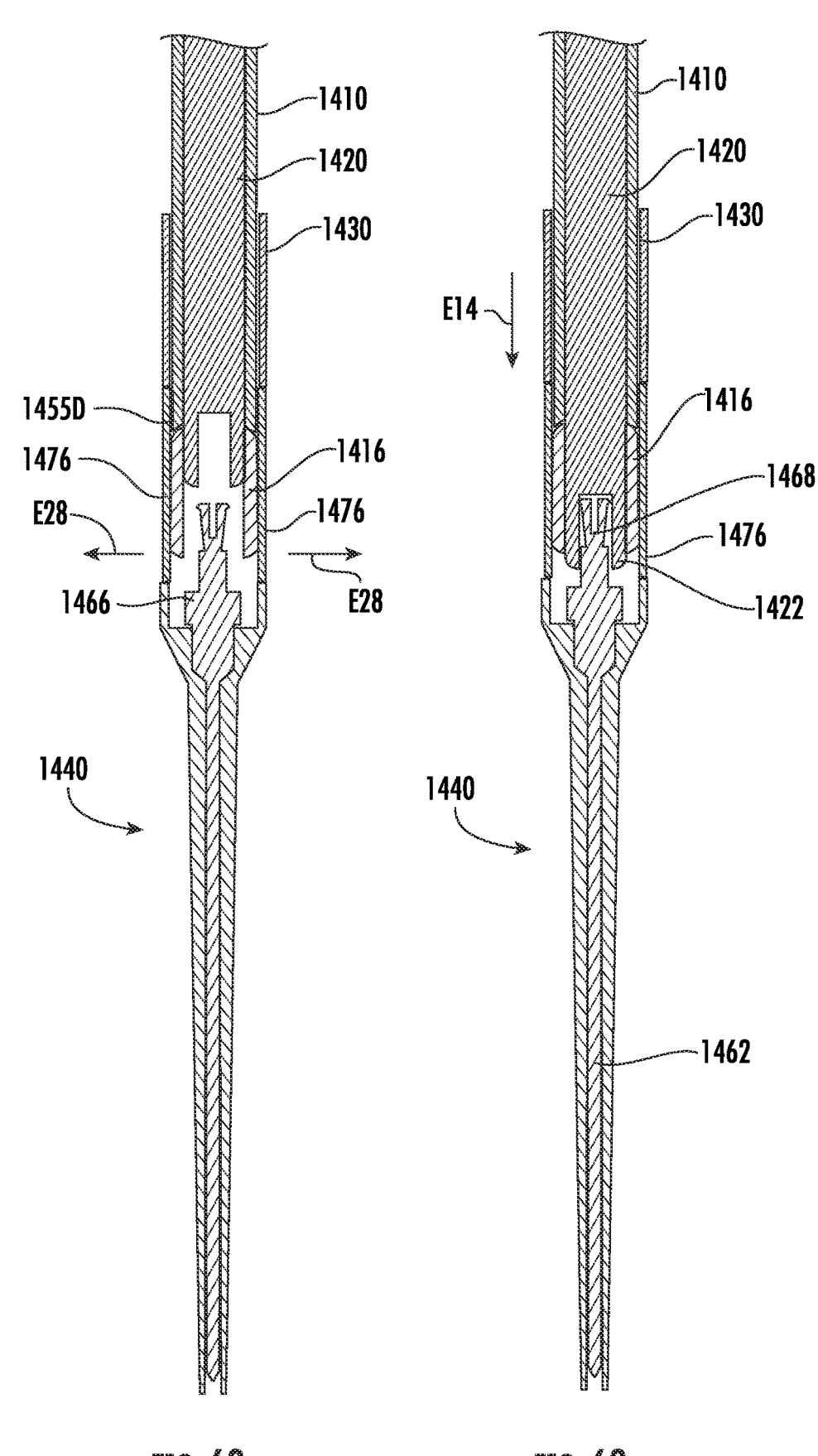

The piston restraint mechanism 1471 is operable to selectively limit movement between the piston 1460 and the tip body 1450. The piston restraint mechanism 1471 includes the flange 1466 and the latch legs 1476 of the interlock insert 1470. The latch legs 1476 are positionable in each of a latching position (as shown in FIGS. 62 and 66) and a non-latching position (as shown in FIG. 68). The piston restraint mechanism 1471 is positionable in each of a restraining configuration (as shown in FIGS. 62 and 66) and a release configuration (as shown in FIG. 68).

When the piston restraint mechanism 1471 is in the restraining configuration, the latch legs 1476 are in the latching position and interlock with the flange 1466 to prevent axial displacement of the piston 1460 in the retraction direction E24 beyond a prescribed position relative to the tip body 1450.

When the piston restraint mechanism 1471 is in the release configuration, the latch legs 1476 do not interlock with the flange 1466, so that they permit axial displacement of the piston 1460 in the retraction direction E24 beyond the prescribed position relative to the tip body 1450. In some embodiments and as illustrated, the piston restraint mechanism 1471 does not limit movement between the piston 1460 and the tip body 1450 when in the release configuration.

In the latching position, the legs 1476 are sloped, tapered or angled radially inward so that the axis P10-P10 of each leg 1476 forms an angle AL (FIG. 65) relative to the tip axis P9-P9. In the latching position, the distal ends 1470A of the legs 1476 are axially aligned with portions of the flange 1466. In some embodiments, the angle AL is in the range of from about 2 to 30 degrees.

Figure 65:
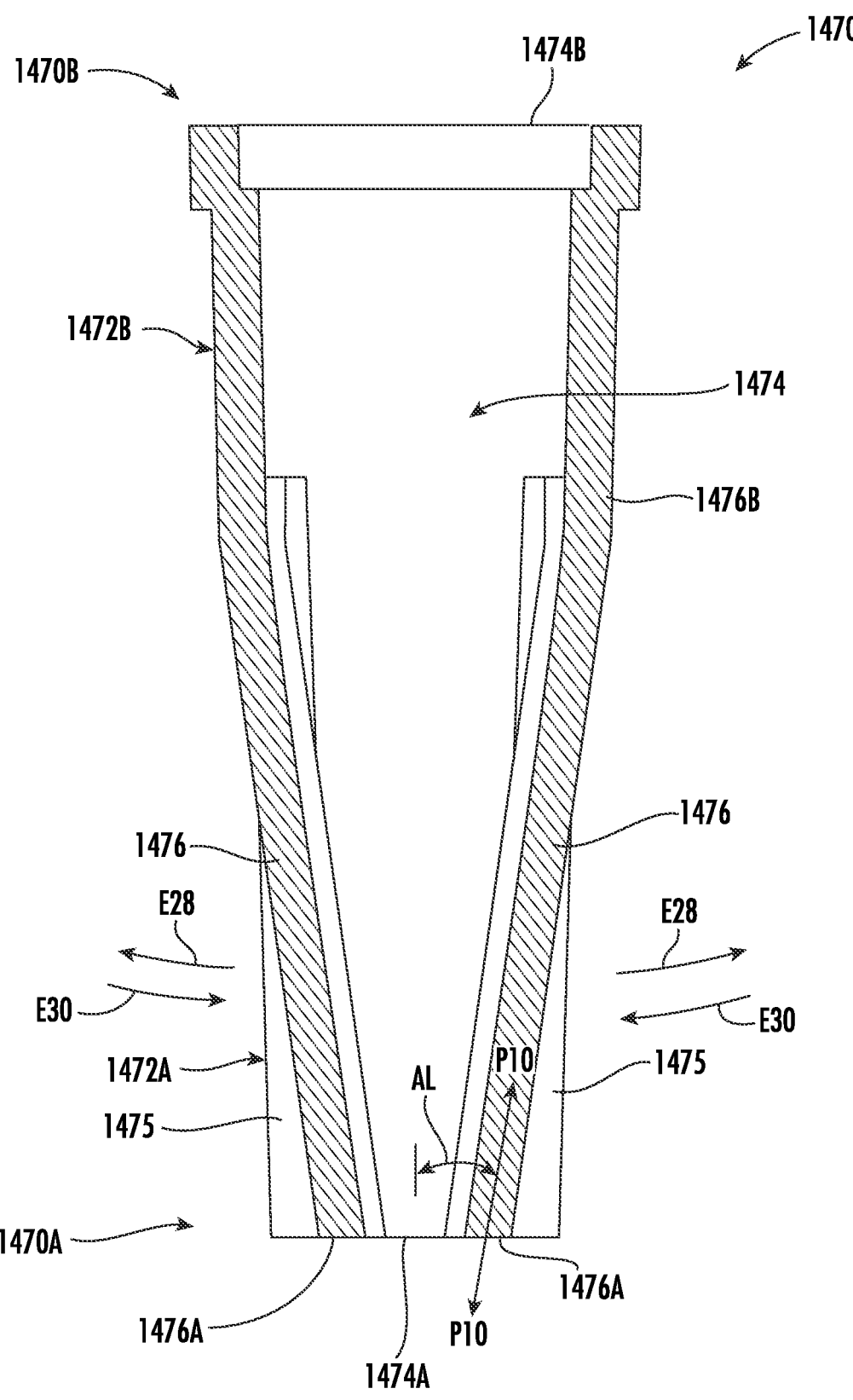
FIG. 65 is a cross-sectional view of an interlock insert forming a part of the positive displacement pipette tip of FIG. 60 taken along the line 62-62 of FIG. 60.

In some embodiments, the insert 1470 is constructed such that, in the latching position, the legs 1476 are elastically bent, folded or deflected outwardly (i.e., in directions E28; FIG. 65) from their relaxed positions. As a result, the legs 1476 are persistently loaded against the rear section 1464 of the piston 1460, and the distal ends 1470A of the legs 1476 are thereby maintained in alignment the flange 1466.

In some embodiments, the legs 1476 are resilient along their lengths so that the legs 1476 can be elastically bent, folded or deflected from the latching position to the non-latching position. In some embodiments, the proximal ends 1476B are resiliently connected to the rear section 1472B so that the legs 1476 can be elastically deflected about the connections from the latching position to the non-latching position.

The liquid handling system 10 and the pipetting system 1401 may be used as follows in accordance with some methods to aspirate and/or dispense one or more liquid samples.

Initially, the PD pipette tip 1440 is disposed in the restraining configuration as shown in FIGS. 62 and 66. The tip 1440 may be held in a pipette tip supply rack, for example.

If not already retracted, the plunger 1420 is retracted (as shown in FIG. 66). The pipettor shaft 1414 is moved in an insertion direction I to insert the pipettor distal end 1400A into the mount section 1455D as shown in FIG. 66. The pipettor shaft 1414 is further inserted into the tip body 1450 as shown in FIG. 67 until the tip adaptor 1416 engages the legs 1476. The pipettor shaft 1414 is further inserted in this manner until the tip adaptor 1416 reaches as prescribed depth within the rear chamber 1455C, as shown in FIG. 68. The plunger 1420 may be retracted relative to the pipettor shaft 1414 to provide clearance between the piston 1460 and the distal end of the plunger 1420, as shown in FIG. 68. As the tip adaptor 1416 is translated to the prescribed depth, the outer diameter of the tip adaptor 1416 displaces or forces the legs 1476 to pivot, fold or deflect in opposed radially outward directions E28 to their non-latching positions. The tip 1440 is thereby placed in its release configuration as shown in FIG. 68.

During the insertion of the pipettor shaft 1414, the ejector sleeve 1430 is positioned away from the distal end 1400A or displaced in the retraction direction E20 relative to the barrel 1410 to make room for the tip body 1450. For example, the ejector sleeve 1430 may be driven in the retraction direction E20 by the tip body 1450 as the pipettor shaft 1414 is inserted.

The plunger drive mechanism 1424 then drives the plunger 1420 to translate in the extension direction E14 until the piston coupling feature 1422 interlocks or couples with the plunger coupling feature 1468, as shown in FIG. 69. The plunger 1420 is thereby mechanically coupled to the piston 1460.

With the tip 1440 in the release configuration and the plunger 1420 and the piston 1460 coupled, the pipettor 1400 and tip 1440 can be used to aspirate and dispense in the manner described herein with regard to the pipette tip 670 (FIG. 32), for example. The plunger 1420 is driven by the plunger drive mechanism 1424 in directions E14 and E16 to translate the piston 1460 through the tip passage 1455A while the tip 1440 is maintained in the release configuration.

When the piston 1460 is drawn in the retraction direction E24 by the plunger 1420, the piston shaft 1462 is translated in the direction E24 relative to the front section 1452A (e.g., as illustrated in FIG. 70), which expands the fluid volume in the tip passage 1455A. This expansion generates a negative pressure in the tip passage 1455A, which aspirates a liquid volume LV of a liquid sample LS into the tip passage 1455A through the orifice 1456.

Figures 71, 72:
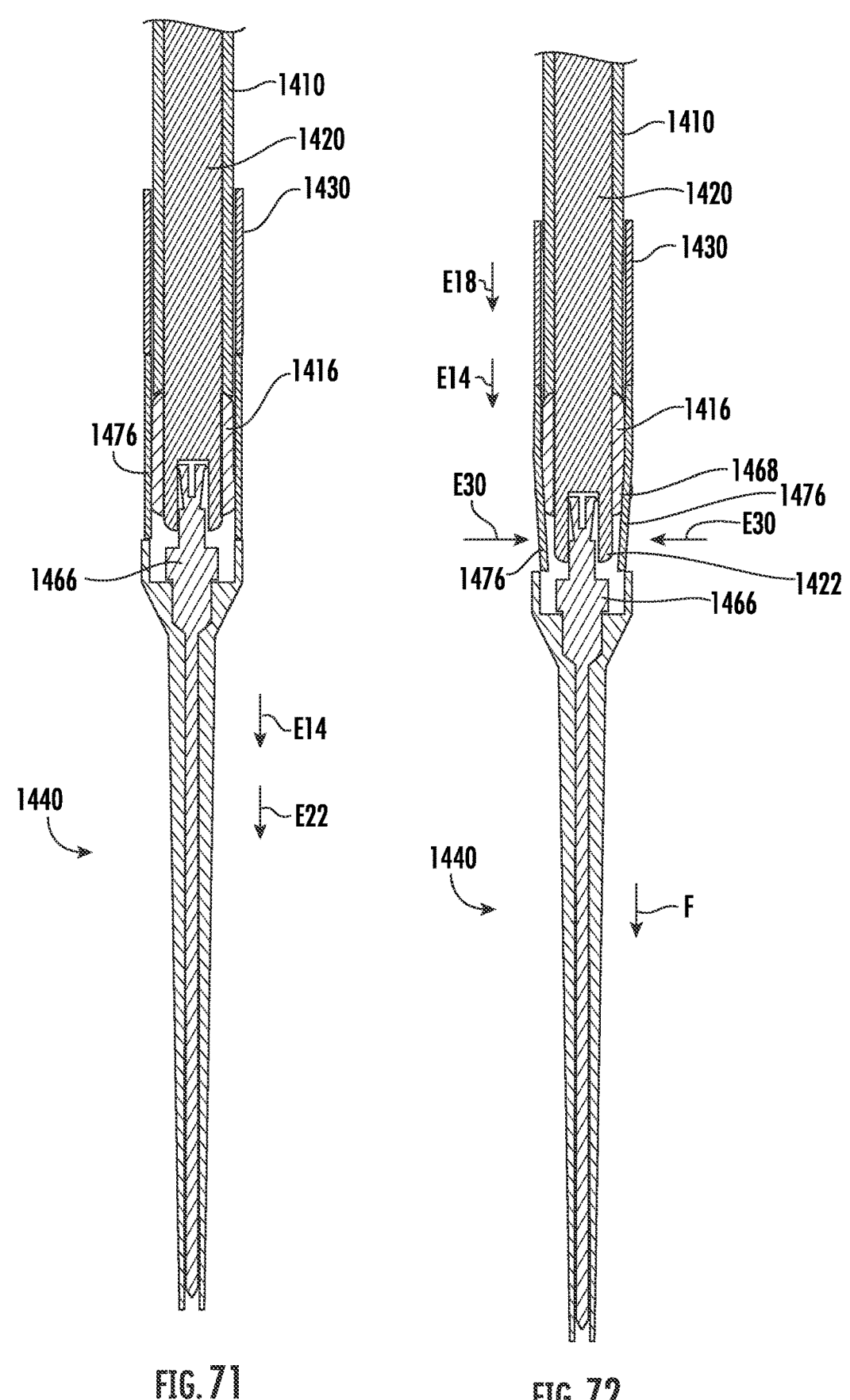

When the piston 1460 is pushed in the extension direction E22 by the plunger 1420, the piston shaft 1462 is translated in the direction E22 relative to the front section 1452A (e.g., as illustrated in FIG. 71), which displaces or reduces the fluid volume in the tip passage 1455A. This reduction generates a positive pressure in the tip passage 1455A, which expels or dispenses a liquid volume LV of the liquid sample LS from the tip passage 1455A through the orifice 1456.

When it is no longer desired to use the pipette tip 1440 on the pipettor 1400, the tip 1440 may be removed from the pipettor 1400 as follows using the piston restraint mechanism 1471.

Starting with the tip 1440 in the release configuration and the plunger 1420 and the piston 1460 coupled as shown in FIG. 71, the ejector drive mechanism 1432 translates the ejector sleeve 1430 in the extension direction E18 relative to the pipettor shaft 1414 while the plunger drive mechanism 1424 drives the plunger 1420 in the direction E14 relative to the pipettor shaft 1414. The tip body 1450 and the piston 1460 are thereby pushed in the forward direction F relative to the pipettor shaft 1414, as shown in FIG. 72. As a result, the tip adaptor 1416 is slid out from between the legs 1476, which permits the legs 1476 to elastically return in the radial directions E30 (by bending, pivoting or folding as illustrated in FIGS. 72 and 73).

Figures 73, 74:
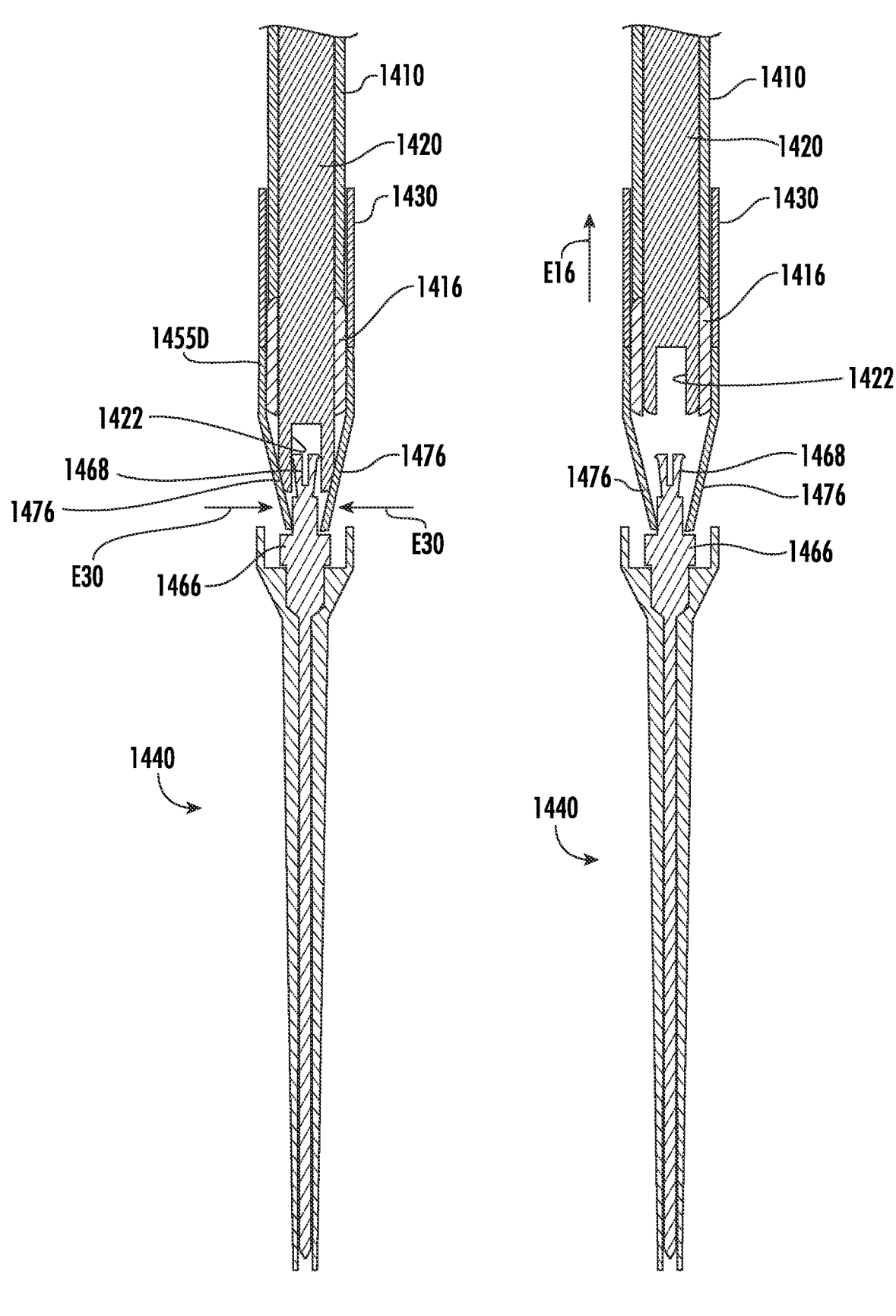

The ejector sleeve 1430 and the plunger 1420 are driven in this manner until the tip 1440 and pipettor 1400 reach the configuration shown in FIG. 73. The legs 1476 are thereby returned to their latching positions and the tip 1440 has assumed its restraining configuration. In some embodiments, the plunger 1420 is translated in the extension direction E14 along with the ejector sleeve 1430 to maintain a relative axial positioning between the flange 1466 and the distal ends 1476A of the legs 1476 so that the distal ends 1476A close about the piston 1460 rearward of the flange 1466.

With the tip 1440 in the restraining configuration and the plunger 1420 and the piston 1460 coupled as shown in FIG. 73, the plunger drive mechanism 1424 drives the plunger 1420 to translate in the retraction direction E16 relative to the pipettor shaft 1414 and the tip body 1450, as shown in FIG. 74. The engagement between the legs 1476 and the flange 1466 prevents the piston 1460 from translating in direction E24 (FIG. 70) relative to the tip body (i.e., the legs 1476 hold the piston 1460 in place). As a result, the piston coupling feature 1422 is decoupled from the plunger coupling feature 1468 (i.e., the plunger 1420 is disconnected from the piston 1460), as shown in FIG. 74.

Figure 75:
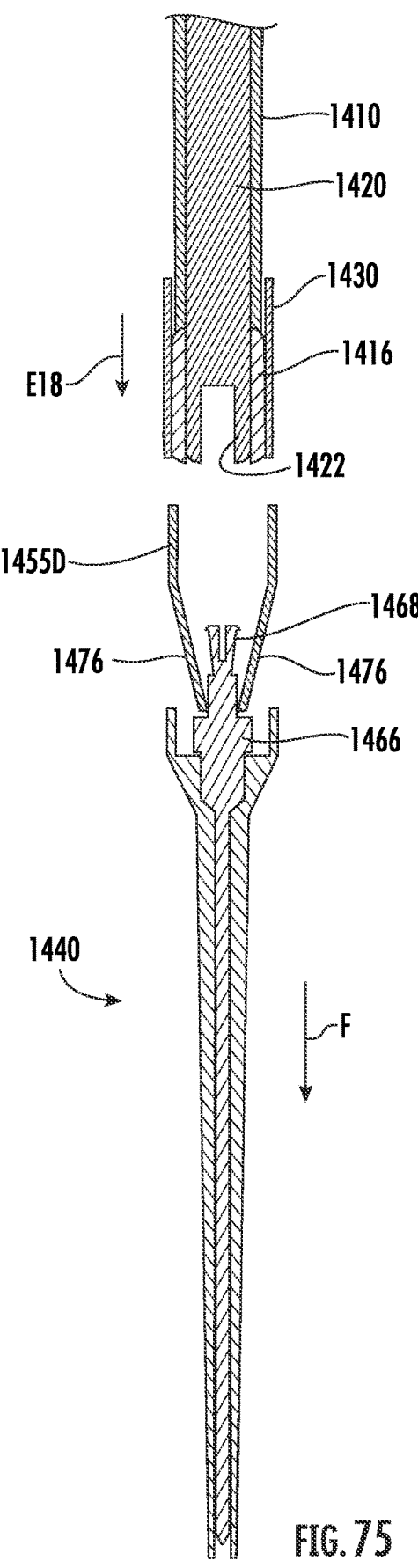

The ejector drive mechanism 1432 then translates the ejector sleeve 1430 in the extension direction E18 relative to the pipettor shaft 1414 to force the tip body 1450 (and thereby the tip 1440) off of the pipettor 1400 in the forward direction F), as shown in FIG. 75.

In other embodiments, the latch legs 1476 are integrally formed with the tip body 1450. In some embodiments, integral latches or latch features other than the latch legs 1476 are provided on the pipette tip to selectively restrain the piston 1460. Each latch may be configured as a tab, protrusion, or sleeve.

Piston coupling features and plunger coupling features of other designs may be used in place of the piston coupling feature 1422 and the plunger coupling feature 1468 to releasably join the plunger to the piston.

In some embodiments, the interlocking features 1466, 1476 may be provided with other designs or configurations.

In some embodiments, the PD pipette tip 1440 is provided with a vent orifice 1452V (FIG. 63) or other venting passage to prevent overpressurization (positive or negative) in the rear chamber 1455C that could interfere with the operation of the pipettor or cause damage to the pipettor (e.g., to a pressure sensor).

The present technology has been described herein with reference to the accompanying drawings, in which illustrative embodiments of the technology are shown. In the drawings, the relative sizes of regions or features may be exaggerated for clarity. This technology may, however, be embodied in many different forms and should not be construed as limited to the embodiments set forth herein; rather, these embodiments are provided so that this disclosure will be thorough and complete, and will fully convey the scope of the technology to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer, or section. Thus, a first element, component, region, layer, or section discussed below could be termed a second element, component, region, layer, or section without departing from the teachings of the present technology.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items.

The term "automatically" means that the operation is substantially, and may be entirely, carried out without human or manual input, and can be programmatically directed or carried out.

The term "programmatically" refers to operations directed and/or primarily carried out electronically by computer program modules, code and/or instructions.

The term "electronically" includes both wireless and wired connections between components.

Many alterations and modifications may be made by those having ordinary skill in the art, given the benefit of present disclosure, without departing from the spirit and scope of the invention. Therefore, it must be understood that the illustrated embodiments have been set forth only for the purposes of example, and that it should not be taken as limiting the invention as defined by the following claims. The following claims, therefore, are to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the invention.

What is claimed is:

1. An automated pipetting system comprising:
a pipettor including:
   a pipetting channel;
   a first plunger mechanism including a first chamber and a first plunger and operable to move the first plunger through the first chamber to displace or replace an air volume in the first chamber and thereby change a pressure in the pipetting channel to aspirate or dispense a liquid;
   a second plunger mechanism including a second chamber and a second plunger and operable to move the second plunger through the second chamber to displace or replace an air volume in the second chamber and thereby change the pressure in the pipetting channel to aspirate or dispense the liquid;
   a valve fluidly connected to each of the second chamber and the pipetting channel; and
   a controller;
wherein:
   the first and second plunger mechanisms are operable to move the first and second plungers independently of one another to change the pressure in the pipetting channel; and
   the controller is configured to control the valve between a first valve state, wherein the valve prevents fluid flow between the second chamber and the pipetting channel, and a second valve state, wherein the valve permits fluid flow between the second chamber and the pipetting channel; and
the controller is configured to operate the pipettor in each of a first aspirating mode and a second aspirating mode, wherein:
   in the first aspirating mode, the controller sets the valve in the first valve state and operates the first plunger mechanism to move the first plunger through the first chamber with the valve in the first valve state to generate a negative pressure in the pipetting channel; and
   in the second aspirating mode, the controller sets the valve in the second valve state and operates the second plunger mechanism to move the second plunger through the second chamber with the valve in the second valve state to generate a negative pressure in the pipetting channel.

2. The automated pipetting system of claim 1 wherein:
the pipetting system includes a pipetting orifice and a liquid collection volume; and
the first and second plunger mechanisms are operable to change the pressure in the pipetting channel to aspirate the liquid into the liquid collection volume through the pipetting orifice or to dispense the liquid from the liquid collection volume through the pipetting orifice.

3. The automated pipetting system of claim 2 including a pipette tip removably coupled to the pipettor, wherein the pipette tip includes the liquid collection volume and the pipetting orifice.

4. The automated pipetting system of claim 1 wherein:
the first plunger mechanism includes a first plunger actuator operable to move the first plunger through the first chamber;
the second plunger mechanism includes a second plunger actuator operable to move the second plunger through the second chamber; and
the controller is configured to control the first plunger actuator and the second plunger actuator automatically.

5. The automated pipetting system of claim 1 wherein:
the first plunger mechanism is configured to translate the first plunger along a first plunger axis;
the second plunger mechanism is configured to translate the second plunger along a second plunger axis;
the first plunger has a first cross-sectional area in a plane orthogonal to the first plunger axis;
the second plunger has a second cross-sectional area in a plane orthogonal to the second plunger axis; and
the second cross-sectional area is greater than the first cross-sectional area.

6. The automated pipetting system of claim 1 wherein:
the first plunger mechanism is configured to translate the first plunger through the first chamber;
the second plunger mechanism is configured to translate the second plunger through the second chamber;
the first plunger displaces an air volume in the first chamber at a first rate of air volume displacement per unit translation;
the second plunger displaces an air volume in the second chamber at a second rate of air volume displacement per unit translation; and
the second rate of air volume displacement per unit translation is greater than the first rate of air volume displacement per unit translation.

7. The automated pipetting system of claim 1 wherein:
a valve is fluidly connected to a port to atmosphere; and
the controller is configured to operate the valve fluidly connected to the port to atmosphere to selectively control fluid communication between the second chamber and the port to atmosphere to selectively expel air displaced from the second chamber by the second plunger to atmosphere through the port.

8. The automated pipetting system of claim 1 including a pressure sensor coupled to the pipetting channel, wherein the controller is configured to receive a pipetting channel pressure signal from the pressure sensor indicating the pressure in the pipetting channel.

9. The automated pipetting system of claim 1 wherein the controller is configured to control the valve automatically.

10. The automated pipetting system of claim 1 wherein the controller is configured to aspirate a liquid sample volume by:
controlling the first plunger mechanism to move the first plunger through the first chamber to displace a first air volume into the first chamber to aspirate a first portion of the liquid sample volume; and
controlling the second plunger mechanism to move the second plunger through the second chamber to displace a second air volume into the second chamber to aspirate a second portion of the liquid sample volume.

11. The automated pipetting system of claim 1 wherein:

the first plunger displaces a first maximum air volume when the first plunger is translated through a full stroke of the first plunger;

the second plunger displaces a second maximum air volume when the second plunger is translated through a full stroke of the second plunger; and the second maximum air volume is greater than the first maximum air volume.

12. The automated pipetting system of claim 1 wherein the first plunger is disposed in the pipetting channel.

13. The automated pipetting system of claim 1 wherein:

in the second aspirating mode, the controller does not operate the first plunger mechanism to move the first plunger through the first chamber to generate a negative pressure in the pipetting channel; and the controller is configured to operate the pipettor in a third aspirating mode in which the controller:

sets the valve in the second valve state;

operates the first plunger mechanism to move the first plunger through the first chamber with the valve in the second valve state to generate a negative pressure in the pipetting channel, and operates the second plunger mechanism to move the second plunger through the second chamber with the valve in the second valve state to generate a negative pressure in the pipetting channel.

14. An automated pipetting system comprising:

a pipettor including:

a pipetting channel;

a first plunger mechanism operable to change a pressure in the pipetting channel to aspirate or dispense a liquid; and a second plunger mechanism operable to change the pressure in the pipetting channel to aspirate or dispense the liquid;

wherein:

the first plunger mechanism includes a first chamber and a first plunger;

the first plunger mechanism is operable to move the first plunger through the first chamber to change the pressure in the pipetting channel;

the second plunger mechanism includes a second chamber and a second plunger;

the second plunger mechanism is operable to move the second plunger through the second chamber to change the pressure in the pipetting channel;

the first and second plunger mechanisms are operable to move the first and second plungers independently of one another to change the pressure in the pipetting channel; and the pipettor includes:

a port to atmosphere;

a valve fluidly connected to each of the second chamber and the port; and a controller configured to operate the valve to selectively control fluid communication between the second chamber and the port to selectively expel air displaced from the second chamber by the second plunger to atmosphere through the port.

15. An automated pipetting system comprising:

a pipettor including:

a pipetting channel;

a first plunger mechanism including a first chamber, a first plunger, and a first plunger actuator configured to move the first plunger through the first chamber to change a pressure in the pipetting channel to aspirate or dispense a liquid; and a second plunger mechanism including a second chamber, a second plunger, and a second plunger actuator configured to move the second plunger through the second chamber to change the pressure in the pipetting channel to aspirate or dispense the liquid; and a controller configured to automatically control the first plunger mechanism and the second plunger mechanism;

wherein:

the first and second plunger mechanisms are operable independently of one another to change the pressure in the pipetting channel; and the controller is configured to aspirate a liquid sample volume by:

automatically controlling the first plunger actuator to move the first plunger through the first chamber to aspirate a first portion of the liquid sample volume; and also automatically controlling the second plunger actuator to move the second plunger through the second chamber to aspirate a second portion of the liquid sample volume.

16. A method for operating an automated pipetting system, the method comprising:

performing, by at least one control circuit, operations comprising:

operating a first plunger mechanism of a pipettor of the automated pipetting system to move a first plunger of the first plunger mechanism through a first chamber of the first plunger mechanism to displace or replace an air volume in the first chamber and thereby change a pressure in a pipetting channel of the pipettor to aspirate or dispense a liquid; and operating a second plunger mechanism of the pipettor to move a second plunger of the second plunger mechanism through a second chamber of the second plunger mechanism to displace or replace an air volume in the second chamber and thereby change the pressure in the pipetting channel to aspirate or dispense the liquid; and operating a valve fluidly connected to each of the second chamber and the pipetting channel to selectively control fluid communication between the second chamber and the pipetting channel;

wherein the first and second plunger mechanisms are operable to move the first and second plungers independently of one another to change the pressure in the pipetting channel.

17. The method of claim 16 including operating the first and second plunger mechanisms to aspirate the liquid into a liquid collection volume through a pipetting orifice or to dispense the liquid from the liquid collection volume through the pipetting orifice.

18. The method of claim 16 wherein:

the first plunger mechanism includes a first plunger actuator operable to move the first plunger through the first chamber;

the second plunger mechanism includes a second plunger actuator operable to move the second plunger through the second chamber; and the method includes controlling the first plunger actuator and the second plunger actuator automatically using a controller.

19. The method of claim 18 including controlling the valve automatically using the controller.

20. The method of claim 18 including:

using the controller, automatically controlling the first plunger mechanism to move the first plunger through the first chamber to displace a first air volume into the first chamber to aspirate a first portion of the liquid sample volume; and using the controller, automatically controlling the second plunger mechanism to move the second plunger through the second chamber to displace a second air volume into the second chamber to aspirate a second portion of the liquid sample volume.

21. The method of claim 16 wherein the first plunger is disposed in the pipetting channel.

22. The method of claim 16 including:

operating the pipettor in a first aspirating mode including:

setting the valve in a first valve state wherein the valve prevents fluid flow between the second chamber and the pipetting channel; and operating the first plunger mechanism to move the first plunger through the first chamber with the valve in the first valve state to generate a negative pressure in the pipetting channel; and operating the pipetting system in a second aspirating mode including:

setting the valve in a second valve state wherein the valve prevents fluid flow between the second chamber and the pipetting channel; and operating the second plunger mechanism to move the second plunger through the second chamber with the valve in the second valve state to generate a negative pressure in the pipetting channel.

23. The method of claim 22 wherein:

in the second aspirating mode, the first plunger mechanism does not move the first plunger through the first chamber to generate a negative pressure in the pipetting channel; and the method further includes operating the pipettor in a third aspirating mode including:

setting the valve in the second valve state;

operating the first plunger mechanism to move the first plunger through the first chamber with the valve in the second valve state to generate a negative pressure in the pipetting channel; and operating the second plunger mechanism to move the second plunger through the second chamber with the valve in the second valve state to generate a negative pressure in the pipetting channel.

* * * * *